United States Patent
Harris, Jr. et al.

(10) Patent No.: US 6,564,747 B2
(45) Date of Patent: *May 20, 2003

(54) METHODS FOR RAISING PRE-ADULT ANADROMOUS FISH

(75) Inventors: H. William Harris, Jr., Portland, ME (US); David R. Russell, Alfred, ME (US); Jacqueline Nearing, N. Yarmouth, ME (US); Marlies Betka, Portland, ME (US)

(73) Assignee: MariCal, LLC, Portland, ME (US)

( * ) Notice: Subject to any disclaimer, the term of this patent is extended or adjusted under 35 U.S.C. 154(b) by 2 days.

This patent is subject to a terminal disclaimer.

(21) Appl. No.: 09/975,553

(22) Filed: Oct. 11, 2001

(65) Prior Publication Data

US 2002/0152968 A1 Oct. 24, 2002

Related U.S. Application Data

(63) Continuation-in-part of application No. 09/687,477, filed on Oct. 12, 2000, now Pat. No. 6,463,883, which is a continuation-in-part of application No. 09/687,476, filed on Oct. 12, 2000, which is a continuation-in-part of application No. 09/687,372, filed on Oct. 12, 2000.

(51) Int. Cl.[7] ................................................ A01K 61/00
(52) U.S. Cl. ........................ 119/230; 119/231; 435/375; 426/2
(58) Field of Search ............................... 119/215, 230, 119/231; 426/2; 435/375

(56) References Cited

U.S. PATENT DOCUMENTS

| | | | |
|---|---|---|---|
| 3,406,662 A | 10/1968 | Vik et al. | 119/217 |
| 3,777,709 A | 12/1973 | Anderson et al. | 119/3 |
| 4,703,008 A | 10/1987 | Lin | 435/240.2 |
| 5,128,153 A | 7/1992 | Axelrod | 119/230 |
| 5,351,651 A | 10/1994 | Ushio et al. | 119/231 |
| 5,688,938 A | 11/1997 | Brown et al. | 536/23.5 |

(List continued on next page.)

FOREIGN PATENT DOCUMENTS

| | | |
|---|---|---|
| EP | 0801904 A1 | 4/1997 |
| SU | 1784152 | 12/1992 |
| WO | WO 97/35977 | 10/1997 |
| WO | WO 98/15627 | 4/1998 |
| WO | WO 00/64274 | 4/1999 |

OTHER PUBLICATIONS

Nearing, J, et al., "Cloning and expression of a homologue of the calcium (Ca2+)/polyvalent cation receptor (CaR) protein that acts as a magnesium (Mg2+) sensor in dogfish shark (*Squallus acanthias*) kidney." *Journal of The American Society of Nephrology*, 8: 40A. (From ASN Program and Abstracts, 1997, Abstract No. A0194) (1997).

Sands, J. M., et al., "An extracellular calcium/polyvalent cations–sensing receptor (CaR) localized to endosomes containing aquaporin 2 water channels modulates vasopressin–elicited water permeability in rat kidney inner medullary collecting duct," *J Clinical Investigation* 99: 1399–1405 (1997).

(List continued on next page.)

*Primary Examiner*—Charles T. Jordan
*Assistant Examiner*—Floris C Copier
(74) *Attorney, Agent, or Firm*—Hamilton, Brook, Smith & Reynolds, P.C.

(57) ABSTRACT

The invention relates to methods, compositions and kits for improving the raising of pre-adult anadromous fish, or preparing pre-adult anadromous fish for transfer to seawater. The methods involve adding at least one Polyvalent Cation Sensing Receptor (PVCR) modulator to the freshwater in an amount sufficient to increase expression and/or sensitivity of at least one PVCR; and adding feed for fish consumption to the freshwater, wherein the feed comprises an amount of NaCl sufficient to contribute to a significantly increased level of the PVCR modulator in serum of the pre-adult anadromous fish.

90 Claims, 52 Drawing Sheets

U.S. PATENT DOCUMENTS

| | | | |
|---|---|---|---|
| 5,763,569 A | 6/1998 | Brown et al. | 530/324 |
| 5,858,684 A | 1/1999 | Nemeth et al. | 435/7.2 |
| 5,962,314 A | 10/1999 | Brown et al. | 435/320 |
| 5,981,599 A | 11/1999 | Moe et al. | 514/654 |
| 6,001,884 A | 12/1999 | Nemeth et al. | 514/699 |
| 6,016,770 A | 1/2000 | Fisher | 119/215 |

OTHER PUBLICATIONS

Ward, D. T., et al., "Disulfide–bonds in the Extracellular Calcium–polyvalent Cation Sensing Receptor Mediate Dimer Formation and its Response to Divalent Cations in Vitro," *J. Biol. Chem.* 273: 14476–14483 (1998).

Riccardi, D., et al., "Cloning and Functional Expression of a Rat Kidney Extracellular Calcium/Polyvalent Cation–Sensing Receptor," *Proc. Natl. Acad. Sci. USA* 92:131–135 (1995).

Zaugg, W.S., et al., "Increased Seawater Survival And Contribution To The Fishery of Chinook Salmon (*Oncorhynchus Tshawytscha*) By Supplemental Dietary Salt," *Aquaculture*, 32: 183–188 (1983).

Shaw, H.M., et al., "Effect of Dietary Sodium Chloride on Growth of Atlantic Salmon (*Salmo salar*)," *J. Fish Res. Board Can.*, 32(10) 1813–1819 (1975).

MacLeod, M.G., "Relationships Between Dietary Sodium Chloride, Food Intake and Food Conversion in the Rainbow Trout," *J. Fish Biol.*, 13: 73–78 (1978).

Stickney, R. R., "Nonconservative Aspects of Water Quality; Conservative Aspects of Water Quality and Physical Aspects of the Culture Environment; and Feed, Nutrition, and Growth. (Chapters 4, 5, 6." In Principles of Aquaculture, (John Wiley & Sons, Inc.), pp. 146–351 (1994).

Folmar, Leroy C. and Dickhoff, Walton W., "The Parr–Smolt Transformation (Smoltification) And Seawater Adaptation In Salmonids," *Aquaculture*, 21: 1–37 (1980).

Williams, S., et al., "A comparison of underyearling growth and smoltification between hatchery reared Maine land-locked Atlantic salmon, *Salmo salar*, and a commercially available strain of Norwegian *Salmo salar*." *World Aquaculture Association Book of Abstracts*, p. 584 (1998).

Brown, E.M., et al., "A comparison of the effects of divalent and trivalent cations on parathyroid hormones release," *Endocrinol.*, 127:1064–1071 (1990).

Ward, P.T. et al., "Disulfide Bonds in the Extracellular Calcium–polyvalent Cation–sensing Receptor Correlate with Dimer Formation and its Response to Divalent Cations in Vitro," *Am Soc. Biochem. Mol. Bio.*, 272:23; 14478–14483 (1998).

Forsberg, James A., et al., "Survival and Growth of Red Drum *Sciaenops ocellatus* in Saline Groundwaters of West Texas, USA," *Journal of the World Aquaculture Society*, 27(4): 462–474 (1996).

Garrett, J.E., et al., "Molecular Cloning and Functional Expression of Human Parathyroid Calcium Receptor cDNAs," *The Journal of Biological Chemistry*, 270(21):12919–12925 (1995).

Brown, E.M., et al., "Cloning and Characterization of an Extracellular $Ca^{2+}$–Sensing Receptor from Bovine Parathyroid," *Nature*, 366:575–580 (1993).

Grau, E.G., et al., "Lunar phasing of the thryoxin surge preparatory to seaward migration of salmonid fish," *Science* 211(4482): 607–609 (1981).

Hedemann, L., et al., "The Familial Magnesium–losing Kidney," *Acta Med Scand* 219(1) :133–6 (1986).

Young, B., et al., "Smoltification and seawater adaptation in coho salmon (*Oncorhynchus kisutsch*): plasma prolactin, growth hormone thyroid hormones and coritsol," *Gen. Comp. Endocrinology*, 74: 335–345 (1989).

Zaugg, W.S., et al., "Changes in Gill adenosine–triphosphatase activity associated with parr–smolt transformation in stellhead trout, coho and spring chinook salmon," *J.. Fish. Res. Bd. Can.*, 29(2): 167–171 (1972).

Holmes, W. N., et al., "The Body Compartments and the Distribution of Electrolytes," *Fish Physiology*, 1: 1–88 (1969).

Clarke, W.C., et al., "A seawater challenge test to measure smolting in juvenile salmon." *Fisheries and Marine Service Research Dir. Tech. Report* 705, Ottawa (1977).

Preston, Gregory M., "Polymerase Chain Reaction with Degenerate Oigonucleotide Primers to Clone Gene Family Members," In *Methods in Molecular Biology, vol. 58: Basic DNA and RNA Protocols*, A. Harwood, eds. (NJ: Humana Press Inc.) Chapter 36,pp. 303–312 (1993).

Usher, M.L., et al., "Intestinal Water Transport in Juvenile Atlantic Salmon (*Salmo Salar* L.) During Smolting and Following Transfer to Seawater," *Comp. Biochem. Physiol.*, 100A(4): 813–818 (1991).

Salman, N.A., and Eddy, F.B., "Kidney Function in Response to Salt Feeding in Rainbow Trout (*Salmo Gairdneri* Richardson)," *Comp. Biochem. Physiol.*, 89A(4): 535–539 (1988).

Nilssen, K.J., et al., "Summer osmoregulatory capacity of the world's northermost living salmonid," *Am. J. Physiol.*, 272: R743–R749 (1997).

Siner, J., "Cloning of an Aquaporin Homologue Present in Water Channel Containing Endosomes of Toad Urinary Bladder," *Am. J. Physiol.* 270:C372–C381 (1996).

Targovnik, J.H., et al., "Regulation of Parathyroid Hormone Secretion in Vitro: Quantitative Aspects of Calcium and Magnesium Ion Control," *Endocrinology* 88:1477–1482 (1971).

Taufield, P.A., et al., "Hypocalciuria in Preeclampsia," *N Engl J Med* 316(12):715–718 (1987).

Yamagami, K., et al., "Molecular and Cellular Basis of Formation, Hardening, and Breakdown of the Egg Envelope in Fish," *International Review of Cytology*, 136:51–92 (1992).

Spellman, P.T., et al., "Comprehensive Identification of Cell Cycle–regulated Genes of the Yeast *Saccharomyces cerevisiae* by Microarray Hybridization," *Molecular Biology of the Cell*, 9: 3237–3297 (1998).

Smith, L.C., "Anatomy and Special Physiology of Salmonids." In *Fish Medicine*, M.K. Stoskopf, eds. (WB Saunders), Chapter 31: 321–327 (1993).

Guo, L., et al., "extracellular $Ca^{2+}$ Increases Cytosolic Free $Ca^{2+}$ in Freshly Isolated Rat Odontoblasts," *J. Bone Miner Res.*, 14: 1357–1366 (1999).

Zadunaisky, J.A., et al., "Osmolarity and Cell Volume Changes of Chloride Cells: The Nature of the Rapid Signal for Adaptation to Salinities of *Fundulus Heteroclitus,*" *Bull. MDI Biol. Lab.*, 32:152–156 (1992).

Cole, et al., "Isolation and Characterization of Pleurociden, an Antimicrobial Peptide in the Skin Secretions of Winter Flounder," *J. Biol. Chem.* 272:12008–12013 (1997).

Forster, R. P., et al., "Formation of excretory products," Chapter 5 of Fish Physiology, Academic Press, New York, NY, pp. 313–345 (1969).

Elger, E.B. et al., "Adaption of renal function to hypotonic medium in winter flounder," *J. Comp. Physio.* B157:21–30 (1987).

Bai, M., et al., "Expression and characterization of inactivating and activating mutations in human $Ca^{2+}$ Sensing Receptor," *J. Biol. Chem.*, 32:19537–19545 (1996).

Evans, D.H., "Osmotic and Ionic Regulation," Chapter 11 in *The Physiology of Fishes*, (CRC Press, Boca Raton, FL) pp. 315–341 (1993).

Prunet, P., et al., "Effects of growth hormone on gill chloride cells in juvenile Atlantic salmon (*Salmo salar*)," *Am. J. Physiol.*, 266: R850–R857 (1994).

Naito, T. et al., "Putative pheromone receptors related to the $Ca^{2+}$-sensing receptor in Fugu," *Proc. Natl. Acad. Sci.*, 95:5178–5181 (Apr. 1998).

Hew, C.L., Antifreeze Protein Gene Transfer in Atlantic Salmon, *Molecular Marine Biology and Biotech.*, 1(4/5): 309–317 (1992).

Ryba, N.J., et al., "A New Multigene Family of Putative Pheromone Receptors," *Neuron*, 19(2):371–379 (1997).

Yamaguchi, Toru, et al., "G Protein–Coupled Extracellular $Ca^{2+}$ ($Ca^{2+}_o$)–Sensing Receptor (CaR): Roles in Cell Signaling and Control of Diverse Cellular Functions." In *Advances in Pharmacology,Hormones and Signaling*, Bert w. O'Malley, et al., eds. (Academic Press) 48: 209–253 (2000).

Zaidi, M., et al., "Emerging insights into the role of calcium ions in osteoclast regulation," *J. Bone Miner Res.*, 14: 669–674 (1999).

Mykles, Donald L., "Proteolytic Processes Underlying Molt–Induced Claw Muscle Atrophy in Decapod Crustaceans." *Amer. Zool.*, 39: 541–551 (1999).

Borgatti, A.R., et al., "Gill (NA+K+) ATPase involvement and regulation during salmonid adaptation to salt water," *Comp. Biochem. Physiol.* 102: 637–643 (1992).

Frenkel, Y., et al., "Hypocalciuria of Preeclampsia Is Independent of Parathyroid Hormone Level," *Obstetrics & Gynecology*, 77(5):689–691 (1991).

Kawamura, T., and Yamashira, S., "Chemical Sensitivity of Lateral Line Organs in the Goby. *Gobus Giurinus*," Comp. Biochem, Physiol., 72A: 253–257 (1981).

Fauci, A.S., et al., "Cardinal Manifestations and Presentation of Diseases," *Principles of Internal Medicine*, 14$^{th}$ Edition:p. 260 (1998).

Stahl, Christopher J., et al., "Optimization of Dissolved Solids for the Intensive Culture of Juvenile Red Drum *Sciaenops ocellatus*," *Journal Of the World Aquaculture Society*, 26(3): 323–326 (1995).

Forsberg, James A., and Neill, William H., "Saline Groundwater As An Aquaculture Medium: Physiological Studies On The Red Drum, *Sciaenops ocellatus*," *Environmental Biology of Fishes.*, 49: 119–128 (1997).

Xu, B., et al., "Osmoregulatory Actions of Growth Hormone In Juvenile Tilapia (*Oreochromis niloticus*)," *Fish Physiology and Biochemistry*, 17: 295–301 (1997).

Rydevik, Magnus, et al., "Plasma Growth Hormone Levels Increase During Seawater Exposure of Sexually Mature Atlantic Salmon Parr (*Salmo salar* L.)," *General and Comparative Endocrinology*, 80: 9–15 (1990).

Walton, M. J., et al., "The effects of dietary tryptophan levels on growth and metabolism of rainbow trout (*Salmo gairdneri*)," *The British Journal of Nutrition* 51: 279–287 (1984).

Veldhuis, J. D., et al., "Divergent Influences of Calcium Ions on Releasing Factor–Stimulated Anterior Pituitary Hormone Secretion in Normal Man," *Journal of Clinical Endocrinology and Metabolism*, 59(1): 56–61. (1984).

Gamba, G., et al., Primary Structure and Functional Expression of a cDNA Encoding the Thiazide–Sensitive, Electroneutral Sodium–Chloride Cotransporter, *Proc. Natl. Acad. Sci.* 90:2749–2753 (1993).

Gardner, W.D., et al., "Genitourinary System." In *Structure of the Human Body*, (W.B. Saunders Company) pp. 365–366 (1967).

El–Mowafi, A.F.A., et al., "Magnesium requirement of Atlantic salmon (*Salmo salar* L.) Parr in seawater–treated fresh water," *Aquaculture Nutrition*, 4(1) 31–38 (1998).

Conigrave, A.D., et al., "L–Amino acid sensing by the extracellular $Ca^{2+}$–sensing receptor." *Proc Natl Acad Sci*, 97(9) 4814–4819 (2000).

Ogino, Chinkichi, and Chiou, Jiing Y., "Mineral Requirements in Fish–II Magnesium Requirement of Carp," *Bulletin of the Japanese Society of Scientific Fisheries*, 42(1): 71–75 (1976).

Raloff, J., "Downtown Fisheries? Advances May Make Fish Farming a Healthy Prospect, Even For Inner Cities," *Science News*, 157(20): 314–316 (2000).

Folmar, L.C. et al., "Evaluation of some physiological parameters as predictive indices of smoltification," *Aquaculture* 23: 309–324 (1981).

Alberts, B., et al., "Cell Junctions, Cell Adhesion, and the Extracellular Matrix." In *Molecular Biology of The Cell*, 3$^{rd}$. ed., (Garland Publishing), pp. 950–954 (1994).

Baum, M. A., et al., "Recent Insights Into the Coordinate Regulation of Body Water and Divalent mineral Ion Metabolism," *The American Journal of the Medical Sciences.*, 316(5): 321–328 (1998).

Brown, E. M., et al., "Neomycin Mimics the Effects of High Extracellular Calcium Concentrations on Parathyroid Function in Dispersed Bovine Parathyroid Cells," *Endocrinology*,128(6):3047–3054 (1991).

Wendelaar Bonga, S., et al., "The Stress Response in Fish," *Physiological Reviews*, 77(3): 591–625 (1997).

Elger, B. , et al., "Effect of adrenergic blockade with bretylium and phentolamine on glomerular filtration rate in the rainbow trout, *Salmo gairdneri* Rich., adapting to saline water," *J. Biochem. Physiol.*, C. 75: 253–258 (1983).

Chen, T. T., et al., "Transgenic fish," *Trends in Biotechnology*, 8: 209–215 (1990).

Chattopadhyay, N., et al., "Calcium–sensing receptor in the rat hippocampus: a developmental study," *Developmental Brain Research*, 100 pp. 13–21 (1997).

Marshall, W.S., "On the involvement of mucous secretion in teleost osmoregulation," *Can. J. Zool.*, 56: 1088–1091 (1978).

Dabrowska, H., et al., "Magnesium status in freshwater fish, common carp (*Cyprinus carpio*, L.) And the dietary protein–magnesium interaction," *Fish Physiology and Biochemistry*, 9(2) 165–172 (1991).

Fuleihan, G. E., et al., "Calcium Modulation of Adrenocorticotropin Levels in Women–A Clinical Research Center Study," *The Journal of Clinical Endocrinology & Metabolism*, 81(3): 932–936 (1996).

Darnell, J., et al., "The Plasma Membrane," Chapter 13 in *Molecular Cell Biology*, 516–520 (1990).

Davenport, J., "Synopsis of Biological Data on the Lumpsucker," *Food and Agriculture Organization of the United Nations*, Synopsis No. 147 pp. 1–19 (1985).

Hocking, P.J., "Effects of Sodium and Potassium Chlorides on the Growth and Accumulation of Mineral Ions by *Cyperus Involucratus* Rottb," *Aquatic Botany*, 21: 201–217 (1985).

Howells, G.D., et al., "Effects of Acidity, Calcium, and Aluminium on fish Survival and Productivity–A Review," *J. Sci. food Agric.* 34: 559–570 (1983).

Köhl, K.I., "The effect of NaCl on growth, dry matter allocation and ion uptake in salt marsh and inland populations of *Armeria maritima*," The New Phytologist, 135: 213–225 (1997).

Looby, D., et al., "Immobilization of animal cells in porous carrier culture," *Trends in Biotechnology*, 8(8): 204–209 (1990).

Lee, Sang–Min, et al., "Influence of P, Ca, Zn, Mg, Fe, K, Mn, or Se in the Dietary Mineral Premix on Growth and Body Composition of Korean Rockfish (*Sebastes schlegeli*)," *J. Korean Fish Society*, Abstract in English, 31(2): 245–251 (1998).

Leatherland, J.F., et al., "Effect of Dietary Mirex and PCBs On Calcium and Magnesium Metabolism in Rainbow Trout, . . . ," *Comparative Biochemistry and Physiology*, 69C: 345–351 (1981).

Weatherley, A.H., et al., "Growth." In *Physiological Ecology of Pacific Salmon*, Groot, C. et al., eds. (UBC Press/Vancouver), pp. 103–158 (1995).

Mount, D.R., et al., "Effect of Long–Term Exposure to Acid, Aluminum, and Low Calsium on Adult Brook Trout (*Salvelinus fontinalis*). 2. Vitellogenesis and Osmoregulation," *Canadian Journal of Fisheries and Aquatic Sciences*, 45(9):1633–1642 (1988).

Naito, T., et al., "Putative pheromone receptors related to the $Ca^{2+}$–sensing receptor in Fugu," *Proc. natl. Acad. Sci.*, 95: 5178–5181 (1998).

Norris, D.O., "Endocrine Regulation of Iono–Osmotic Balance in Teleosts," Chapter 16 in *Vertebrate Endocrinology*, Lea and Fabiger, eds. (Philadelphia, PA) pp. 425–443 (1985).

Nemeth, E.F., et al., "Calcimimetics with potent and selective activity on the parathyroid calcium receptor," *Proc. Natl. Acad. Sci.*, 95: 4040–4045 (1998).

Evans, G.H., et al., "Association of Magnesium Deficiency with the Blood Pressure–Lowering Effects of Calcium," *Journal of Hypertension*, 8(4):327–337 (1990).

Parry, G., "Size and Osmoregulation in Salmonid Fishes," *Nature*, 181(4617): 1218–1219 (1958).

Quinn, S. J., et al., "The $Ca^{2+}$–sensing receptor: a target for polyamines," *American Journal of Physiology*, 273(4): C1315–C1323 (1997).

Renfro, J. L., et al., "Water and ion transport by the urinary bladder of the teleost *Pseudopleuronectes americanus*," *American Journal of Physiology*, 228(1): 52–61 (1995).

Veillette, P.A., et al., "Cortisol Mediates the Increase in Intestinal Fluid Absorption in Atlantic Salmon During Parr–Smolt Transformation," *General and Comparative Endocrinology*, 97: 250–258 (1995).

Rogers, K.V., et al., "Localization of calcium receptor mRNA in the adult rat central nervous system by in situ hybridization," *Brain Research*,744(1): 47–56 (1997).

Ruat, M., et al., "Calcium sensing receptor: Molecular cloning in rat and localization to nerve terminals," *Proc. Natl. Acad. Sci.*, (92): 3161–3165 (1995).

Anast, C.S., et al., "Evidence for Parathyroid Failure in Magnesium Deficiency," *Science*, 177: 606–608 (1972).

Satoh, S., et al., "Effects on Growth and Mineral Composition of Carp of Deletion of Trace elements or Magnesium from Fish Meal Diet," *Bulletin of the Japanese Society of Scientific Fisheries*, 49(3): 431–435 (1983).

Shehadeh, Z.H., et al., "The Role of the Intestine in Salinity Adaptation of the Rainbow Trout, Salmo Gairdneri," *Comp. Biochem. Physiol.*, 30: 397–418 (1969.).

Simpson, J.B., et al., "Subfornical organ lesions reduce intravenous angiotensin–induced drinking," *Brain Research*, 88: 154–161 (1975).

Siner, J., et al., "Cloning of an aquaporin homologue present in water channel containing endosomes of toad urinary bladder," *Am. J. Physiol.*, 270 (*Cell Physiol. 39*): C372–C381 (1996).

Stradmeyer, L., "Smolts—Is feeding 'non–starters' a waste of time?," *Fish Farmer*, pp. 12–13 (1991).

Tacon, A.G.J., et al., "Effect of Different dietary Levels of Salt–mixtures on Growth and Body Composition in Carp," *Bulletin of the Japanese Society of Scientific Fisheries*, 50(7): 1217–1222 (1984).

Du, S.J., et al., "Growth Enhancement in Transgenic Atlantic Salmon by the Use of an "All Fish" Chimeric Growth Hormone Gene Construct," *Bio/Technology* 10:176–181 (1992).

Usher, M.L., et al., "Effects of transfer to seawater on growth and feeding in Atlantic salmon smolts (*Salmo salar* L.)," *Aquaculture*, 94: 309–326 (1991).

Lonning, S., et al., "A Comparative Study of Pelagic and Demersal Eggs from Common Marine Fishes in Northern Norway," *Sarsia*, 73:49–60 (1988).

Ward, D. T., et al., "Disulfide bonds in the Extracellular Calcium–Polyvalent Cation–sensing Receptor Correlate with dimer formation and Its Response to Divalent Cations in Vitro," *The Journal of Biological Chemistry*, 275(23): 14476–14483 (1998).

Willoughby, S., "Production Life Cycle." In *Manual of Salmonid Farming*. Blackwell Science Ltd., eds., (Fishing News Books), pp. 82–122 (1999).

Van Der Velden, J.A., et al., "Growth rate and tissue magnesium concentration in adult freshwater tilapia, *Oreochromis mossambicus* (Peters), fed diets differing in magnesium content," Journal of Fish Biology , 39: 83–91 (1991).

Zadunaisky , J.A., et al., "Osmolarity and Cell volume Changes of Chloride Cells: The Nature of the Rapd signal for Adaptation to Salinities of Fundulus Heteroclitus," *Biological Labs*, 32: 152–156 (1995).

Yanez, J. R., et al., "The neuronal system of the saccus vasculosus of trout (*Salmo trutta fario* and *oncorhynchus mykiss*): an immunocytochemical and nerve tracing study," *Cell Tissue Res.*, 288: 497–507 (1997).

Renfro. K. J., "Relationship between renal fluid and Mg secretion in a glomerular marine teleost." *Am. J. Physiol* 238: F92–F98 (1980).

Harmin, S. A., et al., "Plasma sex steroid profiles and the seasonal reproductive cycle in male and female winter flounder, *Pleuronectes americanus*," *Marine Biology* 121: 601–610 (1995).

Wendelarr Bonga, S. E. W., et al., "Endocrinology, Chapter 15." In *The Physiology of Fishes*, DH. Evans, eds., (CRC Press Inc.) pp. 469–534 (1993).

Mayer–Gostan, M., et al., "Mechanisms of hormone actions on gill transport in Vertebrate Endocrinology." In *Fundamentals and Medical Implications*, PKT Pang, et al., eds., (Academic Press) 2: 211–246 (1987).

Madsen, S.S., "The Role of Cortisol and Growth Hormone in Seawater Adaptation and Development of Hypoosmoregularity Mechanisms in Sea Trout Parr," *Gen. Comp. Endocrinology*, 79: 1–23 (1990).

Hirano, T., "The Spectrum of Prolactin Actions in Teleosts." In *Comparative Endocrinology, Developments and Directives*, CL Ralph, eds., (Alan Liss, Inc.) pp. 53–61 (1986).

Wendelaar Bonga, S., et al., "Control of Calcium regulating hormones in vertebrates: parathyroid hormone, calcitonin, prolactin and stanniocalcin," *Int. Rev. Cytol.*, 128: 139–149 (1991).

Wendalaar Bonga, S., et al., "Pituitary hormones, in Vertebrate Endocrinology." In *Fundamentals and Biochemical Implications*, 3: 105–124 (1989).

Forserg, J.A., et al., "Survival and growth of red drum in saline groundwaters of west Texas, USA," *J. of World Aquaculture Society* 27: 462–474 (1966).

Gatlin, D.M., et al., "Effects of dietary sodium chloride on red drum juveniles in waters of various salinities," *The Prog. Fish–Culturist*, 54: 220–227 (1992).

Shearer, K.D., "Dietary potassium requirement of juvenile chinook salmon," *Aquaculture*, 73: 119–129 (1988).

Brown, E.M., et al., "Calcium–Ion–Sensing Cell–Surface Receptors," *The New England Journal of Medicine*, 333(4):234–240 (1995).

Iyer, V.R., et al., "The Transcriptional Program in the Program in the Response of Human Fibroblasts to Serum," *Science*, 283: 83–87 (1999).

Quinn, S.J., et al., "Sodium and ionic strength sensing by the calcium receptor," *J. Biol. Chem.*, 273(31): 19579–19586 (1998).

Brown, A.J., et al., "Rat calcium–receptor is regulated by vitamin D but not by calcium," *Am. J. Physiol.*, 270: F454–F460 (1996).

Olszak, I., et al., "Extracellular calcium elicits a chemokinetic response from monocytes in vitro and in vivo," *J. Clin Invest.*, 105(9): 1299–1305 (2000).

Plotkin, M.D., et al., "Localization of the Thiazide Sensitive NA–CL Cotransporter (TSC) in the Mammalian Kidney," *J. Am. Soc. Nephrol.*, 6:349A Abstract No.: 1717 (1995).

Knox, D., et al., "Studies on the nutrition of rainbow trout (*Salmo gairdneri*)," *British Journal of Nutrition*, 50: 121–127 (1983).

House, M.G., et al., "Expression of an extracellular calcium–sensing receptor in human bone marrow cells," *J. Bone Mineral Res.*: 12: 1959–1970 (1997).

Anh, D.J., et al., "Skeletal alkaline phosphatase activity is primarily released from human ossteoblasts in an insoluble form, and the net release is inhibited by calcium and skeletal growth factors," *Calcif Tissue In.*: 62: 332–340 (1998).

Bornefalk, E., et al., "Regulation of interleukin–6 secretion from mononuclear blood cells by extracellular calcium," *J. Bone Miner. Res.*, 12: 228–233 (1997).

Nielsen, P. K., et al., "Inhibition of PTH secretion by interleukin–1 beta in bovine parathyroid glands in vitro is associated with an up–regulation of the calcium–sensing receptor mRNA," *Biochem Biophys Res Commun.*, 238: 880–885 (1997).

Chang, W., et al., "Calcium Sensing in Cultured Chondrogenic RCJ3. 1c5.18 Cells," *Endocrinology* 140: 1911–1919 (1999).

Eklou–Kalonji, E., et al., "Effects of extracellular calcium on the proliferation and differentiation of porcine osteoblasts in vitro," *Cell Tissue Res.*, 292: 163–171 (1998).

Emanuel, R. L., et al., "Calcium–sensing receptor expression and regulation by extracellular calcium in the atT–20 pituitary cell line," *Mol Endocrinology*, 10: 555–565 (1996).

Godwin, S.L., et al., "Extracellular calcium and platelet–derived growth factor promote receptor–mediated chemotaxis in osteoblasts through different signaling pathways," *J. Biol. Chem.*, 272(17): 11307–11312 (1997).

Gundberg, C.M., et al., "Acute changes in serum osteocalcin during induced hypocalcemia in humans," *J. Clin. Endocrinology Metabolism*, 72: 438–443 (1991).

Honda, Y., et al., "Effects of extracellular calcium on insulin–like growth factor II in human bone cells," *J. Bone Miner Res.*, 10: 1660–1665 (1995).

Jin, H.J., et al., "Fusion of mouse alveloar macrophages induced by 1–alpha, 25–dihydroxyvitamin D3 involves extracellular, but not intracellular, calcium," *J. Cell. Physiol.*, 142: 434–439 (1990).

Kanatani, M., et al., "Effect of elevated extracellular calcium on the proliferation of osteoblastic MC3T3–E1 cells: its direct and indirect effects via monocytes," *Biochem. Biophys. Res. Commun.*, 181: 1425–1430 (1991).

Kanatani, M., et al., "High extracellular Calcium Inhibits Osteoclast–like Cell formation by Directly Acting on the Calcium–Sensing Receptor Existing in Osteoclast Precursor Cells," *Biochem. Biophys. Res. Commun.*, 261: 144–148 (1999).

Lajeunesse, D., et al., "Regulation of osteocalcin secretion by human primary bone cells and by the human osteosarcoma cell line MG–63," *Bone Miner*, 14: 237–250 (1991).

Malgaroli, A., et al., "Control of cytosolic free calcium in rat and chicken osteoclasts. The role of extracellular calcium and calcitonin," *J. Biol. Chem.*, 264: 14342–14349 (1989).

Quarles, L.D., "Cation–sensing receptors in bone: A novel paradigm for regulating bone remodeling?," *J. Bone Miner. Res.*, 12: 1971–1974 (1997).

Sugimoto, T., et al., "Effects of high calcium concentration on the functions and interactions of osteoblastic cells and monocytes and on the formation of osteoclast–like cells," *J. Bone Miner Res.*, 8: 1445–1452 (1993).

Yamaguchi, T., et al., "Extracellular Calcium ($Ca2+_o$)–sensing Receptor in a Murine Bone Marrow–Derived Stromal Cell Line (ST2): Potential Mediator of the Actions of $Ca2+_o$ on the Function of ST2 Cells," *Endocrinology*, 139: 3561–3568 (1998).

Yamaguchi, T., et al., "Mouse osteoblastic cell line (MC3T3–E1) expresses extracellular calcium ($Ca2+o$)–sensing receptor and its agonists stimulate chemotaxis and proliferation of MC3T3–E1 cells," *J Bone Miner Res.*, 13: 1530–1538 (1998).

Yamaguchi, T., et al., "Extracellular calcium (Ca2+o)–sensing receptor in a mouse monocyte–macrophage cell line (J774): Potential mediator of the actions of Ca2+o on the function of J774 cells," *J Bone Miner Res.*, 13: 1390–1397 (1998).

Yamaguchi, T., et al., "Expression of extracellular calcium (Ca2+o)–sensing receptor in human peripheral blood monocytes," *Biochem. Biophys. Res. Commun.*, 246: 501–506 (1998).

Roberts, J.M., "Prevention of Early Treatment of Preeclampsia," *The New England Journal of Medicine 337*:124–125 (1997).

Rokaw, M., et al., "Rapamycin(RAP) Stimulates Sodium Transport in A6 Cells Through Inhibition of Protein Kinase C (PKC), "*J. Am. Soc. Nephrol 6*:349A (1995).

Cim, R. R., et al., "Identification and functional assay of an extracellular calcium–sensing receptor in Necturus gastric mucosa," *American Journal of Physiology* 273: G1051–G1060 (1997).

Sands, A.T., et al., "High Susceptibility to Ultraviolet–Induced Carcinogenesis in Mice Lacking XPC," *Nature 377*:162–165 (1995).

Ramos, L.S., et al., "Urinary Calcium As an Early Marker for Preeclampsia," *Obstetrics & Gynecology*, 77(5):685–688 (1991).

Saksena, D.N., "Histopathology of the *saccus vasculosus* of the Indian freshwater goby *glossogobisu giuris* Ham. (Teleostei). Folia Morphol. (Praha)," 37: 249–252 (1989).

Aida, K., et al., "Molecular Cloning of a Putative $Ca^{2+}$ Sensing Receptor cDNA from Human Kidney," *Biochemical and Biophysical Research Communications*, 214(2):524–529 (1995).

Gatlin, D. M., et al., "Effects of Dietary Sodium Chloride on Red Drum Juveniles in Waters of Various Salinities," *The Progressive Fish Culturist*, 54:220–227 (1992).

Park, G., et al., "The Effects of Residual Salts and Free Amino Acids in Musid Meal on Growth of Juvenile Japanese Flounder *Paralichttys olivaceus*," Nippon Suisan Gakkaishi, 66(4): 697–704 (2000). Abstract in English.23.

Kroeber, S., et al, "Analyses of Signal Transduction Cascades Reveal an Essential Role of Calcium Ions for Regulation of Melatonin biosynthesis in the light–sensitive Pneal Organ of the Rainbow Trout (*Oncorhynchus mkiss*)," *Journal of Neurochemistry*, 74: 2478–2489 (2000).

Lindström, E., et al., "Control of gastric acid secretion: the gastrin–ECL cell–parietal cell axis," *Comparative Biochemistry and Physiology Part A*, 128: 505–514 (2000).

Seidelin, M, and S. S. Madsen, "Endocrine control of Na+, K+–ATPase and Choloride Cell Development in Brown Trout (*Salmo trutta*): Interaction of Insulin–liike Growth Factor–ol with Prolactin and Growth Hormone," *Journal of Endocrinology*, 162: 127–135 (1999).

Seidelin, M., et al., "Time–Course Changes in the Expression of Na+, K+–ATPase in Gills and pYloric Caeca of Brown Trout (*Salmo trutta*) during Acclimation to Seawater," *Physiological and Biochemical Zoology*, 73(4): 446–453 (2000).

Madsen, S. S., and Bern, H.A., "Antagonism of Prolactin and Growth Hormone: Impact on Seawater Adaptation in Two Salmonids, *Salmo trutta* and *Oncorhynchus mykiss*," *Zoological Science*, 9: 775–784 (1992).

Olsson, C., et al., "Cholecystokinin Affects Gastric Emptying and Stomach Motility in the Rainbow Trout *Oncorhynchus Mkiss*," *The Journal of Experimental Biology* 202: 161–170 (1999).

Olsson, C., and Holmgren, S., "The Control of Gut Motility," *Comparative Biochemistry and Physiology Part A*, 128: 481–503 (2001).

McCormick, S. D., "Methods for Nonlethal Gill Biopsy and Measurement of na+, K+–ATPase Activity," *Can J. Fish. Aquat. Sci.*, 50:656–685 (1993).

Zaugg, W. S., and McLain, L. R., "Inorganic Salt Effects on Growth, Salt Water Adaption, and Gill AtPase of Pacific Salmon." In *Fish in Research*, Otto W. Neuhaus, et al., eds. (Academic Press), pp. 293–307 (1969).

Hubbard, P.C., et al., "Olfactory Sensitivity to Changes in Environmental $[Ca^{2+}]$ in the Marine Teleost *Sparus Aurata*," *Journal of Experimental Biology*, 203: 3821–3829 (2000).

Cheng, S. X., et al., "Expression of calcium–sensing receptor in rat colonic epithelium: evidence for modulation of fluid secretion," *Am. J. Physiology Gastrointestinal Liver Physiology*, 283: G240–G250 (2002).

Bodznick, D., "An odorant for natural water discriminations and the migratory behavior of sockeye salmon," *J. Comparative Physiol. A*, 127: 157–166 (1978).

Wenning, A., "Sensing effectors make sense," *Trends Neuroscience*, 22(12): 550–555 (1999).

Japan Economic Newswire, New "water" allows freshwater, saltwater fish to coexist, Kyoto News Service (Aug. 1994).

```
cttggcatta tgctctgtgc tgggggtatt cttgacagca ttcgtgatgg gagtgtttat 60
caaatttcgc aacaccccaa ttgttaaggc cacaaacaga gagctatcct acctcctcct 120
gttctcactc atctgctgtt tctccagttc cctcatcttc attggtgaac cccaggactg 180
gacatgccgt ctacgccagc ctgcattcgg gataagtttt gttctctgca tctcctgcat 240
cctggtaaaa actaaccgag tacttctagt gttcgaagcc aagatcccca ccagtctcca 300
tcgtaagtgg tgggggctaa acttgcagtt cctgttagtg ttcctgttca catttgtgca 360
agtgatgata tgtgtggtct ggctttacaa tgctcctccg gcgagctaca ggaaccatga 420
cattgatgag ataattttca ttacatgcaa tgagggctct atgatggcgc ttggcttcct 480
aattgggtac acatgcctgc tggcagccat atrcttcttc tttgcattta aatcacgaaa 540
actgccagag aactttactg aggctaagtt catcaccttc agcatgctca tctt       594
```

```
Leu Ala Leu Cys Ser Val Leu Gly Val Phe Leu Thr Ala Phe Val Met
 1               5                  10                  15
Gly Val Phe Ile Lys Phe Arg Asn Thr Pro Ile Val Lys Ala Thr Asn
                20                  25                  30
Arg Glu Leu Ser Tyr Leu Leu Leu Phe Ser Leu Ile Cys Cys Phe Ser
                35                  40                  45
Ser Ser Leu Ile Phe Ile Gly Glu Pro Gln Asp Trp Thr Cys Arg Leu
        50                  55                  60
Arg Gln Pro Ala Phe Gly Ile Ser Phe Val Leu Cys Ile Ser Cys Ile
65                  70                  75                  80
Leu Val Lys Thr Asn Arg Val Leu Leu Val Phe Glu Ala Lys Ile Pro
                85                  90                  95
Thr Ser Leu His Arg Lys Trp Trp Gly Leu Asn Leu Gln Phe Leu Leu
                100                 105                 110
Val Phe Leu Phe Thr Phe Val Gln Val Met Ile Cys Val Val Trp Leu
                115                 120                 125
Tyr Asn Ala Pro Pro Ala Ser Tyr Arg Asn His Asp Ile Asp Glu
    130                 135                 140
Ile Ile Phe Ile Thr Cys Asn Glu Gly Ser Met Met Ala Leu Gly Phe
    145                 150                 155
Leu Ile Gly Tyr Thr Cys Leu Leu Ala Ala Ile Xaa Phe Phe Phe Ala
160                 165                 170                 175
Phe Lys Ser Arg Lys Leu Pro Glu Asn Phe Thr Glu Ala Lys Phe Ile
                180                 185                 190
Thr Phe Ser Met Leu Ile Phe
                195
```

Xaa=any amino acid

FIG. 1

```
cttggcatta tgctctgtgc tgggggtatt cttgacagca ttcgtgatgg gagtgtttat  60
cagatttcgc aacaccccaa ttgttaaggc cacaaacaga gagctatcct acctcctcct 120
gttctcactc atctgctgtt tctccagctc cctcatcttc attggtgaac cccaggactg 180
gacatgccgt ctacgccagc ctgcattcgg gataagtttt gttctctgca tctcctgcat 240
cctggtcaaa actaaccgag tacttctagt gttcgaagcc aagatcccca ccagtctcca 300
tcgtaagtgg tgggggctaa acttgcagtt cctgttggtg ttcctgttca catttgtgca 360
agtgatgata tgtgtggtct ggctttacaa tgctcctccg gcgagctaca ggaaccatga 420
cattgatgag ataattttca ttacatgcaa tgagggctct atgatggcgc tcggcttcct 480
aattgggtac acatgcctgc tggcagccat atgcttcttc tttgcattta aatcacgaaa 540
actgccagag aactttaccg aggctaagtt catcaccttc agcatgctca tctt        594
```

```
Leu Ala Leu Cys Ser Val Leu Gly Val Phe Leu Thr Ala Phe Val Met
 1           5                  10                 15
Gly Val Phe Ile Arg Phe Arg Asn Thr Pro Ile Val Lys Ala Thr Asn
            20                  25                 30
Arg Glu Leu Ser Tyr Leu Leu Leu Phe Ser Leu Ile Cys Cys Phe Ser
            35                  40                 45
Ser Ser Leu Ile Phe Ile Gly Glu Pro Gln Asp Trp Thr Cys Arg Leu
    50                  55                  60
Arg Gln Pro Ala Phe Gly Ile Ser Phe Val Leu Cys Ile Ser Cys Ile
65                   70                  75                   80
Leu Val Lys Thr Asn Arg Val Leu Leu Val Phe Glu Ala Lys Ile Pro
                85                  90                  95
Thr Ser Leu His Arg Lys Trp Trp Gly Leu Asn Leu Gln Phe Leu Leu
                100                 105                 110
Val Phe Leu Phe Thr Phe Val Gln Val Met Ile Cys Val Val Trp Leu
        115                 120                 125
Tyr Asn Ala Pro Pro Ala Ser Tyr Arg Asn His Asp Ile Asp Glu
    130                 135                 140
Ile Ile Phe Ile Thr Cys Asn Glu Gly Ser Met Met Ala Leu Gly Phe
    145                 150                 155
Leu Ile Gly Tyr Thr Cys Leu Leu Ala Ala Ile Cys Phe Phe Phe Ala
160                 165                 170                 175
Phe Lys Ser Arg Lys Leu Pro Glu Asn Phe Thr Glu Ala Lys Phe Ile
                180                 185                 190
Thr Phe Ser Met Leu Ile Phe
                195
```

Xaa = Any amino acid

FIG. 2

```
ttggcattat gctctgtgct gggggtattc ttgacagtat tcgtgatggg agtgtttatc  60
agatttcgca acaccccaat tgttaaggcc acaaacagag agctatccta cctcctcctg 120
ttctcactta tctgctgttt ctccagctcc ctcatcttca ttggtgaacc ccaggactgg 180
acatgccgtc tacgccagcc tgcattcggg ataagttttg ttctctgcat ctcctgcatc 240
ctggtcaaaa ctaaccgagt acttctagtg ttcgaagcaa agatccccac cagtctccat 300
cgtaagtggt gggggctaaa cttgcagttc ctgttggtgt tcctgttcac atttgtgcaa 360
gtgatgatat gtgtggtctg gctttacaat gctcctccgg cgagctacag gaaccatgac 420
attgatgaga tcattttcat tacatgcaat gagggctcta tgatggcgct tggcttccta 480
attgggtaca catgcctgct ggcagccata tgcttcttct ttgcatttaa atcacgaaaa 540
ctgccagaga attttaccga ggctaagttc atcaccttca gcatgctcat ctt         593
```

```
Leu Ala Leu Cys Ser Val Leu Gly Val Phe Leu Thr Val Phe Val Met
 1               5                  10                  15
Gly Val Phe Ile Arg Phe Arg Asn Thr Pro Ile Val Lys Ala Thr Asn
                20                  25                  30
Arg Glu Leu Ser Tyr Leu Leu Leu Phe Ser Leu Ile Cys Cys Phe Ser
                35                  40                  45
Ser Ser Leu Ile Phe Ile Gly Glu Pro Gln Asp Trp Thr Cys Arg Leu
        50                  55                  60
Arg Gln Pro Ala Phe Gly Ile Ser Phe Val Leu Cys Ile Ser Cys Ile
65                  70                  75                  80
Leu Val Lys Thr Asn Arg Val Leu Leu Val Phe Glu Ala Lys Ile Pro
                85                  90                  95
Thr Ser Leu His Arg Lys Trp Trp Gly Leu Asn Leu Gln Phe Leu Leu
                100                 105                 110
Val Phe Leu Phe Thr Phe Val Gln Val Met Ile Cys Val Val Trp Leu
                115                 120                 125
Tyr Asn Ala Pro Pro Ala Ser Tyr Arg Asn His Asp Ile Asp Glu
                130                 135                 140
Ile Ile Phe Ile Thr Cys Asn Glu Gly Ser Met Met Ala Leu Gly Phe
                145                 150                 155
Leu Ile Gly Tyr Thr Cys Leu Leu Ala Ala Ile Cys Phe Phe Phe Ala
160                 165                 170                 175
Phe Lys Ser Arg Lys Leu Pro Glu Asn Phe Thr Glu Ala Lys Phe Ile
                180                 185                 190
Thr Phe Ser Met Leu Ile Phe
                195
```

Xaa = Any amino acid

FIG. 3

|  |  | 10 |  |  |  |  |  |  |  |  | 20 |  |  |  |  |  |
|---|---|---|---|---|---|---|---|---|---|---|---|---|---|---|---|---|
| SKCaR ORF | Leu | Thr | Ile | Phe | Ala | Val | Leu | Gly | Ile | Leu | Ile | Thr | Ser | Phe | Val | Leu | Gly | Val | Phe | Ile | 58 |
| Salmon ORF | Leu | Ala | Leu | Cys | Ser | Val | Leu | Gly | Val | Phe | Leu | Thr | Ala | Phe | Val | Met | Gly | Val | Phe | Ile | 58 |
| Arctic char ORF | Leu | Ala | Leu | Cys | Ser | Val | Leu | Gly | Val | Phe | Leu | Thr | Ala | Phe | Val | Met | Gly | Val | Phe | Ile | 58 |
| R. Trout ORF | Leu | Ala | Leu | Cys | Ser | Val | Leu | Gly | Val | Phe | Leu | Thr | Val | Phe | Val | Met | Gly | Val | Phe | Ile | 58 |

|  | 30 |  |  |  |  |  |  |  |  |  | 40 |  |  |  |  |  |
|---|---|---|---|---|---|---|---|---|---|---|---|---|---|---|---|---|
| SKCaR ORF | Lys Phe Arg Asn Thr Pro Ile Val Lys Ala Thr Asn Arg Glu Leu Ser Tyr Leu Leu Leu | 118 |
| Salmon ORF | Lys Phe Arg Asn Thr Pro Ile Val Lys Ala Thr Asn Arg Glu Leu Ser Tyr Leu Leu Leu | 118 |
| Arctic char ORF | Arg Phe Arg Asn Thr Pro Ile Val Lys Ala Thr Asn Arg Glu Leu Ser Tyr Leu Leu Leu | 118 |
| R. Trout ORF | Arg Phe Arg Asn Thr Pro Ile Val Lys Ala Thr Asn Arg Glu Leu Ser Tyr Leu Leu Leu | 118 |

|  | 50 |  |  |  |  |  |  |  |  |  | 60 |  |  |  |
|---|---|---|---|---|---|---|---|---|---|---|---|---|---|---|
| SKCaR ORF | Phe Ser Leu Ile Cys Cys Phe Ser Ser Ser Leu Ile Phe Ile Gly Glu Pro Arg Asp Trp | 178 |
| Salmon ORF | Phe Ser Leu Ile Cys Cys Phe Ser Ser Ser Leu Ile Phe Ile Gly Glu Pro Gln Asp Trp | 178 |
| Arctic char ORF | Phe Ser Leu Ile Cys Cys Phe Ser Ser Ser Leu Ile Phe Ile Gly Glu Pro Gln Asp Trp | 178 |
| R. Trout ORF | Phe Ser Leu Ile Cys Cys Phe Ser Ser Ser Leu Ile Phe Ile Gly Glu Pro Gln Asp Trp | 178 |

|  | 70 |  |  |  |  |  |  |  |  |  | 80 |  |  |  |
|---|---|---|---|---|---|---|---|---|---|---|---|---|---|---|
| SKCaR ORF | Thr Cys Arg Leu Arg Gln Pro Ala Phe Gly Ile Ser Phe Val Leu Cys Ile Ser Cys Ile | 238 |
| Salmon ORF | Thr Cys Arg Leu Arg Gln Pro Ala Phe Gly Ile Ser Phe Val Leu Cys Ile Ser Cys Ile | 238 |
| Arctic char ORF | Thr Cys Arg Leu Arg Gln Pro Ala Phe Gly Ile Ser Phe Val Leu Cys Ile Ser Cys Ile | 238 |
| R. Trout ORF | Thr Cys Arg Leu Arg Gln Pro Ala Phe Gly Ile Ser Phe Val Leu Cys Ile Ser Cys Ile | 238 |

|  | 90 |  |  |  |  |  |  |  |  |  | 100 |  |  |  |
|---|---|---|---|---|---|---|---|---|---|---|---|---|---|---|
| SKCaR ORF | Leu Val Lys Thr Asn Arg Val Leu Leu Val Phe Glu Ala Lys Ile Pro Thr Ser Leu His | 298 |
| Salmon ORF | Leu Val Lys Thr Asn Arg Val Leu Leu Val Phe Glu Ala Lys Ile Pro Thr Ser Leu His | 298 |
| Arctic char ORF | Leu Val Lys Thr Asn Arg Val Leu Leu Val Phe Glu Ala Lys Ile Pro Thr Ser Leu His | 298 |
| R. Trout ORF | Leu Val Lys Thr Asn Arg Val Leu Leu Val Phe Glu Ala Lys Ile Pro Thr Ser Leu His | 298 |

|  | 110 |  |  |  |  |  |  |  |  |  | 120 |  |  |  |
|---|---|---|---|---|---|---|---|---|---|---|---|---|---|---|
| SKCaR ORF | Arg Lys Trp Val Gly Leu Asn Leu Gln Phe Leu Leu Val Phe Leu Cys Ile Leu Val Gln | 358 |
| Salmon ORF | Arg Lys Trp Trp Gly Leu Asn Leu Gln Phe Leu Leu Val Phe Leu Phe Thr Phe Val Gln | 358 |
| Arctic char ORF | Arg Lys Trp Trp Gly Leu Asn Leu Gln Phe Leu Leu Val Phe Leu Phe Thr Phe Val Gln | 358 |
| R. Trout ORF | Arg Lys Trp Trp Gly Leu Asn Leu Gln Phe Leu Leu Val Phe Leu Phe Thr Phe Val Gln | 358 |

|  | 130 |  |  |  |  |  |  |  |  |  | 140 |  |  |  |
|---|---|---|---|---|---|---|---|---|---|---|---|---|---|---|
| SKCaR ORF | Ile Val Thr Cys Ile Ile Trp Leu Tyr Thr Ala Pro Pro Ser Ser Tyr Arg Asn His Glu | 418 |
| Salmon ORF | Val Met Ile Cys Val Val Trp Leu Tyr Asn Ala Pro Pro Ala Ser Tyr Arg Asn His Asp | 418 |
| Arctic char ORF | Val Met Ile Cys Val Val Trp Leu Tyr Asn Ala Pro Pro Ala Ser Tyr Arg Asn His Asp | 418 |
| R. Trout ORF | Val Met Ile Cys Val Val Trp Leu Tyr Asn Ala Pro Pro Ala Ser Tyr Arg Asn His Asp | 418 |

|  | 150 |  |  |  |  |  |  |  |  |  | 160 |  |  |  |
|---|---|---|---|---|---|---|---|---|---|---|---|---|---|---|
| SKCaR ORF | Leu Glu Asp Glu Val Ile Phe Ile Thr Cys Asp Glu Gly Ser Leu Met Ala Leu Gly Phe | 478 |
| Salmon ORF | Ile - Asp Glu Ile Ile Phe Ile Thr Cys Asn Glu Gly Ser Met Met Ala Leu Gly Phe | 475 |
| Arctic char ORF | Ile - Asp Glu Ile Ile Phe Ile Thr Cys Asn Glu Gly Ser Met Met Ala Leu Gly Phe | 475 |
| R. Trout ORF | Ile - Asp Glu Ile Ile Phe Ile Thr Cys Asn Glu Gly Ser Met Met Ala Leu Gly Phe | 475 |

FIG. 4A

|  |  | 170 |  |  | 180 |  |
|--|--|--|--|--|--|--|
| SKCaR ORF | Leu Ile Gly Tyr Thr Cys Leu Leu Ala Ala Ile Cys Phe Phe Phe Ala Phe Lys Ser Arg | 538 |
| Salmon ORF | Leu Ile Gly Tyr Thr Cys Leu Leu Ala Ala Ile Ser Phe Phe Phe Ala Phe Lys Ser Arg | 535 |
| Arctic char ORF | Leu Ile Gly Tyr Thr Cys Leu Leu Ala Ala Ile Cys Phe Phe Phe Ala Phe Lys Ser Arg | 535 |
| R. Trout ORF | Leu Ile Gly Tyr Thr Cys Leu Leu Ala Ala Ile Cys Phe Phe Phe Ala Phe Lys Ser Arg | 535 |

|  | 190 |  |
|--|--|--|
| SKCaR ORF | Lys Leu Pro Glu Asn Phe Asn Glu Ala Lys Phe Ile Thr Phe Ser Met Leu Ile Phe | 595 |
| Salmon ORF | Lys Leu Pro Glu Asn Phe Thr Glu Ala Lys Phe Ile Thr Phe Ser Met Leu Ile Phe | 592 |
| Arctic char ORF | Lys Leu Pro Glu Asn Phe Thr Glu Ala Lys Phe Ile Thr Phe Ser Met Leu Ile Phe | 592 |
| R. Trout ORF | Lys Leu Pro Glu Asn Phe Thr Glu Ala Lys Phe Ile Thr Phe Ser Met Leu Ile Phe | 592 |

Decoration 'Decoration #1': Box residues that match SKCaR ORF exactly.

|  |  | 10 |  |  | 20 |  |
|---|---|---|---|---|---|---|
| 1 Leu Ala Leu Cys Ser Val Leu Gly Val | Phe Leu Thr Ala Phe Val Met Gly Val | Phe Ile | ATLANTIC SALMON |
| 1 Leu Ala Leu Cys Ser Val Leu Gly Val | Phe Leu Thr Ala Phe Val Met Gly Val | Phe Ile | CHAR |
| 1 Leu Ala Leu Cys Ser Val Leu Gly Val | Phe Leu Thr Ala Phe Val Met Gly Val | Phe Ile | CHUM SALMON |
| 1 Leu Ala Leu Cys Ser Val Leu Gly Val | Phe Leu Thr Ala Phe Val Met Gly Val | Phe Ile | COHO SALMON |
| 1 Leu Ala Leu Cys Ser Val Leu Gly Val | Phe Leu Thr Ala Phe Val Met Gly Val | Phe Ile | KING SALMON |
| 1 Leu Ala Leu Cys Ser Val Leu Gly Val | Phe Leu Thr Ala Phe Val Met Gly Val | Phe Ile | PINK SALMON |
| 1 Leu Ala Leu Cys Ser Val Leu Gly Val | Phe Leu Thr Ala Phe Val Met Gly Val | Phe Ile | SOCKEYE SALMON |
| 1 Leu Ala Leu Cys Ser Val Leu Gly Val | Phe Leu Thr Val Phe Val Met Gly Val | Phe Ile | TROUT |
|  |  | 30 |  |  | 40 |  |
| 61 Lys Phe Arg Asn Thr Pro Ile Val | Lys Ala Thr Asn Arg Glu Leu Ser Tyr | Leu Leu Leu | ATLANTIC SALMON |
| 61 Arg Phe Arg Asn Thr Pro Ile Val | Lys Ala Thr Asn Arg Glu Leu Ser Tyr | Leu Leu Leu | CHAR |
| 61 Arg Phe Arg Asn Thr Pro Ile Val | Lys Ala Thr Asn Arg Glu Leu Ser Tyr | Leu Leu Leu | CHUM SALMON |
| 61 Arg Phe Arg Asn Thr Pro Ile Val | Lys Ala Thr Asn Arg Glu Leu Ser Tyr | Leu Leu Leu | COHO SALMON |
| 61 Arg Phe Arg Asn Thr Pro Ile Val | Lys Ala Thr Asn Arg Glu Leu Ser Tyr | Leu Leu Leu | KING SALMON |
| 61 Arg Phe Arg Asn Thr Pro Ile Val | Lys Ala Thr Asn Arg Glu Leu Ser Tyr | Leu Leu Leu | PINK SALMON |
| 61 Arg Phe Arg Asn Thr Pro Ile Val | Lys Ala Thr Asn Arg Glu Leu Ser Tyr | Leu Leu Leu | SOCKEYE SALMON |
| 61 Arg Phe Arg Asn Thr Pro Ile Val | Lys Ala Thr Asn Arg Glu Leu Ser Tyr | Leu Leu Leu | TROUT |
|  |  | 50 |  |  | 60 |  |
| 121 Phe Ser Leu Ile Cys Phe Ser Cys | Phe Ser Ser Leu Ile Phe Ile Gly Glu | Pro Gln Asp Trp | ATLANTIC SALMON |
| 121 Phe Ser Leu Ile Cys Phe Ser Cys | Phe Ser Ser Leu Ile Phe Ile Gly Glu | Pro Gln Asp Trp | CHAR |
| 121 Phe Ser Leu Ile Cys Phe Ser Cys | Phe Ser Ser Leu Ile Phe Ile Gly Glu | Pro Gln Asp Trp | CHUM SALMON |
| 121 Phe Ser Leu Ile Cys Phe Ser Cys | Phe Ser Ser Leu Ile Phe Ile Gly Glu | Pro Gln Asp Trp | COHO SALMON |
| 121 Phe Ser Leu Ile Cys Phe Ser Cys | Phe Ser Ser Leu Ile Phe Ile Gly Glu | Pro Gln Asp Trp | KING SALMON |
| 121 Phe Ser Leu Ile Cys Phe Ser Cys | Phe Ser Ser Leu Ile Phe Ile Gly Glu | Pro Gln Asp Trp | PINK SALMON |
| 121 Phe Ser Leu Ile Cys Phe Ser Cys | Phe Ser Ser Leu Ile Phe Ile Gly Glu | Pro Gln Asp Trp | SOCKEYE SALMON |
| 121 Phe Ser Leu Ile Cys Phe Ser Cys | Phe Ser Ser Leu Ile Phe Ile Gly Glu | Pro Gln Asp Trp | TROUT |
|  |  | 70 |  |  | 80 |  |
| 181 Thr Cys Arg Leu Arg Gln Pro Ala | Phe Gly Ile Ser Phe Val Leu Cys | Ile Ser Cys Ile | ATLANTIC SALMON |
| 181 Thr Cys Arg Leu Arg Gln Pro Ala | Phe Gly Ile Ser Phe Val Leu Cys | Ile Ser Cys Ile | CHAR |
| 181 Thr Cys Arg Leu Arg Gln Pro Ala | Phe Gly Ile Ser Phe Val Leu Cys | Ile Ser Cys Ile | CHUM SALMON |
| 181 Thr Cys Arg Leu Arg Gln Pro Ala | Phe Gly Ile Ser Phe Val Leu Cys | Ile Ser Cys Ile | COHO SALMON |
| 181 Thr Cys Arg Leu Arg Gln Pro Ala | Phe Gly Ile Ser Phe Val Leu Cys | Ile Ser Cys Ile | KING SALMON |
| 181 Thr Cys Arg Leu Arg Gln Pro Ala | Phe Gly Ile Ser Phe Val Leu Cys | Ile Ser Cys Ile | PINK SALMON |
| 181 Thr Cys Arg Leu Arg Gln Pro Ala | Phe Gly Ile Ser Phe Val Leu Cys | Ile Ser Cys Ile | SOCKEYE SALMON |
| 181 Thr Cys Arg Leu Arg Gln Pro Ala | Phe Gly Ile Ser Phe Val Leu Cys | Ile Ser Cys Ile | TROUT |
|  |  | 90 |  |  | 100 |  |
| 241 Leu Val Lys Thr Asn Arg Val Leu | Leu Val Leu Val Phe Glu Ala Lys | Ile Pro Thr Ser Leu His | ATLANTIC SALMON |
| 241 Leu Val Lys Thr Asn Arg Val Leu | Leu Val Leu Val Phe Glu Ala Lys | Ile Pro Thr Ser Leu His | CHAR |
| 241 Leu Val Lys Thr Asn Arg Val Leu | Leu Val Leu Val Phe Glu Ala Lys | Ile Pro Thr Ser Leu His | CHUM SALMON |
| 241 Leu Val Lys Thr Asn Arg Val Leu | Leu Val Leu Val Phe Glu Ala Lys | Ile Pro Thr Ser Leu His | COHO SALMON |
| 241 Leu Val Lys Thr Asn Arg Val Leu | Leu Val Leu Val Phe Glu Ala Lys | Ile Pro Thr Ser Leu His | KING SALMON |
| 241 Leu Val Lys Thr Asn Arg Val Leu | Leu Val Leu Val Phe Glu Ala Lys | Ile Pro Thr Ser Leu His | PINK SALMON |
| 241 Leu Val Lys Thr Asn Arg Val Leu | Leu Val Leu Val Phe Glu Ala Lys | Ile Pro Thr Ser Leu His | SOCKEYE SALMON |
| 241 Leu Val Lys Thr Asn Arg Val Leu | Leu Val Leu Val Phe Glu Ala Lys | Ile Pro Thr Ser Leu His | TROUT |

FIG. 27B

```
aattccgttg ctgtcggttc agtccaagtc tcctccagtg caaaatgaga aatggtggtc  60
gccattacag gaacatgcac tacatctgtg ttaatgaaat attgtcagtt atctgaaggt 120
tattaaaatg tttctgcaag gatggcttca cgagaaatca attctgcacg ttttcccatt 180
gtcattgtat gaataactga ccaaagggat gtaacaaaat ggaacaaagc tgaggaccac 240
gttcacccct tcttggagca tacgatcaac cctgaaggag atggaagact tgaggaggaa 300
atggggattg atcttccagg agttctgctg taaagcgatc cctcaccatt acaaagataa 360
gcagaaatcc tccaggcatc ctctgtaaac gggctggcgt agtgtggctt ggtcaaggaa 420
cagagacagg gctgcaca atg gct cag ctt cac tgc caa ctc tta ttc ttg    471
                    Met Ala Gln Leu His Cys Gln Leu Leu Phe Leu
                     1               5                      10 gga ttt aca ctc cta cag tcg tac aat gtc tca ggg tat ggt cca aac    519
Gly Phe Thr Leu Leu Gln Ser Tyr Asn Val Ser Gly Tyr Gly Pro Asn
             15                  20                  25 caa agg gcc cag aag aaa gga gac atc ata ctg gga ggt ctc ttc cca    567
Gln Arg Ala Gln Lys Lys Gly Asp Ile Ile Leu Gly Gly Leu Phe Pro
         30                  35                  40 ata cac ttt gga gta gcc gcc aag gat cag gac tta aaa tcg aga ccg    615
Ile His Phe Gly Val Ala Ala Lys Asp Gln Asp Leu Lys Ser Arg Pro
     45                  50                  55 gag gcg aca aaa tgt att cgg tac aat ttt cga ggc ttc cga tgg ctc    663
Glu Ala Thr Lys Cys Ile Arg Tyr Asn Phe Arg Gly Phe Arg Trp Leu
 60                  65                  70                  75 cag gcg atg ata ttc gca att gaa gag att aac aac agt atg act ttc    711
Gln Ala Met Ile Phe Ala Ile Glu Glu Ile Asn Asn Ser Met Thr Phe
             80                  85                  90 ctg ccc aat atc acc ctg gga tat cgc ata ttt gac acg tgt aac acc    759
Leu Pro Asn Ile Thr Leu Gly Tyr Arg Ile Phe Asp Thr Cys Asn Thr
         95                  100                 105 gtg tcc aag gcg cta gag gca aca ctc agc ttt gtg gcc cag aac aaa    807
Val Ser Lys Ala Leu Glu Ala Thr Leu Ser Phe Val Ala Gln Asn Lys
     110                 115                 120 atc gac tcg ctg aac tta gat gag ttc tgt aac tgc tct gac cat atc    855
Ile Asp Ser Leu Asn Leu Asp Glu Phe Cys Asn Cys Ser Asp His Ile
 125                 130                 135 cca tcc aca ata gca gtg gtc ggg gca acc ggg tca gga atc tcc acg    903
Pro Ser Thr Ile Ala Val Val Gly Ala Thr Gly Ser Gly Ile Ser Thr
140                  145                 150                 155 gct gtg gcc aat cta ttg gga tta ttt tac att cca cag gtc agc tat    951
Ala Val Ala Asn Leu Leu Gly Leu Phe Tyr Ile Pro Gln Val Ser Tyr
             160                 165                 170 gcc tcc tcg agc agg ctg ctc agc aac aag aat gag tac aag gcc ttc    999
Ala Ser Ser Ser Arg Leu Leu Ser Asn Lys Asn Glu Tyr Lys Ala Phe
         175                 180                 185 ctg agg acc atc ccc aat gat gag caa cag gcc acg gcc atg gcc gag   1047
Leu Arg Thr Ile Pro Asn Asp Glu Gln Gln Ala Thr Ala Met Ala Glu
     190                 195                 200
```

FIG. 28A

```
atc atc gag cac ttc cag tgg aac tgg gtg gga acc ctg gca gcc gac    1095
Ile Ile Glu His Phe Gln Trp Asn Trp Val Gly Thr Leu Ala Ala Asp
    205                 210                 215 gat gac tat ggc cgc cca ggc att gac aag ttc cgg gag gag gcc gtt    1143
Asp Asp Tyr Gly Arg Pro Gly Ile Asp Lys Phe Arg Glu Glu Ala Val
220                 225                 230                 235 aag agg gac atc tgt att gac ttc agt gag atg atc tct cag tac tac    1191
Lys Arg Asp Ile Cys Ile Asp Phe Ser Glu Met Ile Ser Gln Tyr Tyr
                240                 245                 250 acc cag aag cag ttg gag ttc atc gcc gac gtc atc cag aac tcc tcg    1239
Thr Gln Lys Gln Leu Glu Phe Ile Ala Asp Val Ile Gln Asn Ser Ser
            255                 260                 265 gcc aag gtc atc gtg gtc ttc tcc aat ggc ccc gac ctg gag ccg ctc    1287
Ala Lys Val Ile Val Val Phe Ser Asn Gly Pro Asp Leu Glu Pro Leu
        270                 275                 280 atc cag gag ata gtt cgg aga aac atc acc gat cgg atc tgg ctg gcc    1335
Ile Gln Glu Ile Val Arg Arg Asn Ile Thr Asp Arg Ile Trp Leu Ala
285                 290                 295 agc gag gct tgg gcc agc tct tcg ctc att gcc aag cca gag tac ttc    1383
Ser Glu Ala Trp Ala Ser Ser Ser Leu Ile Ala Lys Pro Glu Tyr Phe
300                 305                 310                 315 cac gtg gtc ggc ggc acc atc ggc ttc gct ctc agg gcg ggg cgt atc    1431
His Val Val Gly Gly Thr Ile Gly Phe Ala Leu Arg Ala Gly Arg Ile
                320                 325                 330 cca ggg ttc aac aag ttc ctg aag gag gtc cac ccc agc agg tcc tcg    1479
Pro Gly Phe Asn Lys Phe Leu Lys Glu Val His Pro Ser Arg Ser Ser
            335                 340                 345 gac aat ggg ttt gtc aag gag ttc tgg gag gag acc ttc aac tgc tac    1527
Asp Asn Gly Phe Val Lys Glu Phe Trp Glu Glu Thr Phe Asn Cys Tyr
        350                 355                 360 ttc acc gag aag acc ctg acg cag ctg aag aat tcc aag gtg ccc tcg    1575
Phe Thr Glu Lys Thr Leu Thr Gln Leu Lys Asn Ser Lys Val Pro Ser
    365                 370                 375 cac gga ccg gcg gct caa ggg gac ggc tcc aag gcg ggg aac tcc aga    1623
His Gly Pro Ala Ala Gln Gly Asp Gly Ser Lys Ala Gly Asn Ser Arg
380                 385                 390                 395
cgg aca gcc cta cgc cac ccc tgc act ggg gag gag aac atc acc agc    1671
Arg Thr Ala Leu Arg His Pro Cys Thr Gly Glu Glu Asn Ile Thr Ser
                400                 405                 410 gtg gag acc ccc tac ctg gat tat aca cac ctg agg atc tcc tac aat    1719
Val Glu Thr Pro Tyr Leu Asp Tyr Thr His Leu Arg Ile Ser Tyr Asn
            415                 420                 425 gta tac gtg gcc gtc tac tcc att gct cac gcc ctg caa gac atc cac    1767
Val Tyr Val Ala Val Tyr Ser Ile Ala His Ala Leu Gln Asp Ile His
        430                 435                 440
```

FIG. 28B

```
tct tgc aaa ccc ggc acg ggc atc ttt gca aac gga tct tgt gca gat      1815
Ser Cys Lys Pro Gly Thr Gly Ile Phe Ala Asn Gly Ser Cys Ala Asp
    445             450             455 att aaa aaa gtt gag gcc tgg cag gtc ctc aac cat ctg ctg cat ctg      1863
Ile Lys Lys Val Glu Ala Trp Gln Val Leu Asn His Leu Leu His Leu
460             465             470             475 aag ttt acc aac agc atg ggt gag cag gtt gac ttt gac gat caa ggt      1911
Lys Phe Thr Asn Ser Met Gly Glu Gln Val Asp Phe Asp Asp Gln Gly
                480             485             490 gac ctc aag ggg aac tac acc att atc aac tgg cag ctc tcc gca gag      1959
Asp Leu Lys Gly Asn Tyr Thr Ile Ile Asn Trp Gln Leu Ser Ala Glu
            495             500             505 gat gaa tcg gtg ttg ttc cat gag gtg ggc aac tac aac gcc tac gct      2007
Asp Glu Ser Val Leu Phe His Glu Val Gly Asn Tyr Asn Ala Tyr Ala
        510             515             520 aag ccc agt gac cga ctc aac atc aac gaa aag aaa atc ctc tgg agt      2055
Lys Pro Ser Asp Arg Leu Asn Ile Asn Glu Lys Lys Ile Leu Trp Ser
    525             530             535 ggc ttc tcc aaa gtg gtt cct ttc tcc aac tgc agt cga gac tgt gtg      2103
Gly Phe Ser Lys Val Val Pro Phe Ser Asn Cys Ser Arg Asp Cys Val
540             545             550             555 ccg ggc acc agg aag ggg atc atc gag ggg gag ccc acc tgc tgc ttt      2151
Pro Gly Thr Arg Lys Gly Ile Ile Glu Gly Glu Pro Thr Cys Cys Phe
                560             565             570 gaa tgc atg gca tgt gca gag gga gag ttc agt gat gaa aac gat gca      2199
Glu Cys Met Ala Cys Ala Glu Gly Glu Phe Ser Asp Glu Asn Asp Ala
            575             580             585 agt gcg tgt aca aag tgc ccg aat gat ttc tgg tcg aat gag aac cac      2247
Ser Ala Cys Thr Lys Cys Pro Asn Asp Phe Trp Ser Asn Glu Asn His
        590             595             600 acg tcg tgc atc gcc aag gag atc gag tac ctg tcg tgg acg gag ccc      2295
Thr Ser Cys Ile Ala Lys Glu Ile Glu Tyr Leu Ser Trp Thr Glu Pro
    605             610             615 ttc ggg atc gct ctg acc atc ttc gcc gta ctg ggc atc ctg atc acc      2343
Phe Gly Ile Ala Leu Thr Ile Phe Ala Val Leu Gly Ile Leu Ile Thr
620             625             630             635 tcc ttc gtg ctg ggg gtc ttc atc aag ttc agg aac act ccc atc gtg      2391
Ser Phe Val Leu Gly Val Phe Ile Lys Phe Arg Asn Thr Pro Ile Val
                640             645             650 aag gcc acc aac cgg gag ttg tcc tac ctg ctc ttc ctc atc                2439
Lys Ala Thr Asn Arg Glu Leu Ser Tyr Leu Leu Leu Phe Ser Leu Ile
            655             660             665 tgc tgc ttc tcc agc tcg ctc atc ttc atc ggc gag ccc agg gac tgg      2487
Cys Cys Phe Ser Ser Ser Leu Ile Phe Ile Gly Glu Pro Arg Asp Trp
        670             675             680
                            FIG. 28C
```

```
acc tgt cgg ctc cgc caa ccg gcc ttt ggc atc agc ttc gtc ctg tgc    2535
Thr Cys Arg Leu Arg Gln Pro Ala Phe Gly Ile Ser Phe Val Leu Cys
    685                 690                 695 atc tcc tgc atc ctg gtg aag acc aac cgg gtg ctg ctg gtc ttc gag    2583
Ile Ser Cys Ile Leu Val Lys Thr Asn Arg Val Leu Leu Val Phe Glu
700                 705                 710                 715 gcc aag atc ccc acc agc ctc cac cgc aag tgg gtg ggc ctc aac ctg    2631
Ala Lys Ile Pro Thr Ser Leu His Arg Lys Trp Val Gly Leu Asn Leu
                720                 725                 730 cag ttc ctc ctg gtc ttc ctc tgc atc ctg gtg caa atc gtc acc tgc    2679
Gln Phe Leu Leu Val Phe Leu Cys Ile Leu Val Gln Ile Val Thr Cys
            735                 740                 745 atc atc tgg ctc tac acc gcg cct ccc tcc agc tac agg aac cat gag    2727
Ile Ile Trp Leu Tyr Thr Ala Pro Pro Ser Ser Tyr Arg Asn His Glu
        750                 755                 760 ctg gag gac gag gtc atc ttc atc acc tgc gac gag ggc tcg ctc atg    2775
Leu Glu Asp Glu Val Ile Phe Ile Thr Cys Asp Glu Gly Ser Leu Met
    765                 770                 775 gcg ctg ggc ttc ctc atc ggc tac acc tgc ctc ctc gcc gcc atc tgc    2823
Ala Leu Gly Phe Leu Ile Gly Tyr Thr Cys Leu Leu Ala Ala Ile Cys
780                 785                 790                 795 ttc ttc ttc gcc ttc aag tcc cgt aag ctg ccg gag aac ttc aac gag    2871
Phe Phe Phe Ala Phe Lys Ser Arg Lys Leu Pro Glu Asn Phe Asn Glu
                800                 805                 810 gct aag ttc atc acc ttc agc atg ttg atc ttc ttc atc gtc tgg atc    2919
Ala Lys Phe Ile Thr Phe Ser Met Leu Ile Phe Phe Ile Val Trp Ile
            815                 820                 825 tcc ttc atc ccc gcc tat gtc agc acc tac ggc aag ttt gtg tcg gcc    2967
Ser Phe Ile Pro Ala Tyr Val Ser Thr Tyr Gly Lys Phe Val Ser Ala
        830                 835                 840 gtg gag gtg att gcc atc ctg gcc tcc agc ttc ggg ctg ctg ggc tgc    3015
Val Glu Val Ile Ala Ile Leu Ala Ser Ser Phe Gly Leu Leu Gly Cys
    845                 850                 855 att tac ttc aac aag tgt tac atc atc ctg ttc aag ccg tgc cgt aac    3063
Ile Tyr Phe Asn Lys Cys Tyr Ile Ile Leu Phe Lys Pro Cys Arg Asn
860                 865                 870                 875 acc atc gag gag gtg cgc tgc agc acg gcg gcc cac gcc ttc aag gtg    3111
Thr Ile Glu Glu Val Arg Cys Ser Thr Ala Ala His Ala Phe Lys Val
                880                 885                 890 gcg gcc cgg gcc acc ctc cgg cgc agc gcc gcg tct cgc aag cgc tcc    3159
Ala Ala Arg Ala Thr Leu Arg Arg Ser Ala Ala Ser Arg Lys Arg Ser
            895                 900                 905 agc agc ctg tgc ggc tcc acc atc tcc tcg ccc gcc tcg tcc acc tgc    3207
Ser Ser Leu Cys Gly Ser Thr Ile Ser Ser Pro Ala Ser Ser Thr Cys
        910                 915                 920
```

FIG. 28D

```
ggg ccg ggc ctc acc atg gag atg cag cgc tgc agc acg cag aag gtc    3255
Gly Pro Gly Leu Thr Met Glu Met Gln Arg Cys Ser Thr Gln Lys Val
    925             930             935 agc ttc ggc agc ggc acc gtc acc ctg tcg ctc agc ttc gag gag aca    3303
Ser Phe Gly Ser Gly Thr Val Thr Leu Ser Leu Ser Phe Glu Glu Thr
940             945             950                 955 ggc cga tac gcc acc ctc agc cgc acg gcc cgc agc agg aac tcg gcg    3351
Gly Arg Tyr Ala Thr Leu Ser Arg Thr Ala Arg Ser Arg Asn Ser Ala
            960             965                 970 gat ggc cgc agc ggc gac gac ctg cca tct aga cac cac gac cag ggc    3399
Asp Gly Arg Ser Gly Asp Asp Leu Pro Ser Arg His His Asp Gln Gly
        975             980                 985 ccg cct cag aaa tgc gag ccc cag ccc gcc aac gat gcc cga tac aag    3447
Pro Pro Gln Lys Cys Glu Pro Gln Pro Ala Asn Asp Ala Arg Tyr Lys
            990             995             1000 gcg gcg ccg acc aag ggc acc cta gag tcg ccg ggc ggc agc aag gag    3495
Ala Ala Pro Thr Lys Gly Thr Leu Glu Ser Pro Gly Gly Ser Lys Glu
    1005            1010            1015 cgc ccc aca act atg gag gaa acc taa tccaactcct ccatcaaccc          3542
Arg Pro Thr Thr Met Glu Glu Thr *
1020            1025 caagaacatc ctccacggca gcaccgtcga caactgacat caactcctaa ccgtggctg   3602
cccaacctct cccctctccg gcactttgcg ttttgctgaa gattgcagca tctgcagttc  3662
cttttatccc tgattttctg acttggatat ttactagtgt gcgatggaat atcacaacat  3722
aatgagttgc acaattaggt gagcagagtt gtgtcaaagt atctgaacta tctgaagtat  3782
ctgaactact ttattctctc gaattgtatt acaaacattt gaagtatttt tagtgacatt  3842
atgttctaac attgtcaaga taatttgtta caacatataa ggtaccacct gaagcagtga  3902
ctgagattgc cactgtgatg acagaactgt tttataacat ttatcattga aacctggatt  3962
gcaacaggaa tataatgact gtaacaaaaa aattgttgat tatcttaaaa atgcaaattg  4022
taatcagatg tgtaaaattg gtaattactt ctgtacatta aatgcatatt tcttgataaa  4082
aaaaaaaaaa aaaaaaaaaa aaaaaaaaaa aaaagcggcc cgacagcaac gg          4134
```

FIG. 28E

*Note that neither group of fish was offered food on Days #1,2,21,22, 31,32, 55 and 56.

*Note that neither group of fish was offered food on Days #1,2,21,22, 31,32, 55 and 56.

$Na^+K^+$ ATPase activity present in either gill or pyloric caeca of juvenile Atlantic salmon that were either maintained in freshwater or treated for 45 days with Process II in freshwater.

US 6,564,747 B2

METHODS FOR RAISING PRE-ADULT ANADROMOUS FISH

RELATED APPLICATIONS

This application is a continuation-in-part of application Ser. No. 09/687,477, now U.S. Pat. No. 6,463,883, filed Oct. 12, 2000, entitled, "Methods for Raising Pre-Adult Anadromous Fish," by H. William Harris, Jr., et al.; application Ser. No. 09/687,476, filed on Oct. 12, 2000, entitled "Methods for Raising Pre-adult Anadromous Fish," by H. William Harris, Jr., et al.; and application Ser. No. 09/687,372, filed on Oct. 12, 2000, entitled "Methods for Raising Pre-adult Anadromous Fish," by H. William Harris, Jr., et al. The entire teachings of the above applications are incorporated herein by reference.

BACKGROUND OF THE INVENTION

In nature, many anadromous fish live most of their adulthood in seawater, but swim upstream to freshwater for the purpose of breeding. As a result, anadromous fish hatch from their eggs and are born in freshwater. As these fish grow, they swim downstream and gradually adapt to the seawater.

Fish hatcheries have experienced difficulty in raising these types of fish because the window of time in which the pre-adult fish adapts to seawater (e.g., undergoes smoltification) is short-lived, and can be difficult to pinpoint. As a result, these hatcheries experience significant morbidity and mortality when transferring anadromous fish from freshwater to seawater. Additionally, many of the fish that do survive the transfer from freshwater to seawater are stressed, and consequently, experience decreased feeding, and increased susceptibility to disease. Therefore, these anadromous fish often do not grow well after they are transferred to seawater.

The aquaculture industry loses millions of dollars each year due to problems it encounters in transferring pre-adult anadromous fish from freshwater to seawater. Hence, a need exists to improve methods involved in transferring pre-adult anadromous fish to seawater. A further need exists to increase survival and growth, and reduce stress, of pre-adult anadromous fish that have been transferred to seawater.

SUMMARY OF THE INVENTION

The present invention relates to methods for improving the raising of pre-adult anadromous fish or preparing these fish for transfer to seawater by modulating (e.g., increasing and/or decreasing) expression of a receptor, referred to as the Polyvalent Cation Sensing Receptor (PVCR). The modulation of the PVCR includes changes in PVCR protein and mRNA expression as well as changes to the PVCR sensitivity by subjecting the pre-adult anadromous fish to at least one modulator of the PVCR. The pre-adult anadromous fish are subjected to the modulator when it is added to their freshwater environment, and optionally, to the feed. The invention encompasses adding at least one PVCR modulator to the freshwater, and adding feed for fish consumption to the freshwater, wherein the feed has an agent that that is sufficient to contribute to a significantly increased level of the PVCR modulator in serum of the fish. In one embodiment the agent is sodium chloride (NaCl). Hence, the feed contains NaCl and, optionally, at least one PVCR modulator in an amount to contribute to a significantly increased level of a PVCR modulator in the serum of the pre-adult anadromous fish. Modulated expression and/or sensitivity of the PVCR is maintained until the fish are ready to be transferred to seawater. The pre-adult anadromous fish can be maintained in the freshwater having at least one PVCR agonist until they are ready to be transferred to seawater. The present invention also includes optionally exposing the pre-adult anadromous fish to a photoperiod sufficient to increase growth and/or smoltification both before and immediately after their transfer to seawater. Preferably, the photoperiod is continuous. The photoperiod can range between about 12 hours to about 24 hours in a 24 hour period. Additionally, the present invention further includes transferring the fish to seawater where they remain exposed to a continuous photoperiod. The present invention, in one example, allows for these pre-adult anadromous fish weighing as little as about 15 grams or as much as about 120 grams to be transferred to seawater.

In one embodiment of the invention, pre-adult anadromous fish (e.g., salmon, trout and arctic char) are prepared for transfer from freshwater to seawater by adding PVCR agonists, such as calcium and magnesium to the freshwater, and adding feed for fish consumption having between about 1% and about 10% NaCl by weight (e.g. between about 10,000 mg/kg and 100,000 mg/kg) to the freshwater. The amount of calcium added to the freshwater is an amount sufficient to bring the concentration up to between about 2.0 mM and about 10.0 mM, and the amount of magnesium added is an amount sufficient to bring the concentration up to between about 0.5 mM and about 10.0 mM. The feed can optionally include a PVCR agonist, such as an amino acid. A particular amino acid that can be added is tryptophan in an amount between about 1 gm/kg and about 10 gm/kg. The present invention also includes optionally exposing the pre-adult anadromous fish to a photoperiod for a sufficient amount of time to increase growth and/or smoltification. Preferably, the photoperiod is continuous (e.g., for a period of between about 12 hours and about 24 hours in a 24 hour period). A continuous photoperiod can occur for 1 day to several days, as described herein, before and after seawater transfer.

Additional embodiments of the invention include methods of increasing or improving food consumption before and/or after seawater transfer, increasing growth, increasing survival and/or reducing mortality, improving the Feed Conversion Ratio (FCR), increasing the Specific Growth Rates (SGR), reducing osmotic damage, transferring parr (e.g., between about 15 and about 60 grams) to seawater, and transferring pre-adult anadromous fish to seawater having an elevated temperature of about 14° C. to about 19° C. These methods are performed by adding at least one PVCR modulator to the freshwater, subjecting or exposing the pre-adult anadromous fish to at least one PVCR modulator, or introducing the pre-adult anadromous fish to freshwater having at least one PVCR modulator, in an amount sufficient to modulate expression and/or sensitivity of the PVCR. The methods also involve adding feed having between about 1% and about 10% NaCl by weight to the freshwater and transferring the pre-adult anadromous fish to seawater.

The present invention also embodies methods for increasing Sodium Potassium ATPase (Na+K+ATPase) activity in chloride cells in tissues (e.g., gill) of pre-adult anadromous fish or reducing the frequency of chloride cells in secondary lamellae of gill of pre-adult anadromous fish. The method comprises adding a PVCR modulator to the freshwater in an amount sufficient to modulate expression and/or sensitivity of at least one PVCR; and adding feed for fish consumption to the freshwater, wherein the feed contains an amount of NaCl sufficient to contribute to a significantly increased level of the PVCR modulator in serum of the pre-adult anadromous fish. An increase in Na+ K+ATPase activity in chloride cells and/or a reduction in the number of chloride cells in secondary lamellae occurs, as compared to fish of the same size and age group held in freshwater and not subjected to steps of the present invention. A ratio of the distribution of chloride cells between secondary lamellae (SL) and primary lamellae (PL) can be determined. The SL/PL ratio decreases, as compared to fish maintained in freshwater and not subjected to steps of the present invention. The methods of the present invention reduce the SL/PL ratio to closely resemble the ratio exhibited by fish already transferred to seawater, yet the treated fish are still maintained in freshwater. The SL/PL ratio can range between about 0.1 and about 1.0.

In other embodiments, the invention encompasses detection assays or methods of determining whether pre-adult anadromous fish that are subjected to at least one PVCR modulator and are fed with feed having between about 1% and about 10% NaCl by weight, are ready for transfer to seawater, by assessing the amount and/or localization of PVCR expression in the pre-adult anadromous fish. A modulated (e.g., increased or decreased) level of expression and/or sensitivity, as compared to a control (e.g., PVCR expression from a fish not subjected to a PVCR modulator), indicates that the pre-adult anadromous fish are ready for transfer to seawater. In a preferred embodiment, the assay includes contacting an anti-PVCR antibody with a sample (e.g., gill, skin, intestine, olfactory lamellae, urinary bladder, kidney, brain or muscle) under conditions sufficient for the formation of a complex between the antibody and the PVCR; and detecting the formation of the complex. In another embodiment the assay relates to hybridizing a nucleic acid sequence having a detectable label to the nucleic acid sequence of the PVCR of a sample taken from the pre-adult anadromous fish and detecting the hybridization. In yet another embodiment, detection of the PVCR in a tissue can also be accomplished by Reverse Transcriptase Polymerase Chain Reaction (RT-PCR). This embodiment involves reverse transcribing mRNA from the tissue having at least one PVCR; performing a PCR reaction with PVCR-specific primers to obtain RT-PCR product; and determining the presence or amount of the PVCR.

In yet another embodiment, the present invention relates to various compositions and mixtures. In particular, the invention pertains to an aquatic food composition having a concentration of NaCl between about 10,000 mg/kg and 100,000 mg/kg (e.g., about 12,000 mg/kg). The aquatic food composition can optionally include a PVCR modulator (e.g. tryptophan in an amount between 1 gm/kg and 10 gm/kg).

The invention also embodies an aquatic mixture for providing an environment to improve the raising of pre-adult anadromous fish. The mixture includes at least one PVCR modulator. An example of such a mixture is a calcium source, that when added to freshwater, provides a concentration of between about 2.0 mM and about 10.0 mM; and a magnesium source, that when added to freshwater, provides a concentration of between about 0.5 mM and 10.0 mM.

In yet another embodiment, the present invention relates to kits. In particular, the invention embodies kits for improving the raising of pre-adult anadromous fish, that includes a PVCR modulator for addition to the freshwater and an aquatic food composition, as described herein. In another embodiment, the invention includes kits for determining whether a pre-adult anadromous fish are ready for transfer to seawater, after being subjected to at least one PVCR modulator and feed having between about 1% and about 10% NaCl by weight. The kit includes either an anti-PVCR antibody, and a solid support; or a nucleic acid sequence having a detectable label that can hybridize to nucleic acid of an aquatic PVCR.

Surprisingly, it has been discovered that modulated expression and/or altering the sensitivity of the PVCR allows these pre-adult anadromous fish to better adapt to seawater. Until the discovery of the present invention, the aquaculture industry was unable to transfer the pre-adult anadromous fish to seawater without subjecting the fish to stress, death and/or disease. Unlike this practice, carrying out the steps of the invention modulates the expression and/or alters the sensitivity of the PVCR and allows for transfer of the pre-adult anadromous fish to seawater with minimal or no stress, death and/or disease, and unexpectedly provides several benefits, such as increased growth and the ability to transfer these fish to water having higher temperatures, as further described herein. The present invention results in one or more of the following advantages in transferring pre-adult anadromous fish to seawater: a reduction in mortality; improvement in feeding; an increase in growth; a decrease in the amount of diseased fish; and/or a reduction in osmotic shock. The present invention also allows for earlier harvesting of the fish with increased flexibility in producing fish year round. Additionally, the methods of the present invention can result in significant cost savings for fish hatcheries.

BRIEF DESCRIPTION OF THE DRAWINGS

FIG. 1 is a diagram illustrating the partial nucleotide (SEQ ID NO: 1) and amino acid (SEQ ID NO:2) sequences of the polyvalent cation-sensing receptor (PVCR) of Atlantic salmon (*Salmo salar*).

FIG. 2 is a diagram illustrating the partial nucleotide (SEQ ID NO:3) and amino acid (SEQ ID NO:4) sequences of the PVCR of arctic char (*Salvelinus alpinus*).

FIG. 3 is a diagram illustrating the partial nucleotide (SEQ ID NO:5) and amino acid (SEQ ID NO:6) sequences of the PVCR of rainbow trout (*Onchorhynchus mykiss*).

FIGS. 4A–B are diagrams illustrating the alignment of the amino acids sequences for shark kidney cation receptor ("SKCaR") (SEQ ID NO: 18), salmon (SEQ ID NO:2), arctic char (SEQ ID NO:4) and rainbow trout (SEQ ID NO:6).

FIGS. 26A–C are an alignment illustrating nucleic acid sequences for the PVCR of Atlantic Salmon (SEQ ID NO.: 1), Char (SEQ ID NO.: 3), Chum Salmon (SEQ ID NO.:7), Coho Salmon (SEQ ID NO.:9), King Salmon (SEQ ID NO.:11), Pink Salmon (SEQ ID NO.:13), Sockeye Salmon (SEQ ID NO.:15) and Trout (SEQ ID NO.: 5).

FIGS. 27A–B are an alignment illustrating the open reading frame of the polypeptide sequences for the PVCR of Atlantic Salmon (SEQ ID NO.: 2), Char (SEQ ID NO.: 4), Chum Salmon (SEQ ID NO.: 8), Coho Salmon (SEQ ID NO.: 10), King Salmon (SEQ ID NO.: 12), Pink Salmon (SEQ ID NO.: 14), Sockeye Salmon (SEQ ID NO.: 16) and Trout (SEQ ID NO.: 6).

FIGS. 28A–E are a diagram illustrating the nucleic acid and amino acid sequence of SKCaR (SEQ ID NOs.: 17 and 18, respectively).

DETAILED DESCRIPTION OF THE INVENTION

Figure 5:
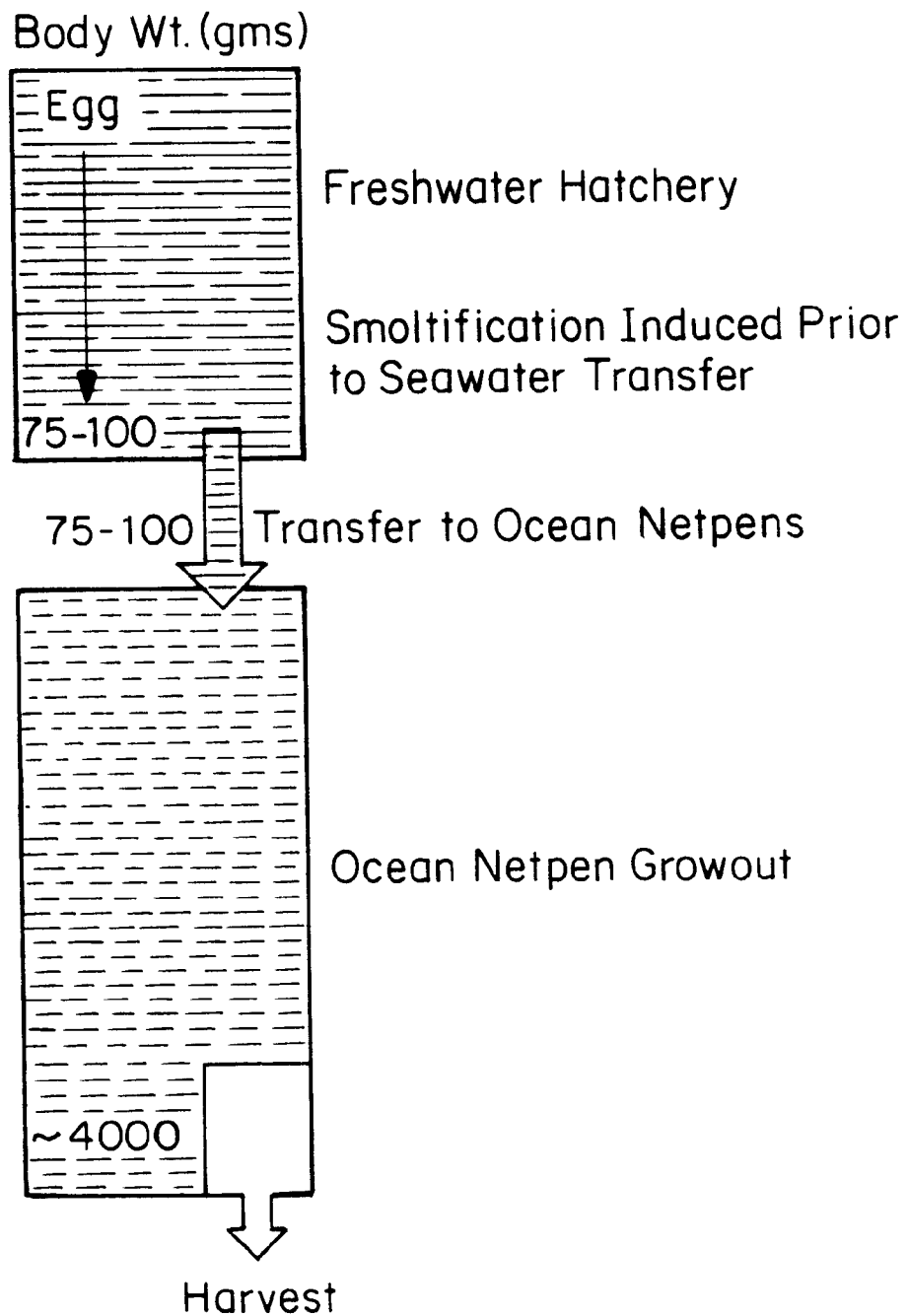
FIG. 5 is a schematic diagram illustrating industry practice for salmon aquaculture production, prior to the discovery of the present invention. The diagram depicts key steps in salmon production for S0 (75 gram) and S1 (100 gram) smolts. The wavy symbol indicates freshwater while the bubbles indicate seawater.

The present invention relates to methods for improving the raising of pre-adult anadromous fish and/or methods for preparing pre-adult anadromous fish for transfer from freshwater to seawater. The methods involve modulating expression and/or altering the sensitivity of a Polyvalent Cation Sensing Receptor (PVCR) (e.g., at least one PVCR). The invention relates to modulating expression of the PVCR that affects the fish's ability to adapt to seawater, to undergo smoltification, to survive, to increase growth, to increase food consumption, and/or to be less susceptible to disease.

In particular, the methods of the present invention include adding at least one PVCR modulator to the freshwater, and adding a specially made or modified feed to the freshwater for consumption by the fish. The feed contains a sufficient amount of sodium chloride (NaCl) (e.g., between about 1% and about 10% by weight, or about 110,000 mg/kg to about 100,000 mg/kg) to significantly increase levels of the PVCR modulator in the serum. This amount of NaCl in the feed causes or induces the pre-adult anadromous fish to drink more freshwater. Since the freshwater contains a PVCR modulator and the fish ingest increased amounts of it, the serum level of the PVCR modulator significantly increases in the fish, and causes modulated (e.g., increased and/or decreased) PVCR expression and/or altered PVCR sensitivity. This process allows the pre-adult anadromous fish to be prepared for transfer to seawater, so that they can better adapt to seawater once they are transferred.

The methods of the present invention pertain to adapting pre-adult anadromous fish to seawater. Anadromous fish are fish that swim from seawater to freshwater to breed. Anadromous fish include, for example, salmon (e.g, Atlantic Salmon (*Salmo salar*), Coho Salmon (*Oncorhynchus kisutch*), Chum Salmon (*Oncorhynchus keta*), Chinook Salmon (*Oncorhynchus tshawytscha*), Pink Salmon (*Oncorhynchus gorbuscha*), Sockeye Salmon (*Oncorhynchus nerka*)), char (e.g., Arctic Char (*Salveninus alpinus*)) and trout (e.g., Rainbow Trout (*Oncorhynchus mykiss*)). Anadromous fish also include fish that are unable to swim to seawater (e.g., landlocked), but have the physiological mechanisms to adapt to seawater. The term "pre-adult anadromous fish," as used herein, refers to anadromous fish that have not yet adapted to seawater. These fish are generally juvenile fish. Pre-adult anadromous fish include, but are not limited to fish that are fingerlings, parr or smolts. As used herein, a "smolt" is a fish undergoing physiological changes that allows the fish to adapt to seawater, or survive upon subsequent transfer to seawater. The term, "smolt," also refers to a fish that is not at the precise developmental stage to survive uninjured upon transfer to seawater, but rather is one of a population of fish wherein, based on a statistical sampling and evaluation, the population of fish is determined to be at a physiological stage ready for transfer to seawater.

The present invention includes methods for preparing pre-adult anadromous fish undergoing the process of smoltification for transfer to seawater. Smoltification is the stage at which a fish undergoes the acclimation or adaptation from freshwater to seawater. Smoltification also refers to a process occurring in pre-adult anadromous fish that is physiological pre-adaption to seawater while still in freshwater. The smolification process varies from species to species. Different species of anadromous fish can undergo smoltification at different sizes, weights, and times in the life of the fish. The present invention induces the vast majority or all of the pre-adult anadromous fish to undergo this process and be prepared for transfer to seawater.

The pre-adult anadromous fish are maintained in freshwater prior to adding the PVCR modulator. The term, "freshwater," means water that comes from, for example, a stream, river, ponds, public water supply, or from other non-marine sources having, for example, the following ionic composition: less than about 2 mM of magnesium, calcium and NaCl. The term "freshwater" also refers to freshwater to which at least one PVCR modulator has been added, as described herein.

The PVCR modulator is added to the freshwater in sufficient amounts to modulate expression or alter the sensitivity of the PVCR. A PVCR has been isolated from various tissue of several types of anadromous fish using molecular biology techniques, as described in Example 9. DNA was isolated from samples from various species of anadromous fish including Atlantic Salmon, Char, Chum Salmon, Coho Salmon, King or Chinook Salmon, Pink Salmon, Sockeye Salmon and Trout. See Example 20 showing that the PVCR is expressed in tissues as shown by RT-PCR. The DNA was amplified using polymerase Chain Reaction (PCR) methodology. The amplified DNA was purified and subcloned into vectors, and their sequences were determined, as described in Example 9.

The PVCR, which is located in various tissues (e.g., gill, skin, olfactory lamellae, intestine, kidney, urinary bladder, brain or muscle) of the pre-adult anadromous fish, senses alterations in PVCR modulators including various ions (e.g., divalent cations), for example, in the surrounding water, in their serum or in the luminal contents of tubules inside the body, such as kidney, urinary bladder, or intestine. Its ability to sense these modulators increases and/or decreases expression of the PVCR, thereby allowing the fish to better adapt to seawater. Increased and/or decreased expression of the PVCR can occur, for example, in one or more tissues, or in all tissues.

A "PVCR modulator" is defined herein to mean a compound which modulates (e.g., increases and/or decreases) expression of the PVCR, or alters the sensitivity or responsiveness of the PVCR. Such compounds include, but are not limited to, PVCR agonists (e.g., inorganic polycations, organic polycations and amino acids), Type II calcimimetics, and compounds that indirectly alter PVCR expression (e.g., 1,25 dihydroxyvitamin D in concentrations of about 3,000–10,000 International Units /kg feed), cytokines such as Interleukin Beta, and Macrophage Chemotatic Peptide-1 (MCP-1)). Examples of Type II calcimimetics, which increase and/or decrease expression, and/or sensitivity of the PVCR, are, for example, NPS-R-467 and NPS-R-568 from NPS Pharmaceutical Inc., (Salt Lake, Utah, U.S. Pat. Nos. 5,962,314; 5,763,569; 5,858,684; 5,981,599; 6,001,884) which can be administered in concentrations of between about 0.1 $\mu$M and about 100 $\mu$M feed or water. See Nemeth, E. F. et al., *PNAS* 95: 4040–4045 (1998). Examples of inorganic polycations are divalent cations including calcium at a concentration between about 2.0 and about 10.0 mM and magnesium at a concentration between about 0.5 and about 10.0 mM; and trivalent cations including, but not limited to, gadolinium (Gd3+) at a concentration between about 1 and about 500 $\mu$M. Organic polycations include, but are not limited to, aminoglycosides such as neomycin or gentamicin in concentrations of between about 1 and about 8 gm/kg feed as well as organic polycations including polyamines (e.g., polyarginine, polylysine, polyhistidine, polyornithine, spermine, cadaverine, putrescine, copolymers of poly arginine/histidine, poly lysine/arginine in concentrations of between about 10 $\mu$M and 10 mM feed). See Brown, E. M. et al., *Endocrinology* 128: 3047–3054 (1991); Quinn, S. J. et al., *Am. J. Physiol.* 273: C1315–1323 (1997). Additionally, PVCR agonists include amino acids such as L-Tryptophan L-Tyrosine, L-Phenylalanine, L-Alanine, L-Serine, L-Arginine, L-Histidine, L-Leucine, L-Isoleucine, L-Aspartic acid, L-Glutamic acid, L-Glycine, L-Lysine, L-Methionine, L-Asparagine, L-Proline, L-Glutamine, L-Threonine, L-Valine, and L-Cysteine at concentrations of between about 1 and about 10 gm/kg feed. See Conigrave, A. D., et al., *PNAS* 97: 4814–4819 (2000). Amino acids, in one embodiment, are also defined as those amino acids that can be sensed by at least one PVCR in the presence of low levels of extracellular calcium (e.g., between about 1 mM and about 10 mM). In the presence of extracellular calcium, the PVCR in organs or tissues such as the intestine, pyloric caeca, or kidney can better sense amino acids. See Example 22. The molar concentrations refer to free or ionized concentrations of the PVCR modulator in the freshwater, and do not include amounts of bound PVCR modulator (e.g., PVCR modulator bound to negatively charged particles including glass, proteins, or plastic surfaces). Any combination of these modulators can be added to the water or to the feed (in addition to the NaCl, as described herein), so long as the combination modulates expression and/or sensitivity of the PVCR.

The PVCR modulator can be administered to the fish in a number of ways. The invention encompasses administration of the PVCR in any way that is sufficient to modulate the expression and/or alter the sensitivity of the PVCR. In one embodiment, the PVCR modulator is simply added to the freshwater in various concentrations, as described herein. A freshwater environment having at least one PVCR modulator is referred to herein as a "PVCR modulator environment." PVCR modulators that are added to the water modulate expression and/or alter the sensitivity of the PVCR on the skin and gills of the fish, and can be ingested by the fish, in particular, when fish are fed feed having between about 1% and about 10% NaCl (e.g., in concentrations between about 10,000 mg/kg and about 100,000 mg/kg feed). In addition to adding NaCl to the feed, the PVCR modulator (e.g., an amino acid such as tryptophan) can also be added to the feed. Amounts and types of PVCR modulators added to the feed are also described herein. Other embodiments include subjecting the fish to the PVCR modulator by "dipping" the fish in the modulator, e.g., organic polycations. The organic polycations can be formulated in such a way as to allow the polycations to adhere to the skin and gills of the fish, in sufficient amounts to modulate expression of the PVCR.

In one preferred embodiment, the present invention is practiced by adding a combination of two PVCR agonists to the freshwater. In particular, calcium and magnesium are added to the freshwater to bring the concentrations of each to between about 2.0 mM and about 10.0 mM of calcium, and between about 0.5 mM and about 10.0 mM of magnesium. In addition to adding calcium and magnesium to the water, these ranges of ion concentrations can be achieved by providing a brackish water (e.g., diluted seawater) environment for the fish.

Calcium and magnesium can come from a variety of sources, that when added to the water, the calcium and/or magnesium levels modulate expression of the PVCR, and/or are within the stated ranges. Sources of calcium and magnesium can be a mixture of a variety of compounds, or each can come from a substantially uniform or pure compound. Sources of calcium include, for example, $Ca(CO_3)_2$, $CaCl_2$, $CaSO_4$, and $Ca(OH)_2$ and sources of magnesium include, for example, $MgCl_2$, $MgSO_4$, $MgBr_2$, and $MgCO_3$.

In one embodiment, the invention includes intermittent (e.g., interrupted) as well as continuous (e.g., non-interrupted) exposure to freshwater having at least one PVCR modulator, while on the NaCl diet. Intermittent exposure to the PVCR can occur so long as the PVCR expression and/or altered sensitivity remains modulated (e.g., increased and/or decreased in various tissues). Continuous maintenance in or exposure to freshwater having at least one PVCR modulator is shown in Examples 2 and 7.

The process of the present invention prepares fish for transfer from freshwater to seawater. The pre-adult anadromous fish are maintained in a freshwater environment having a PVCR modulator long enough to modulate the expression and/or alter sensitivity of the PVCR. The length of time depends on the physiological and physical maturity of the fish. Some fish will more readily adapt to the environment, and modulate their expression and/or alter the sensitivity of their PVCR, while others will need more time to do so. Factors that can influence the length of time necessary to modulate the expression and/or alter sensitivity of the PVCR include, but are not limited to, size of the fish, level of PVCR expression or sensitivity, if any, prior to addition of the PVCR modulator to the freshwater, the fish's ability to excrete the PVCR modulator and ions, the fish's surface to volume ratio, etc. Therefore, the length of time the fish is maintained can range from about 7 days to several months (e.g., 7, 14, 21, 30, 45, 90 and 120 days). The fish can also be maintained indefinitely so long as the fish are maintained in freshwater having the PVCR modulator and being fed a NaCl diet. For example, salmon, trout or char weighing less than 10 gms can be maintained in freshwater having a PVCR modulator, and fed a NaCl diet for at least about 180 days, prior to transfer to seawater.

The invention further includes adding feed to the freshwater. The frequency and amounts of feed that fish are fed, are taught in the art. Generally, the fish are fed 1–3 times a day, totaling about 0.25–5.0% body weight/day. The feed has enough NaCl to contribute to a significant increased level of the PVCR modulator in the serum of the pre-adult anadromous fish. More specifically, NaCl has at least two effects. The first occurs when sufficient amounts of NaCl is present in the feed. The presence of NaCl in the feed causes the pre-adult anadromous fish to drink more water from the surrounding environment. Second, NaCl is a direct negative PVCR modulator, and works to decreases PVCR sensitivity. Despite NaCl's effect in decreasing sensitivity, it surprisingly increases PVCR expression in certain tissues when fish are fed a NaCl diet and the surrounding freshwater environment has at least one PVCR modulator it in. The increase in the ingestion of freshwater having PVCR modulators causes an overall increase of the serum levels of PVCR modulators.

The present invention also relates to an aquatic food composition. In one embodiment, the feed contains an agent that is sufficient to contribute to a significantly increased level of the PVCR modulator in serum of the anadromous fish. Such an agent can be used in the methods of the present invention described herein. One example of an agent that significantly increases the level of the PVCR modulator in the serum of fish is NaCl. The feed contains between about 1%–10% of NaCl by weight, or between about 10,000 mg of NaCl/kg of feed and about 100,000 mg of NaCl/kg of feed (e.g., 12,000 mg/kg). Such feeds are referred to herein as "NaCl diets." The NaCl can be combined or replaced with other sodium salts to confer the desired effect of increasing PVCR expression, altering PVCR sensitivity and/or inducing the fish to drink more. Hence, as used herein, the term NaCl, includes a substantially pure compound, mixtures of NaCl with other sources of sodium and mixtures of other sources of sodium. The feed can further include a PVCR modulator, and in particular a PVCR agonist such as an amino acid. In one embodiment, the feed has between about 1% and about 10% NaCl by weight and an amino acid such as tryptophan in an amount between about 1 and about 10 gm/kg. In addition to the unique components of the present invention that comprise the feed, as described above, the feed can additionally comprise ingredients that are traditionally put into feed, e.g., for nutrition and/or palatability. For example, the feed can include fish components, such as flounder or squid meat, or fish oils.

The feed can be made in a number of ways, so long as the proper concentration of NaCl is present. The feed can be made, for example, by reformulating the feed, or by allowing the feed to absorb a solution having the NaCl and optionally, adding a PVCR modulator. A top dressing can be added for palatability. Example 8 describes in detail one way to make the feed.

Another embodiment of the present invention includes feeding pre-adult anadromous fish feed having between 1% and 10% NaCl by weight when the fish are maintained in a freshwater environment having between about 2.0 and about 10.0 mM of calcium, and between about 0.5 mM and about 10.0 mM of magnesium. When this embodiment of the present invention is carried out, the levels of calcium, magnesium and/or sodium in the serum of the pre-adult anadromous fish increases, as compared to identically paired fish maintained in freshwater, between about 1% and 60%, between about 1% and 40%, and between about 1% and 15%, respectively.

In another embodiment, the fish, while in the freshwater having the PVCR modulator, are also exposed to a photoperiod. A photoperiod refers to exposing the fish to light (e.g., sunlight, incandescent light or fluorescent light). Preferably, the photoperiod is substantially continuous, or occurs long enough to increase growth, induce smotification and/or reduce mortality. The fish can be exposed to a continuous photoperiod while they are in freshwater and undergoing the steps of the present invention (e.g., in the PVCR modulator environment and being fed the NaCl diet), as well as after being exposed to this environment and then transferred to seawater. The photoperiod can occur for at least about 12 hours within a 24 hour interval, or for longer periods such as about 14, 16, 18, 20, 22 or preferably, about 24 hours. The number of days the fish is exposed to a photoperiod can range from about 1 day to several months (e.g., 1, 3, 7, 14, 21, 30, 45, 90 and 120 days). Preferably, the photoperiod while the fish are being maintained in the PVCR modulator environment and being fed the NaCl diet, is preferably between about 4 days and about 50 days. The fish can also be maintained indefinitely so long as the fish are maintained in freshwater having the PVCR modulator and being fed a NaCl diet. After being transferred to seawater, the photoperiod exposure is preferably between about 7 days and about 45 days. The PVCR can be modulated in a variety of tissues including the stalk of the pineal gland. Methods for exposing fish to a photoperiod are known in the art, and are described for example, in Willoughby, S., Manual of Salmonid Farming, Blackwell Scientific, Oxford, UK, at 106, and 152–154 (1999).

The fish can also be exposed to a photoperiod after transfer to seawater. The effects of exposure of fish to a photoperiod are described in Example 10 and Table 13. The benefits of exposure to a photoperiod include a dramatic decrease in the mortality of fish after transfer to seawater. Thus, in one embodiment, maintaining fish in a continuous photoperiod increases their survival during their adaptation to seawater.

After being exposed to the steps of the present invention, the pre-adult anadromous fish are transferred to seawater. The term, "seawater," means water that comes from the sea, or water which has been formulated to simulate the chemical and mineral composition of water from the sea. The major elemental composition of the prepared seawater preferably falls substantially within the range of the major elemental composition of the natural seawater (e.g., having the following ionic composition: greater than 30mM of magnesium, greater than about 6 mM of calcium, and greater than about 300 mM NaCl). Methods of preparing artificial seawater are known in the art and are described in, for instance, U.S. Pat. No. 5,351,651.

When performing the methods of the present invention on pre-adult anadromous fish, the fish exhibit significant increased growth (e.g., SGR), gut motility and/or food consumption, as compared to pre-adult anadromous fish that are not subjected to the present invention. The present invention allows for enhancements in growth, gut motility and/or food consumption prior to, during, and after seawater transfer. Upon transfer to seawater, fish that are not subjected to the steps of the present invention generally experience osmotic stress, reduced or no food consumption, and even death. Osmotic stress results from differences in the osmotic pressure between the surrounding environment and body compartments of the fish. This disturbs the homeostatic equilibrium of the fish and results in decreased growth, reproductive failure and reduced resistance to disease. The fish that have been subjected to the steps of the present invention do not experience a significant amount of osmotic stress, and begin feeding on or soon after transfer to seawater. As a result, the fish also grow more rapidly and reach market size faster. In one experiment, fish subjected to APS Process I began feeding vigorously within 48 hours after transfer to seawater, as compared to control fish (e.g., fish not subjected to the APS Process I) that began feeding 20 days after transfer to seawater. These fish are predicted to reach market size 7 months earlier than fish not subjected to APS Process I. See Example 15. In particular, pre-adult anadromous fish that ingested a feed having between about 1% and about 10% NaCl, and between about 1 gm and about 10 gms per kg of feed of an amino acid, exhibit a substantial increase in growth after transfer to seawater. In the experiments, the fish subjected to the steps of the present invention have shown as much as about 65% increased growth during the same interval of time, as compared to identically paired fish that did not undergo the steps of the present invention and were transferred to seawater. See Table 4 of Example 2. In another experiment, fish subjected to APS Process I were approximately the same size as control fish after transfer to seawater, even though the control fish were in seawater for an additional 64 days, and were 25% bigger at the time of seawater transfer. See Example 15. Remarkable increases in growth were also seen with APS Process II. In one particular experiment, fish treated with APS Process II rapidly increased their body weights greater than 9 fold (15.2 gm to 142.5 gm) during a certain 157-day interval, a significant increase in growth as compared to control fish. See Example 12. Additionally, the present invention allows increases in growth of fish of a variety of sizes. Growth increases are seen in smaller fish (e.g., about 15 gm), medium fish (e.g., 40 gm) as well as larger fish (e.g., 90–120 gm). See Examples 12 and 14. Accordingly, the present invention pertains to methods of increasing growth of pre-adult anadromous fish having weights that range from about 15 gm to about 120 gm. Expression and/or sensitivity of the PVCR can be modulated, for example, in chloride cells in gill tissue, or epithelial cells in the gastrointestinal tract (e.g., stomach, pyloric caeca, proximal or distal intestine), tubules of the kidney, skin or urinary bladder.

Also, elimination of low feeding or poorly feeding osmotically stressed fish in a group improves the overall feed conversion ratio of the entire group. Optimal feeding and growth after seawater transfer by all members of the group of treated fish will permit better feed utilization and improve the overall yield of production when fish reach market size.

Accordingly, the present invention includes methods for improving the FCR for pre-adult anadromous fish that are being transferred to seawater. The feed conversion ratio or FCR is obtained by dividing the body weight gained by a group of fish into the amount of food fed to these group of fish. The more efficient the conversion of food into body weight growth by fish, the smaller the FCR (small amount of food/large weight gain of fish). A very small FCR number (less than 1) encompasses a highly efficient conversion of food into body weight growth and is what the industry is striving for. By contrast, a large FCR means an inefficient conversion of food into body weight growth and is generally undesirable. A large or poor FCR is undesirable because feed usually is expensive and more must be used to grow fish to a given weight. The FCR values for fish subjected to the methods of the present invention are generally smaller and more desirable, in some instances (e.g., when fish were fed dry feed), than most industry published values because the present invention eliminates the presence of osmotically damaged fish that tend to increase the overall FCR since they eat food but do not grow. As a consequence, by subjecting the fish to the methods of the present invention, the FCR, in one embodiment, decreases to thereby allow for optimal feeding and growth of most all of the fish. The FCR of fish subjected to the present invention is sufficient to maintain growth and feeding of the majority of fish, or preferably increase the growth and feed consumption of the majority of fish. When fish are subjected to the methods of the present invention, they exhibit ranges of FCRs, for example, would include values between about 0.7 and about 7.0. In particular, food consumption or food intake is improved because it is believed that the fish "smell" or "sense" the food with the PVCR in cells of the olfactory lamellae or olfactory bulb.

Similarly, the present invention allows for decreasing or reducing the time between generations of pre-adult anadromous fish. These fish begin breeding earlier because the present invention increases their growth, as described herein. Since 2–3 years are required to obtain sexually mature fish, attempts to engage in selective breeding of traits requires this 2–3 year interval before a given trait can be selected for and the fish exhibit that trait breed. Improvements in growth and time to reach maturity produced by the invention reduce the time interval required to reach sexual maturity in fish by as much as about 6 months to about 12 months. Reducing the interval for breeding allows for the production of more fish, and the improved selection of fish that possess traits other than those that are better able to adapt to seawater (e.g., select for fish that have improved taste, increased filet thickness, increased α3 omega fatty acid content, or fish that are more readily able to modulate PVCR expression).

Prior to the present invention, anadromous fish that are transferred from freshwater to seawater are generally transferred at a particular size, referred to as "critical size." The critical size varies from species to species, but generally refers to a minimum size at which a fish can be transferred to seawater. The critical size for salmon, trout and char is between about 50 and about 100 gms, between about 70 and about 120 gms, and greater than 100 gms, respectively. Critical sizes for Coho, King, and Sockeye Salmon are between about 10 and about 15 gms, between about 20 and 40 gms and between about 1 and about 2 gms, respectively. Chum and Pink Salmon each have a critical size about less than 3 gms.

Prior to the invention, a population of pre-adult anadromous fish having attained a mean critical size were transferred to seawater. Some of the fish are physiologically ready for the transfer, while others are not. This is one of the reasons for the increased mortality rate upon transfer to seawater. The methods of the present invention physiologically prepares all or mostly all of the fish for transfer to seawater by modulating PVCR expression and/or sensitivity, and/or by inducing smoltification. Greater than about 80% (e.g., 90%, 95%, 100%) undergo smoltification and are ready for transfer to seawater. In fact, in one experiment, when performing the steps of the present invention on Atlantic Salmon (e.g., subjecting the fish to a PVCR modulator environment and a NaCl diet), close to 100% of the Atlantic Salmon underwent smoltification. See Example 2. Hence, the methods of the present invention include methods of preparing pre-adult anadromous fish for transfer to seawater, as well as inducing smotification in pre-adult anadromous fish.

Since the methods of the present invention modulate the expression and/or sensitivity of the PVCR in pre-adult anadromous fish, they survive better when transferred to seawater. The reduced osmotic stress results in reduced mortality. In one case, certain populations of pre-adult anadromous fish that did not undergo the methods of the present invention exhibit a 100% mortality rate after transfer to seawater (see FIG. 9, Example 2), while other populations of pre-adult anadromous fish that did not undergo the methods of the invention have survival rates of only between about 40% and 70% (e.g., approximately 50%). See Table I, Example 2. This occurs because the fish experience osmotic shock when transferred to seawater which has a very different ionic composition than freshwater. However, when subjected to the methods of the present invention, the fish exhibit a survival rate that is significantly greater than the rate for unconditioned fish (e.g.,between about 80% about 100%). In fact, when performing the present invention on Atlantic Salmon, 99% of the fish survived transfer to seawater after 5 days, as compared to 50% of fish that did not undergo the steps of the present invention in one experiment. See Table I of Example 2. Hence, the present invention embodies methods of reducing the mortality rate after pre-adult anadromous fish are transferred to seawater.

Not only is the present invention useful in reducing mortality rates after transfer to seawater, the present invention is also used to increase survival rates in freshwater prior to transfer. Prior to the discovery of the present invention, a "smolt window" existed in which the hatcheries transferred the pre-adult anadromous fish to seawater, or else the fish died if they continued to remain in freshwater after undergoing smoltification. The PVCR modulator environment and the NaCl diet of the present invention allow the fish to continue to thrive indefinitely. The fish continue to consume feed and grow. Accordingly, the methods of the present invention significantly increase the time period or window in which the fish can be transferred to seawater, or eliminate it altogether. When the present invention was performed on Atlantic Salmon, 99% of the fish survived and thrived for at least 45 days in freshwater thereby increasing the smolt window to at least about 45 days (e.g., 1–45 days). In contrast, only 67% of the fish that did not undergo the steps of the invention survived after 45 days in freshwater in one experiment. See Example 2. Additionally, after these fish are transferred to seawater they consume more feed, and grow better, as compared to fish that do not undergo either APS Process I or E, as further described herein and in particular, Example 15.

The present invention also includes methods for transferring to seawater pre-adult anadromous fish having smaller weights, as compared to the industry recognized critical size for the particular species of fish. The methods of the present invention, as described herein, modulate PVCR expression in fish that are smaller than those normally transferred to seawater, or those undergoing or about to undergo smoltification. These methods include transferring a parr, the stage of a juvenile fish prior to becoming a smolt, to seawater. Parr is a life stage of pre-adult anadromous fish that occurs after maturation of alevins or yolk sac fry. Parr or fingerlings display characteristic ovid stripes or parr marks along their flanks, and normally undergo growth and development in freshwater prior to smoltification. The term "parr" is a term that is known in the art. As yolk sac fry continue to feed, they grow into larger parr. Parr can possess a wide range of body weights depending on conditions under which they are grown. The weights of parr vary from species to species. Body weights for parr vary significantly with a range from about 0.5 gms to about 70 gms. Carrying out the present invention in one experiment, as described herein, results in a transfer of Atlantic Salmon parr weighing as little as between about 13% and about 18.5% of the critical size weight (between about 70 and about 100 gins), or about 13 gins Adding a PVCR modulator to the feed (e.g., an amino acid such as a tryptophan), in addition to the NaCl diet, allows seawater transfer of fish having particularly low weights. See Example 2. In one embodiment, salmon that were subjected to the APS Process II could be transferred to seawater weighing as little as 15 grams. Salmon weighing at least 15 grams experienced rapid growth, efficiently utilized feed, and suffered less death than salmon that are not exposed to the APS Process II and weigh 4 times more. See Example 12. Accordingly, the present invention encompasses method for preparing anadromous fish for transfer to seawater wherein the fish weigh between about 15 grams and about 120 grams at the time of seawater transfer.

The present invention additionally provides methods for transferring pre-adult anadromous fish into seawater having warmer temperatures (e.g., 14° C. and 19° C.), as compared to water temperatures (6°–14° C.) into which these fish have been transferred in the past. Since the fish experience reduced or little osmotic stress when transferred to seawater using the methods of the present invention, the fish are able to withstand transfer into higher water temperatures without exhibiting an increase in mortality rates. See Example 2.

The methods of the present invention also decrease the incidence of disease among the smolts and the growing salmon. Because smolts treated with the methods of the present invention experience less stress upon transfer to seawater, their immune functions are stronger, and they are less susceptible to parasitic, viral, bacterial and fungal diseases. Fish not treated with the methods described herein are more susceptible to such diseases, and can serve as reservoirs of disease, capable of infecting healthy fish.

Another embodiment of the present invention includes modifying the distribution of chloride cells in various tissues of pre-adult anadromous fish. One example of such a tissue is gill tissue. However, in multiple experiments in which the fish were subjected to APS Process II, the distribution of chloride cells in the gill shifted such that there was a significant reduction in the number of chloride cells in the secondary lamellae resembling the pattern exhibited by fish transferred to seawater yet the treated fish remained in freshwater. In fish maintained in freshwater and not subjected to the steps of the present invention, chloride cells are localized in approximately equal numbers in both the primary and secondary lamellae of gill tissue. In contrast, when such fish are transferred to seawater, the distribution changes such that there are significantly fewer chloride cells observed in secondary lamellae. See Example 21. Accordingly, the methods of the present invention include increasing the number of chloride cells in the primary lamellae and reducing the number of chloride cells in the secondary lamellae by subjecting the fish to the methods described herein. Localization of chloride cells can be performed using methods known in the art. Chloride cells contain abundant quantities of Na+K+ATPase that can be localized using immunocytochemistry as well as measured using enzymatic assays. One method for localizing chloride cells is to obtain sections of the gill (e.g., paraffin sections) and stain the sections with an anti-Sodium Potassium (Na+K+)ATPase antibody (mouse monoclonal alpha 5 anti-Na+K+ATPase antibody). Na+K+ATPase activity is found in chloride cells, and can be used as a marker for chloride cells. The antibody can be labeled, or a second antibody that is labeled and can bind to the anti-Na+K+ATPase antibody can be used to stain and view the chloride cells. See Seidelin et al., *Physiol Biochem Zool.* 73(4):446–53 (2000).

The distribution of chloride cells in the Primary Lamellae (PL) and the Secondary Lamellae (SL) can be determined using a ratio. A ratio of the number of chloride cells in the SL to the number of chloride cells in the PL (SL/PL) is determined. In pre-adult anadromous fish that are maintained in freshwater and are not subject to the methods of the present invention, the SL/PL ratio is known in the art, and is generally between about 0.6 and about 1.8. Fish subjected to the methods of the present invention and remaining in freshwater, in one experiment, exhibit a decrease in SL/PL ratios. Such a ratio is generally between about 0.1 and about 1.0, a ratio closer to that seen for fish that have been transferred to seawater (e.g., ratios between about 0 and about 0.18). See Example 21. Hence, the methods of the present invention include decreasing the SL/PL ratio of pre-adult anadromous fish that are maintained in freshwater by subjecting the fish to the methods described herein (e.g., APS Process I or II).

Similarly, the present invention relates to methods of increasing Na+K+ATPase activity in chloride cells. It is generally recognized that specific epithelial cells called chloride cells present on the gill lamellae of fish are important for their survival in both freshwater and seawater. In freshwater adapted fish, gill chloride cells pump Na+ and Cl− ions that are present in dilute concentrations in the surrounding freshwater into the body fluids of the fish enabling the fish to maintain its normal body ionic composition. In contrast, when the same fish are transferred to seawater, gill chloride cells remodel their structure and function permitting them to remove the excess Na+ and Cl− accumulated in the body fluid of fish as a result of their drinking of hyperosmotic seawater. Chloride cells contain such abundant Na+K+ATPase protein that both the presence and activity of this enzyme can be used as a marker for the identification of chloride cells and an indicator of their function. Fish subjected to the methods of the present invention (e.g., APS Process I or II) exhibit an increase in the expression and/or activity of Na+K+ATPase protein. In one example, significant increases in Na+K+ATPase activity of chloride cells found in gill tissue were seen in fish subjected to APS Process II, as compared to fish that were maintained in freshwater and not subjected to APS Process II. See Example 21.

Na+K+ATPase activity can be measured using enzymatic methods, which are further described herein. Homogenates of tissues containing chloride cells (e.g. gill or pyloric caeca) are obtained and subjected to an enzymatic assay in which ATP hydrolysis is measured. The Na+K+-ATPase activity can be calculated from the difference in ATP hydrolysis with or without ouabain and normalized for protein content in wells. This protein can be analyzed in a plate reader using, for example, the Coomassie based Bio-Rad Protein Assay (Bio-Rad, Hercules, Calif.). Example 21 describes in more detail, a protocol for measuring Na+K+ATPase activity. Methods for quantifying Na+K+ATPase and/or localizing chloride cells, that are known in the art or developed in the future, can be used. See Seidelin et al., *Physiol Biochem Zool.* 73(4):446–53 (2000) and McCormick, *Can. J. Fish Aquat. Sci.* 50, 656–658 (1993).

Methods of Assessment of the PVCR

The present invention includes methods of detecting the level of the PVCR to determine whether fish are ready for transfer from freshwater to seawater. Methods that measure PVCR levels include several suitable assays. Suitable assays encompass immunological methods, such as FACS analysis, radioimmunoassay, flow cytometry, immunocytochemistry, enzyme-linked immunosorbent assays (ELISA) and chemiluminescence assays. Any method known now or developed later can be used for measuring PVCR expression.

Antibodies reactive with the PVCR or portions thereof can be used. In a preferred embodiment, the antibodies specifically bind with the PVCR or a portion thereof The antibodies can be polyclonal or monoclonal, and the term antibody is intended to encompass polyclonal and monoclonal antibodies, and functional fragments thereof. The terms polyclonal and monoclonal refer to the degree of homogeneity of an antibody preparation, and are not intended to be limited to particular methods of production.

In several of the preferred embodiments, immunological techniques detect PVCR levels by means of an anti-PVCR antibody (i.e., one or more antibodies). The term "anti-PVCR" antibody includes monoclonal and/or polyclonal antibodies, and mixtures thereof.

Anti-PVCR antibodies can be raised against appropriate immunogens, such as isolated and/or recombinant PVCR or portion thereof (including synthetic molecules, such as synthetic peptides). In one embodiment, antibodies are raised against an isolated and/or recombinant PVCR or portion thereof (e.g., a peptide) or against a host cell which expresses recombinant PVCR. In addition, cells expressing recombinant PVCR, such as transfected cells, can be used as immunogens or in a screen for antibody which binds receptor.

Any suitable technique can prepare the immunizing antigen and produce polyclonal or monoclonal antibodies. The art contains a variety of these methods (see e.g., Kohler et al., Nature, 256: 495–497 (1975) and Eur. J. Immunol. 6: 511–519 (1976); Milstein et al., Nature 266: 550–552 (1977); Koprowski et al., U.S. Pat. No. 4,172,124; Harlow, E. and D. Lane, 1988, Antibodies: A Laboratory Manual, (Cold Spring Harbor Laboratory: Cold Spring Harbor, N.Y.); Current Protocols In Molecular Biology, Vol. 2 (Supplement 27, Summer '94), Ausubel, F. M. et al., Eds., (John Wiley & Sons: New York, N.Y.), Chapter 11, (1991)). Generally, fusing a suitable immortal or myeloma cell line, such as SP2/0, with antibody producing cells can produce a hybridoma. Animals immunized with the antigen of interest provide the antibody producing cell, preferably cells from the spleen or lymph nodes. Selective culture conditions isolate antibody producing hybridoma cells while limiting dilution techniques produce them. Researchers can use suitable assays such as ELISA to select antibody producing cells with the desired specificity.

Other suitable methods can produce or isolate antibodies of the requisite specificity. Examples of other methods include selecting recombinant antibody from a library or relying upon immunization of transgenic animals such as mice.

According to the method, an assay can determine the level of PVCR in a biological sample. In determining the amounts of PVCR, an assay includes combining the sample to be tested with an antibody having specificity for the PVCR, under conditions suitable for formation of a complex between antibody and the PVCR, and detecting or measuring (directly or indirectly) the formation of a complex. The sample can be obtained directly or indirectly, and can be prepared by a method suitable for the particular sample and assay format selected.

In particular, tissue samples, e.g., gill tissue samples, can be taken from fish after they are anaesthetized with MS-222. The tissue samples are fixed by immersion in 2% paraformaldehyde in appropriate Ringers solution corresponding to the osmolality of the fish, washed in Ringers, then frozen in an embedding compound, e.g., O.C.T.™ (Miles, Inc., Elkahart, Ind., USA) using methylbutane cooled with liquid nitrogen. After cutting 8–10 µ tissue sections with a cryostat, individual sections are subjected to various staining protocols. For example, sections are: 1) blocked with goat serum or serum obtained from the same species of fish, 2) incubated with rabbit anti-CaR or anti-PVCR antiserum, and 3) washed and incubated with peroxidase-conjugated affinity-purified goat antirabbit antiserum. The locations of the bound peroxidase-conjugated goat antirabbit antiserum are then visualized by development of a rose-colored aminoethylcarbazole reaction product. Individual sections are mounted, viewed and photographed by standard light microscopy techniques. The anti-CaR antiserum used to detect fish PVCR protein is raised in rabbits using a 23-mer peptide corresponding to amino acids numbers 214–236 localized in the extracellular domain of the RaKCaR protein. The sequence of the 23-mer peptide is: ADDDYGRPGIEK-FREEAEERDIC (SEQ ID NO.: 19) A small peptide with the sequence DDYGRPGIEKFREEAEERDICI (SEQ ID NO.: 20) or ARSRNSADGRSGDDLPC (SEQ ID NO.: 21) can also be used to make antisera containing antibodies to PVCRs. Such antibodies can be monoclonal, polyclonal or chimeric.

Suitable labels can be detected directly, such as radioactive, fluorescent or chemiluminescent labels. They can also be indirectly detected using labels such as enzyme labels and other antigenic or specific binding partners like biotin. Examples of such labels include fluorescent labels such as fluorescein, rhodamine, chemiluminescent labels such as luciferase, radioisotope labels such as $^{32}P$, $^{125}I$, $^{131}I$, enzyme labels such as horseradish peroxidase, and alkaline phosphatase, β-galactosidase, biotin, avidin, spin labels and the like. The detection of antibodies in a complex can also be done immunologically with a second antibody which is then detected (e.g., by means of a label). Conventional methods or other suitable methods can directly or indirectly label an antibody.

In performing the method, the levels of PVCR in various tissues change in comparison to control. Modulated levels or the presence of PVCR expression in various tissues, as compared to a control, indicate that the fish or the population of fish from which a statistically significant amount of fish were tested, are ready for transfer to freshwater. A control refers to a level of PVCR, if any, from a fish that is not subjected to the steps of the present invention, e.g., not subjected to freshwater having a PVCR modulator and/or not fed a NaCl diet. For example, FIGS. 13 and 18 show that fish not subjected to the present invention had no detectable PVCR level, whereas fish that were subjected to the steps of the invention had PVCR levels that were easily detected.

The PVCRs can also be assayed by Northern blot analysis of mRNA from tissue samples. Northern blot analysis from various shark tissues has revealed that the highest degree of PVCRs expression is in gill tissue, followed by the kidney and the rectal gland. There appear to be at least three distinct mRNA species of about 7 kb, 4.2 kb and 2.6 kb.

The PVCRs can also be assayed by hybridization, e.g., by hybridizing one of the PVCR sequences provided herein (e.g., SEQ ID NO: 1,3,5,7,9,11,13,15) or an oligonucleotide derived from one of the sequences, to a DNA-containing tissue sample from a fish. Such a hybridization sequence can have a detectable label, e.g., radioactive, fluorescent, etc., attached to allow the detection of hybridization product. Methods for hybridization are well known, and such methods are provided in U.S. Pat. No. 5,837,490, by Jacobs et al., the entire teachings of which are herein incorporated by reference in their entirety. The design of the oligonucleotide probe should preferably follow these parameters: (a) it should be designed to an area of the sequence which has the fewest ambiguous bases ("N's"), if any, and (b) it should be designed to have a $T_m$ of approx. 80° C. (assuming 2° C. for each A or T and 4 degrees for each G or C).

Stringency conditions for hybridization refers to conditions of temperature and buffer composition which permit hybridization of a first nucleic acid sequence to a second nucleic acid sequence, wherein the conditions determine the degree of identity between those sequences which hybridize to each other. Therefore, "high stringency conditions" are those conditions wherein only nucleic acid sequences which are very similar to each other will hybridize. The sequences can be less similar to each other if they hybridize under moderate stringency conditions. Still less similarity is needed for two sequences to hybridize under low stringency conditions. By varying the hybridization conditions from a stringency level at which no hybridization occurs, to a level at which hybridization is first observed, conditions can be determined at which a given sequence will hybridize to those sequences that are most similar to it. The precise conditions determining the stringency of a particular hybridization include not only the ionic strength, temperature, and the concentration of destabilizing agents such as formamide, but also on factors such as the length of the nucleic acid sequences, their base composition, the percent of mismatched base pairs between the two sequences, and the frequency of occurrence of subsets of the sequences (e.g., small stretches of repeats) within other non-identical sequences. Washing is the step in which conditions are set so as to determine a minimum level of similarity between the sequences hybridizing with each other. Generally, from the lowest temperature at which only homologous hybridization occurs, a 1% mismatch between two sequences results in a 1° C. decrease in the melting temperature ($T_m$) for any chosen SSC concentration. Generally, a doubling of the concentration of SSC results in an increase in the $T_m$ of about 1 7° C. Using these guidelines, the washing temperature can be determined empirically, depending on the level of mismatch sought. Hybridization and wash conditions are explained in *Current Protocols in Molecular Biology* (Ausubel, F. M. et al., eds., John Wiley & Sons, Inc., 1995, with supplemental updates) on pages 2.10.1 to 2.10.16, and 6.3.1 to 6.3.6.

High stringency conditions can employ hybridization at either (1) 1×SSC (10×SSC=3 M NaCl, 0.3 M Na$_3$-citrate.2H$_2$O (88 g/liter), pH to 7.0 with 1 M HCl), 1% SDS (sodium dodecyl sulfate), 0.1–2 mg/ml denatured calf thymus DNA at 65° C., (2) 1×SSC, 50% formamide, 1% SDS, 0.1–2 mg/ml denatured calf thymus DNA at 42° C., (3) 1% bovine serum albumin (fraction V), 1 mM Na$_2$.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1–2 mg/ml denatured calf thymus DNA at 65° C., (4) 50% formamide, 5×SSC, 0.02 M Tris-HCl (pH 7.6), 1×Denhardt's solution (100×=10 g Ficoll 400, 10 g polyvinylpyrrolidone, 10 g bovine serum albumin (fraction V), water to 500 ml), 10% dextran sulfate, 1% SDS, 0.1–2 mg/ml denatured calf thymus DNA at 42° C., (5) 5×SSC, 5×Denhardt's solution, 1% SDS, 100 μg/ml denatured calf thymus DNA at 65° C., or (6) 5×SSC, 5×Denhardt's solution, 50% formamide, 1% SDS, 100 μg/ml denatured calf thymus DNA at 42° C., with high stringency washes of either (1) 0.3–0.1×SSC, 0.1% SDS at 65° C., or (2) 1 mM Na$_2$EDTA, 40 mM NaHPO$_4$ (pH 7.2), 1% SDS at 65° C. The above conditions are intended to be used for DNA-DNA hybrids of 50 base pairs or longer. Where the hybrid is believed to be less than 18 base pairs in length, the hybridization and wash temperatures should be 5–10° C. below that of the calculated $T_m$ of the hybrid, where $T_m$ in ° C.=(2×the number of A and T bases)+(4×the number of G and C bases). For hybrids believed to be about 18 to about 49 base pairs in length, the $T_m$ in ° C.=(81.5° C.+16.6(log$_{10}$M)+0.41(% G+C)−0.61 (% formamide)−500/L), where "M" is the molarity of monovalent cations (e.g., Na$^+$), and "L" is the length of the hybrid in base pairs.

Moderate stringency conditions can employ hybridization at either (1) 4×SSC, (10×SSC=3 M NaCl, 0.3 M Na$_3$-citrate-2H$_2$O (88 g/liter), pH to 7.0 with 1 M HCl) 1% SDS (sodium dodecyl sulfate), 0.1–2 mg/ml denatured calf thymus DNA at 65° C., (2) 4×SSC, 50% formamide, 1% SDS, 0.1–2 mg/ml denatured calf thymus DNA at 42° C., (3) 1% bovine serum albumin (fraction V), 1 mM Na$_2$.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per 0.1–2 mg/ml denatured calf thymus DNA at 65° C., (4) 50% formamide, 5×SSC, 0.02 M Tris-HCl (pH 7.6), 1×Denhardt's solution (100×=10 g Ficoll 400, 10 g polyvinylpyrrolidone, 10 g bovine serum albumin (fraction V), water to 500 ml), 10% dextran sulfate, 1% SDS, 0.1–2 mg/ml denatured calf thymus DNA at 42° C., (5) 5×SSC, 5×Denhardt's solution, 1% SDS, 100 μg/ml denatured calf thymus DNA at 65° C., or (6) 5×SSC, 5×Denhardt's solution, 50% formamide, 1% SDS, 100 μg/ml denatured calf thymus DNA at 42° C., with moderate stringency washes of 1×SSC, 0.1% SDS at 65° C. The above conditions are intended to be used for DNA-DNA hybrids of 50 base pairs or longer. Where the hybrid is believed to be less than 18 base pairs in length, the hybridization and wash temperatures should be 5–10° C. below that of the calculated $T_m$ of the hybrid, where $T_m$ in ° C.=(2×the number of A and T bases)+(4×the number of G and C bases). For hybrids believed to be about 18 to about 49 base pairs in length, the $T_m$ in ° C.=(81.5° C.+16.6(log$_{10}$M)+0.41(% G+C)−0.61 (% formamide)−500/L), where "M" is the molarity of monovalent cations (e.g., Na$^+$), and "L" is the length of the hybrid in base pairs.

Low stringency conditions can employ hybridization at either (1) 4×SSC, (10×SSC=3 M NaCl, 0.3 M Na$_3$-citrate-2H$_2$O (88 g/liter), pH to 7.0 with 1 M HCl), 1% SDS (sodium dodecyl sulfate), 0.1–2 mg/ml denatured calf thymus DNA at 50° C., (2) 6×SSC, 50% formamide, 1% SDS, 0.1–2 mg/ml denatured calf thymus DNA at 40° C., (3) 1% bovine serum albumin (fraction V), 1 mM Na$_2$.EDTA, 0.5 M NaHPO$_4$ (pH 7.2) (1 M NaHPO$_4$=134 g Na$_2$HPO$_4$.7H$_2$O, 4 ml 85% H$_3$PO$_4$ per liter), 7% SDS, 0.1–2 mg/ml denatured calf thymus DNA at 50° C., (4) 50% formamide, 5×SSC, 0.02 M Tris-HCl (pH 7.6), 1×Denhardt's solution (100×=10 g Ficoll 400, 10 g polyvinylpyrrolidone, 10 g bovine serum albumin (fraction V), water to 500 ml), 10% dextran sulfate, 1% SDS, 0.1–2 mg/ml denatured calf thymus DNA at 40° C., (5) 5×SSC, 5×Denhardt's solution, 1% SDS, 100 μg/ml denatured calf thymus DNA at 50° C., or (6) 5×SSC, 5×Denhardt's solution, 50% formamide, 1% SDS, 100 μg/ml denatured calf thymus DNA at 40° C., with low stringency washes of either 2×SSC, 0.1% SDS at 50° C., or (2) 0.5% bovine serum albumin (fraction V), 1 mM Na$_2$EDTA, 40 mM NaHPO$_4$ (pH 7.2), 5% SDS. The above conditions are intended to be used for DNA-DNA hybrids of 50 base pairs or longer. Where the hybrid is believed to be less than 18 base pairs in length, the hybridization and wash temperatures should be 5–10° C. below that of the calculated $T_m$ of the hybrid, where $T_m$ in ° C.=(2×the number of A and T bases)+(4×the number of G and C bases). For hybrids believed to be about 18 to about 49 base pairs in length, the $T_m$ in ° C.=(81.5° C.+16.6(log$_{10}$M)+0.41(% G+C)−0.61 (% formamide)−500/L), where "M" is the molarity of monovalent cations (e.g. Na$^+$), and "L" is the length of the hybrid in base pairs.

The present invention encompasses detection of PVCRs with PCR methods using primers disclosed or derived from sequences described herein. For example, PVCRs can be detected by PCR using SEQ ID Nos: 22 and 23, as described in Example 9. PCR is the selective amplification of a target sequence by repeated rounds of nucleic acid replication utilizing sequence-specific primers and a thermostable polymerase. PCR allows recovery of entire sequences between two ends of known sequence. Methods of PCR are described herein and are known in the art.

In particular, the level of aquatic PVCR can be determined in various tissues by Reverse Transcriptase-Polymerase Chain Reaction (RT-PCR) after isolation of poly A+RNA from aquatic species. Methods of PCR and RT-PCR are well characterized in the art (See generally, PCR Technology: Principles and Applications for DNA Amplification (ed. H. A. Erlich, Freeman Press, NY, N.Y., 1992); PCR Protocols: A Guide to Methods and Applications (Eds. Innis, et al., Academic Press, San Diego, Calif., 1990); Mattila et al., Nucleic Acids Res., 19:4967 (1991); Eckert et al., PCR Methods and Applications, 1:17 (1991); PCR (eds. McPherson et al., IRL Press, Oxford); Ausebel, F. M. et al., Current Protocols in Molecular Biology, Greene Publishing Assoc. and Wiley-Interscience 1987, & Supp. 49, 2000; and U.S. Pat. No. 4,683,202). Briefly, mRNA is extracted from the tissue of interest and reverse transcribed. Subsequently, a PCR reaction is performed with PVCR-specific primers and the presence of the predicted PVCR product is determined, for example, by agarose gel electrophoresis. Examples of PVCR-specific primers are SEQ ID No.: 22 and/or SEQ ID NO.: 23. The product of the RT-PCR reaction that is performed with PVCR-specific primers is referred to herein as a RT-PCR product. The RT-PCR product can include nucleic acid molecules having part or all of the PVCR sequence. The RT-PCR product can optionally be radioactively labeled and the presence or amount of PVCR product can be determined using autoradiography. Two examples of commercially available fluorescent probes that can be used in such an assay are Molecular Beacons (Stratagene) and Taqman® (Applied Biosystems). Alternative methods of labeling and quantifying the RT-PCR product are well known to one of skill in the art (see Ausebel, F. M. et al., Current Protocols in Molecular Biology, Greene Publishing Assoc. and Wiley-Interscience 1987, & Supp. 49, 2000. Poly A+RNA can be isolated from any tissue which contains at least one PVCR by standard methods. Such tissues include, for example, gill, nasal lamellae, urinary bladder, kidney, intestine, stomach, liver and brain.

Hence, the present invention includes kits for the detection of the PVCR or the quantification of the PVCR having either antibodies specific for the PVCR or a portion thereof, or a nucleic acid sequence that can hybridize to the nucleic acid of the PVCR.

Alterations in the expression or sensitivity of PVCRs could also be accomplished by introduction of a suitable transgene. Suitable transgenes would include either the PVCR gene itself or modifier genes that would directly or indirectly influence PVCR gene expression. Methods for successful introduction, selection and expression of the transgene in fish oocytes, embryos and adults are described in Chen, TT et al., Transgenic Fish, Trends in Biotechnology 8:209–215 (1990).

The present invention is further and more specifically illustrated by the following Examples, which are not intended to be limiting in any way.

EXEMPLIFICATION

Example 1

Polyvalent Cation-sensing Receptors (PVCRs) Serve as Salinity Sensors in Fish

Polyvalent cation-sensing receptors (PVCRs) serve as salinity sensors in fish. These receptors are localized to the apical membranes of various cells within the fish's body (e.g., in the gills, intestine, kidney) that are known to be responsible for osmoregulation. A full-length cation receptor (CaR, also referred to as "PVCR") from the dogfish shark has been expressed in human HEK cells. This receptor was shown to respond to alterations in ionic compositions of NaCl, Ca2+ and Mg2+ in extracellular fluid bathing the HEK cells. The ionic concentrations responded to encompassed the range which includes the transition from freshwater to seawater. Expression of PVCR mRNA is also increased in fish after their transfer from freshwater to seawater, and is modulated by PVCR agonists. Partial genomic clones of PVCRs have also been isolated from other fish species, including winter and summer flounder and lumpfish, by using nucleic acid amplification with degenerate primers.

This method was also used to isolate partial genomic clones of PVCRs for Atlantic salmon (FIG. 1), arctic char (FIG. 2) and rainbow trout (FIG. 3). The degenerate oligonucleotide primers used were 5'-TGT CKT GGA CGG AGC CCT TYG GRA TCG C-3' (SEQ ID NO:22) AND 5'-GGC KGG RAT GAA RGA KAT CCA RAC RAT GAA G-3' (SEQ ID NO:23), where K is T or G, Y is C or T, and R is A or G. The degenerate oligos were generated by standard methodologies (Preston, G. M., 1993, "Polymerase chain reaction with degenerate oligonucleotide primers to clone gene family members," in: Methods in Mol. Biol., vol. 58, ed. A. Harwood, Humana Press, pp. 303–312). Genomic bands from these three species were amplified, purified by agarose gel electrophoresis, ligated into an appropriate plasmid vector (salmon and arctic char species-pT7 Blue (Novagen, Madison, Wis.; trout used pGem-T (Promega Biotech. Madison, Wis.), and transformed into an appropriate bacterial host strain salmon and arctic char—pT7 vector with NovaBlue (Novagen, Madison, Wis.) and trout pGEM-T used JM-109 E. coli cell which was then grown in liquid medium. The plasmids and inserts were purified from the host cells, and sequenced. FIG. 4 shows the deduced amino acid sequences and alignment for the PVCRs from Atlantic salmon, arctic char and rainbow trout, relative to the PVCR from the kidney of the dogfish shark (Squalus acanthias).

Example 2

Survival and Growth of Pre-Adult Anadromous Fish using the Methods of the Present Invention An important feature of current salmon farming is the placement of smolt from freshwater hatcheries to ocean netpens. Present day methods use smolt that have attained a critical size of approximately 70–110 grams body weight. The present invention can either be utilized both to improve the ocean netpen transfer of standard 70–110 grams smolt as well as permit the successful ocean netpen transfer of smaller smolts weighing, for example, only 15 grams. For standard 70–110 gram smolt, application of the invention eliminates the phenomenon known as "smolt window" and permits fish to be maintained and transferred into ocean water at 15° C. or higher. Use of the invention in 15 gram or larger smolt permits greater utilization of freshwater hatchery capacities followed by successful seawater transfer to ocean netpens. In both cases, fish that undergo the steps of the invention feed vigorously within a short interval of time after transfer to ocean netpens and thus exhibit rapid growth rates upon transfer to seawater.

FIG. 5 shows in schematic form the key features of current aquaculture of Atlantic salmon in ocean temperatures present in Europe and Chile. Eggs are hatched in inland freshwater hatcheries and the resulting fry grow into fingerlings and parr. Faster growing parr are able to undergo smoltification and placement in ocean netpens as So smolt (70 gram) during year 01. In contrast, slower growing parr are smoltified in year 02 and placed in netpens as S1 smolt (100 gram). In both S0 and S1 transfers to seawater, the presence of cooler ocean and freshwater temperatures are desired to minimize the stress of osmotic shock to newly transferred smolt. This is particularly true for S1 smolt since freshwater hatcheries are often located at significant distances from ocean netpen growout sites and their water temperatures rise rapidly during early summer. Thus, the combination of rising water temperatures and the tendency of smolt to revert or die when held for prolonged intervals in freshwater produces a need to transfer smolt into seawater during the smolt window.

Standard smolts that are newly placed in ocean netpens are not able to grow optimally during their first 40–60 day interval in seawater because of the presence of osmotic stress that delays their feeding. This interval of osmotic adaptation prevents the smolts from taking advantage of the large number of degree days present immediately after either spring or fall placement. The combination of the presence of the smolt window together with delays in achieving optimal smolt growth prolong the growout interval to obtain market size fish. This is particularly problematic for S0's since the timing of their harvest is sometimes complicated by the occurrence of grilsing in maturing fish that are exposed to reductions in ambient photoperiod.

Methods

The following examples refer to APS Process I and APS Process II throughout. APS stands for "AquaBio Products Sciences®, L.L.C." APS Process I is also referred to herein as "SUPERSMOLT™ I Process" or "Process I." An "APS Process I" fish or smolt refers to a fish or smolt that has undergone the steps of APS Process I. An APS Process I smolt is also referred to as a "SUPERSMOLT™ I" or a "Process I" smolt. Likewise, APS Process II is also referred to herein as "SUPERSMOLT™ II Process" or "Process II." An "APS Process II" fish or smolt refers to a fish or smolt that has undergone the steps of APS Process II. An APS Process II smolt is also referred to as a "SUPERSMOLT™ II" or a "Process II" smolt.

APS Process I: Pre-adult anadromous fish (this includes both commercially produced S0, S1 or S2 smolts as well as smaller parr/smolt fish) are exposed to or maintained in freshwater containing either 2.0–10.0 mM Calcium and 0.5–10.0 mM Magnesium ions. This water is prepared by addition of calcium carbonate and/or chloride and magnesium chloride to the freshwater. Fish are fed with feed pellets containing 7% (weight/weight) NaCl. See Example 8 for further details regarding the feed. Fish are exposed to or maintained in this regimen of water mixture and feed for a total of 30–45 days, using standard hatchery care techniques. Water temperatures vary between 10–16° C. Fish are exposed to a constant photoperiod for the duration of APS Process I. A fluorescent light is used for the photoperiod.

APS Process II: Pre-adult anadromous fish (this includes both commercially produced S0, S1 or S2 smolts as well as smaller parr/smolt fish) are exposed to or maintained in freshwater containing 2.0–10.0 mM Calcium and 0.5–10.0 mM Magnesium ions. This water is prepared by addition of calcium carbonate and/or chloride and magnesium chloride to the freshwater. Fish are fed with feed pellets containing 7% (weight/weight) NaCl and either 2 gm or 4 gm of L-Tryptophan per kg of feed. See Example 8 for further details regarding the feed. Fish are exposed to or maintained in this regimen of water mixture and feed for a total of 30–45 days using standard hatchery care techniques. Water temperatures vary between 10–16° C. Fish are exposed to a constant photoperiod for the duration of APS Process II. A fluorescent light is used for the photoperiod.

Results and Discussion

Section I:

Demonstration of the Benefits of the APS Process I For Atlantic Salmon, Trout and Arctic Char Demonstration of the benefits of the APS Process I For Atlantic Salmon APS Process I increases the survival of small Atlantic Salmon S2 like smolt after their transfer to seawater when compared to matched freshwater controls. Optimal survival is achieved by using the complete process consisting of both the magnesium and calcium water mixture as well as NaCl diet. In contrast, administration of calcium and magnesium either via the food only or without NaCl dietary supplementation does not produce results equivalent to APS Process I.

Table 1 shows data obtained from Atlantic salmon S2 like smolts less than 1 year old weighing approximately 25 gm. This single group of fish was apportioned into 4 specific groups as indicated below and each were maintained under identical laboratory conditions except for the variables tested. All fish were maintained at a water temperature of 9–13° C. and a continuous photoperiod for the duration of the experiment. The control freshwater group that remained in freshwater for the initial 45 day interval experienced a 33% mortality rate under these conditions such that only 67% were able to be transferred to seawater. After transfer to seawater, this group also experienced high mortality where only one half of these smolts survived. Inclusion of calcium (10 mM) and magnesium (5 mM) within the feed offered to smolt (Ca2+/Mg2+diet) reduced survival as compared to controls both in freshwater (51% vs 67%) as well after seawater transfer (1% vs 50%). In contrast, inclusion of 10 mM Ca2+ and 5 mM Mg2+ in the freshwater (APS Process I Water Only) improved smolt survival in APS Process I water as well as after transfer of smolt to seawater. However, optimal results were obtained (99% survival in both the APS Process I water mixture as well as after seawater transfer) when smolt were maintained in APS Process I water mixture and fed a diet supplemented with 7% sodium chloride.

TABLE 1

Comparison of the Survival of Atlantic Salmon S2 like Smolts After Various Treatments

| Parameter Sampled | Control Freshwater | Ca2+/Mg2+ Diet | APS Water Only | APS Water + NaCl Diet |
|---|---|---|---|---|
| Starting # of fish | 66 | 70 | 74 | 130 |
| # of fish | 44 | 36 | 67 | 129 |
| % of fish surviving after 45 days in freshwater or APS mixture | 67% | 51% | 91% | 99% |
| # of fish | 22 | 2 | 60 | 128 |
| % of fish surviving 5 days after transfer to seawater | 50% | 6% | 90% | 99% |

[1]Survival percentages expressed as rounded whole numbers

Application of the APS Process I to the Placement of 70–100 gm Smolts in Seawater These data show that use of the APS Process I eliminates the "smolt window" and provides for immediate smolt feeding and significant improvement in smolt growth rates.

Experimental Protocol

Smolts derived from the St. John strain of Atlantic salmon produced by the Connors Brothers Deblois Hatchery located in Cherryfield, Me., USA were utilized for this large scale test. Smolts were produced using standard practices at this hatchery and were derived from a January 1999 egg hatching. All smolts were transferred with standard commercially available smolt trucks and transfer personnel. S1 smolt were purchased during Maine's year 2000 smolt window and smolt deliveries were taken between the dates of Apr. 29, 2000–May 15, 2000. Smolts were either transferred directly to Polar Circle netpens (24m diameter) located in Blue Hill Bay Maine (Controls) or delivered to the treatment facility where they were treated with APS Process I for a total of 45 days. After receiving the APS Process I treatment, the smolt were then transported to the identical Blue Hill Bay netpen site and placed in an adjacent rectangular steel cage (15 m×15 m×5 m) for growout. Both groups of fish received an identical mixture of moist (38% moisture) and dry (10% moisture) salmonid feed (Connors Bros). Each of the netpens were fed by hand or feed blower to satiation twice per day using camera visualization of feeding. Mort dives were performed on a regular basis and each netpen received identical standard care practices established on this salmon farm. Sampling of fish for growth analyses was performed at either 42 days (APS Process I) or 120 days or greater (Control) fish. In both cases, fish were removed from the netpens and multiple analyses performed as described below.

All calculations to obtain feed conversion ratio (FCR) or specific growth rate (SGR) and growth factor (GF3) were performed using standard accepted formulae (Willoughby, S. Manual of Salmonid Farming Blackwell Scientific, Oxford UK 1999) and established measurements of degree days for the Blue Hill Bay site as provided in Table 2 below. A degree day is calculated by multiplying the number of days in a month by the mean daily temperature in degrees Celsius.

TABLE 2

Degree days for Blue Hill Bay Salmon Aquaculture Site

| Month | Degree Days |
| --- | --- |
| Jan | 60 |
| Feb | 30 |
| Mar | 15 |
| April | 120 |
| May | 210 |
| June | 300 |
| July | 390 |
| Aug | 450 |
| Sept | 420 |
| Oct | 360 |
| Nov | 240 |
| Dec | 180 |

Table 3 displays data obtained after seawater transfer of Control S1 smolt. Smolt ranging from 75–125 gm were placed into 3 independent netpens and subjected to normal farm practices demonstrated characteristics typical for present day salmon aquaculture in Maine. Significant mortalities (average 3.3%) were experienced after transfer into cool (10° C.) seawater and full feeding was achieved only after a significant interval (~56 days) in ocean netpens. As a result, the average SGR and GF3 values for these 3 netpens were 1.09 and 1.76 respectively for the 105–121 day interval measured.

In contrast to the immediate transfer of Control S1 smolt as described above to ocean netpens (Table III), a total of 10,600 S1 smolt possessing an average size of 63.6 grams were transported on May 11, 2000 from the Deblois freshwater hatchery to the research facility. While being maintained in standard circular tanks, these fish were held for a total of 45 days at an average water temperature of 11° C. and were subjected to APS Process I. During this interval, smolt mortality was only 64 fish (0.6%). As a matched control for the APS Process I fish, a smaller group of control fish (n=220) were held under identical conditions but did not receive the APS Process I treatment. The mortalities of these control fish were minimized by the holding temperature of 10° C. and were equivalent to treated smolts prior to transfer to seawater.

TABLE 3

Characteristics of St. John S1 smolt subjected to immediate placement in ocean netpens after transport form the freshwater hatchery without APS technology (the Control fish)

| | Netpen Number | | |
| --- | --- | --- | --- |
| | #17 | #18 | #10 |
| Total Fish | 51,363 | 43,644 | 55,570 |
| Mean Date of Seawater Transfer | 5/1/00 | 5/5/00 | 5/14/00 |
| Average Size at Transfer (grams) | (117.6) 100–125 | 75–100 | 75–100 |
| Mortalities after 30 days (# and % total) | 1,785; 3.5% | 728; 1.7% | 2503; 4.5% |
| Time to achieve full feeding after transfer | 68 days | 48 days | 50 days |
| Interval between netpen placement and analysis | 121 | 120 | 105 |
| Average size at Analysis | | | |
| Weight (gram) | 376.8 ± 74 | 305.80 ± 64 | 298.90 ± 37.40 |
| Length (cm) | 33.4 ± 1.9 | 28.30 ± 9.0 | 30.40 ± 1.17 |
| Condition Factor (k) | 1.02 | 1.34 | 1.06 |
| SGR | 0.96 | 1.10 | 1.17 | during initial 120 days

During the 45 day interval when S1 smolts were receiving APS Process I, fish grew an average of 10 grams and thus possessed an average weight of 76.6 gm when transferred to an ocean netpen. The actual smolt transfer to seawater occurring on Jun. 26, 2000 was notable for the unusual vigor of the smolt that would have normally been problematic since this time is well past the normal window for ocean placement of smolt. The ocean temperature at the time of APS Process I smolt netpen placement was 15.1° C. In contrast to the counterpart S1 smolts subjected to standard industry practices described above, APS Process I smolts fed vigorously within 48 hours of ocean placement and continued to increase their consumption of food during the immediate post-transfer period. The mortality of APS Process I smolts was comparable to that of smolts placed earlier in the summer (6.1%) during initial 50 days after ocean netpen placement and two thirds of those mortalities were directly attributable to scale loss and other physical damage incurred during the transfer process itself.

In contrast, corresponding control fish (held under identical conditions without APS Process I treatment) did not fare well during transfer to the netpen (17% transfer mortality) and did not feed vigorously at any time during the first 20 days after ocean netpen placement. This smaller number of control fish (176) were held in a smaller (1.5m× 1.5m×1.5m) netpen floating within the larger netpen containing APS Process I smolts. Their mortality post-ocean netpen placement was very high at 63% within the 51 day interval.

Both APS Process I and control smolts were fed on a daily basis in a manner identical to that experienced by the Industry Standard Fish shown on Table 3. APS Process I fish were sampled 51 days after their seawater placement and compared to the Industry Standard smolts shown on Table 3. As shown in Table 4, comparison of their characteristics reveals dramatic differences between Industry Standard smolts vs APS Process I.

TABLE 4

Comparison of the characteristics of St. John S1 APS Process I Smolts subjected to APS treatment and then placed in ocean netpens vs corresponding industry standard smolts.

| | APS Process I Smolts | Averaged Industry Standard Data from Table 3 in this Example |
|---|---|---|
| Total Fish | 10,600 | 150,577 |
| Mean Date of Seawater Transfer | 6/26/00 | 5/7/00 |
| Average Size at Transfer (grams) | 76.6 | 95.8 |
| Mortalities after 30 days (# and %) | 648; 6.1% | 5,016; 3.3% |
| Time to achieve full Feeding after transfer | 2 days | 56 days |
| Interval between netpen placement and analysis | 51 | 115 |
| Average size at Analysis | | |
| Weight (gram) | 175.48 ± 50 | 327.2 ± 97 |
| Length (cm) | 26.2 ± 32 | 30.7 |
| Condition Factor (k) | 0.95 ± 0.9 | 1.14 |
| SGR | 1.80 | 1.09 |

In summary, notable differences between APS Process I, Control smolt and Industry Standard smolt include:

1. The mortalities observed after ocean netpen placement were low in APS Process I (6.1%) vs Control (63%) despite the that fact these fish were transferred to seawater 1.5 months after the smolt window and into a very high (15.1° C.) ocean water temperature. The mortality of APS Process I was comparable to that of the accepted Industry Standard smolt (3–10%) transferred to cooler (10C) seawater during the smolt window. This characteristic of APS Process I provides for a greater flexibility in freshwater hatchery operations since placement of APS Process I smolts are not rigidly confined the conventional "smolt window" currently used in industry practice.

2. The APS Process I fish were in peak condition during and immediately after seawater transfer. Unlike industry standard smolt that required 56 days to reach full feeding, the APS Process I smolts fed vigorously within 2 days. Moreover, the initial growth rate (SGR 1.8) demonstrated by APS Process I smolts are significantly greater than published data for standard smolt during their initial 50 days after seawater placement (published values (Stradmeyer, L. Is feeding nonstarters a waste of time. Fish Farmer 3:12–13, 1991; Usher, M L, C Talbot and F B Eddy. Effects of transfer to seawater on growth and feeding in Atlantic salmon smolts (Salmo salar L.) Aquaculture 94:309–326, 1991) for SGR's range between 0.2–0.8). In fact, the growth rates of APS Process I smolts are significantly larger as compared to Industry standard smolts placed into seawater on the same site despite that industry standard smolt were both larger at the time of seawater placement as well as that their growth was measured 120 days after seawater placement. These data provide evidence that the APS Process I smolts were not subjected to significant osmoregulatory stress which would prevent them from feeding immediately.

3. The rapid growth of APS Process I smolts immediately upon ocean netpen placement provides for compounding increases in the size of salmon as seawater growout proceeds. Thus, it is anticipated that if Industry Standard Smolts weighing 112.5 gram (gm) were subjected to APS Process I treatment, placed in ocean netpens and examined at 120 days after ocean netpen placement their size would be average 782 gram instead of 377 gram as observed. This provides for more than a doubling in size of fish in the early stages of growout. Such fish would reach market size more rapidly as compared to industry standard fish.

Figure 6A:
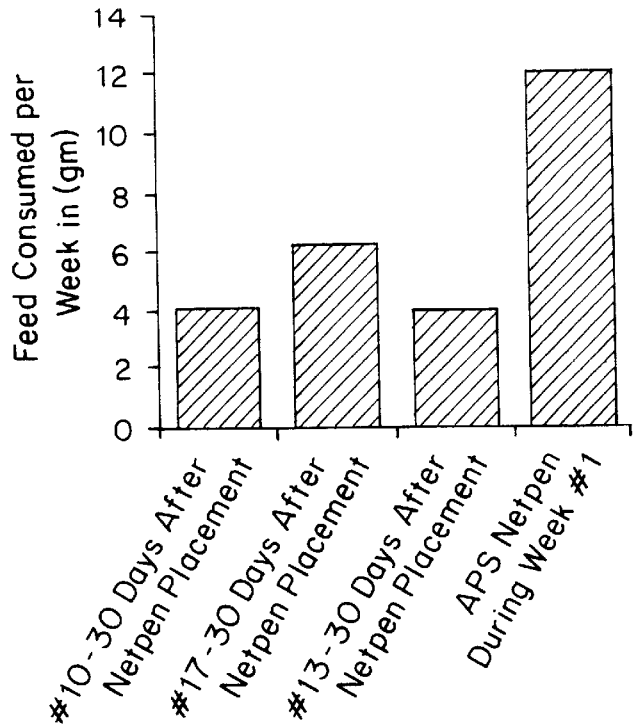
FIG. 6A is a graphical representation comparing the weekly feed consumption on a per fish basis between Process I treated smolts weighing approximately 76.6 gm vs industry standard smolt weighing approximately 95.8 gm. These data are derived from individual netpens of fish containing about 10,000–50,000 fish per pen. As shown, fish treated with Process I consumed approximately twice as much feed per fish during their first week after seawater transfer as compared to the large industry standard smolts weekly food consumption after 30 days.

In contrast to the counterpart S1 smolts subjected to standard industry practices, smolt treated with APS Process I fed vigorously within 48 hours of ocean placement and continued to increase their consumption of food during the immediate post-transfer period. By comparison, the industry standard smolts consumed little or no feed within the first week after transfer. FIG. 6A compares the weekly feed consumption on a per fish basis between Process I treated smolts and industry standard smolts. As shown, Process I treated smolts consumed approximately twice as much feed per fish during their FIRST WEEK as compared to the industry standard smolts after 30 days. Since smolts treated with Process I fed significantly more as compared to Industry standard smolts, the Process I treated smolts grew faster, as detailed in Example 15.

Figure 6B:
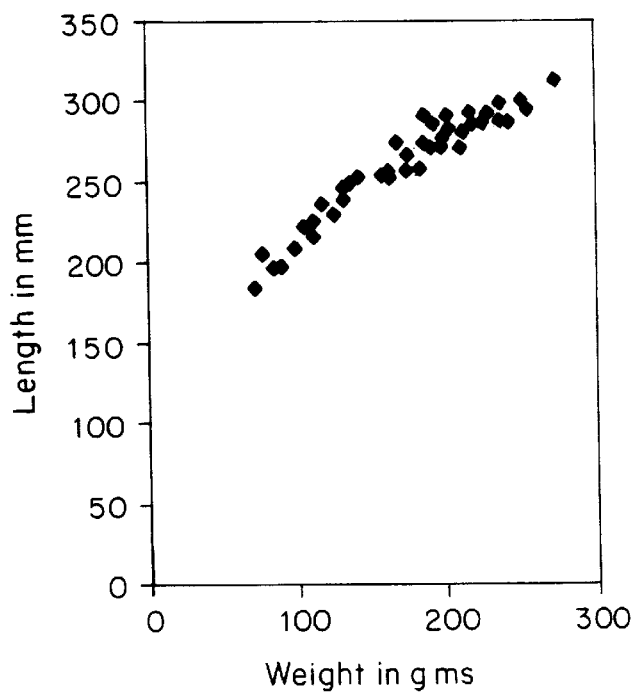
FIG. 6B is a graphical representation illustrating length (cm) and weight (gm) of APS Process I Smolts 50 days after ocean netpen placement. APS Process I smolts had an average weight of 76.6 gram when placed seawater and were sampled after 50 days. APS Process I is defined is Example 2.

FIG. 6B provides data on the characteristics of APS Process I smolts after seawater transfer. These experiments were carried out for over 185 days, and these data can be found in Example 15 for the same fish.

Application of the APS Process I to Atlantic Salmon Preadult Fish that are Smaller than the Industry Standard "Critical Size" Smolt A total of 1,400 Landcatch/St John strain fingerlings possessing an average weight of 20.5 gram were purchased from Atlantic Salmon of Maine Inc., Quossic Hatchery, Quossic, Me., USA on Aug. 1, 2000. These fingerlings were derived from an egg hatching in January 2000 and considered rapidly growing fish. They were transported to the treatment facility using standard conventional truck transport. After their arrival, these fingerlings were first placed in typical freshwater growout conditions for 14 days. These fingerlings were then subjected to APS Process I for a total of 29 days while being exposed to a continuous photoperiod. The APS Process I were then vaccinated with the Lipogen Forte product (Aquahealth LTD.) and transported to ocean netpens by conventional truck transport and placed into seawater (15.6° C.) in either a research ocean netpen possessing both a predator net as well as net openings small enough (0.25 inch) to prevent loss of these smaller APS Process I smolts. Alternatively, APS Process I smolts were placed in circular tanks within the laboratory. Forty eight hours after sea water transfer, APS Process I smolts were begun on standard moist (38% moisture) smolt feed (Connors Bros.) that had been re-pelletized due to the necessity to provide for smaller size feed for smaller APS Process I smolts, as compared to normal industry salmon. In a manner identical to that described for 70 gram smolts above, the mortality, feed consumption, growth and overall health of these 30 gram APS Process I smolts were monitored closely.

Figure 7:
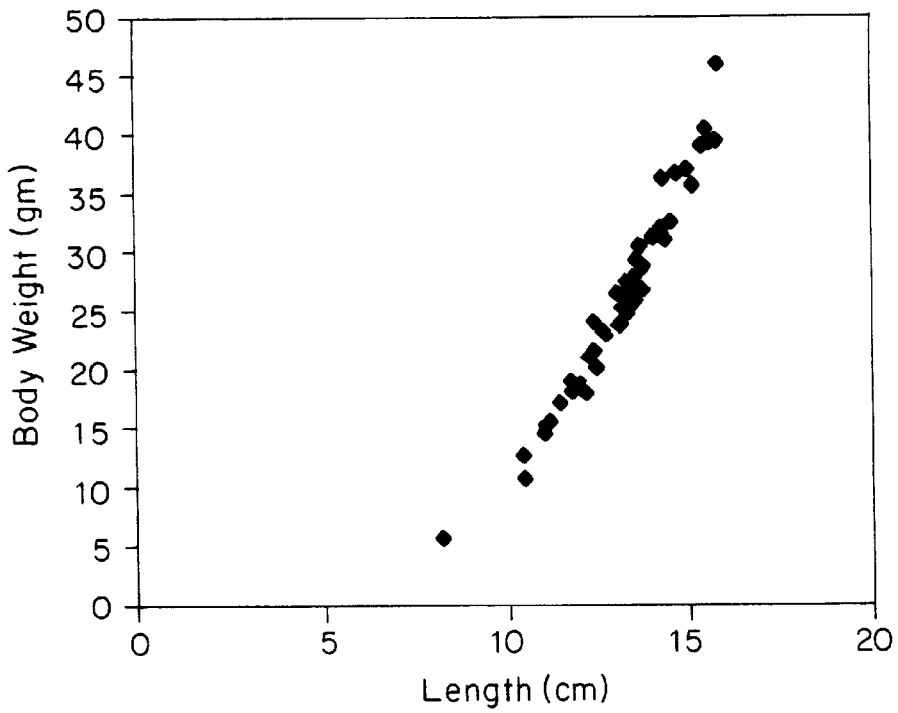
FIG. 7 is a graphical representation illustrating length (cm) and weight (gm) of representative APS Process I smolts prior to transfer to seawater.

FIG. 7 displays the characteristics of a representative sample of a larger group of 1,209 APS Process I smolts immediately prior to their transfer to seawater. These parameters included an average weight of 26.6+8.6 gram, length of 13.1+1.54 cm and condition factor of 1.12+0.06. After seawater transfer, APS Process I smolts exhibited a low initial mortality despite the fact that their average body weight is 26–38% of industry standard 70–100 gram S0–S1 smolts. As shown in Table 5, APS Process I smolts mortality within the initial 72 hr after seawater placement was 1/140 or 0.07% for the laboratory tank. Ocean netpen mortalities after placement of APS Process I smolts were 143/1069 or 13.4%. FIG. 7 shows representative Landcatch/St John strain APS Process I smolts possessing a range of body sizes that were transferred to seawater either in ocean netpens or corresponding laboratory seawater tanks. APS Process I smolts possess a wide range of sizes (e.g., from about 5.6 grams to about 46.8 grams body weight) with an average body weight of 26.6 gram. Experiments with these data were carried out for 84 days after the transfer of fish to seawater tanks, and the data from these experiments are described in Example 16.

TABLE 5

Characteristics and survival of Landcatch/St. John APS Process I fish after their placement into seawater in either a laboratory tank or ocean netpen.

|  | Laboratory Tank | Ocean Netpen |
|---|---|---|
| Total Fish | 140 | 1,069 |
| Date of Seawater Transfer | 9/5/00 (40); 9/12/00 (100) | 9/12/00 |
| Average Size at Transfer (gram) | 26.6 | 26.6 |
| Total mortalities after 4 days (# and % total) | 1; 0.7% | 143; 13.4% |
| % mortality of fish weighing 25 gm and above | 0; 0.0% | 4; 0.4% |
| Time to achieve feeding | 48 hrs | 72 hrs |

Figure 8:
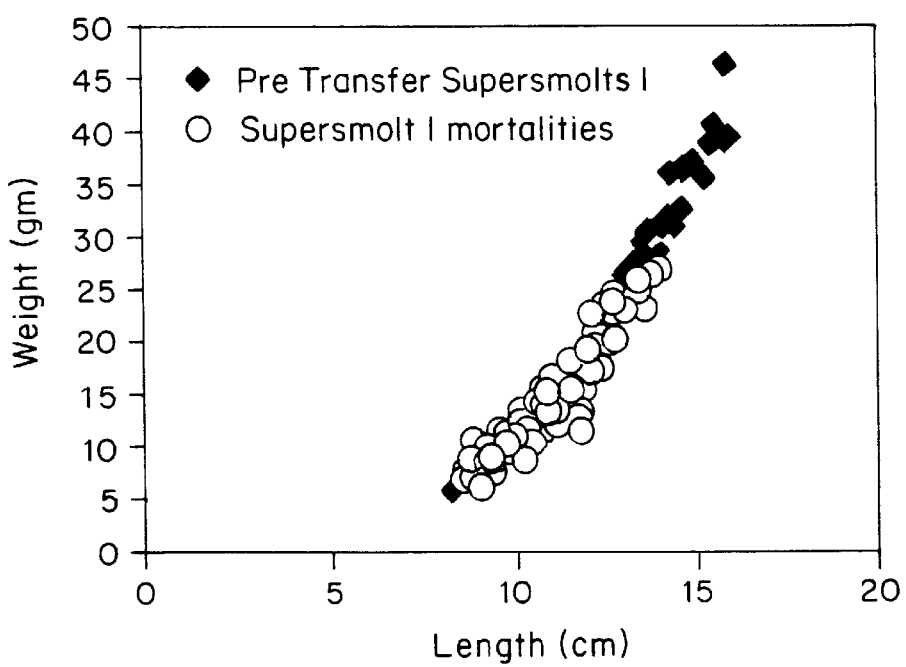
FIG. 8 is a graphical representation illustrating length (cm) and weight (gm) of APS Process I smolts before transfer, and mortalities.

FIG. 8 shows a comparison of the distributions of body characteristics for total group of Landcatch/St John APS Process I smolts vs. mortalities 72 hr after seawater ocean netpen placement. Length and body weight data obtained from the 143 mortalities occurring after seawater placement of 1,069 APS Process I smolts were plotted on data obtained from a 100 fish sampling as shown previously in FIG. 7. Note that the mortalities are exclusively distributed among the smaller fish within the larger APS Process I netpen population.

Length and weight measurements for all mortalities collected from the bottom of the ocean netpen were compared to the distribution of APS Process I smolt body characteristics obtained from analysis of a representative sample prior shown in FIG. 8. The data show that the mortalities occurred selectively amongst APS Process I smolts possessing small body sizes such that the mean body weight of mortalities was 54% of the mean body weight of the total transfer population (14.7/27 gram or 54%). Thus, the actual mortality rates of APS Process I smolts weighing 25–30 gram is 0.4% (4/1069) and those weighing 18–30 gram is 2.9% (31/1069).

Application of APS Process I to Trout Pre-adult Fish that are Smaller than the Industry Standard "Critical Size" Smolt Table 6 displays data on the use of the APS Process I on small (3–5 gram) rainbow trout. Juvenile trout are much less tolerant of abrupt transfers from freshwater to seawater as compared to juvenile Atlantic salmon. As a result, many commercial seawater trout producers transfer their fish to brackish water sites located in estuaries or fresh water lenses or construct "drinking water" systems to provide fresh water for trout instead of the full strength seawater present in standard ocean netpens. After a prolonged interval of osmotic adaptation, trout are then transferred to more standard ocean netpen sites to complete their growout cycle. In general, trout are transferred to these ocean sites for growout at body weights of approximately 70–90 or 90–120 gram.

TABLE 6

Comparison of the Survival of Rainbow Trout (3–5 gram) in Seawater After Various Treatments.
Percent Survival of Fish[1]

| Hours Post Seawater Transfer | Control Freshwater | Constant 14 day Photoperiod | Constant 14 day Photoperiod APS Process | Constant 23 day Photoperiod + APS Process |
|---|---|---|---|---|
| 0 | 100 | 100 | 100 | 100 |
| 24 | 0 | 25 | 80 | 99 |
| 48 |  | 0 | 70 | 81 |
| 72 |  |  | 40 | 68 |
| 96 |  |  | 30 | 58 |
| 120 |  |  | 30 | 46 |
| Number of Fish Per Experiment | 10 | 20 | 30 | 80 |

[1]Survival percentages expressed as rounded whole numbers

A total of 140 trout from a single pool of fish less than 1 year old were divided into groups and maintained at a water temperature of 9–13° C. and pH 7.8–8.3 for the duration of the experiment described below. When control freshwater rainbow trout are transferred directly into seawater, there is 100% mortality within 24 hr (Control Freshwater). Exposure of the trout to a constant photoperiod for 14 days results in a slight improvement in survival after their transfer to seawater. In contrast, exposure of trout to APS Process I for either 14 days or 23 days results in significant reductions in mortalties after transfer to seawater such that 30% and 46% of the fish respectively have survived after a 5 day interval in seawater. These data demonstrate that application of the APS Process I increases in the survival of pre-adult trout that are less than 7% of the size of standard "critical size" trout produced by present day industry standard techniques.

Figure 9:
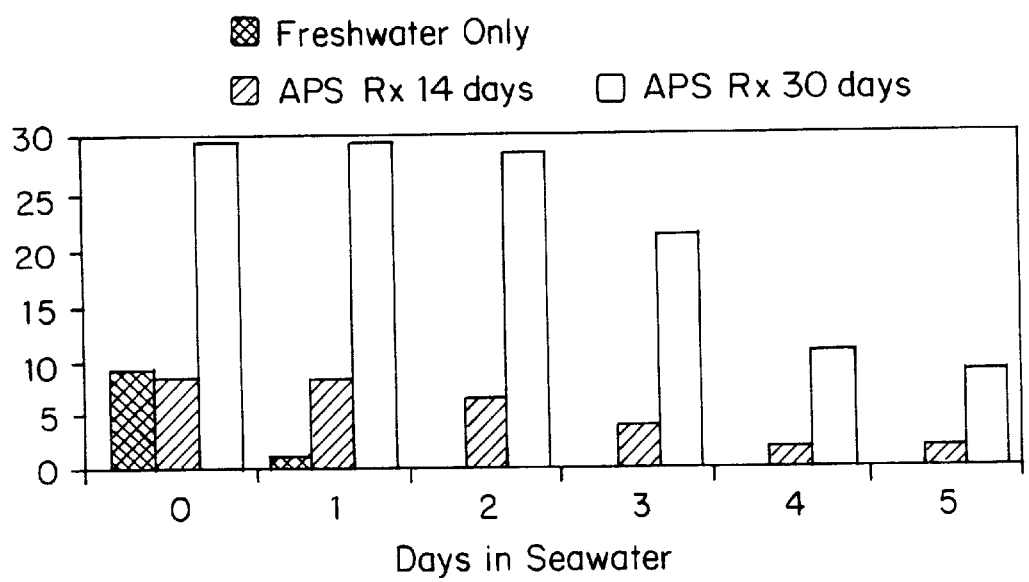
FIG. 9 is a three dimensional graph illustrating the survival over 5 days of Arctic Char in seawater after being maintained in freshwater, APS Process I for 14 days, and APS Process I for 30 days.

Application of the APS Process I to Arctic Char pre-adult Fish that are Smaller than the Industry Standard "Critical Size" Smolt Although arctic char are salmonids and anadromous fish, their tolerance to seawater transfer is far less as compared to either salmon or trout. FIG. 9 shows the results of exposure of smaller char (3–5 gram) to the APS Process I for a total of 14 and 30 days. All fish shown in FIG. 9 were exposed to a continuous photoperiod. Transfer of char to seawater directly from freshwater results in the death of all fish within 24 hr. In contrast, treatment of char with the APS Process I for 14 and 30 days produces an increase in survival such that 33% (3/9) or 73% (22/30) respectively are still alive after a 3 day exposure. These data demonstrate that the enhancement of survival of arctic char that are less than 10% of the critical size as defined by industry standard methods after their exposure to the APS Process I followed by transfer to seawater.

FIG. 9 shows a comparison of survival of arctic char after various treatments. A single group of arctic char (3–5 gram were obtained from Pierce hatcheries (Buxton, Me.) and either maintained in freshwater or treated with the APS Process I prior to transfer to seawater.

SECTION II

The Use of the APS Process II to Permit Successful Transfer of 10–30 gram Smolt into Seawater Netpens and Tanks The APS Process II protocol is utilized to treat pre-adult anadromous fish for placement into seawater at an average size of 25–30 gram or less. This method differs from the APS Process I protocol by the inclusion of L-tryptophan in the diet of pre-adult anadromous fish prior to their transfer to seawater. APS Process II further improves the osmoregulatory capabilities of pre-adult anadromous fish and provides for still further reductions in the "critical size" for Atlantic salmon smolt transfers. In summary, APS Process II reduces the "critical size" for successful seawater transfer to less than one fifth the size of the present day industry standard SO smolt.

Application of APS Process II to Atlantic Salmon Fingerlings

St John/St John strain pre-adult fingerlings derived from a January 2000 egg hatching and possessing an average weight of 0.8 gram were purchased from Atlantic Salmon of Maine Inc. Kennebec Hatchery, Kennebec Me. on April 27, 2000. These fish were transported to the treatment facility using standard conventional truck transport. After their arrival, these parr were first grown in conventional flow through freshwater growout conditions that included a water temperature of 9.6° C. and a standard freshwater parr diet (Moore-Clark Feeds). On July 17, 2000, fingerlings were begun on APS Process II for a total of 49 days while being exposed to a continuous photoperiod. APS Process II smolts were then vaccinated with the Lipogen Forte product (Aquahealth LTD.) on Day 28 (Aug. 14, 2000) of APS Process II treatment. APS Process II smolts were size graded prior to initiating APS Process II as well as immediately prior to transfer to seawater. St John/St John APS Process II smolts were transported to ocean netpens by conventional truck transport and placed into seawater (15.2° C.) in either a single ocean netpen identical to that described for placement of APS Process I smolts or into laboratory tanks (15.6° C.) within the research facility.

Figure 10:
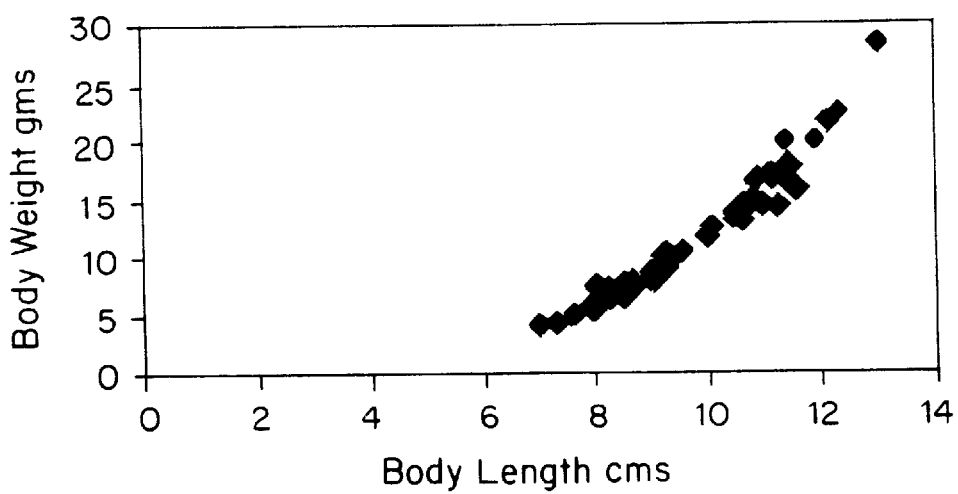
FIG. 10 is a graphical representation illustrating the length (cm) and weight (gm) of St. John/St. John APS Process II smolts prior to seawater transfer. APS Process II is defined in Example 2.

FIG. 10 shows representative St. John/St John strain APS Process II smolts possessing a range of body sizes were transferred to seawater either in ocean netpens or corresponding laboratory seawater tanks. Note that these APS Process II smolts possess a wide range of body weights (3.95–28 gram) that comprised an average body weight of 11.5 gram. FIG. 10 shows the characteristics of St. John/St John APS Process II smolts. The average measurements of these St. John/St. John APS Process II smolts included a body weight of 11.50+/−5.6 gram, length of 9.6+/−1.5 cm and condition factor of 1.19+/−0.09. The data displayed in Table 8 shows the outcomes for two groups of APS Process II smolts derived from a single production pool of fish after their seawater transfer into either laboratory tanks or ocean netpens. Although important variables such as the water temperatures and transportation of fish to the site of seawater transfer were identical, these 2 groups of APS Process II smolts experienced differential post seawater transfer mortalities after 5 days into laboratory tanks (10% mortality) and ocean netpens (37.7% mortality).

The probable explanation for this discrepancy in mortalities between seawater laboratory tanks (10% mortality) and ocean netpens (37.7% mortality) is exposure of these fish to different photoperiod regimens after seawater placement. As detailed in Example 10, exposure of juvenile Atlantic salmon to a constant photoperiod after seawater placement reduced their post-seawater transfer mortality from approximately 34% to 6%. Fish transferred to ocean netpens experienced natural photoperiod that was not continuous and thus suffered an approximate 4-fold increase in mortality. As shown in Table 7, a separate seawater transfer of St John/St John juvenile Atlantic salmon possessing an average weight of 21 gms exhibited only 0.2% mortality after a six week treatment with APS Process II and underwater lights. These fish were exposed to a continuous photoperiod by underwater halogen lights for an interval of 30 days.

TABLE 7

Characterization and survival of APS St. John/St. John APS Process II fish after their placement into seawater in ocean netpens containing underwater lights.

| | |
|---|---|
| Total Fish | 15,000 |
| Seawater Transfer Date | 8/9/01 |
| Water Temperature (° C.) | 12.6 |
| Size at Transfer (gram) | 21 +/− 4.5 |
| Total Mortalities after 30 days (# and % total) | 250 1.7% |
| % Mortalities weighing 15 grams or greater | 30 0.2% |
| Time to achieve feeding after transfer | 48 hr |

TABLE 8

Characteristics and survival of APS St. John/St. John APS Process II fish after their placement into seawater in either a laboratory tank or ocean netpen.

| | Laboratory Tank | Ocean Netpen |
|---|---|---|
| Total Fish | 100 | 1,316 |
| Seawater Transfer Date | 8/31/00 | 9/5/00 |
| Water Temperature (° C.) | 15.6 | 15.6 |
| Size at Transfer (gram) | 11.5 | 11.5 |
| Total Mortalities after 5 days (# and % total) | 10; 10% | 496; 37.7% |
| % mortalities weighing 13 grams or greater | 0; 0% | 1; 0.08% |
| Time to achieve feeding after transfer | 48 hrs | 48 hrs |

No apparent problems were observed with the smaller (10–30 gram) APS Process II smolts negotiating the conditions that exist within the confines of their ocean netpen. This included the lack of apparent problems including the ability to school freely as well as the ability to swim normally against the significant ocean currents that are continuously present in the commercial Blue Hill Bay salmon aquaculture site. While these observations are still ongoing, these data do not suggest that the placement and subsequent growth of APS Process II smolts in ocean netpens will be comprised because of lack of ability of these pre-adult anadromous fish to swim against existing ocean currents and therefore be unable to feed or develop properly.

Figure 11A:
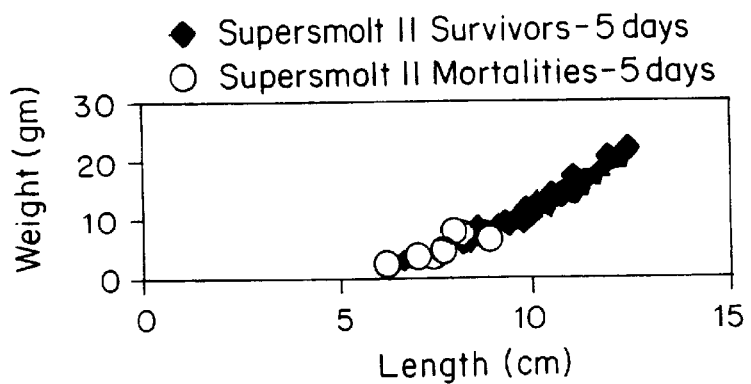
FIGS. 11A and 11B are graphical representations illustrating weight (gm) and length (cm) of APS Process II smolt survivors and mortalities 5 days after transfer to seawater tanks, and 96 hours after transfer to ocean netpens.
Figure 11B:
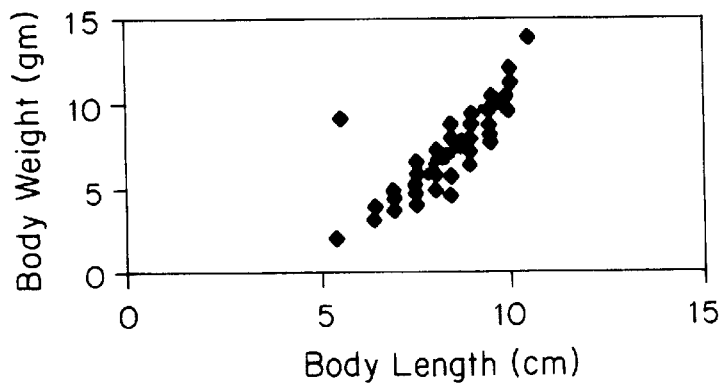

FIG. 11 compares characteristics of survivors and mortalities of APS Process II smolts after seawater transfer to either laboratory tanks (FIG. 11A) or ocean netpens (FIG. 11B). FIG. 11A data are derived from analyses of 100 APS Process II smolts transferred to seawater tank where all fish were killed and analyzed on Day 5. In contrast, FIG. 11B displays only mortality data from ocean netpen. In both cases, only smaller APS Process II smolts experienced mortality. Note differences in Y axis scales of FIGS. 11A–B.

Comparison of the average body size of those APS Process II smolts that survived seawater transfer vs. those APS Process II smolts that died shows that unsuccessful APS Process II smolts possessed significantly smaller body weights as compared to average body size of whole APS Process II smolt transfer group. Thus, the average weight of mortalities in laboratory tank (5.10+/−2.2 gram) and ocean netpen (6.46+/−1.5 gram) are 44% and 56% respectively the value of the average body weight possessed by the entire transfer cohort (11.5 gram). In contrast, the mortalities of APS Process II smolts with body weights greater than 13 gram is 0/100 in the laboratory tank and 1/1316 or 0.076% for ocean netpens. Together, these data demonstrate that APS Process H is able to redefine the "critical size" of Atlantic salmon smolts from 70–100 gram to approximately 13 gram.

Application of the APS Process II to Rainbow Trout

Expansion of trout farming has been hampered by several factors. These include the fact that juvenile trout are much less tolerant of abrupt transfers from freshwater to seawater as compared to juvenile Atlantic salmon. As a result, many commercial seawater trout producers transfer their fish to brackish water sites located in estuaries or fresh water lenses or construct "drinking water" systems to provide fresh water for trout instead of the full strength seawater present in standard ocean netpens. After a prolonged interval of osmotic adaptation, trout are then transferred to more standard ocean netpen sites to complete their growout cycle. In general, trout are transferred to these ocean sites for growout at body weights of approximately 70–90 or 90–120 gram.

A total of 2,000 Donaldson strain trout with an average weight of 18 gram were obtained from a local commercial hatchery source (Pine Tree Trout Farm, Sanford, Me., USA). They were derived from a December 1999 egg hatching and were transferred from freshwater to the APS Process II at 11–12° C. while being exposed to a continuous photoperiod. The total duration of APS Process II treatment was 35 days (Jun. 21–Jul. 26, 2000). After being vaccinated using Lipogen Forte (Aquahealth LTD), trout were transferred directly to a research netpen containing full strength seawater at 15.6° C. using standard transfer procedures as described for Atlantic salmon above. The average weight for the total group of Trout APS Process II was 22.7 gram as shown on Table 9.

Mortality counts performed identically to those described for Atlantic salmon transfers revealed a total of 513/1190 or 43.1% during the initial 5-day interval. The average body weight of these mortalities was 15.5+/−1.5 gram as shown on FIG. 12. In a manner similar to that displayed by Atlantic salmon APS Process I and II smolts, mortalities occurred amongst the smaller trout APS Process II smolts while the larger judo fish exhibited little or no deaths. Thus, the average body weight for the mortality population was 15.5 gram or 68.3% of the value for total population of trout transferred to seawater. Feeding of trout was observed upon offering moist diet feed at 48 hours after placement in full strength seawater.

TABLE 9

Characteristics and Survival of Donaldson Rainbow Trout APS Process II Fish After Their Direct Placement into Full Strength Seawater in APS Ocean Netpen.

| | APS Process II Trout |
|---|---|
| Total Fish | 1,190 |
| Date of Seawater Transfer | 7/25/00 |
| Average Size at Transfer (grams) | 22.7 grams |
| Mortalities after 5 days (#, and % total) | 513; 43.1% |
| Average Size of Morts (grams) | 15.5 ± 1.52 |
| Average Size of Survivors (grams) | 29.35 + 8.3 |
| Time to achieve feeding after transfer | 48 hours |

Figure 12:
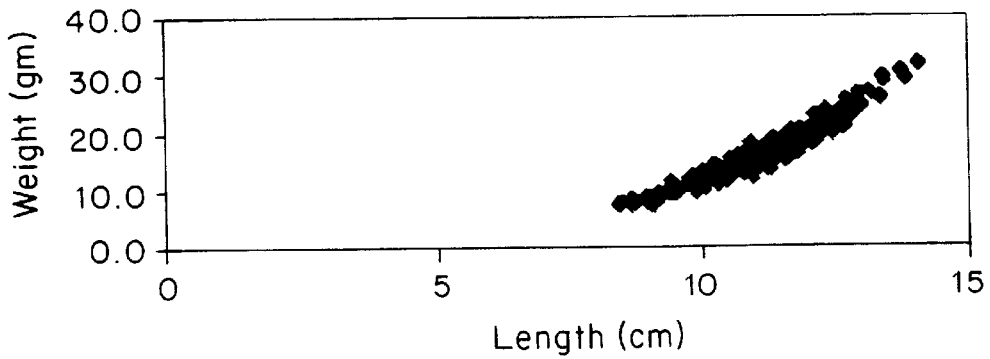
FIG. 12 is a graphical representation showing weight (gm) and length (cm) of APS Process II smolt mortalities after 5 days after transfer to ocean netpens.

FIG. 12 shows a distribution of body weights and lengths amongst mortalities of trout APS Process II smolts during the initial 5 days after transfer to ocean netpens. Note that the average weight of these 515 mortalities is 15.5+/−1.5 gram.

In summary, these data demonstrate that the benefits of the present invention are not confined to Atlantic salmon but also occur using rainbow trout. Application of the APS Process II smolts process has significantly reduced the "critical size" of rainbow trout for direct seawater transfer to approximately 30 gram. Moreover, it has eliminated the necessity for the transfer of rainbow trout into brackish water. Thus, application of the APS Process II promises to greatly expand the possible number of sites that can be utilized for full strength seawater transfer of rainbow trout.

Quantitation of Feeding and Growth of APS Process I and II Smolts after Seawater Transfer Landcatch/St John APS Process I smolts were offered food beginning 48 hr after their seawater transfer to either laboratory tanks or ocean netpens. While these APS Process I smolts that were transferred to laboratory tanks began to feed after 48 hr, those fish transferred to ocean netpens were not observed to feed substantially until 7 days. To validate these observations, the inventors performed direct visual inspection of the gut contents from a representative sample of 49 APS Process I smolts 4 days after their seawater transfer to laboratory tanks. A total of 21/49 or 42.9% possessed food within their gut contents at that time.

The St John/St John APS Process II smolts fed vigorously when first offered food 48 hrs after their seawater transfer regardless of whether they were housed in laboratory tanks or ocean netpens. An identical direct analysis of APS Process II smolts gut contents performed as described above revealed that 61/83 or 73.5% of fish were feeding 4 days after transfer to seawater. The vigorous feeding activity of APS Process II smolts in an ocean netpen as well as laboratory tanks occurred. Taken together, these data suggest that APS Process I and II smolts do not suffer from a prolonged (20–40 day) interval of poor feeding after seawater transfer as is notable for the much larger industry standard Atlantic salmon smolts not treated with the process.

APS has quantified the growth rates of identical fish treated with either APS Process I or II within laboratory seawater tanks. As shown in Table 10, both Atlantic salmon treated with APS Process I or II grow rapidly during the initial interval (21 days) after transfer to seawater. In contrast to industry standard smolt weighing 70–100 grams that eat poorly and thus have little or no growth during their first 20–30 days after transfer to seawater, pre-adult Atlantic salmon receiving APS Process I or II both exhibited substantial weight gains and growth despite the fact that they are only 27–38% (APS Process I) and 12–16% (APS Process II) of the critical size of industry standard smolts. Data that relates to mortalities, SGR, temperature corrected SGR (GF3), FCR, body weights, lengths and condition factors for these same fish were obtained a total of 4 additional intervals during an interval that now extends for 157 days. This additional data can be found in Example 12.

TABLE 10

Comparison of Growth Rates of Pre-adult Atlantic Salmon Exposed to either APS Process I or APS Process II and Placed in Laboratory Tanks During Initial Interval After Seawater Transfer

| | APS Process I | APS Process II |
|---|---|---|
| Number of Fish | 140 | 437 |
| Weight at Placement into Seawater | 26.6 | 11.50 |
| Days in Seawater | 22 | 21 |
| Placement Weight Corrected for Mortalities | 26.6* | 13.15* |
| Weight after Interval in Seawater | 30.3 | 15.2 |

TABLE 10-continued

Comparison of Growth Rates of Pre-adult Atlantic Salmon Exposed to either APS Process I or APS Process II and Placed in Laboratory Tanks During Initial Interval After Seawater Transfer

|  | APS Process I | APS Process II |
| --- | --- | --- |
| Weight Gained in Seawater | 3.75 | 2.05 |
| SGR (% body weight/day) | 0.60 | 0.68 |
| FCR | 1.27 | 2.04 |

*Weight gain corrected for selective mortalities amongst smaller fish (4/140 or 2.9% APS Process I; 103/437 or 23.6% APS Process II)

Example 3

Exposure of Salmon Smolts to Ca2+ and Mg2+ Increases Expression of PVCR in Certain Tissues In smolts that were exposed to 10 mM $Ca^{2+}$ and 5.2 mM Mg2+, the expression of PVCR was found to increase in a manner similar to that in smolts that are untreated, but are transferred directly to seawater.

Tissues were taken from either Atlantic salmon or rainbow trout, after anesthesitizing the animal with MS-222. Samples of tissues were then obtained by dissection, fixed by immersion in 3% paraformaldehyde, washing in Ringers then frozen in an embedding compound, e.g., O.C.T.T™ (Miles, Inc., Elkahart, Ind., USA) using methylbutane cooled on dry ice. After cutting 8 micron thick tissue sections with a cryostat, individual sections were subjected to various staining protocols. Briefly, sections mounted on glass slides were: 1) blocked with goat serum or serum obtained from the same species of fish, 2) incubated with rabbit anti-CaR antiserum, and 3) washed and incubated with peroxidase-conjugated affinity-purified goat antirabbit antiserum. The locations of the bound peroxidase-conjugated goat antirabbit antiserum were visualized by development of a rose-colored aminoethylcarbazole reaction product. Individual sections were mounted, viewed and photographed by standard light microscopy techniques. The methods used to produce anti-PVCR antiserum are described below.

Figure 13A:
FIGS. 13A–G are photographs of immunocytochemistry of epithelia of the proximal intestine of Atlantic Salmon illustrating PVCR localization and expression.
Figure 13B:
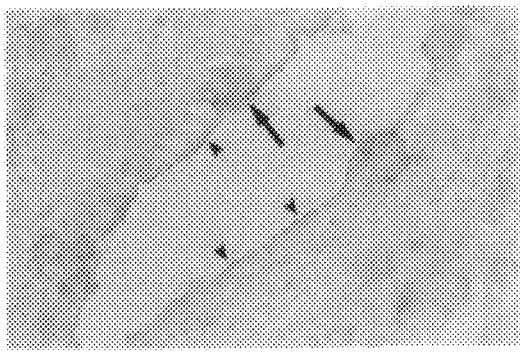
Figure 13C:
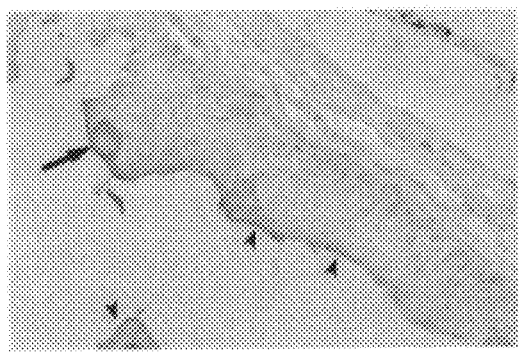
Figure 13D:
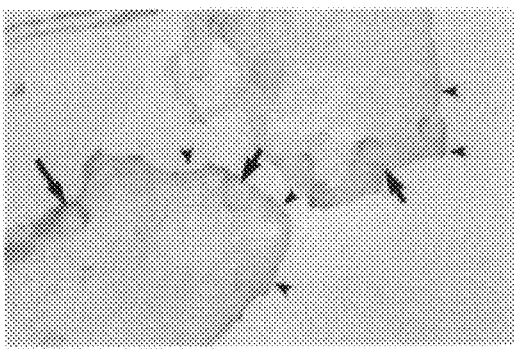
Figure 13E:
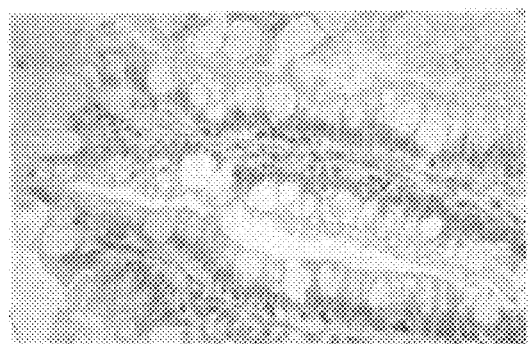
Figure 13F:
Figure 13G:
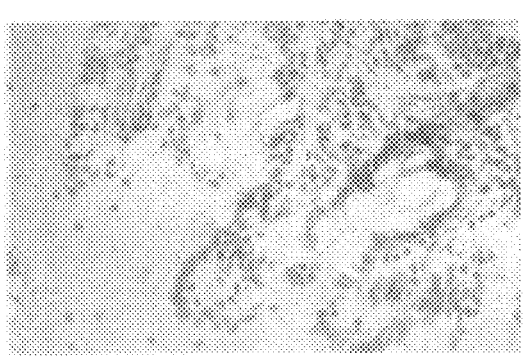
Figure 14:
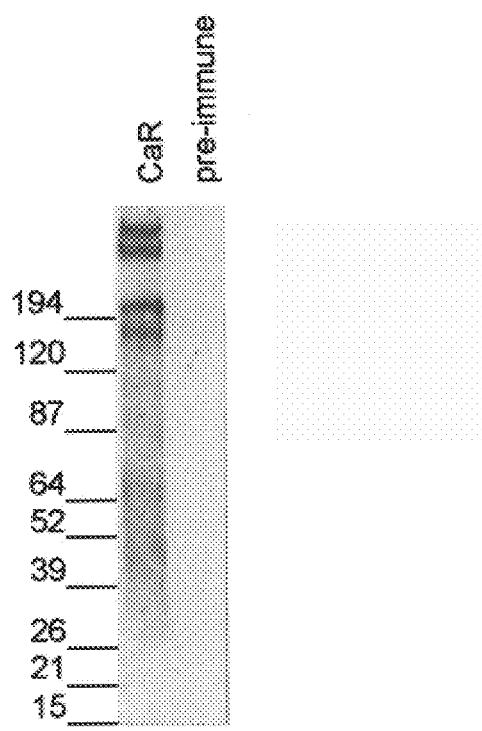
FIG. 14 is a photograph of a Western Blot of intestinal tissue from salmon maintained subjected to APS Process I for immune (lane marked CaR, e.g., a PVCR) and preimmune (lane marked preimmune) illustrating PVCR expression.

The results are shown in FIGS. 13A–13G, which are a set of seven photomicrographs showing immunocytochemistry of epithelia of the proximal intestine of Atlantic salmon smolts using anti-PVCR antiserum, and in FIG. 14, which is a Western blot of intestine of a salmon smolt exposed to Ca2+- and Mg2+-treated freshwater, then transferred to seawater. The antiserum was prepared by immunization of rabbits with a 16-mer peptide containing the protein sequence encoded by the carboxyl terminal domain of the dogfish shark PVCR ("SKCaR") (Nearing, J. et al., 1997, J. Am. Soc. Nephrol. 8:40A). Specific binding of the anti-PVCR antibody is indicated by aminoethylcarbazole (AEC) reaction product.

FIGS. 13A and 13B show stained intestinal epithelia from smolts that were maintained in freshwater then transferred to seawater and held for an interval of 3 days. Abundant PVCR immunostaining is apparent in cells that line the luminal surface of the intestine. The higher magnification (1440×) shown in FIG. 13B displays PVCR protein localized to the apical (luminal-facing) membrane of intestinal epithelial cells. The pattern of PVCR staining is localized to the apical membrane of epithelial cells (small arrowheads) as well as membranes in globular round cells (arrows). FIG. 13C shows stained intestinal epithelia from a representative smolt that was exposed APS Process I and maintained in freshwater containing 10 mM Ca2+ and 5.2 mM Mg2+ for 50 days. Note that the pattern of PVCR staining resembles the pattern exhibited by epithelial cells displayed in FIGS. 13A and 13B including apical membrane staining (small arrowheads) as well as larger globular round cells (arrows). FIG. 13D shows a 1900× magnification of PVCR-stained intestinal epithelia from another representative fish that was exposed to the APS Process I and maintained in freshwater containing 10 mM Ca2+ and 5.2 mM Mg2+ for 50 days and fed 1% NaCl in the diet. Again, small arrowhead and arrows denote PVCR staining of the apical membrane and globular cells respectively. In contrast to the prominent PVCR staining shown in FIGS. 13A–D, FIGS. 13E (1440×) and 13F (1900×) show staining of intestinal epithelia from two representative smolt that were maintained in freshwater alone without supplementation of Ca2+ and Mg2+ or dietary NaCl. Both 13E and 13F display a marked lack of significant PVCR staining. FIG. 13G (1440×) shows the lack of any apparent PVCR staining upon the substitution of preimmune serum on a section corresponding to that shown in FIG. 13A where anti-PVCR antiserum identified the PVCR protein. The lack of any PVCR staining is a control to demonstrate the specificity of the anti-PVCR antiserum under these immunocytochemistry conditions.

The relative amount of PVCR protein present in intestinal epithelial cells of freshwater smolts (FIGS. 13E and 13F) was negligible as shown by the faint staining of selected intestinal epithelial cells. In contrast, the PVCR protein content of the corresponding intestinal epithelial cells was significantly increased upon the transfer of these smolts to seawater (FIGS. 13A and 13B). Importantly, the PVCR protein content was also significantly increased in the intestinal epithelial cells of smolts maintained in freshwater supplemented with Ca2+ and Mg2+ (FIG. 13C and 13D). The AEC staining was specific for the presence of the anti-PVCR antiserum, since substitution of the immune antiserum by the preimmune eliminated all reaction product from intestinal epithelial cell sections (FIG. 13G).

Disclosure of Localization of PVCR protein(s) in additional areas of osmoregulatory organs of Atlantic Salmon using paraffin sections. Demonstration that PVCR proteins are localized to both the apical and basolateral membranes of intestinal epithelial cells.

Using the methods described herein, immunolocalization data from paraffin sections of various osmoregulatory organs of seawater-adapted juvenile Atlantic salmon smolt were obtained. PVCR proteins, as determined by the binding of a specific anti-PVCR antibody, were present in the following organs. These organs are important in various osmoregulatory functions. These organs include specific kidney tubules and urinary bladder responsible for processing of urine, and selected cells of the skin, nasal lamellae and gill each of which are bathed by the water surrounding the fish. The PVCR was also seen in various portions of the G.I. tract including stomach, pyloric caeca, proximal intestine and distal intestine that process seawater ingested by fish. These tissues were analyzed after treatment with APS Processes and after their transfer from freshwater to seawater. In addition, it is believed that the PVCR protein can also act a nutrient receptor for various amino acids that are reported to be present in stomach, proximal intestine, pyloric caeca.

In particular, higher magnification views of PVCR immunolocalizations in selected cells of the stomach, proximal intestine and pyloric caeca were obtained. The PVCR protein is not only present on both the apical (luminally facing) and basolateral (blood-facing) membranes of stomach epithelial cells localized at the base of the crypts of the stomach, but also is present in neuroendocrine cells that are located in the submucosal area of the stomach. From its location on neuroendocrine cells of the G.I. tract, the PVCR protein is able to sense the local environment immediately adjacent to intestinal epithelial cells and modulate the secretion and synthesis of important G.I. tract hormones (e.g., 5-hydroxytryptamine (5-HT), serotonin, or cholecystokinin (CCK)). Importantly, it is believed that the constituents of APS Process II effect G.I. neuroendocrine cells by at least two means. The first way that constituents of APS Process II remodel the G.I endocrine system is through alterations in the expression and/or sensitivity of PVCRs expressed by these cells. The second way is to supply large quantities of precursor compounds, for example, tryptophan that is converted into 5-HT and serotonin by G.I. metabolic enzymes.

In a similar manner, PVCR protein is localized to both the apical and basolateral membranes of epithelial cells lining the proximal intestine. From their respective locations, PVCR proteins can sense both the luminal and blood contents of divalent cations, NaCl and specific amino acids and thereby integrate the multiple nutrient and ion absorptive-secretory functions of the intestinal epithelial cells. Epithelial cells of pyloric caeca also possess abundant apical PVCR protein.

To further demonstrate the specificity of the anti-CaR antiserum to recognize salmon smolt PVCRs, FIG. 14 shows a Western blot of intestinal protein from salmon smolt maintained in 10 mM Ca2+, 5 mM Mg2+ and fed 1% NaCl in the diet. Portions of the proximal and distal intestine were homogenized and dissolved in SDS-containing buffer, subjected to SDS-PAGE using standard techniques, transferred to nitrocellulose, and equal amounts of homogenate proteins as determined by both protein assay (Pierce Chem. Co, Rocford, Ill.) as well as Coomassie Blue staining were probed for presence of PVCR using standard western blotting techniques. The results are shown in the left lane, labeled "CaR", and shows a broad band of about 140–160 kDa and several higher molecular weight complexes. The pattern of PVCR bands is similar to that previously reported for shark kidney (Nearing, J. et al., 1997, J. Am. Soc. Nephrol. 8:40A) and rat kidney inner medullary collecting duct (Sands, J. M. et al., 1997, J. Clin. Invest. 99:1399–1405). The lane on the right was treated with the preimmune anti-PVCR serum used in FIG. 13G, and shows a complete lack of bands. Taken together with immunocytochemistry data shown in FIG. 13, this immunoblot demonstrates that the antiserum used is specific for detecting the PVCR protein in salmon.

Example 4

Exposure of Trout Fingerlings to Ca2+ and Mg2+ Increases Expression of PVCRs

Figure 19:
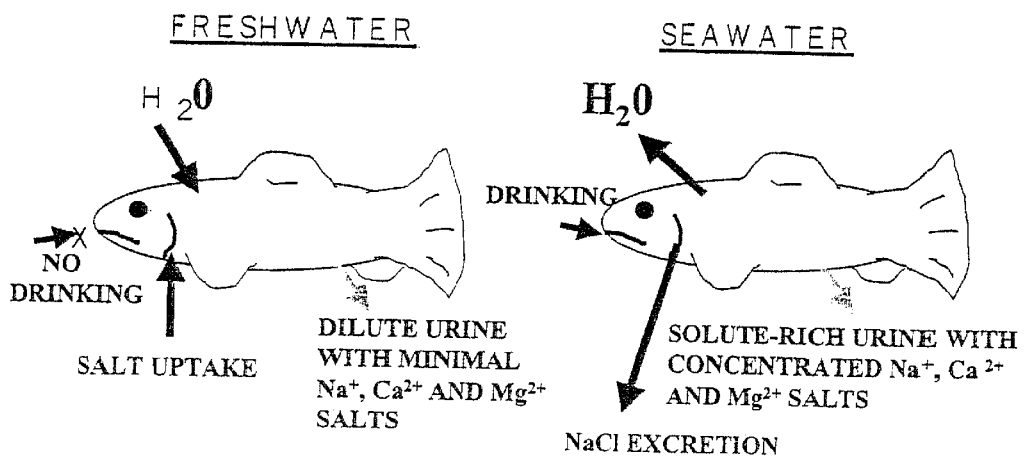
FIG. 19 is a schematic drawing illustrating adaptive changes of fish in seawater and in freshwater.

Development of specific ion transport capabilities in epithelial cells of gill, kidney and intestinal tissues are important to pre-adult anadromous fish if they are to survive transfer to seawater. To determine if alterations in the PVCRs expression accompanied the increase in trout fingerling survival in seawater, immunoblotting and immunocytochemistry was performed on samples from the fingerlings as was done for the salmon smolt tissues. The results are shown in FIGS. 15, 16 and 19.

Figure 15:
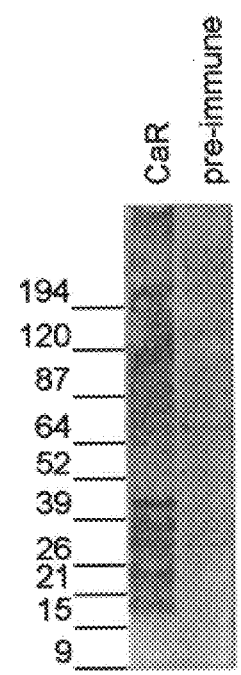
FIG. 15 is a photograph of a Western Blot of intestinal tissue from trout fingerlings for immune (lane marked CaR, e.g., a PVCR) and preimmune.(lane marked preimmune) illustrating PVCR expression.
Figure 16A:
FIGS. 16A–H are photographs of immunocytochemistry of epithelia of proximal intestine of rainbow trout using anti-PVCR antiserum illustrating PVCR localization and expression.
Figure 16B:
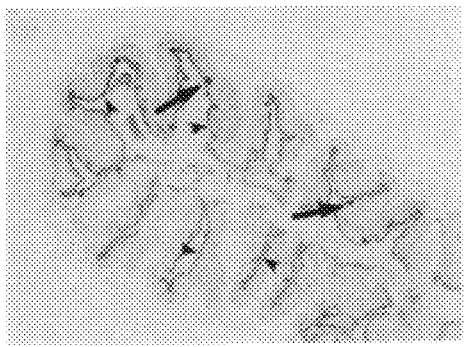
Figure 16C:
Figure 16D:
Figure 16E:
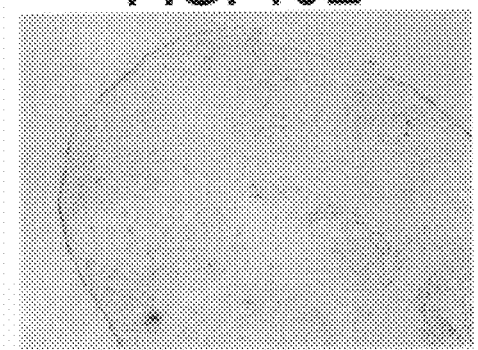
Figure 16F:
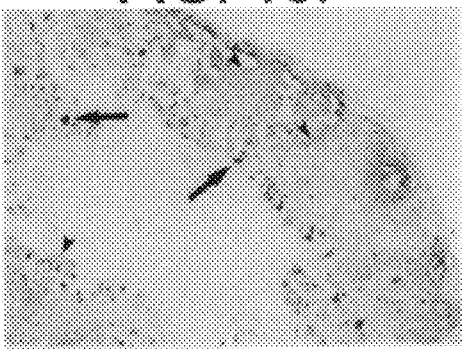
Figure 16G:
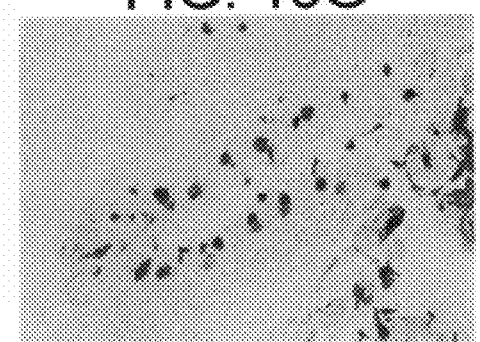
Figure 16H:
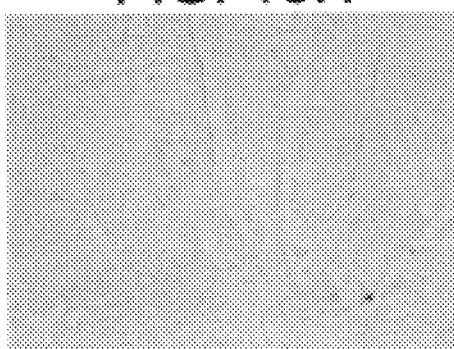

FIG. 15 is an immunoblot of intestinal tissue from trout fingerlings. Anti-CaR antiserum identifies multiple bands that are specific for PVCR staining as determined by comparison of immune (lane marked CaR) vs. preimmune (lane marked pre-immune). Prominent among these bands includes a broad band of 120–160 kDa, together with larger molecular weight complexes present above these bands from both intestine and gill tissue. FIGS. 16A, 16B, 16C, 16D, 16E, 16F, 16G and 16H are a set of eight photomicrographs showing immunocytochemistry of epithelia of the proximal intestine of rainbow trout using anti-PVCR antiserum. FIGS. 16A, 16C and 16E show samples from trout maintained in freshwater alone, while FIGS. 16B, 16D, 16F, 16G and 16H show samples from trout maintained in freshwater supplemented with 10 mM Ca2+ and 5.2 mM Mg2+ and fed a 1% NaCl diet. Proximal intestinal segments are shown in FIGS. 16A–16D, and 16G–16H, while distal intestinal segments are shown in FIGS. 16E–16F. FIGS. 16A–16F were treated with immune rabbit anti-CaR antiserum, washed, and developed with horseradish peroxidase-conjugated goat anti-rabbit antiserum using an aminoethylcarbazole (AEC) reaction. While FIGS. 16A, 16C and 16E display little or no PVCR staining, FIGS. 16B, 16D and 16F show significant PVCR staining that is present on the apical membrane of cells lining the intestinal lumen (small arrowheads) as well as larger globular round cells (arrows). In contrast to sections exposed to immune anti-PVCR antiserum, FIG. 16H was treated with pre-immune rabbit anti-CaR antiserum and thus do not contain the colored AEC reaction product. These data indicate this method specifically detects PVCR protein bound to the anti-PVCR antiserum. FIG. 16G was stained directly with Alcian blue (Sheehan, D. C. et al., 1980, Theory and Practice of Histochemistry, Battelle Press, Columbus, Ohio, USA) to localize mucin-producing epithelial cells that are present in intestine. Note the appearance of cells staining for PVCR protein in FIGS. 13D (denoted by small arrows) display a similar morphological appearance to those stained with Alcian blue in FIG. 13G. These data suggest that PVCR are expressed by mucin producing cells in the intestine where PVCR signaling actions modulate mucin production in the intestine. Immunocytochemistry of intestinal tissue shows that the content of PVCR protein is different in trout maintained in freshwater alone (FIGS. 16A, 16C and 16E) vs. freshwater supplemented with Ca2+ and Mg2+ and trout fed a NaCl supplemented diet (FIGS. 16B, 16D, 16F). Normally in freshwater, PVCR expression is low in either proximal (FIGS. 15A and 16C) or distal (FIG. 16E) sections of intestine. However, PVCR expression is significantly increased in both proximal (FIGS. 16B and 15D) and distal segments (FIG. 15F) after exposure to freshwater supplemented with 10 mM Ca2+ and 5.2 mM Mg2+ and feeding of NaCl supplemented diet.

Figure 17:
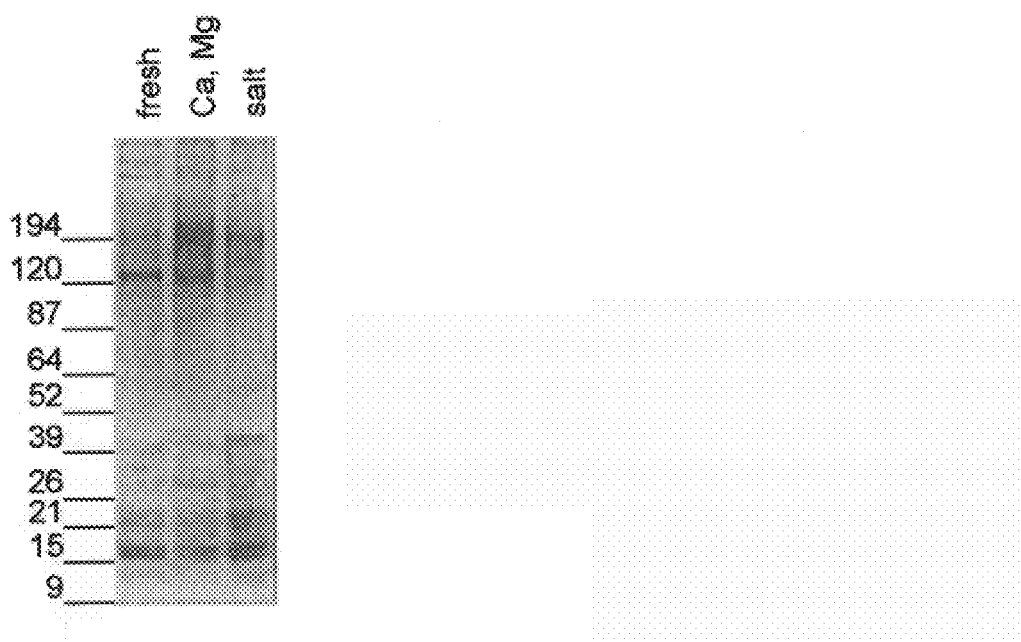
FIG. 17 is a photograph of a Western Blot comparing levels of PVCR of fish in freshwater, water having calcium and magnesium, and seawater, illustrating PVCR expression.

While PVCR protein is localized to several regions of multiple cells, the presence of intense staining on the apical membranes of intestinal epithelial cells (small arrowheads) as well as occasional rounded cells (large arrowheads) are identical to data localizing PVCR protein in both the dogfish shark (Nearing, J. et al., 1997, J. Am. Soc. Nephrol. 8:40A), as well as rat kidney inner medullary collecting duct (IMCD) (Sands, J. M. et al., 1997, J. Clin. Invest. 99:1399–1405). As described above for Atlantic salmon smolts, the apical PVCR in trout intestine is induced by increases in luminal Ca2+ and Mg2+ concentrations, and thereby regulates the NaCl-mediated recovery of water from intestinal contents. This recovery is important to the survival of marine fish (Evans, D. H., 1993, "Osmotic and Ionic Regulation," in: The Physiology of Fishes, ed. D. H. Evans, CRC Press, Boca Raton, Fla., USA, Chapter 11, pp. 315–341), as it replaces osmotic water losses that occur via the skin and gill. The anti-PVCR staining of rounded cells, which are interspersed throughout the larger intestinal epithelial cells (FIG. 16D) is also consistent with these cells corresponding to mucin-producing cells which are known to stain intensely with Alcian Blue (Sheehan, D. C. et al., 1980, Theory and Practice of Histochemistry, Battelle Press, Columbus, Ohio, USA) (FIG. 16G). FIG. 17 shows a representative immunoblot that compares the overall levels of PVCR content of protein homogenates prepared from gill tissue of trout using the same anti-PVCR antiserum as described in FIGS. 13–15. Prior to dissection and homogenation of gill tissue, trout were exposed to 1 of 3 different treatments including either freshwater, freshwater with 10 mM calcium and 5.2 mM magnesium with dietary NaCl supplementation or freshwater with dietary NaCl supplementation only. In the gill, the anti-PVCR antiserum also identifies a broad 120–140 kDa and a band of large molecular mass (greater than 200 kDa) that are similar to those shown in FIGS. 14 and 15. These data are consistent with molecular masses of CaRs of known structure and similar to those observed in immunoblotting analyses of multiple organisms, including rat (Sands, J. M. et al., 1997, J. Clin. Invest. 99:1399–1405), flounder, and shark (Nearing, J. et al., 1997, J. Am. Soc. Nephrol. 8:40A). A moderate level of PVCR expression in gill as defined by PVCR reactive bands occurs when trout are maintained in freshwater (freshwater). The abundance of PVCR protein is increased when trout are exposed to the APS Process I (Ca, Mg+NaCl suppl. Feed) as shown in the middle lane (Ca, Mg). In contrast, when trout are maintained in freshwater and fed a NaCl diet without exposure to calcium and magnesium in the freshwater, there is no change in the overall PVCR staining intensity but rather a shift of PVCR reactivity from the 120 kDa to the larger 200 kDa higher molecular weight band (lane marked salt). These data demonstrate that exposure of trout to the APS Process I (freshwater containing 10 mM calcium, 5 mM magnesium and dietary NaCl supplementation) increases PVCR expression in gill tissue as compared to freshwater alone. Feeding of NaCl supplement diet while the trout are maintained in freshwater does not produce similar increased expression of the PVCR protein. The data shown in Example 21 indicates that the PVCR protein present on gill chloride cells responds to treatment of fish with APS Process II and remodels both the distribution and Na+K+ ATPase activity of chloride cells in a manner that closely resembles the process after fish are transferred to seawater. This treatment of anadromous fish by APS Process II provides for more rapid adaptation and better performance and growth after transfer of juvenile Atlantic salmon to seawater.

Example 5

Immunolocalization of Polyvalent Cation Receptor (PVCR) in Mucous Cells of Epidermis and in the Brain of Salmon The skin surface of salmonids is extremely important as a barrier to prevent water gain or loss depending whether the fish is located in fresh or seawater. Thus, the presence of PVCR proteins in selected cells of the fish's epidermal layer would be able to "sense" the salinity of the surrounding water as it flowed past and provide for the opportunity for continuous remodeling of the salmonid's skin based on the composition of the water where it is located.

Figure 18A:
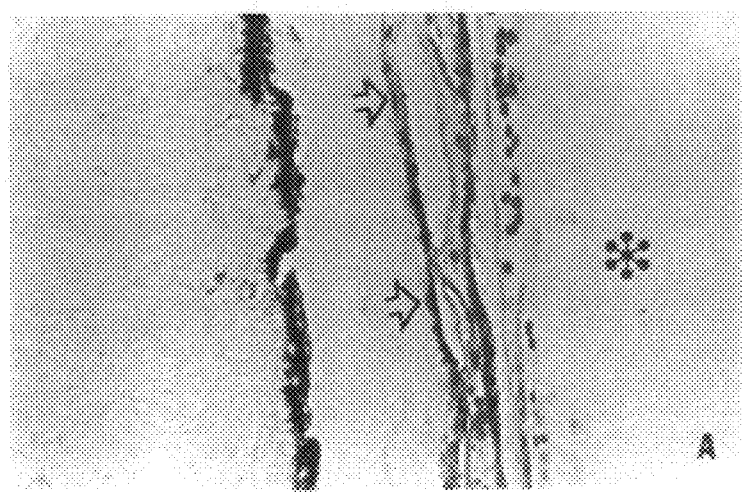
FIGS. 18A–C are photographs of immunolocalization of the PVCR in the epidermis of salmon illustrating PVCR localization and expression.
Figure 18B:
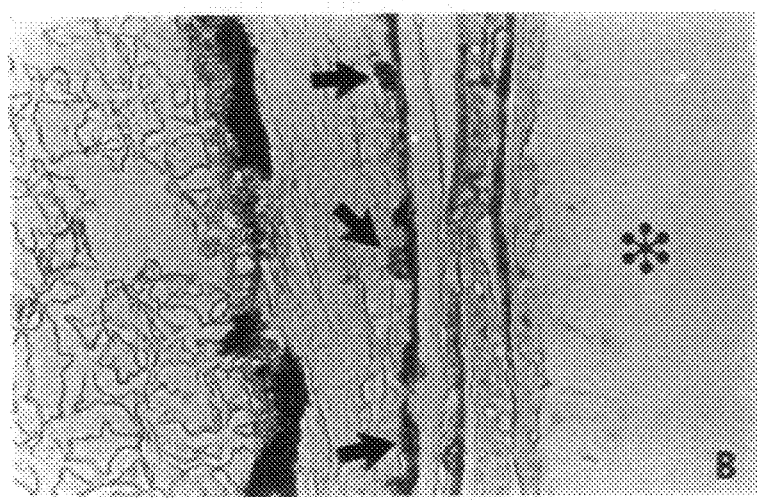
Figure 18C:
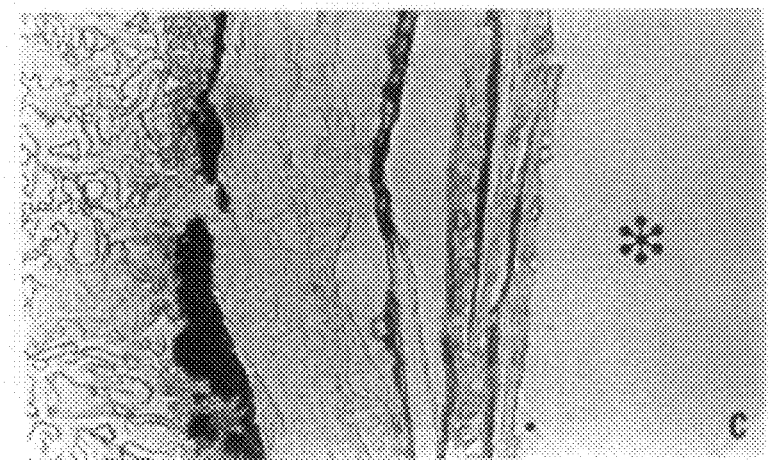

Methods: Samples of the skin from juvenile Atlantic Salmon resident in seawater for over 12 days were fixed in 3% paraformaldehyde dissolved in buffer (0.1M NaP04, 0.15M NaCl, 0.3M sucrose pH 7.4), manually descaled, rinsed in buffer and frozen at −80° C. for cryosectioning. Ten micron sections were either utilized for immunolocalization of PVCR using anti-shark PVCR antiserum or stained directly with 1% Alcian Blue dye to localize cells containing acidic glycoprotein components of mucous. Results and Discussion: FIG. 18A shows that salmon epidermis contains multiple Alcian Blue staining cells present in the various skin layers. Note that only a portion of some larger cells (that containing acidic mucins) stains with Alcian Blue (denoted by the open arrowheads). For purposes of orientation, note that scales have been removed so asterisks denote surface that was previously bathed in seawater. FIG. 18B shows immunolocalization of salmon skin PVCR protein that is localized to multiple cells (indicated by arrowheads) within the epidermal layers of the skin. Note that anti-PVCR staining shows the whole cell body, which is larger than its corresponding apical portion that stains with Alcian Blue as shown in FIG. 18A. The presence of bound anti-CaR antibody is indicated by the rose color reaction product. Although formal quantitation has not yet been performed on these sections, it appears that the number of PVCR cells is less than the total number of Alcian Blue positive cells. These data indicate that only a subset of Alcian Blue positive cells contain abundant PVCR protein. FIG. 18C of FIG. 18 shows the Control Preimmune section where the primary anti-CaR antiserum was omitted from the staining reaction. Note the absence of rose colored reaction product in the absence of primary antibody.

These data demonstrate the presence of PVCR protein in discrete epithelial cells (probably mucocytes) localized in the epidermis of juvenile Atlantic salmon. From this location, the PVCR protein could "sense" the salinity of the surrounding water and modulate mucous production via changes in the secretion of mucous or proliferation of mucous cells within the skin itself. The PVCR agonists (Ca2+, Mg2+) present in the surrounding water activate these epidermal PVCR proteins during the interval when smolts are being exposed to the process of the present invention. This treatment of Atlantic salmon smolts by the process of the present invention is important to increased survival of smolts after their transfer to seawater.

Example 6

Localization of PVCR Protein in Brain of Atlantic Salmon

The PVCR protein can be specifically localized to the brain stem area of Atlantic salmon using immunocytochemistry and antibody raised against a peptide sequence found in the carboxyl terminal of the shark PVCR. These data are consistent with a role for a PVCR in the modulation of endocrine function as well as appetite control in Atlantic salmon.

Localization of the expression of calcium receptors to specific regions of the mammalian brain has been determined. While the exact functions of mammalian CaRs in many regions of the mammalian brain are still unknown, several lines of evidence indicate that CaRs can integrate alterations in systemic calcium, sodium and water metabolism with modulations in brain function that include differences in the secretion of hormones such as adrenocorticotrophin (ACTH) from the hypothalamus as well as behavioral changes such as regulation of thirst or eating. Of importance to disclosure findings detailed below, PVCRs (CaRs) roles in alteration of endocrine function, drinking and appetite in anadromous fish undergoing transfer from freshwater to seawater are important.

In mammalian brain, there is prominent CaR expression in the subfornical organ or SFO. The SFO is a key hypothalamic thirst center and is believed to play a role in modulation of drinking activity to integrate body calcium and water homeostasis. Stimulation of drinking behavior by systemic hypercalcemia via stimulation of CaRs located in the SFO is thought to minimize the dehydration produced by alterations in kidney function that blunt the tubular reabsorption of filtered water by the kidney. The equivalent SFO area of the fish brain has not presently been identified.

In the mammalian brain, there is CaR expression in the pons area of the brainstem particularly around the area postrema near the third ventricle. The area postrema is known to be a collection of neurons believed to mediate appetite and has been termed the "nausea center". From this portion of the mammalian brain, neuronal pathways provide for integration of sensory input from vestibular function (sensing of balance) as well as visual input via pathways from optic nerves and their respective nuclei in the brain. This region of the brain is believed to be intimately involved in the nausea produced by hypercalcemia as well as the administration of opiates to humans. The equivalent area postrema of the fish brain is not presently identified.

A combination of physiological and anatomic data provide evidence for the role of CaRs to integrate a variety of endocrine functions with changes in the serum calcium levels in humans. Intravenous infusion of calcium sufficient to raise serum calcium concentrations causes selective increases in gonadotropic releasing hormones and thyroid releasing hormone (TRH) as well ACTH that are produced by the anterior pituitary. The anterior pituitary gland is known to be intimately connected with specific areas of the hypothalamus that express CaRs.

Increases in the serum calcium concentrations of humans cause multiple alterations in both behavior as well as endocrine function. Thus, hypercalcemia causes increased drinking, decreased food consumption and alterations in the circulating levels of specific hypothalamic hormones. As mentioned below, analogous changes in behavior and circulating hormone levels occur in preadult anadromous fish during smoltification and transfer from freshwater to seawater.

Methods

Whole brains obtained from preadult Atlantic salmon (St. John/St John APS Process II smolts) that were subjected to the APS Process II and transferred to seawater were dissected free of their surroundings and fixed in 3% paraformaldehyde (PFA) in buffer [identical to other immunocytochemistry descriptions]. Eight micron sections were cut, attached to glass slides and processed for immunocytochemistry using either nonimmune control antiserum or anti-PVCR of dogfish shark. Specific antibody binding was detected by the rose-colored reaction product formed from the action of horseradish peroxidase conjugated goat anti-rabbit secondary antiserum and amino ethylcarbazole. Sections were viewed and photographed using standard light microscopy techniques.

Results and Discussion

After examining serial sections from multiple preadult Atlantic salmon, there is consistent localization of PVCR protein in cells localized in at least 7 distinct regions of the salmon brain. The first region of PVCR localization is distinct staining of neurons in the vagal lobe region. The second region of PVCR staining is within neurons in the commissural nucleus of Cajal. Both of these regions of salmon brain are known to represent important nuclei in the gustatory (sensing food and eating) as well as general visceral activities including esophageal and intestinal motility (processing of food and intestinal contents for nutrient and water reabsorption). Expression of PVCR protein links alterations in both serum and CNS calcium concentrations to changes in eating and processing of intestinal contents important for anadromous fish adaptation to seawater.

A third site of PVCR localization in salmon brain is the saccus vasculosus where PVCR protein is distributed throughout multiple cell types. The saccus vasculosus is ovid and localized on the ventral surface of the brain between the inferior lobes. This structure is highly vascularized and contains connections between the cerebral spinal fluid and the vascular space. Moreover, neurons present in the saccus vasculosus possess massive nerve projections that tract to the subependymal region of the thalamus. The saccus vasculosus system modulates the function of centers of the posterior tubercle and periventricular thalamus. These areas of the brain are immediately adjacent to the pituitary gland.

The localization of PVCR proteins in the brain of preadult Atlantic salmon provides evidence that PVCR can be involved in a variety of functions in the central nervous system of anadromous fish in a manner similar to that described above for the mammalian brain. In particular, localization of PVCR to nuclei that are part of the gustatory system in Atlantic salmon indicates that PVCR protein is expressed in neurons that modulate appetite similar to that described for the area postrema in mammals. Stimulation of PVCR or alterations in its expression via changes in the serum calcium, magnesium or sodium concentrations as demonstrated for Atlantic salmon in this application would then be able to modulate appetite and food consumption. Alternatively, alterations in the cerebral spinal fluid concentration of these ions via exchange between the CSF and the vascular system can also be involved. Since Atlantic salmon smolt produced by present day industry standard methods experience an interval of profound anorexia after their transfer to seawater, this well known suppression of appetite can be mediated through PVCR signaling mechanisms.

In a similar manner, PVCR signaling pathways can also modulate both drinking behavior and pituitary hormone secretion. PVCR protein expressed in the saccus vasculosus can provide for both the initiation of the drinking of seawater by Atlantic salmon and can be directly analogous to increased drinking in mammals caused by hypercalcemia. Increases in serum calcium, magnesium and sodium concentrations produced by transfer of preadult anadromous fish from freshwater to seawater can also be the stimulus for increased secretion of hypothalamic hormones such as ACTH. ACTH stimulates the secretion of cortisol by the adrenal gland in fish. Cortisol is one hormone that has been shown to be a modulator of ion transport activity and involved in modulation of the parr-smolt transformation in anadromous fish. Modulation of pituitary activity via connections between the saccus vasculosus, hypothalamus and the pituitary can modulate these endocrine changes.

PVCR proteins in additional areas of the brain and brain-associated structures of juvenile Atlantic salmon including stalk of pineal gland, olfactory nerve and olfactory bulb and prolactin-producing cells of the pituitary gland were localized. In addition to the three areas of the brain in which the PVCR was localized, additional data that was obtained indicate that the PVCR is expressed in at least four other brain regions or tissues associated with the brain that are known to be key regulators of anadromous fish smolt seawater performance.

The data obtained from these localization show that neurons present in the magnocellular nucleus, olfactory lobe and nerve as well as pineal stalk of seawater adapted juvenile Atlantic salmon express abundant amounts of PVCR protein. In contrast, multiple other brain nuclei in the brain possess no detectable PVCR protein. The presence of PVCR protein in the magnocellular nucleus of the brain is likely due to the proposed involvement of this nucleus as a regulator in the drinking behavior of fish. Thus, alterations in serum Ca2+, Mg2+ or NaCl concentrations can be sensed by neurons possessing PVCR and drinking behavior necessary for survival after seawater transfer would be initiated. In a similar manner, the presence of PVCR protein in both olfactory lobe and nerve can permit the modulation of neuronal input from olfactory lamellae (sensing the ionic and nutrient concentrations of the surrounding water) with nuclei to other regions of the brain based on sensing the serum concentrations of Ca2+, Mg2+ or NaCl. Calcium ions play a key role in generation of the light-modulated hormone, melatonin, from the fish pineal gland. Hence, neurons expressing PVCR protein present in the stalk of the pineal gland sense the concentrations of serum Ca2+, Mg2+ or NaCl and thereby provide integration between signals generated by the photoperiod exposure, melatonin synthesis and alterations in the body composition of the junvenile Atlantic salmon. This system may facilitate the effects of photoperiod after seawater transfer of Process II treated fish as detailed in Example 10.

Immunolocalization studies of the pituitary gland of juvenile Atlantic salmon reveal prominent expression of PVCR protein in prolactin-producing cells of the adenohypophysis. Staining of serial sections of a single pituitary with either anti-PVCR antiserum or anti-growth hormone antiserum were obtained and analyzed. The data obtained shows that only prolactin producing cells possess PVCR protein while adjacent growth hormone producing cells have no detectable PVCR protein. These data are consistent with the prominent role of prolactin as a key hormone in regulation of the body composition of salmonids in freshwater. Moreover, prolactin acts as an antagonist of the seawater-promoting action of growth hormone. These data indicate that, in nature, prolactin protects juvenile salmon during the interval immediately prior to seawater transfer by antagonizing the action of growth hormone that would accelerate the remodeling of the fish's tissues for life in seawater. The presence of PVCR protein in prolactin producing cells in the pituitary of juvenile Atlantic salmon permits these cells to sense the exact time that fish are transferred to seawater via alterations in the serum Ca2+, Mg2+ or NaCl as demonstrated by Example 7. Reduction in the release and/or synthesis of prolactin reduces concentrations of circulating prolactin and thus reduces prolactin's antagonism of growth hormone permitting juvenile salmon to adapt fully to seawater. Exposure of fish to APS Process I or It alters serum Ca2+, Mg2+ or NaCl in a manner similar to that of seawater transfer and prepares fish for their transfer to seawater.

Example 7

Serum Level in Fish Exposed to APS Process I or APS Process II

The data described herein demonstrates that alterations in the concentrations of calcium, magnesium and NaCl in the body fluids of anadromous fish occur after seawater transfer and excessively high concentrations cause or contribute to post seawater transfer deaths in anadromous fish. APS Process II mimics seawater transfer without subjecting small preadult anadromous fish to osmotic stress. This treatment of fish thus allows them to be transferred to seawater at significantly smaller sizes and under conditions that are nonpermissive using industry standard practices.

PVCRs are present in multiple tissue locations where PVCRs are exposed to surrounding seawater (gills, skin), olfactory lamellae, luminal contents of tubules (kidney, intestine) as well as internal body fluids (brain, endocrine tissue, muscle). When anadromous fish are transferred from fresh to seawater there is an abrupt rise in the external water concentrations of calcium, magnesium and NaCl. If the fish absorbs increased amounts of calcium, magnesium and NaCl via drinking or osmosis then PVCRs located on the apical surfaces of intestinal and kidney epithelial cells will be exposed to increased amounts of these divalent and monovalent ions. These increases in divalent cation concentrations occur since the kidney is the primary excretory organ for divalent cations and the intestine is the major water recovery organ for anadromous fish via the processing of ingested seawater. Important for this data disclosure is the fact that if the concentrations of calcium, magnesium and NaCl increase in the blood and extracellular fluid of fish, then the PVCRs that are bathed in these body fluids will become stimulated. Alterations in serum calcium and magnesium constitute an actual signaling pathway. In this regard, it is also noteworthy that there are a wide range of "normal" values for serum concentrations of calcium, sodium, magnesium and chloride in anadromous fish. While it has been recognized that steady state serum concentrations of these ions change with differing salinities, there has been no recognition that these might represent fish with differing PVCR "set points" as described herein.

Current production methods for salmonids depend on the attainment of a "critical size" for preadult fish called smolt to enable them to survive the transfer from freshwater to seawater.

The production of salmonids for aquaculture is dependent on the ability for preadult fish to survive direct transfer from freshwater to seawater. For this process to occur, present day industry methods have identified a "critical size" for each species of salmonid. Below this critical size, many fish are not able to survive the dramatic alterations in water osmolality and ionic composition. Factors that contribute to the ability of "critical size" smolt include specific surface area to volume ratios as well as the maturity of ionic transport and hormonal mechanisms to cope with the new seawater ionic environment. These mechanisms involve coordinated responses from several organs including the gill, gastrointestinal tract, kidney, and skin as well as specific behavioral changes such as the initiation of drinking behavior after seawater exposure. The transfer of a fish from a freshwater to seawater environment constitutes a major challenge to these osmoregulatory systems that are rapidly remodeled to permit its survival. The basic osmoregulatory mechanisms and responses are outlined briefly on FIG. 19.

When a fish resides in freshwater, it is surrounded by an aqueous environment that possesses a significantly lower ionic and osmotic content (Table 11). Due to the osmotic gradient that exists between the body fluid of the fish and the surrounding environment, the fish is constantly gaining water that continuously threatens to dilute the more concentrated ionic content of the fish's body fluids. As a result, the freshwater fish do not drink and excrete a copious dilute urine. To prevent the loss of important body salts into the environment, the gills, gastrointestinal tract as well as kidney tubules engage in active uptake of ions from either their luminal contents or the surrounding freshwater.

TABLE 11

Comparison of the Ionic[1] and Osmotic[2] Composition of Seawater and Freshwater vs Serum (Blood) of Atlantic Salmon[3]

| | Seawater | Freshwater | Atlantic Salmon |
|---|---|---|---|
| Sodium | 450 | 0.3–5 | 135–185 |
| Calcium | 10 | 0.07–2 | 2.5–3.9 |
| Magnesium | 50 | 0.04–3 | 1.0–2.8 |
| Chloride | 513 | 0.23–10 | 120–138 |
| Sulfate | 26 | 0.05 | <0.02 |
| Osmolality | 1050 | 1–20 | 330–390 |

[1] All values expressed as mMoles/Liter.
[2] Values expressed as mOsmoles/kg $H_2O$
[3] Values vary whether fish is in freshwater or seawater. Range of average values provided.

In contrast, when a fish resides in seawater the surrounding aqueous environment possess a significantly larger ionic and osmotic content as compared to the fish's own body composition (Table 11). As shown in FIG. 19, marine salmonids are constantly losing body water content to the surrounding seawater. In this regard, both the integrity and permeability of the fish's skin layer are important in reducing these cutaneous losses to as low as possible. To replace these ongoing water losses, the fish drinks seawater and processes it in such a way to retain water and only a portion of its constituent ions. Ingested seawater is processed by epithelial cells lining the gastrointestinal tract. In this process, the intestinal uptake of water and some NaCl by the fish is permitted while Ca2+ and Mg 2+ are either not absorbed or excreted by kidney tubules. Absorbed NaCl is pumped from the fish's body via gill epithelial cells.

FIG. 19 compares adaptive changes present in fish in freshwater vs seawater. Specific physiological adaptations present in freshwater fish are shown schematically on the left panel. In contrast, alterations in these same physiological responses when fish are in seawater are shown on the right.

It is important for the pre-adult anadromous fish to accomplish all of these adaptative changes rapidly after transfer from freshwater to seawater. Deployment and maturation of these mechanisms requires the synthesis of new proteins and remodeling of epithelial cells involved in transepithelial transport. These changes occur in a time scale that will permit the smolt to survive in its new seawater environment. The smaller the fish, the larger its surface area/volume ratio. Thus, smaller fish lose their body water more rapidly and have less body water stores to buffer changes in body ionic composition. As a result, small fish rapidly lose water and they cannot replace this water via drinking seawater since their ionic removal mechanisms are not mature. As a result, smaller or nonmature smolts rapidly die of electrolyte and water imbalances produced by their inability to adapt to the new osmotic and ionic environment of seawater. In contrast, larger smolts that are larger than the "critical size" possess a lower surface area to volume ratio, lose water less rapidly and have more body water to buffer ionic changes. This larger body size provides them the interval of time necessary to deploy their more mature ionic transport mechanisms enabling them to survive.

In smolts that are either less than the critical size or possess immature physiological ion transport mechanisms, the combination of the osmotic removal of water from their bodies coupled with ingestion of ion rich seawater produces specific alterations in body fluid and electrolyte composition. These changes include: a decrease in total body water content, increases in the concentrations of calcium, magnesium and sodium chloride. Abnormally high concentrations of these monovalent and divalent cations causes a wide range of specific changes in organ and cellular functions including alterations in cellular metabolism and nerve conduction, depression of normal nervous system and muscle activity as well as cessation of normal ingestion of food and its digestion. The abnormal behavior and appearance of highly stress pre-moribund fish after seawater transfer are actually attributable to the physiological effects of elevated ions including calcium and magnesium within the body fluids of the fish.

As described herein, measurements of serum calcium, magnesium and sodium confirm these data as well as demonstrate that the present invention causes a change in physiological and ionic transport mechanisms permitting the successful seawater transfer of preadult anadromous fish that are significantly smaller than the critical size as defined by present day industry standard methods.

Methods

Blood was obtained from fish (salmon and trout) via venipuncture into the caudal sinus and prevented from coagulation by the addition of lithium heparin. The blood was centrifuged at 4,000 rpm for 10 minutes and the resulting serum collected and stored until assay. Calcium and magnesium concentrations of 2 microliter aliquots of serum were quantified using calcium and magnesium assay kits (Kit #595, #587 Sigma Aldrich, St Louis, Mo.) and Na was determined by commercial testing (NorDx Laboratories, Scarborough, Me.) using a Hitachi 747 analyzer.

Results and Discussion

The APS Process II Mimics Exposure to Seawater Without the Presence of a Large Osmotic Gradient Between the Fish's Body Fluids and Surrounding Hypertonic Seawater.

Figure 20:
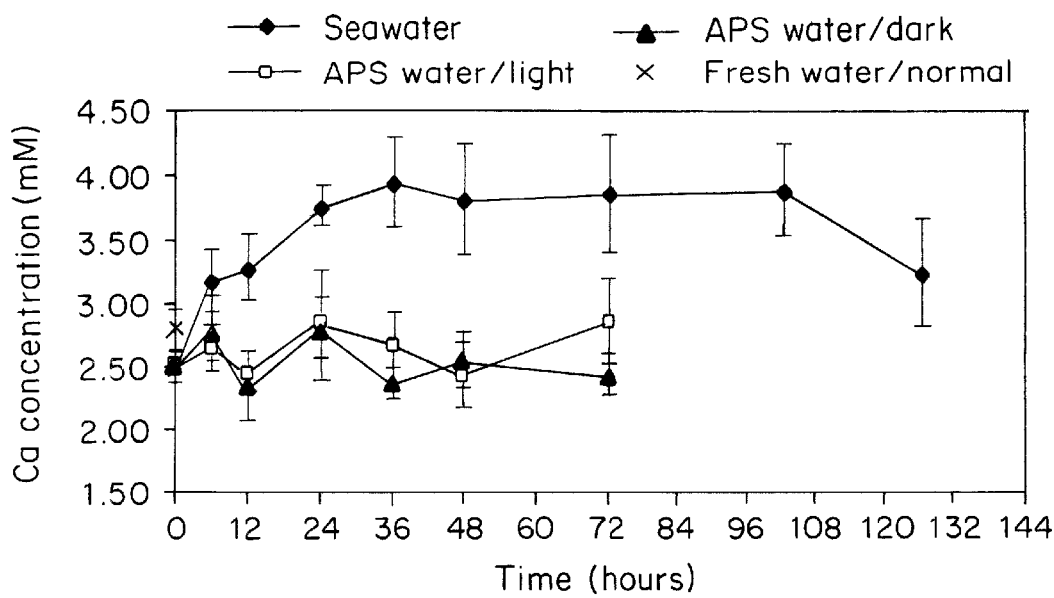
FIG. 20 is a graphical representation of serum calcium concentrations (mM) over time in rainbow trout subjected to transfer to either seawater or water mixture of the present invention. All data points represent a least 5 independent determinations mean±standard deviation from a single representative experiment.

FIG. 20 shows the changes in serum calcium concentrations in juvenile trout (average body weight approximately 30 gram) subjected to seawater transfer either directly from treshwater or after exposure to various components of APS Process II. The average steady state serum calcium concentration in these trout maintained in freshwater is 2.72+/−0.16 mM. In contrast, transfer of trout to seawater results in a significant rise in serum calcium to approximately 3.80 mM within the initial 24 hr after seawater transfer. This increase in serum calcium is sustained for an interval of approximately 108 hr (4.5 days) but then declines to a slightly lower average concentration of 3.20+/−0.42 mM by 126 hr. Thus, internal PVCRs are exposed to a rise in serum calcium upon transfer of freshwater trout to seawater. The aquatic PVCRs would actually sense and respond to alterations in calcium this concentration range. Thus, the increase in serum calcium (a PVCR agonist) likely constitutes a signal for the initiation of multiple PVCR-activated processes in various organs to permitting the survival of juvenile trout in seawater.

Placement of trout in the water mixture of the present invention which contains 3 mM calcium and 1 mM magnesium, and feeding the trout a standard freshwater diet (Moore Clarke Feeds) results in no significant increases in serum calcium as compared to serum calcium values for trout maintained in freshwater despite the presence of a net inward gradient of calcium from external water mixture (3 mM) to internal body fluids (2.72 mM). Moreover, serum calcium concentrations of trout maintained in the water mixture are not changed by alterations of the ambient photoperiod from a normal (10 hr daylight; 14 hr darkness) to continuous daylight exposure.

Figure 21:
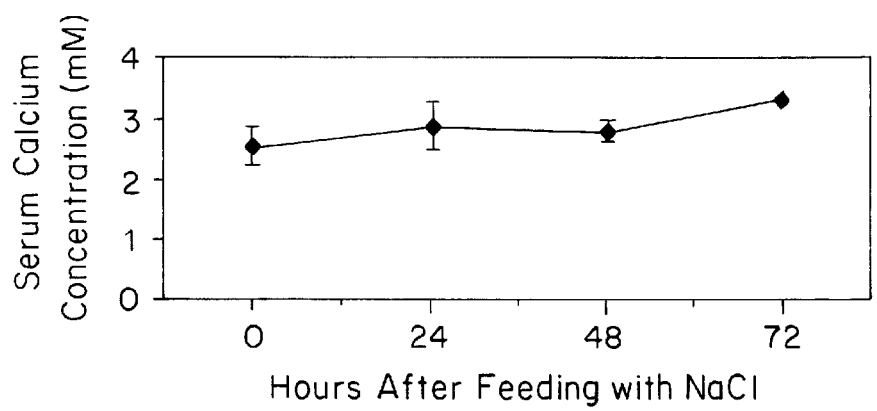
FIG. 21 is a graphical representation showing increases in serum calcium concentrations (mM) over time induced by feeding trout maintained in a water mixture (3 mM calcium, 1mM magnesium) and a standard freshwater pelleted diet containing additional 1% sodium chloride (w/w).

FIG. 21 shows increases in serum calcium concentrations induced by feeding trout maintained in water mixture (3 mM calcium, 1 mM magnesium) a standard freshwater pelleted diet containing additional 1% sodium chloride (w/w). Feeding of NaCl supplemented diet began immediately after determination of baseline serum calcium concentrations at time zero. Note that serum calcium concentrations became elevated after an interval of 24 hr. Data points shown represent a total of 5 or more independent determinations from a single representative experiment. Values at 24 hr and 72 hr are significantly (p<0.05) increased as compared to the value at zero time.

In contrast, the feeding of trout maintained in the water mixture of the present invention with the identical standard feed except with the addition of 1% NaCl (weight/weight) produces a significant increase in serum calcium concentrations within 24 hr (FIG. 21). This increase in the serum calcium concentrations of trout mimics the rise produced by transfer of trout into seawater (compare FIG. 20 vs. 21). This effect of dietary NaCl to increase serum calcium levels likely occurs because the fish is obligated to excrete this excess NaCl that it has ingested. Ingestion of this excess NaCl activates the fish's drinking behavior thereby causing it to ingest water mixture containing 3 mM calcium and thereby increases its body fluid calcium content via the intestinal absorption of calcium. Ingestion of 1% NaCl alone does not alter serum calcium concentrations. Thus, the serum calcium concentration of trout maintained in freshwater (2.72+/− 0.43 n=6) was not altered significantly after consumption of feed containing 1% NaCl (w/w) for as long as 30 days (2.37+/−0.25 n=5). These data provide a demonstration that this protocol is necessary to achieve increase the serum calcium concentrations in anadromous fish.

Figure 22A:
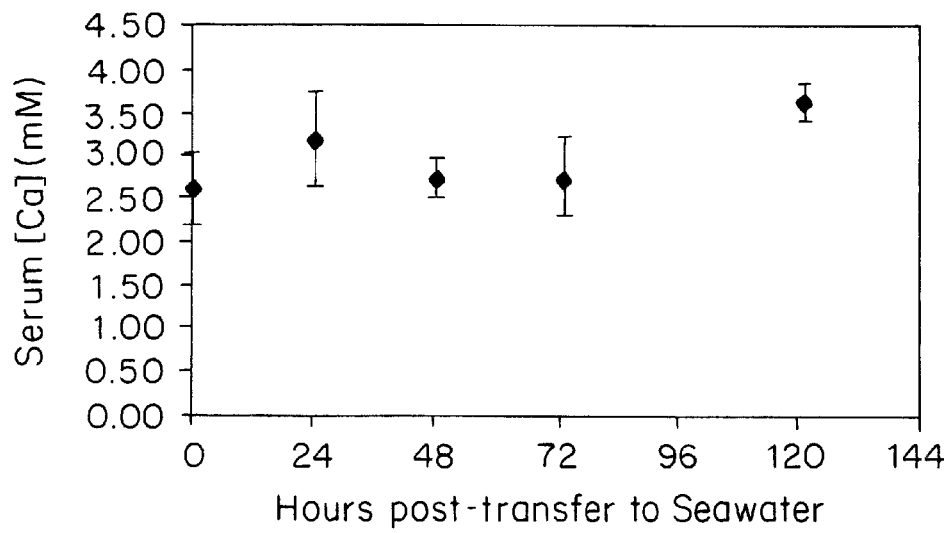
FIGS. 22A and 22B are graphical representations of alterations in serum calcium (FIG. 22A) and sodium (FIG. 22B) after seawater transfer of S1 Altantic salmon smolts.
Figure 22B:
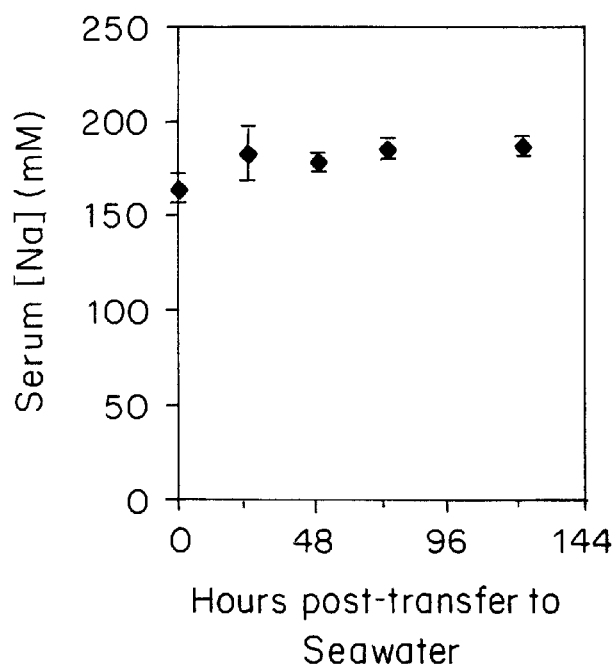

Transfer of Larger Atlantic Salmon Smolts Raised in Freshwater that Possess the Industry Standard "Critical Size" to Seawater Raises their Serum Calcium and Sodium Concentrations The data displayed in FIG. 20 shows that the mean serum calcium concentration increases by approximately 40% when trout are transferred from freshwater to seawater. The magnitude of this increase is associated with significant trout mortality (approximately 30–40%) due to osmoregulatory failure in these fish that are smaller than the "critical size" for trout. In contrast, the magnitude of increases in serum calcium concentrations is smaller (approximately 30% increase) when larger Atlantic salmon smolts that possess the critical size 60–70 gram are transferred to seawater (FIG. 22A–B). During this same interval after seawater transfer, serum sodium concentrations in these same fish increase by approximately 17%. Data derived from both trout (FIG. 21) and salmon (FIG. 22A–B) were only collected from fish that exhibited no visible signs of stress (i.e. stressed fish exhibit body discoloration, bizarre swimming behavior or markedly decreased activity levels) during this experiment.

Figure 23A:
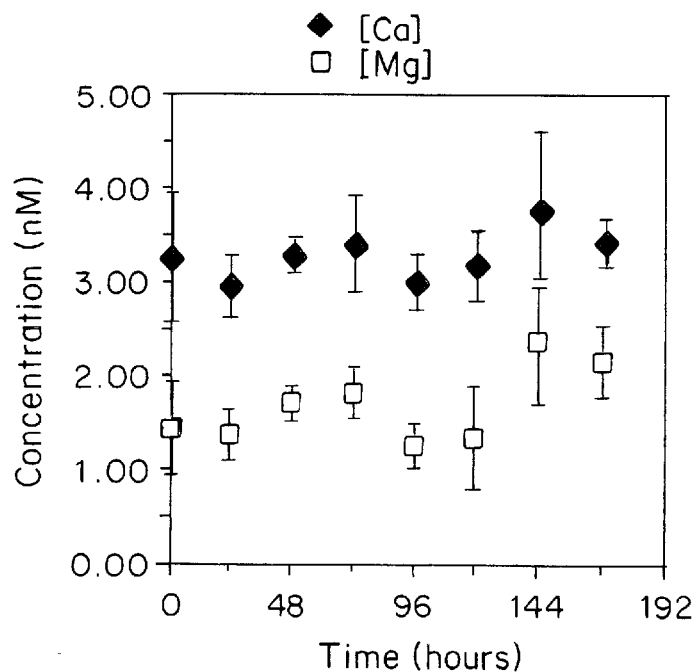
FIGS. 23A and B are graphical representations of serum calcium, magnesium and sodium levels (mM) over time from Atlantic Salmon S1 APS Process I treated fish. Each value displays the mean +/- S.D. of a minimum of 10 independent determination from this single representative experiment.
Figure 23B:
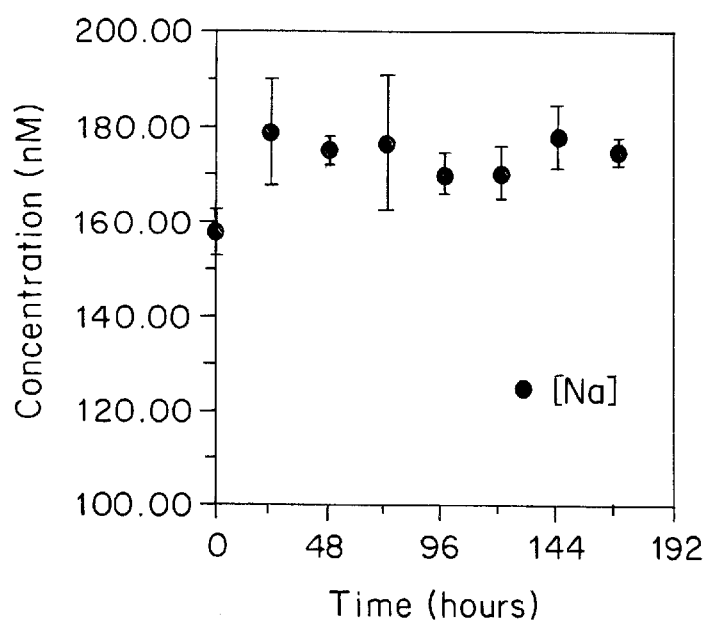

FIG. 22 shows alterations in serum calcium (FIG. 22A) and sodium (FIG. 22B) after seawater transfer of S1 Atlantic salmon smolt that possess the critical size as defined by standard present day practices. Each data point represents the mean ±S.D of 5–10 independent determinations FIGS. 23A–B show post seawater transfer values for serum calcium, magnesium and sodium obtained from a cohort of 80 S1 Atlantic salmon smolt identical to that shown in FIG. 22 after a total of 45 days of treatment with APS Process I (3 mM $Ca^{2+}$, 1 mM $Mg^{2+}$ in water) and 7% NaCl dietary supplement in food. Note that the initial serum calcium in fish exposed to APS Process I is slightly larger (2.5 vs 3.0 mM) and changes in serum concentrations of calcium and sodium are similar to those displayed in FIG. 22. Moreover, calcium and magnesium do not undergo dramatic increases during the initial 120 hr interval as these fish are transferred from calcium/magnesium water mixture to seawater. In contrast, the serum sodium concentration increases approximatley 12% (178.8 mM from 158.0 mM) within the first 24 hr.

Taken together, these data shown in FIGS. 19–23 demonstrate that increases in both the serum calcium and sodium occur after transfer of preadult anadromous fish from freshwater to seawater. Moreover, the overall expression of PVCR protein is modulated in specific cells involved in this osmoregulatory response such as intestine. Since PVCRs are capable of responding to alterations of both calcium and sodium within these concentrations ranges, these data indicate that a new "set point" for PVCR activity is established after transfer of fish to seawater.

The data shown in FIGS. 21–23 demonstrate that treatment of preadult anadromous fish with APS Process I causes increases in the serum calcium concentrations of the fish that mimic those produced by their transfer from freshwater to seawater. Exposure of the fish to the combination of calcium and magnesium in the water and NaCl in the feed causes increased calcium intake that mirrors the drinking of hypertonic seawater without the accompanying osmotic stress. Thus, the PVCRs in the APS Process I fish have been exposed to calcium and magnesium and, as a result, the fish are more readily able to adapt to seawater when it is subsequently transferred to it. Anadromous Fish Exhibiting Visible Symptoms of Stress After Transfer to Seawater Possess Elevated Serum Values of Calcium and/or Magnesium. The Inability of Fish to Excrete These Ions is the Major Cause for Their Death After Seawater Transfer When pre-adult anadromous fish are transferred to seawater either directly from freshwater or after exposure to the APS Process I, some portion of the total number of fish are often unable to adapt to the dramatic differences in osmolality and ionic composition between freshwater and seawater and die of resulting electrolyte imbalances. Observations that include tracking of fish that will ultimately expire within a short time interval (24–120 hr) after seawater transfer demonstrates that they begin to exhibit visible signs of high levels of stress including alterations in their normal light silver body coloration to a darker duskier hue as well as displaying of bizarre swimming behavior or markedly decreased activity levels 24–72 hr before their death.

Comparison of serum calcium, magnesium and sodium concentrations from control nonstressed fish vs fish exhibiting signs of high levels of stress show that serum ion concentrations in stressed fish are significantly higher as compared to control (Table 12).

TABLE 12

Comparison of serum concentrations of juvenile Atlantic salmon and trout in seawater judged by visual inspection as either nonstressed or stressed fish.

| | Serum Concentrations in mM | |
|---|---|---|
| | Calcium | Magnesium |
| Industry Standard Juvenile Trout | | |
| Nonstressed Fish | 4.03 ± 0.71 (n = 49) | Not Done |
| Stressed Fish APS Treated | 4.58 ± 0.78** (n = 63) | Not Done |

TABLE 12-continued

Comparison of serum concentrations of juvenile Atlantic salmon and trout in seawater judged by visual inspection as either nonstressed or stressed fish.

| | Serum Concentrations in mM | |
|---|---|---|
| | Calcium | Magnesium |
| Atlantic Salmon | | |
| Nonstressed Fish | 3.74 ± 0.52 | 2.40 ± 0.77 (n = 15) |
| Stressed fish | 3.97 ± 0.66 | 4.07 + 0.60** (n = 16) |

**$P < 0.01$

These signs of high stress are directly referable to abnormally elevated concentrations of calcium, magnesium and sodium ions within the body fluids of the fish. Thus, preadult anadromous fish that are unable to excrete excess divalent cations as well as process seawater to replace body water that is lost via osmosis die from the consequences of electrolyte imbalances. Anadromous fish below the critical size are not able to rapidly adapt to the new osmotic environment of seawater and die as a result.

Figure 24:
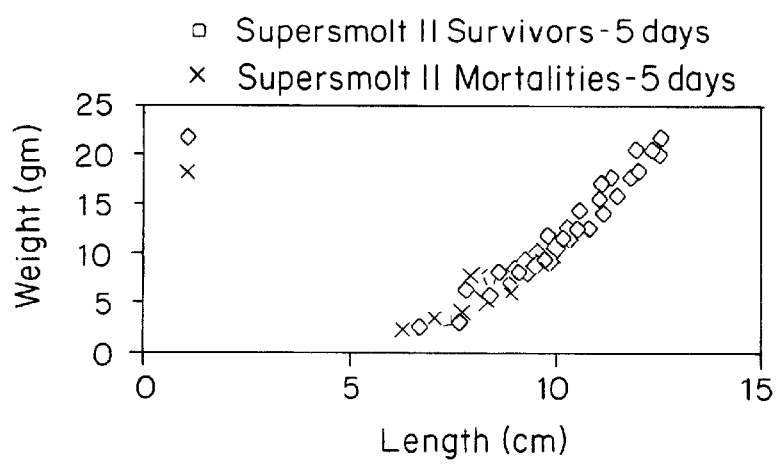
FIG. 24 is a graphical representation illustrating the weight (gm) and length (cm) of representative APS Process II smolts prior to transfer to seawater. This representative sample (n=100) of APS Process II smolts possess a wide range of body weights (3.95–23 gram) with an average body weight of 11.5 gm. Note that all mortalities (n=10) occurred only in the smaller fish in the transfer group.

Exposure of Preadult Atlantic Salmon Fish Below the "Critical Size" as Defined by Present Day Industry Standard Methods to the APS Process II Prevents the Lethal Elevations of Serum Calcium, Magnesium and Sodium and Thus Allows Successful Seawater Transfer of Fish Possessing Very Small Body Weights Pre-adult Atlantic salmon of the St John/St John strain were begun on the APS Process II including a water mixture (3 mM Ca2+ and 1 mM Mg2+) as well as feed a combination of 7% NaCl and 2 gm/kg (w/w) L-Tryptophan (APS Process II) for a total of 49 days while being exposed to a continuous photoperiod. These small, but treated pre-adult Atlantic salmon (termed APS Process II smolts) were then placed into seawater into either a single ocean netpen or into laboratory tanks (15.6° C.) within the research facility. FIG. 24 compares the body characteristics of APS Process II smolts that adapted successfully to seawater vs APS Process II smolts from the same group that were unable to adapt to seawater and died.

As shown in FIG. 24, only those Atlantic salmon preadult fish treated with the APS Process II with the smallest body weights (approximately 10%) experienced post seawater mortalities after 5 days into laboratory tanks. Comparison of the average body size of 90% surviving APS Process II smolts vs. those 10% APS Process II smolts that died shows that unsuccessful APS Process II smolts possessed smaller body weights (5.10+/−2.2 gm) as compared to average body size of whole APS Process I transfer group (11.5+/−5.65 gm). Thus, the critical size for these APS Process II smolts is approximately 13 gin. This critical body size is only 13–18.6% (13/70–100) that of the critical size defined previously by industry standard techniques. Thus, these data show that the use of the Process II has reduced the "critical size" of Atlantic salmon parr/smolt by over 80%.

Figure 25:
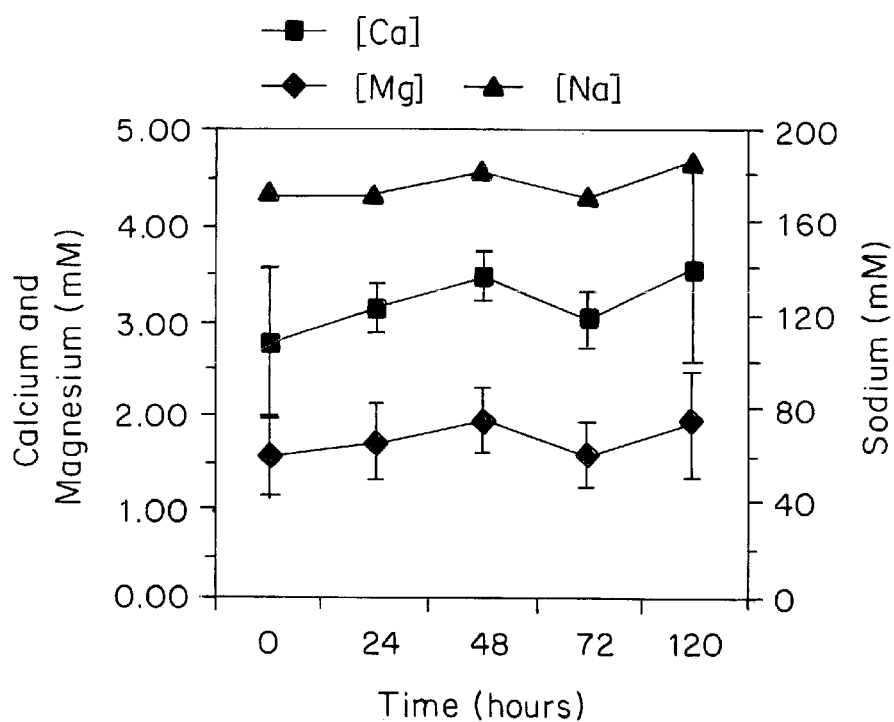
FIG. 25 is a graphical representation illustrating the quantitation of serum concentrations (mM) of calcium, magnesium and sodium in preadult Atlantic salmon subjected to APS Process II after their transfer to seawater. All values shown are the mean+S.D. of a minimum of 10 independent samples from a single representative experiment.

Quantitation of serum calcium, magnesium and sodium concentrations in APS Process II smolts that have successfully made the transition from calcium/magnesium water mixture to seawater is shown in FIG. 25. It is noteworthy that serum concentrations of calcium, magnesium or sodium did not change despite the fact that the average body size of these APS Process HI smolts is less than 20% (11.5/60.5 gm ) of the normal "critical size" for Atlantic Salmon smolts produced using present day industry standard methods. FIG. 25 shows that neither serum calcium, magnesium or sodium concentrations increase dramatically as would be expected from data shown in FIG. 20 and Table 2 as well as data published previously. Treatment of industry standard Atlantic salmon smolt/parr with APS Process II results in no dramatic increases in the concentrations of any ions measured above despite the significantly smaller body size of APS Process II smolts, as compared to large industry standard smolts. Comparison of data shown in FIGS. 22A–B (Industry standard S1 smolts), FIG. 23 (Industry standard S1 smolts treated with APS Process I vs FIG. 25 (preadult salmon less than 20% of the industry standard critical size) also reveals that these serum concentrations for the smaller APS Process II smolts are comparable to those displayed by the larger industry standard S1 smolts. In summary, these data show that preadult Atlantic salmon treated with APS Process II do not exhibit dramatic changes in their body composition of calcium, magnesium and sodium despite their significantly smaller size. This lack of alterations in the concentrations of these ions greatly reduces stress in these fish and permits them to adapt to seawater readily.

Example 8

The Feed

There are two general methods to prepare feed for consumption by fish as part of APS Process I and II. These two processes involve either reformulation of feed or addition of a concentration solution for absorption by the feed followed by a top dressing for palatability. This disclosure describes the methodology to prepare feed using each of these 2 methods.

Methods

Feed Manufacture for Salmon Experiments

To reformulate feed, the ingredients are as follows: Base Diet was made using the following ingredients and procedure: 30% Squid (liquefied in blender), 70%Corey Aquafeeds flounder diet (powderized in blender). Ingredients were blended into a semi moist "dough" ball. Other ingredients including NaCl or PVCR active compounds were blended into the base diet by weight according to what the experiment called for.

Moore Clark standard freshwater salmonid diet (sizes 1.2,1.5.2.0, 2.5, and 3.5 mm) can also be used. A top dressing was applied to the pellets such that top dressing is composed of 4% of the weight of the Base Diet. Top dressing is composed of 50% krill hydrolysate (Specialty Marine Products Ltd.) and 50% Menhaden fish oil. The top dressing is added for palatability and sealing of added ingredients.

Other ingredients can include NaCl, MgCl2, CaCl2 or L-Tryptophan that are added by weight to the base diet by weight.

Preparation of Feed Containing 7% (weight/weight) NaCl

For the APS Process I: Solid sodium chloride or NaCl apportioned at a ratio of 7% of the weight of the Moore Clark standard freshwater salmonid diet weight was added to a volume of tap water approximately 3–4 times the weight of NaCl. The mixture was heated to 60–70° C. with mixing via use of a magnetic stirring bar to dissolve salt. The NaCl solution was then poured into a hand held sprayer and applied to the Moore Clark standard freshwater salmonid diet that is tumbling inside of a 1.5 cubic meter motorized cement mixer. After absorption of the NaCl rich solution, the wetted Moore Clark standard freshwater salmonid diet is spread out thinly on window screening and placed in an enclosed rack system equipped with a fan and 1500 watt heater to expedite drying process. After drying for approximately 6 hr, the dried NaCl-rich pellets are returned to the cement mixer and a top dressing is applied. The feed is stored at room temperature until use.

Preparation of Feed Containing 7% (weight/weight) NaCl+PVCR Agonist (Tryptophan) For the APS Process II: Solid sodium chloride or NaCl apportioned at a ratio of 7% of the weight of the Moore Clark standard freshwater salmonid diet weight was added to a volume of tap water approximately 3–4 times the weight of NaCl. The mixture was heated to 60–70° C. with mixing via use of a magnetic stirring bar to dissolve salt. USP Grade L-Tryptophan was added to the water at either 2 grams or 4 grams for every kg of Moore Clark standard freshwater salmonid diet depending on formulation need. Dilute hydrochloric acid was added to the water with mixing until the tryptophan was dissolved and the pH of solution was approximately 4.0. The NaCl+ Tryptophan solution was then poured into a hand held sprayer and was then applied to the Moore Clark standard freshwater salmonid diet tumbling inside a cement mixer. After absorption of the NaCl+ Tryptophan solution, the wetted Moore Clark standard freshwater salmonid diet is then spread out thinly on window screening and placed in an enclosed rack system equipped with a fan and 1500-watt heater to expedite drying process. After drying for approximately 6 hr, the dried NaCl/Tryptophan-rich pellets are then returned to the cement mixer and a top dressing is applied. The feed is stored at room temperature until use. L-Tryptophan can be replaced with any amino acid, described herein, that modulates PVCR expression.

Example 9

DNA and Putative Protein Sequences from Partial Genomic Clones of Polyvalent Cation Receptor Protein Amplified by PCR from the DNA of 8 Species of Anadromous Fish These data provide the partial genomic sequences derived from the PVCR gene in 8 species of anadromous fish. A full length clone was isolated as described in Example 1. Each of these nucleotide sequences is unique and thus could be used as a unique probe to isolate the full-length cDNA from each species. Moreover, this DNA fragment could form the basis for a specific assay kits for detection of PVCR expression in various tissues of these fish. See Example 19.

The PVCR has been isolated in several species of salmon, char and trout. Sequences of mammalian CaRs together with the nucleotide sequence of SKCaR (FIGS. 28A–E) were used to design degenerate oligonucleotide primers to highly conserved regions in the transmembrane domain of polyvalent cation receptor proteins using standard methodologies (See GM Preston, Polymerase chain reaction with degenerate oligonucleotide primers to clone gene family members, Methods in Mol. Biol. Vol. 58 Edited by A. Harwood, Humana Press, pages 303–312, 1993). Using these primers, cDNA or genomic DNA from various fish species representing important commercial products are amplified using standard PCR methodology. Amplified bands are then purified by agarose gel electrophoresis and ligated into appropriate plasmid vector that is transformed into a bacterial strain. After growth in liquid media, vectors and inserts are purified using standard techniques, analyzed by restriction enzyme analysis and sequenced where appropriate. Using this methodology, nucleotide sequences were amplified.

Figure 26A:
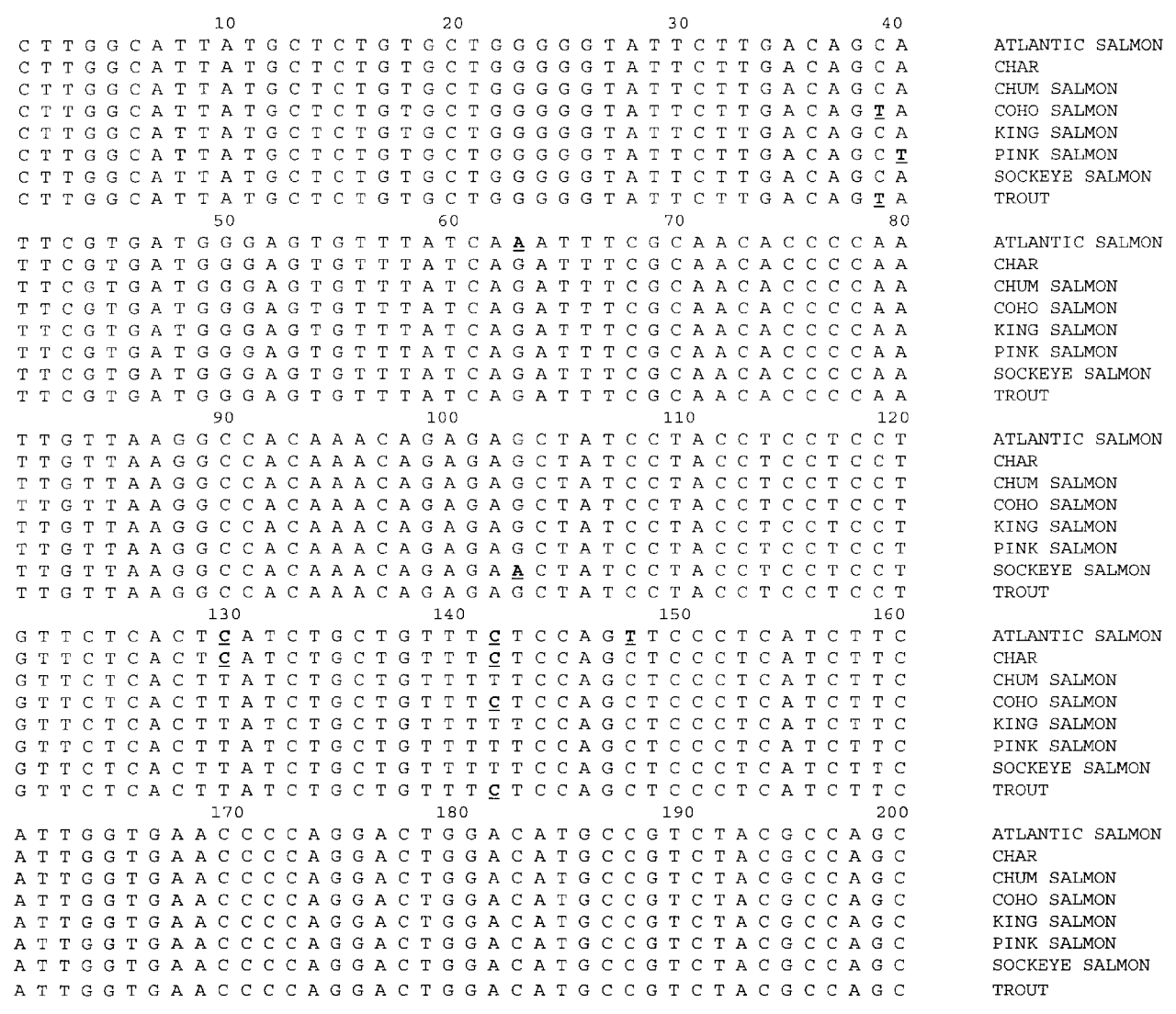
Figure 26B:
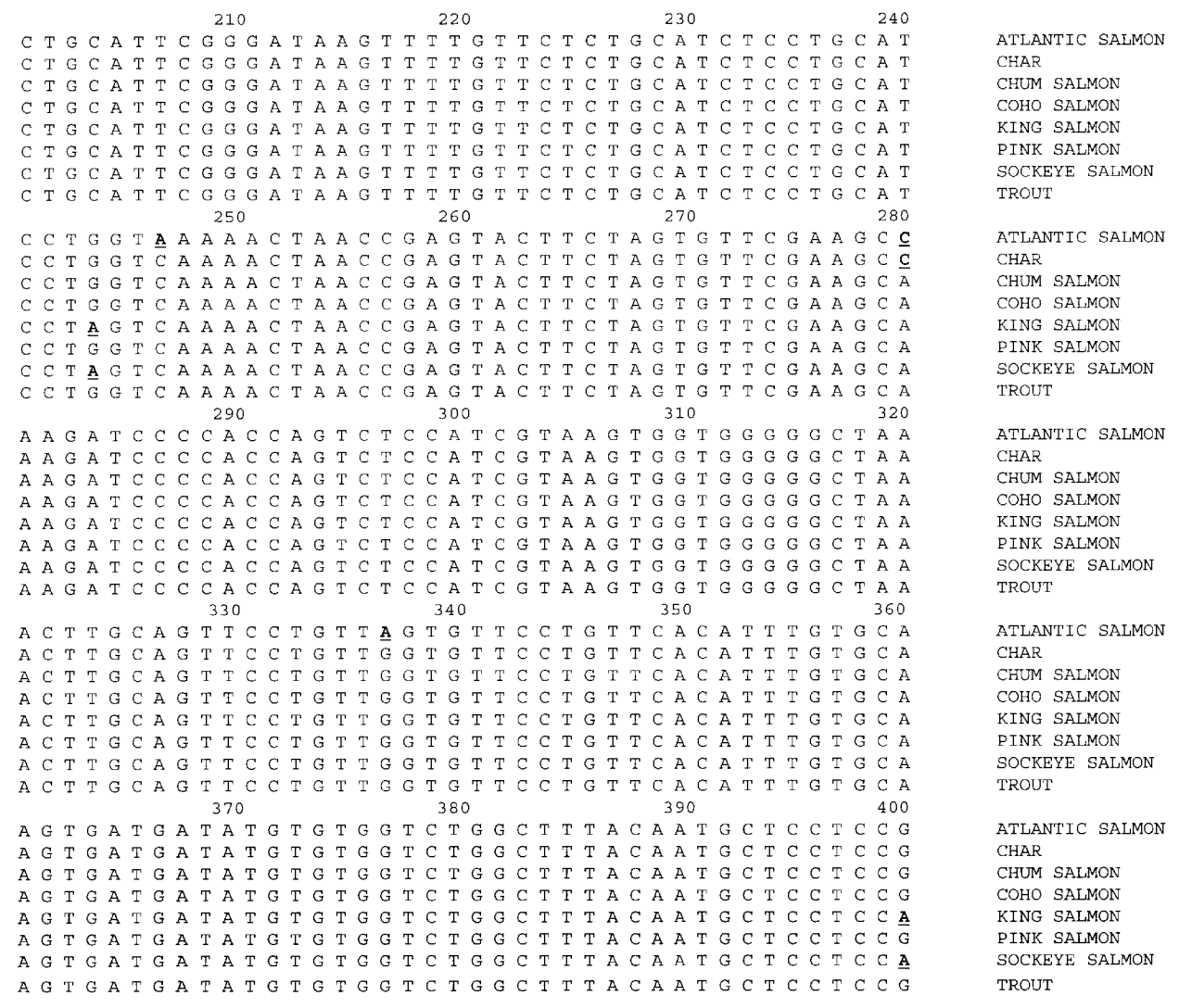
Figure 26C:
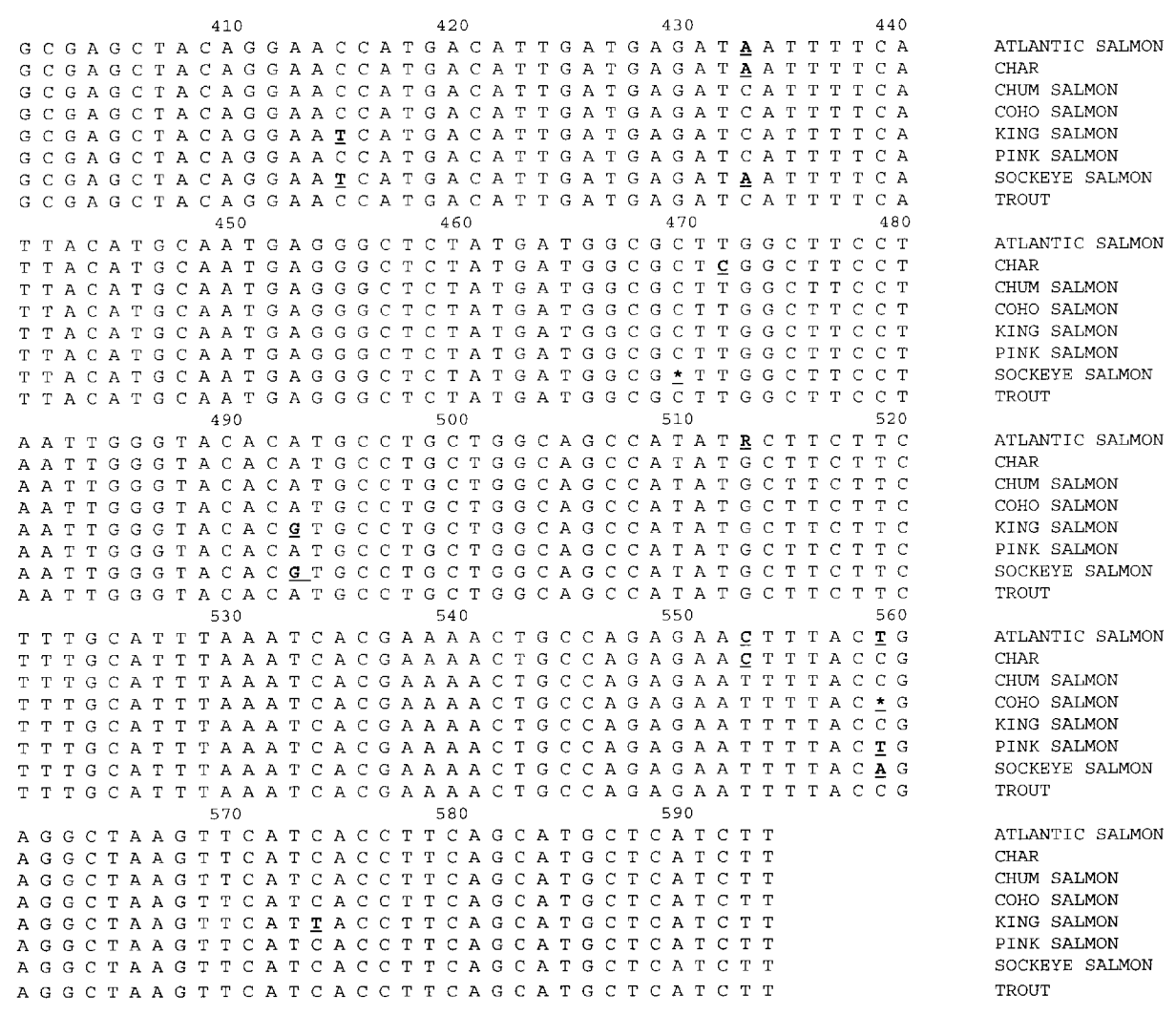
Figure 27B:
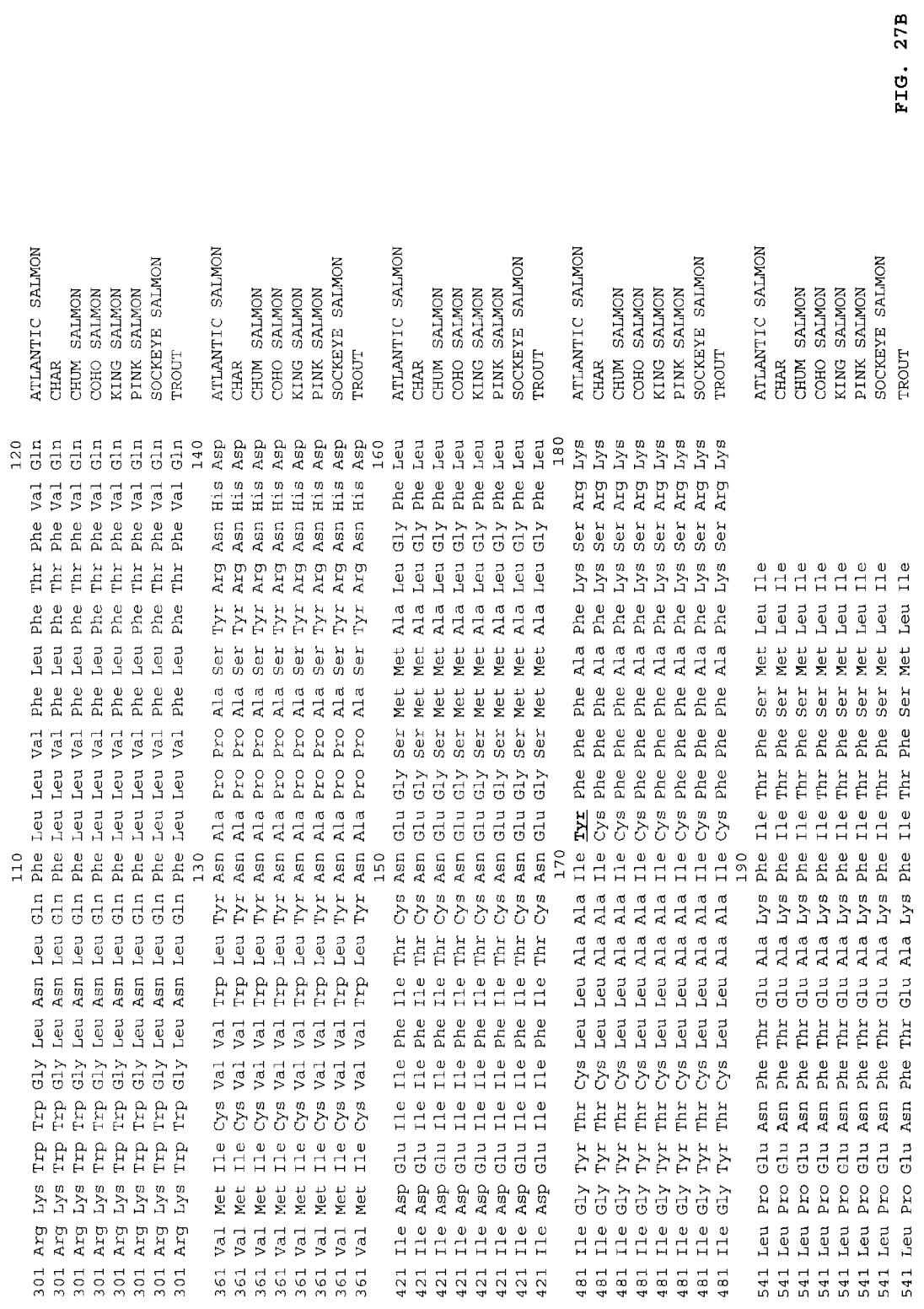

To generate the data displayed in FIGS. 26 and 27, DNA was isolated from muscle samples of each of the species indicated using standard published techniques. DNA was then amplified using polymerase chain reaction (PCR) methodology including 2 degenerate PCR primers (DSK-F3 and DSK-R4; SEQ ID NO:22 and 23). Amplified DNAs were then purified by agarose gel electrophoresis, subcloned into plasmid vectors, amplified, purified and sequenced using standard methods.

FIG. 26 shows an aligned genomic DNA sequences of 594 nucleotides for 8 anadromous fish species, each of which codes for an identical region of the PVCR protein. Note that each nucleotide sequence derived from each specific species is unique. However, alterations in the DNA sequences of these genes often occur at common specific nucleotides within each sequence of 594 nucleotides.

FIG. 27 shows aligned corresponding predicted protein sequences derived from genomic nucleotide sequences displayed in FIG. 26. Note that only 3 alterations in the amino acid sequence of this portion of the PVCR occur as a consequence of alterations in the nucleotide sequence as shown in FIG. 26. All of these changes (Ala to Val; Arg to Lys; and Cys to Tyr) are known as "conservative" substitutions of amino acids in that they preserve some combination of the relative size, charge and hydrophobicity of the peptide sequence.

Example 10

The Effect of Continuous Photoperiod to Reduce the Mortalities of Smolts Receiving APS Process II Treatment The data show significant improvement in post seawater transfer mortalities when APS Process II fish are exposed to a continuous photoperiod rather than a discontinuous photoperiod composed of 10hr of light and 14 hr of darkness.

Description of Experimental Protocol: Three experimental groups of 100 fish were taken from a single group of 1,200 St. John/St John APS Process II fish (average weight of 11.5 gm) that had been subjected to a total of 45 days of the APS Process II including a diet supplemented by 7% NaCl and tryptophan. During this 45 day interval with treatment with the APS Process II in freshwater, these fish were exposed to a continuous photoperiod of light. To initiate the experiment where the effects of continuing this constant photoperiod after seawater transfer were tested, each group of 100 fish were placed in individual 1 meter circular tanks containing seawater (32 ppt) that was equipped with its own biofilter and maintained at a constant 19° C. To maintain optimal water quality, parameters were checked daily and did not vary between any of the 3 experimental tanks. Tank #1 (Continuous) was exposed to a continuous photoperiod using a standard fluorescent bulb located 1 meter from the surface of the tank containing seawter. Tanks #2 and #3 also filled with seawater (Discontinuous #1 and #2) were exposed to a discontinuous photoperiod consisting identical lighting conditions to Tank #1 for a daily interval of 10 hr. followed by 14 hr of complete darkness produced by covering tanks #2 and #3 with a light tight heavy polyethylene plastic sheet. This light-dark regimen is similar to that experienced by APS Process II fish when placed into ocean netpens under diural conditions present in the summer/early fall of northern hemisphere. Mortalities occurring in each of the 3 tanks were checked 3 times a day and any dead fish removed immediately. Fish were offered standard moist diet beginning on Day #3.

Figure 29:
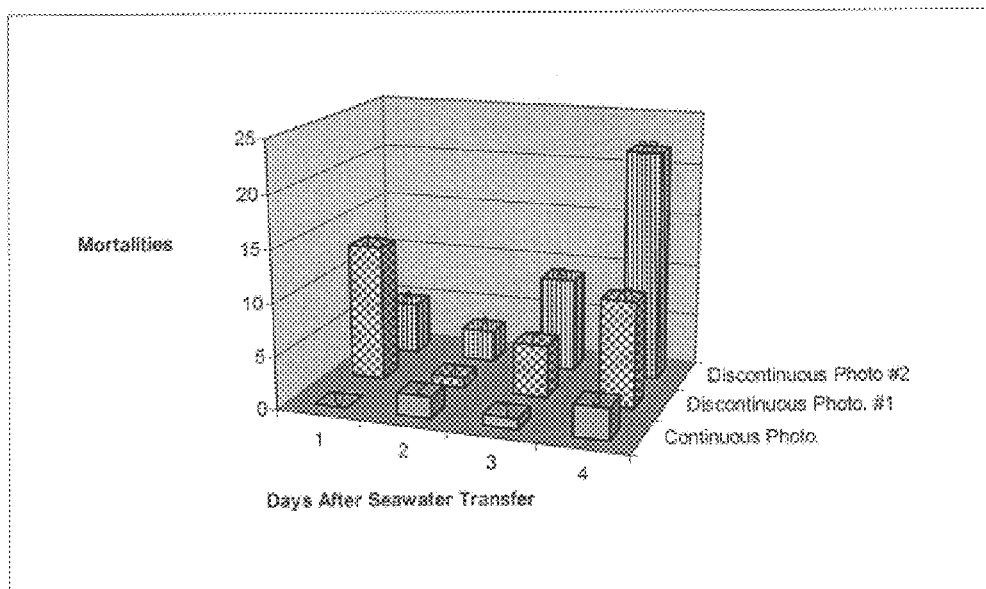
FIG. 29 is a graphical representation showing the number of mortalities over Days 1–4 after transfer to Seawater of APS Process II Fish exposed to continuous or discontinuous photoperiods before and after transfer to seawater.

Results: FIG. 29 and Table 13 display the number of mortalities that occurred upon exposure of APS Process II fish to either a continuous vs. discontinuous photoperiod after transfer to full strength seawater. The mortalities of APS Process II fish was low (6%) during the initial 96 hr interval after seawater transfer when these were exposed to a continuous photoperiod. In contrast, both groups of APS Process II fish that were exposed a discontinuous photoperiod (10 hr continuous light followed by 14 hr darkness) experienced mortalities that were 4.8 times (29%) and 6.5 times (39%) higher as compared to APS Process II fish exposed to a continuous photoperiod. These data show that exposure of APS Process II fish to a continuous photoperiod during the initial 4 days after seawater transfer significantly reduces their mortality. These data provide a simple explanation for the differential mortalities observed when these APS Process 11 fish are transferred to seawater tanks in the APS laboratory (possessing a continuous photoperiod) vs. ocean netpens (possessing an natural photoperiod with interval of darkness). Data contained in Table 7 also show that exposure of 15 gm and greater juvenile salmon treated with the APS Process II experienced low (0.2%) mortalities after seawater transfer in ocean netpens containing underwater lights that illuminated fish for 30 days.

TABLE 13

Summary of Post Seawater Mortalities for St. John/St. John APS Process II Fish After Transfer

| | No. of Mortalities for Continuous and Discontinuous Photoperiod | | |
|---|---|---|---|
| | Continuous | Discontinuous #1 | Discontinuous #2 |
| Day 1 | 0 | 13 | 5 |
| Day 2 | 2 | 1 | 3 |
| Day 3 | 1 | 5 | 9 |
| Day 4 | 3 | 10 | 22 |
| Total | 6 | 29 | 39 |

Example 11

Growth Rates of Juvenile Atlantic Salmon For APS Process II

The laboratory data of this experiment show that juvenile Atlantic salmon that are maintained in freshwater have the same growth rate as those fish that are exposed to the APS Process II prior to transfer to seawater.

Figure 30:
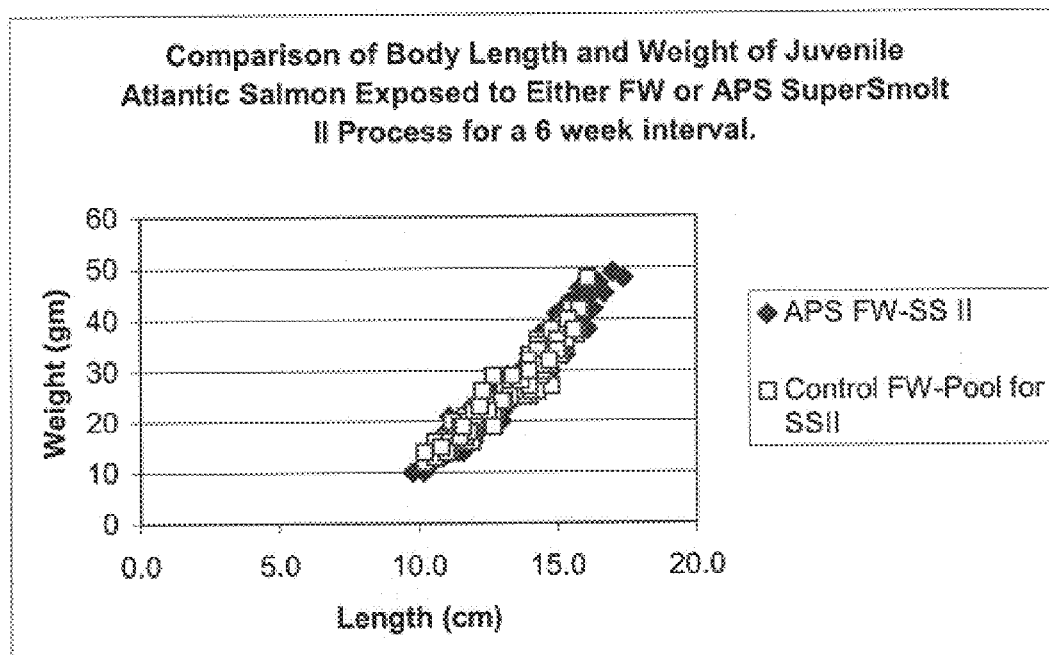
FIG. 30 is a graphical representation showing the length (cm) and weight (gm) of juvenile Atlantic Salmon exposed to FreshWater (FW) or APS Process II for a 6 week interval.

Description of Experimental Protocol: This experiment was designed to compare the growth rates of juvenile Atlantic salmon undergoing the APS Process II to matched controls that were maintain in freshwater (FW). A total of 187 Control and 314 Experimental St John/St John juvenile Atlantic salmon were selected randomly from a large pool of fish derived from a single hatch. Both groups were maintained on isocaloric diets and exposed to water with identical water quality characteristics as well as temperatures. However, the Experimental group of fish were subjected to the APS Process II for a total of 6 weeks (45 days). The lengths and weights of individual fish from both groups were then measured and their distributions compared as shown in FIG. 30.

Results: In this experiment, these data show that both groups achieved identical growth rates. There were no significant differences between the mean body weights (26+/−9.5 APS Process II fish vs 23+/−7.7 gm Control FW p=0.30) or mean body lengths (13.2+/−1.7 APS Process II fish vs 13.3+/−1.5 cm Control FW p=0.43) of the two groups. There were no mortalities in either group of fish during the duration of the experiment. Thus, in this instance, the APS Process II does not result in either increased or decreased growth rates of juvenile Atlantic salmon during the freshwater phase as compared to standard freshwater practices.

Example 12

Additional Growth Data for APS Process II Fish in Seawater Laboratory Tanks

The growth rates and feed conversion ratios of APS Process II fish demonstrate the value of the APS Process II. These data provide specific information as to the outcome of juvenile Atlantic salmon of various sizes ranging from <5 gm to approximately 30 gm after their exposure to the APS Process II in freshwater and then transfer to seawater. Repeated measurements on a single group of APS Process II fish over a 157-day interval provide for a comprehensive evaluation of growth performance, mortality and feed utilization during this interval. Mortality data demonstrate that APS Process II fish weighing greater than 15 gm at the time of their seawater transfer grow rapidly, experience no mortalities and utilize feed very efficiently, as compared to present day industry standard Atlantic salmon smolts (60–120 gm) that weigh 4 times more than APS Process II fish. In contrast, APS Process II fish possessing body weights less than 15 gm at the time of seawater transfer do poorly and either die of acute osmoregulatory failure or suffer osmotic damage and become "slinks or pinheads" possessing characteristics similar to those exhibited by a subpopulation of much larger present day industry standard smolts. These latter observations define the lower limit of efficacy of the present APS Process II as applied to juvenile Atlantic salmon.

Description of Experimental Protocol: The design of this experiment is described in Example 2. In Example 2, data were obtained for a 21-day interval after seawater transfer. In this Example, the mortalities, SGR, temperature corrected SGR (GF3), FCR, body weights, lengths and condition factors for these same fish were obtained a total of 4 additional intervals during an interval that now extends for 157 days. After exposure to the APS II Process and transfer to seawater, growth of the salmon were measured by repeated measurements of length and weight over a 157 day interval. Results: Table 14 provides a summary of data for this group of APS Process II fish after their transfer and growth in laboratory seawater tanks for an interval of 157 days. Note that the first interval of Table 14 corresponds to the data shown in Table 10, in the column labeled "APS Process II" with 2 data values requiring adjustments for experimental data reporting consistency. The first adjustment pertains to the tabulation of number of days in seawater entry. The original entry stated 21 while the new data on Table 14 shows 20 days. This difference is because the original entry included the day that the fish were actually transferred to seawater. Since this value represents only a 12 hr time interval, it has been corrected to the value of 20 days. As a result of this fact, a minor adjustment of the initial SGR value from 0.68 (Table 10 original) to 0.725 (Table 14) is necessary. The second adjustment pertains to the original FCR value of 2.04 when the fish were being fed moist feed containing 30% water content during their initial 20-day interval in seawater. Since APS Process R fish were fed moist feed for a total of 60 days and then converted to dry feed (9% moisture content) Table 14 now reports an SGR value of 1.43 instead of 2.04 reflecting a correction for the SGR of that interval on a corrected dry weight feed basis. These SGR and GF3 corrections for 30% moisture contents are provided as footnotes to Table 14.

The FCR values for the 60 day interval immediately after seawater transfer averaged 1.37 when APS Process II fish were fed moist feed containing 30% water content as shown

TABLE 14

Calculated SGRs and GF3s for APS Process II Fish in Laboratory Tanks.
Summary of Data from APS Process II Fish St. John/St. John Strain of Atlantic Salmon After Transfer to Seawater in APS Laboratory Tanks.

| Period | Dates | Days in Seawater | | | | | | Weight Gained | | Average Body Weights* | | Mortalities | | | |
|---|---|---|---|---|---|---|---|---|---|---|---|---|---|---|---|
| | | Period | Cum. | Degree | GF3 | SGR | FCR# | Period | Cumulative | Cumulative* | Placement* | <15 gms | % Total | <15 gms | % Total |
| 1 | 9/11–10/3 | 20 | 20 | 324 | 0.354 | 0.725 | 1.43 | 2.05 | 2.05 | 15.2 | 13.15 | 103 | 23.2 | 0 | 0 |
| 2 | 10/4–11/13 | 40 | 60 | 553 | 1.029 | 1.53 | 1.31 | 14.38 | 16.43 | 31.48 | 17.1 | 138 | 31 | 0 | 0 |
| 3 | 11/13–12/6 | 22 | 82 | 311 | 2.328 | 2.87 | 0.75 | 27.76 | 44.19 | 59.24 | 31.48 | 0 | 0 | 0 | 0 |
| 4 | 12/7–1/16 | 40 | 122 | 454 | 1.559 | 1.27 | 0.76 | 40.1 | 84.29 | 100.5 | 60.4 | 0 | 0 | 5 | 1.1 |
| 5 | 11/7–2/21 | 35 | 157 | 407 | 1.362 | 0.99 | 0.8 | 41.6 | 125.89 | 142.1 | 100.5 | 0 | 0 | 0 | 0 |

Figure 31:
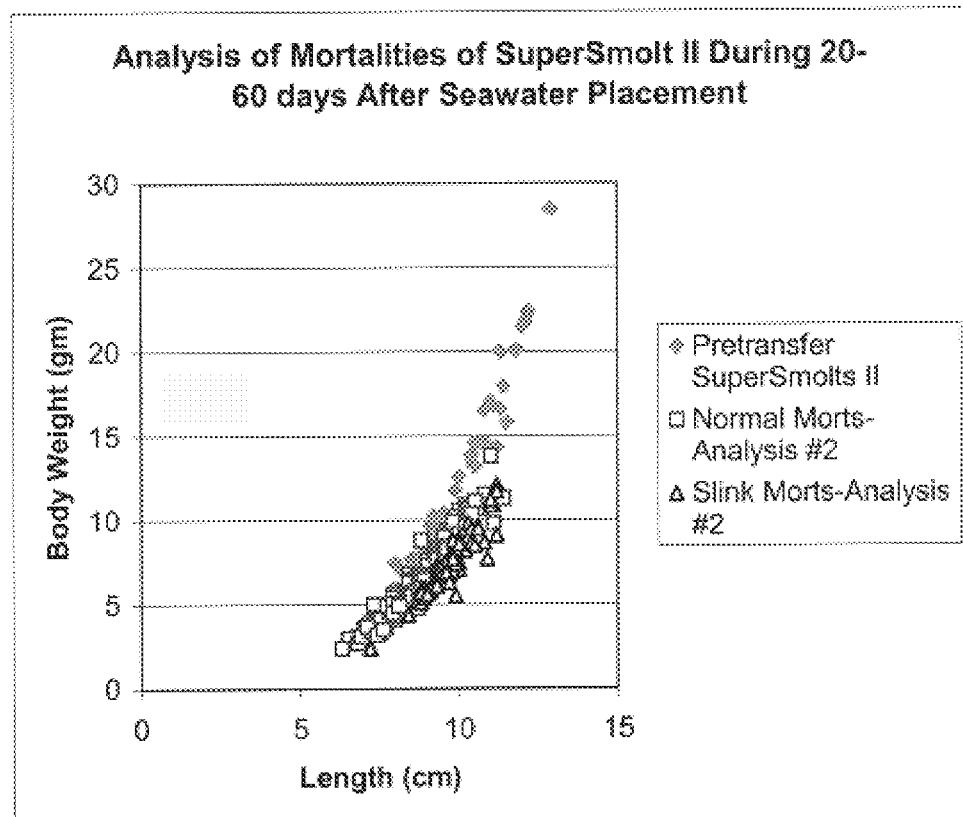
FIG. 31 is a graphical representation showing the body weights (gm) and length (cm) of APS Process II fish mortalities during 20–60 days after transfer to Seawater.

*Both Average and Placement Weights Corrected for Mortalities
FCRs calculated during intervals #1 and 2 are corrected for 30% Water Content of Moist Feed Fed to Fish The data summarized in Table 14 show that the overall mortality of APS Process II fish weighing 15 gm or greater at the time of seawater placement was 1.1% for the entire 157 day interval. This mortality rate is very low and within the expected limits of normal fish husbandry despite meticulous care. In contrast, there were a total of 231 mortalities or 54.2% of the total number of APS Process II fish transferred to seawater in the subpopulation weighing less than 15 gm at seawater transfer. All these mortalities occurred in 2 "waves" within the first 60 days after seawater transfer. The first occurred within 20 days of seawater placement and were due to acute osmoregulatory failure. All of these fish were less than 13 gm in body weight. The second group of 138 fish died within the ensuing 40-day interval and accounted for 31% of the total. FIG. 31 compares the body characteristics of these 138 mortalities to the lengths and weights of APS Process II fish at the time of seawater transfer. It is notable that a significant number of these fish displayed significant reductions in body weight (shown in FIG. 31 as solid triangles that are shifted to the right as compared to their respective sizes after seawater placement) and acquired the appearance of osmotically damaged fish that are called "slinks or pinheads" which occurred regularly in larger (60–100 gm) Atlantic salmon smolts. Thus, these data define the lower limit of body size for the successful transfer of APS Process It fish into seawater at 15 gm bodyweight and larger.

Figure 32:
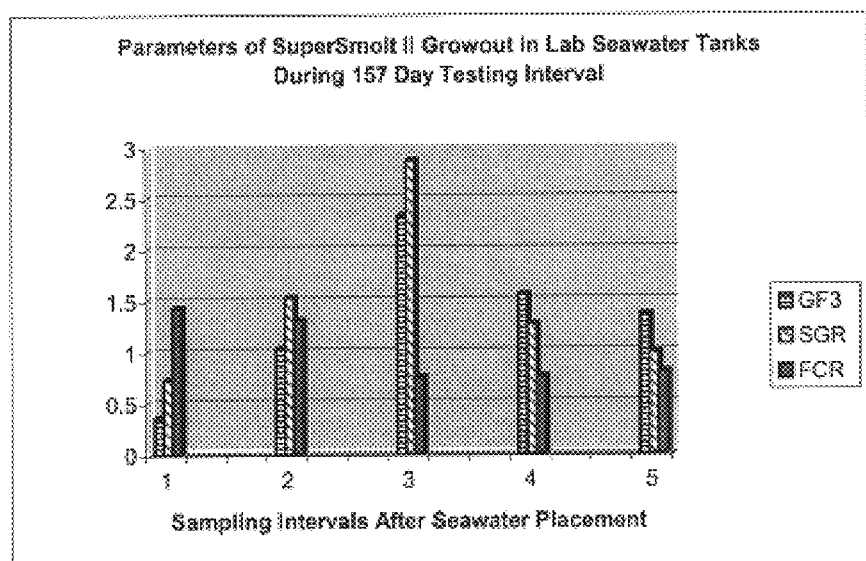
FIG. 32 is a graphical representation showing GF3 (SGR normalized for variation in water temperature), SGR (Specific Growth Ratio), and FCR (Feed Conversion Ratio) of fish in intervals 1–5 after seawater placement.

Table 14 and FIG. 32 show the SGR and GF3 values for surviving APS Process II fish during the 157-day interval where a total of 5 independent measurements were recorded. During this interval, APS Process II fish rapidly increased their body weights greater than 9 fold (15.2 gm to 142.5 gm). Initially, APS Process II fish exhibited only modest SGR/GF3 values for the first 20-day interval after seawater transfer. However, their growth rates then doubled for each of the 2 successive intervals reaching a peak of SGR 2.87/GF3 2.33 that occurred between 60–82 days after seawater transfer. During this interval the fish grew from 31.5 gm to 59.3 gm body weight. Subsequently, the SGR/GF3 values then declined during the last 2 intervals reaching values of an average SGR 0.99/GF3 1.36.

in Table 14 and FIG. 32. FCR values then decreased to average 0.77 for remaining 97 days when fish were fed dry feed containing less than 9% water content. These low FCR values compare favorably with present day industry standard FCR values of larger Atlantic salmon smolts that average 0.9–1.4.

Figure 33:
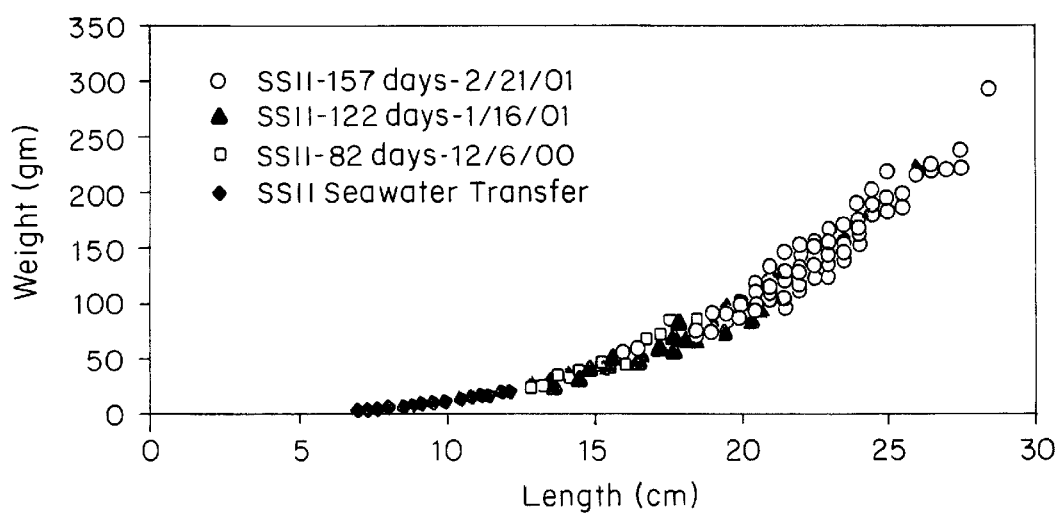
FIG. 33 is a graphical representation showing the body weights (gm) and length (cm) of APS Process II fish after transfer to seawater laboratory tanks.

FIG. 33 shows the progressive increases in body size and length during the last 3 measurement intervals. Note that the largest fish is approximately 300 gm, which represents a minimum growth of over 10 times body weight at seawater transfer. All fish possess an excellent condition factor (k) having gained body weight in proper proportion to linear growth.

Example 13

Comparison of Specific Growth Rates (SGRs), Feed Conversion Ratios (FCR), Daily Feed Consumption Rates and Body Characteristics of Paired Juvenile Atlantic Salmon Weighing Either 20 gm or 40 gm during A 61 Day Interval Where Groups Were Maintained in Either Freshwater or Treated With the APS Process II and Transferred to Seawater The experiments disclosed herein compared the growth performance of juvenile Atlantic salmon that either were: 1) treated with the APS Process II and transferred to seawater or 2) kept in freshwater. These experiments also compared the growth performance of smaller (20 gm) vs. larger (40 gm) APS Process II fish after their transfer to seawater and compared these data to those obtained on matched freshwater controls. The overall conclusion from this 61 day experiment is that both 20 gram and 40 gram juvenile Atlantic salmon can be successfully transferred to seawater. In contrast to what would be predicted by present day industry standards where the smaller 20 gram fish would suffer a worse outcome as compared to the larger 40 gram fish and where both would perform in a significant inferior manner as compared to larger 80–100 gm standard fish, these data described below show that 20 gram fish performed comparably to both 40 gram fish. These data provide further evidence that both 20 gram and 40 gram fish can be transferred to seawater after treatment with APS Process II despite the fact that their body sizes are approximately ⅕ and ⅖ of the critical size as defined by present day industry standard methods. These data also show that both 20 gm and 40 gm APS Process H fish achieve SGRs, FCRs and growth in body characteristics equal or superior to conventional larger industry standard smolt after seawater transfer. As measured by SGR and FCR criteria, the 20 gm APS Process H fish outperformed the larger 40 gm APS Process II group. However, both 20 gm and 40 gm APS Process II fish exhibit initially inferior SGRs, FCRs and body weights as compared to matched controls that remain in freshwater. This temporary reduction in performance is only during the initial interval of their adaptation to seawater. Notably, these APS Process II fish achieve marked improvements in SGR, FCR and body weights immediately following this 61 day interval that provide for extremely rapid growth in seawater as shown in Example 12.

Specific conclusions from these data include:
1. Both 20 gm and 40 gm APS Process II fish were transferred to seawater and fed only 4 days of moist feed (30% moisture content) and then fed dry feed (<9% water content) for the remainder of the experiment. These data further demonstrate the value of APS Process II since normally present day industry standard fish in the Northeastern portion of North America are fed moist feed for approximately 14–30 days.
2. The average 61 day SGRs for 20 gm and 40 gm APS Process II fish after their transfer to seawater were 65% and 57% of the SGR values achieved by matched controls that remained in freshwater respectively. APS Process II fish weighing 20 gm at the time of seawater transfer displayed the larger average SGR as compared to their larger 40 gm counterparts.
3. The SGRs achieved by 20 gm and 40 gm APS Process II fish increased by 58% and 36% respectively during the second 30-day interval as compared to the first 30-day interval reflecting adaptation to the new seawater environment.
4. As the result of their lower SGRs, the average final body weight achieved by the 20 gm APS Process II fish after seawater transfer was 73.4% of the value attained by their matched freshwater controls. Similarly, the average final body weight achieved by larger APS Process II fish was 71.0% the value of their matched controls. These data show that smaller APS Process II fish exhibited a similar degree of growth as compared to their larger 40 gm counterparts.
5. The average FCR of smaller 20 gm APS Process II fish was comparable to that displayed by the larger 40 gm APS Process II fish during the entire 60 day interval after seawater transfer.
6. Both 20 gm and 40 gm APS Process II fish fed immediately when offered food 48 hr after seawater transfer. However, both sizes of APS Process II fish exhibited an interval of approximately 25–30days of depressed feeding after their seawater transfer as compared to matched freshwater controls. This reduction in APS Process II daily feed consumption was subsequently equalized with that of freshwater controls for the remaining 30–35days of the testing interval.

Description of Experimental Protocol: These series of experiments were designed to test whether smaller (20 gm body weight) juvenile Atlantic salmon exhibit deleterious effects from placement in seawater (SW) after the APS Process II as compared to either control fish of identical size maintained in freshwater (FW) or larger juvenile Atlantic salmon (40 gm) that were either maintained in freshwater or transferred to seawater in a manner identical to their smaller 20 gm counterparts. To quantify any alterations in growth and feed utilization, a combination of growth rates, FCR, daily food consumption as well as body weights, lengths and condition factors were measured for each group. All of the 4 groups that were studied were derived from a single hatch of St. John/St. John fish and were treated as follows:
1. Medium sized 40 gm Control fish maintained in FW for the 103-day interval and fed standard dry feed except for the 4 days that their APS Process II counterparts received moist feed and they received identical feed preparations. For their last 61 days in FW, SGR, FCR and daily food consumption was measured (n=84).
2. Small sized 20 gm Control fish maintained in FW for the 103 interval in a manner identical to that described in #1 for their 40 gm counterparts (n=51).
3. Medium sized 40 gm APS Process II fish exposed to the APS Process II for an interval of 42 days then transferred to seawater fed moist feed for 4 days and then switched dry feed and maintained for 61 days (n=99).
4. Small sized 20 gm APS Process II fish exposed to the APS Process n for an interval of 42 days then transferred to seawater, fed moist feed for 4 days and then switched to dry feed and maintained for 61 days (n=80).

Each group of fish was kept in individual 1-meter circular tanks with corresponding biofilter to ensure that water quality was maintained at identical high standards and thus did not contribute to variability within the experiment. All fish were fed identical food rations with the exception of APS Process II fish during the 42 day APS Process II itself where food contained 7% NaCl and 2gm of tryptophan /kg of feed. All 4 groups were exposed to a continuous photoperiod for the duration of the experiment.

All 4 groups of fish were weighed and measured upon the transfer of Groups #3 and #4 to seawater and 2 intervals of approximately 30 days thereafter.

Results

Figure 34:
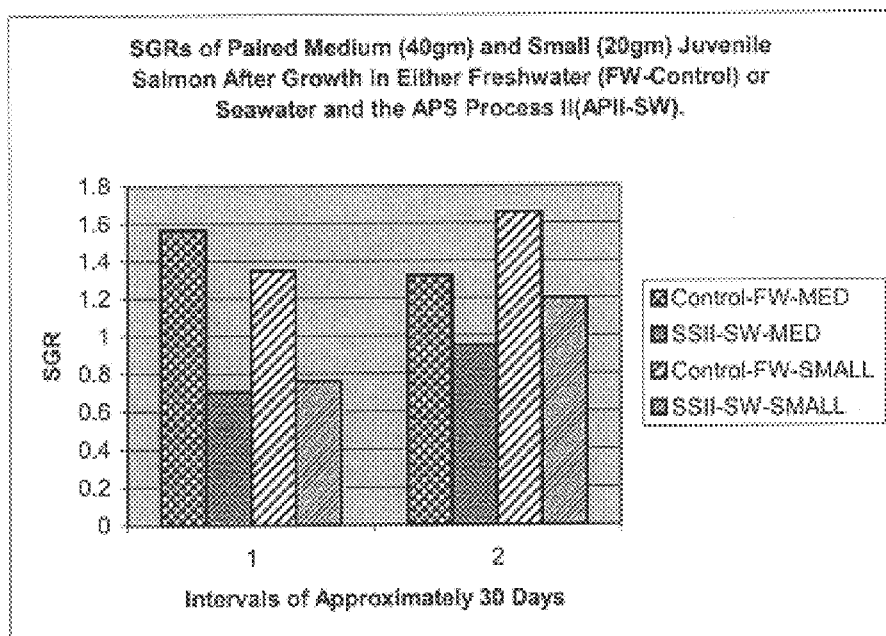
FIG. 34 is a graphical representation showing the SGR over 30 day intervals of medium (40 gm) and small (20 gms) juvenile salmon after growth in freshwater (FW-Control) or growth after being subjected to the APS Process II and transferred to seawater (APII-SW).

Comparison of Specific Growth Rates (SGRs) Exhibited by Each Group During the 61-Day Test Interval FIG. 34 compares the SGRs during 2 consecutive 30-day intervals for 20 gm and 40 gm juvenile Atlantic salmon either treated with the APS Process II and transferred to seawater or continuously maintained in freshwater.

The SGRs for both 20 gm and 40 gm fish maintained continuously in freshwater were larger than either of their paired APS Process II counterparts in seawater. The average 60-day SGR for freshwater 20 gm and 40 gm fish were 1.51 and 1.45 respectively. In contrast, the SGRs for 20 gm and 40 gm APS Process II fish after transfer to seawater were 65% (0.98) and 57% (0.83) of these freshwater values respectively. The lower SGR values exhibited by both 20 gm and 40 gm APS Process II fish reflect their adaptation to seawater during this initial 60 day interval. The increasing adaptation to seawater is reflected by increases in the SGRs for both 20 gm and 40 gm APS Process II fish of 58% and 36% respectively during the second 30 day interval as compared to the first. As shown in Example 12, SGRs values for APS Process II fish in seawater significantly increase over the next 60 day interval to values nearly double those shown here. These data show that the 20gin APS Process II fish displayed a larger SGR as compared to their 40 gm counterparts under identical seawater transfer conditions.

Figure 35:
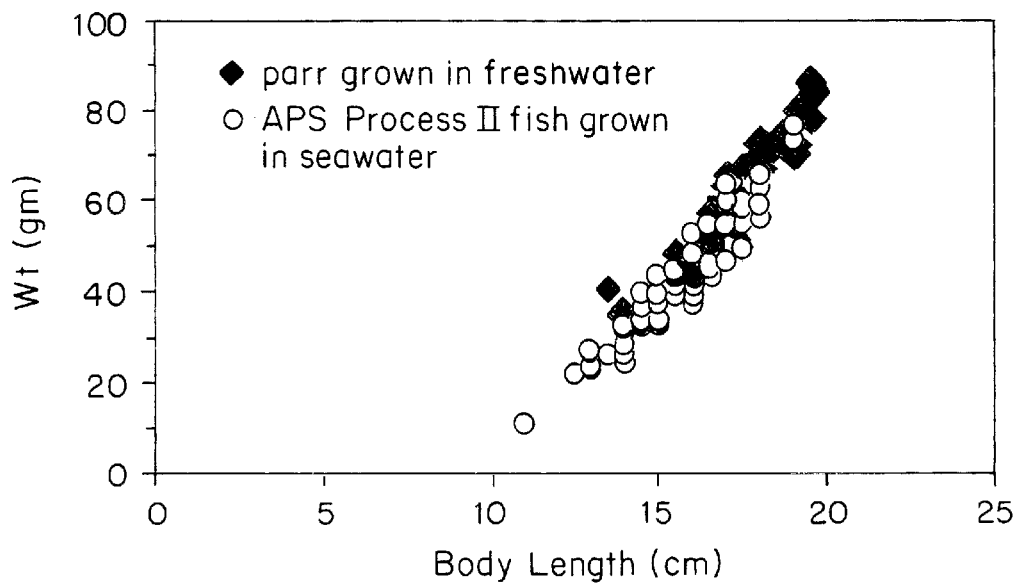
FIG. 35 is a graphical representation showing the body weights (gm) and length (cm) of parr grown in freshwater (solid diamonds) and APS Process II fish grown in Seawater (open circles) both weighing 20 gm at placement and drawn for an interval of 62 days.
Figure 36:
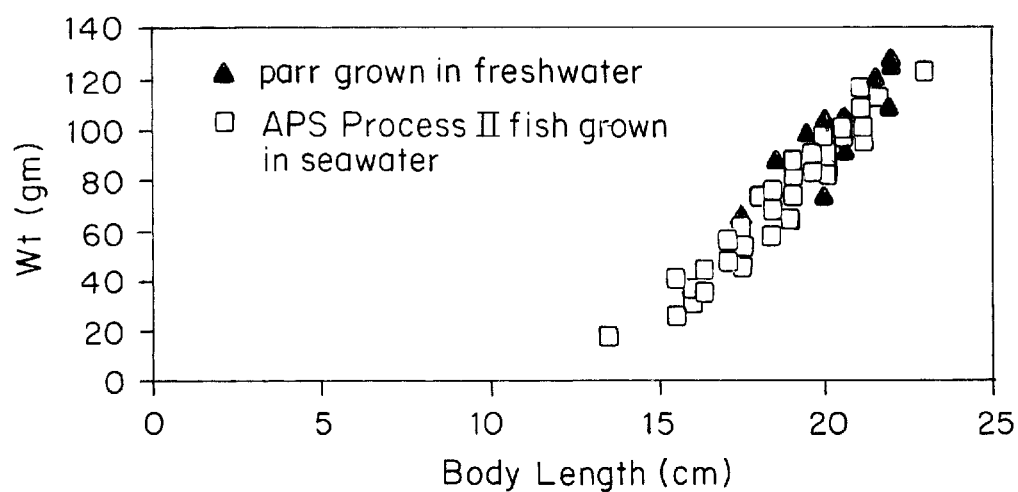
FIG. 36 is a graphical representation showing the body weights (gm) and length (cm) of parr grown in freshwater (solid triangles) and APS Process II fish grown in Seawater (open squares) both weighing 40 gm at placement and grown for an interval of 62 days.

As a result of their larger SGRs, the average body weights and lengths of freshwater juvenile salmon were significantly (p<0.05) larger than corresponding values achieved by APS Process II fish during the 61-day test interval. As shown in Table 15 as well as FIGS. 35 and 36, the average final body weight achieved by the smaller APS Process II fish after seawater transfer at 20 gm was 73.4% of the value attained by their matched freshwater controls. Similarly, the larger APS Process II fish transferred at 40 gm bodyweight and grown in seawater achieved only 71.0% of the average body weight attained by their matched controls. Taken together, these data show that both smaller and larger APS Process II fish exhibited a similar degrees of growth during the initial 61 days after seawater placement despite the fact that the smaller 20 gm fish were one half the size of their larger 40 gm counterparts. As described in Example 12, continued growth of APS Process II fish in seawater during a subsequent 60 day interval resulted in SGRs that were 1.5–2.5 times those shown in FIG. 34.

TABLE 15

Comparison of the body characteristics of 4 groups of juvenile Atlantic salmon with initial body weights of either 20 gm or 40 gm grown for 61 days in either freshwater or seawater after exposure to the APS Process II (APII).

| Initial Body Weight | Growout Condition | Final Body Characteristics After 61 Days of Growout | | |
|---|---|---|---|---|
| | | Weight (gm) | Length (cm) | Condition Factor |
| 20 gm | Freshwater | 60.5 ± 13.3 | 17.1 ± 1.5 | 1.2 ± 0.1 |
| | APII-Seawater | 44.4 ± 12.5 | 15.7 ± 1.5 | 1.1 ± 0.1 |
| 40 gm | Freshwater | 92.3 ± 12.8 | 19.9 ± 1.0 | 1.2 ± 0.1 |
| | APII-Seawater | 71 ± 19.5 | 18.6 ± 1.5 | 1.1 ± 0.1 |

Figure 37:
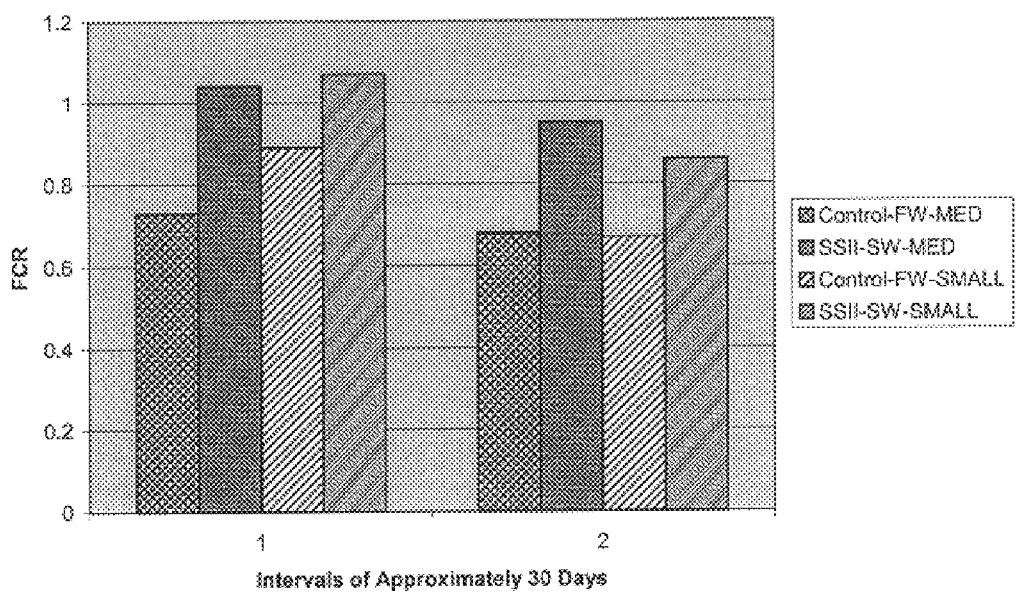
FIG. 37 is a graphical representation showing FCRs over intervals of 30 days of Paired Medium (40 gm) and Small (20 gm) Juvenile Salmon after growth in either Freshwater (FW-Control) or Seawater after treatment with APS Process II (APII-SW).

Comparison of Feed Conversion Ratios (FCRs) Exhibited by Each Group During the 61-Day Test Interval FIG. 37 shows FCR data for both freshwater and APS Process II seawater groups for 2 consecutive 30 day intervals. First, both 20 gm and 40 gm APS Process II fish tolerated well the abrupt switch from moist to dry feed. Even larger present day industry standard smolts weighing 100 gm or more would not tolerate this rapid reduction in oral water supplementation.

However, these data show that both 20 gm and 40 gm APS Process II fish were less efficient at converting food energy into increases in body weight during the 60 day interval after seawater transfer as compared to their matched controls grown in freshwater. This less efficient conversion of food into biomass by APS Process II fish reflects their initial 30-day interval of adaptation to seawater that improved for both sizes of APS Process II fish during their second 30-day interval. Nevertheless, the average FCR of smaller 20 gm APS Process II fish (FCR (60 Day) 0.97) was comparable to that displayed by the larger 40 gm APS Process II fish (FCR (60day) 1.0) during the entire 60 day interval after seawater transfer. However, both groups of APS Process II fish exhibited larger FCRs as compared to matched controls grown in freshwater and fed identical food rations (20 gm Freshwater—FCR (60 Day) 0.78; 40 gm Freshwater—FCR (60 Day) 0.71). These data are consistent with data disclosed in Example 12 in which the APS Process II fish achieve highly desirable FCRs of less than 0.8 only after 60 days post seawater transfer.

Figure 38:
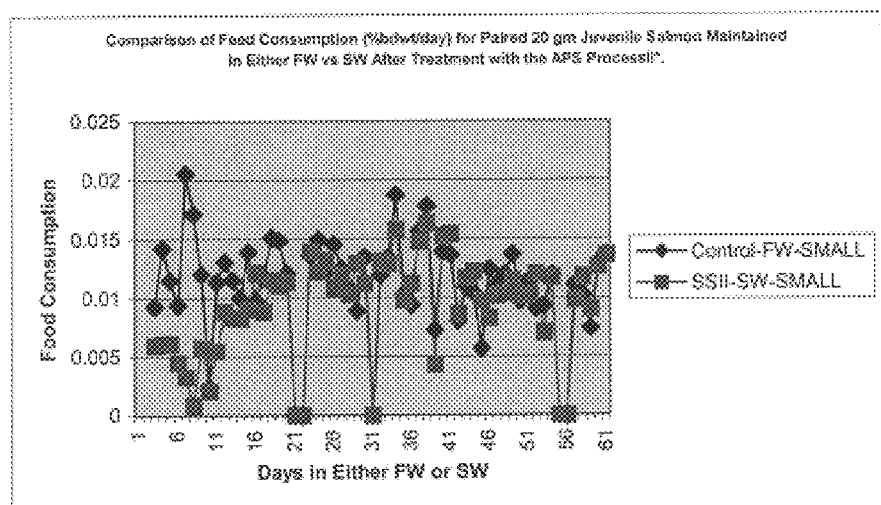
FIG. 38 is a graphical representation showing Food Consumption (%bdwt/day) over 61 days for paired 20 gm juvenile salmon maintained in either FW or SW after treatment with the APS Process II.
Figure 39:
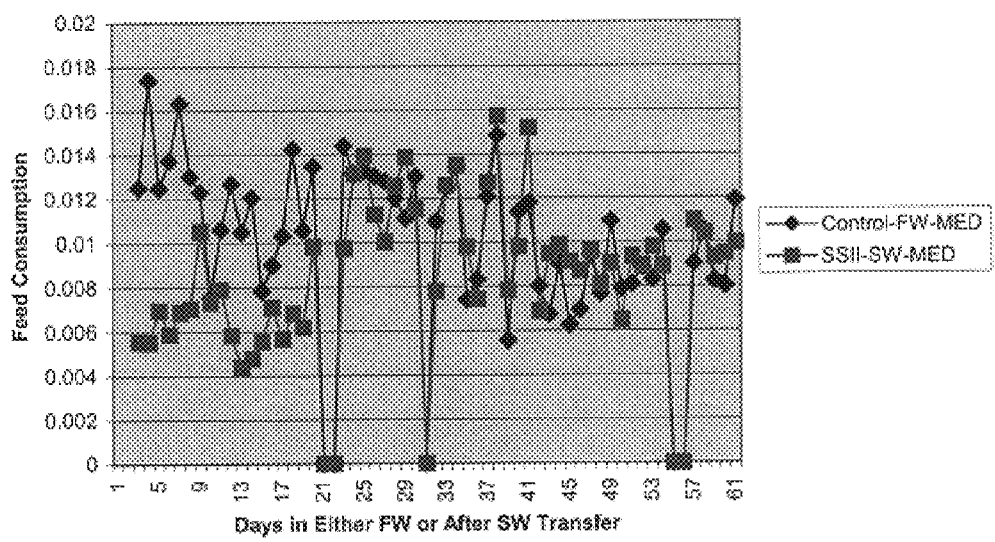
FIG. 39 is a graphical representation showing Food Consumption (%bdwt/day) over 61 days for paired 40 gm juvenile salmon maintained in either FW or SW after treatment with the APS Process II.

Comparison of Daily Feed Intakes Exhibited by Each Group During the 61-Day Test Interval FIGS. 38 and 39 show daily food consumption expressed as % body weight per day achieved by each of the 4 groups of juvenile salmon. These fish were not offered food until 48 hr after transfer to seawater and were not fed on days #21,22,31,32,55 and 56 during the 61-day test interval. As shown in FIG. 38, APS Process II fish with a 20 gm transfer weight began to feed immediately when offered food on day 3 albeit at a reduced rate as compared to matched controls in freshwater. While food intake variety widely on a daily basis (previously documented and widely accepted as normal for aquacultured fish), these data suggest that the food consumption of APS Process II fish did not reach levels equivalent to those displayed by matched freshwater controls until approximately 25–30 days after seawater transfer.

FIG. 39 compares the food consumption of APS Process II fish weighing 40 gm at transfer to seawater vs. matched controls remaining in freshwater. In a manner similar to that exhibited by 20 gm APS Process II fish, 40 gm APS Process II fish also required at least 25 days to consume food at rates that were identical to their freshwater counterparts. These data provide further documentation of the remarkably short duration of depressed feeding of APS Process II fish after seawater transfer as compared to much larger 100 gm present day industry standard Atlantic salmon smolts that exhibit no food intake for 20 days or more after their transfer to seawater.

These data are consistent with a role of PVCR proteins present on various organs that play key roles in the sensing and utilization of food nutrients. As shown in Examples 3–6, these tissues include: olfactory lamellae, olfactory nerve and olfactory lobe (sensing salinity and nutrients), gustatory brain nuclei including vagal lobe and accessory nucleus of Cajal (regulation of gut motility and appetite) as well as epithelial and neuroendocrine cells located in the juvenile salmonid's stomach, pyloric caeca, proximal and distal intestine (processing and absorption of food nutrients). Thus, APS Process II modulates the expression and/or sensitivity of these PVCRs and thereby improves both the food intake and utilization by fish after their transfer to seawater from freshwater.

Example 14

Comparison of Seawater Transfer and Growth of Large 90–100 gm Industry Standard Atlantic Salmon Smolts When Treated with Either the APS Process I or APS Process II These data compare the seawater survival and initial growth rates of larger (90–100 gm) fast growing Atlantic salmon smolts that were exposed to 6 weeks of either the APS Process I or APS Process II. These data show that both the APS Process I or II treated fish grew at identical rates over a 37 day interval after seawater transfer. Both groups had identical low post seawater transfer mortality rates. The data show that application of the APS Process II to larger (90–100 gm) Altantic salmon produces post seawater mortalities and growth rates comparable to those displayed when identical fish are treated with the APS Process I.

Description of Experimental Protocol: A single group of large fast growing juvenile Landcatch/St John Atlantic salmon weighing approximately 90 gm was purchased from a commercial producer (Atlantic salmon of Maine), divided into 2 equal size groups matched for length and weight and each were treated for 6 weeks in separate tanks with either the APS Process I or APS Process II. Individual fish in each group were then tagged after obtaining their lengths and weights and then transferred to a single large laboratory seawater tank. After 37 days of growth in seawater where all fish received a dry (<9% water content) seawater diet, fish were measured and SGR calculated using a standard formula.

Results: Table 16 compares the average body weights, lengths and condition factors (k) of smolts treated with either APS Process I or APS Process II immediately prior to their seawater transfer vs after 37 days of seawater growout. These data show that there were no significant differences between the body characteristics of smolts treated with either APS Process I or APS Process II prior to seawater transfer. Both APS Process I and APS Process II fish exhibited a combination of low mortalities 2–3% and significant growth in body weight (approximately 30%) and length (approximately 9–10%) after 37 days of seawater growout. However, when the body weights of APS Process I vs APS Process II fish after 37 days of seawater growout were compared there was no significant difference, indicating that each group of fish had grown a similar amount (SGR of APS Process I=0.80 vs SGR of APS Process II=0.86).

TABLE 16

Comparison of Body Characteristics of Larger Atlantic Salmon Smolt Treated with Either APS Process I or APS Process II and Grown in Seawater for 37 Days.

|  | APS Process I | APS Process II | P value* |
|---|---|---|---|
| Seawater Transfer | n = 60 | n = 60 |  |
| Weight | 97.2 ± 24.2 | 94.2 ± 18.1 | 0.19 |
| Length | 22.1 ± 1.67 | 21.6 ± 1.3 | 0.5 |
| Condition Factor | 0.89 + 0.09 | 0.93 ± 0.065 | 0.6 |
| Post 37 Day Seawater | n = 58 | n = 59 |  |
| Weight | 130.3 ± 36.5 | 123.7 ± 35.8 | 0.16 |
| Length | 23.9 ± 1.87 | 23.7 ± 1.8 | 0.8 |
| Condition Factor | 0.93 ± 0.12 | 0.91 ± 0.13 | 0.4 |
| P value# | <0.01 | <0.01 |  |
| SGR | 0.86 | 0.80 |  |

P value*: compares weights, lengths and k of APS Process I vs APS Process II
P value#: compares weights of seawater transfer vs after 37 day seawater growout for a single type of Fish subjected to APS Process I or APS Process II.

Figure 40A:
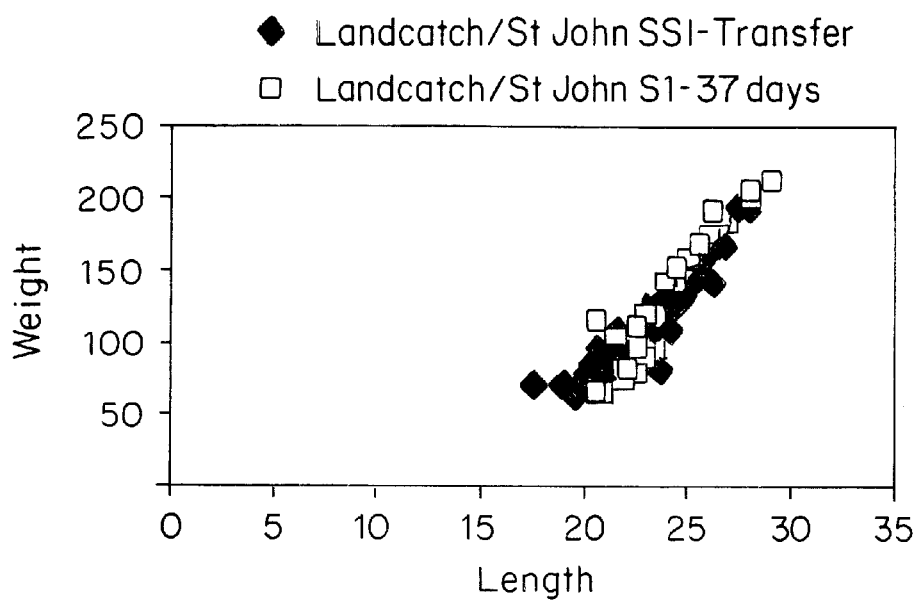
FIGS. 40A–B are graphical representations showing the body weight (gm) and length (cm) of salmon that were subjected to either the APS Process I (FIG. 40A) or APS Process II (FIG. 40B). Each group (n=60) of fish were measured immediately prior to transfer to seawater (solid diamonds) and after 37 days of seawater growout (open squares).
Figure 40B:
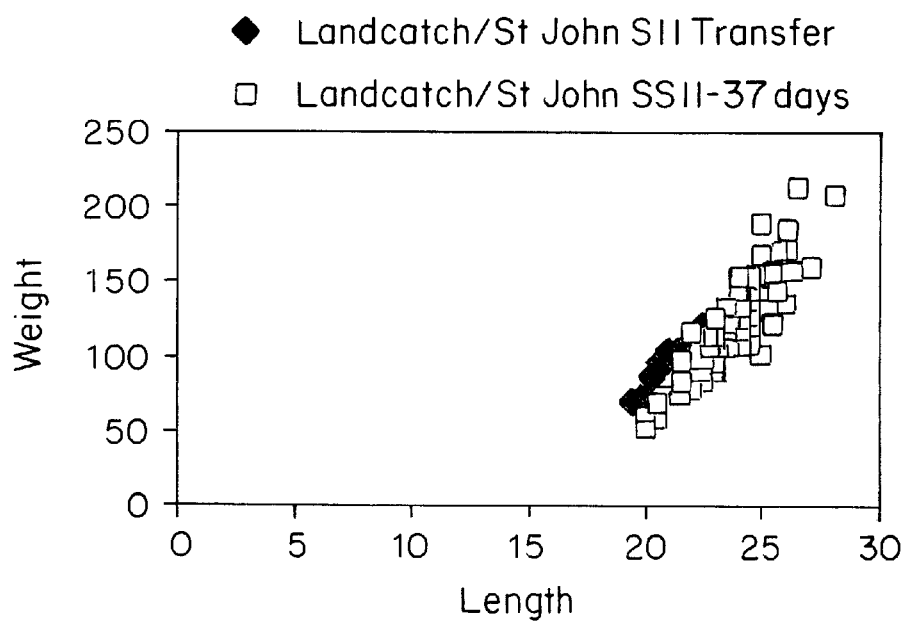

FIGS. 40A–B compare the weights and lengths of fish treated with either the APS Process I or APS Process II before seawater transfer vs after 37 days of seawater growout. These data show that fish belonging to both the APS Process I and APS Process II groups grew and maintained similar desirable condition factors (k—See Table I) during this 37 day interval of seawater growout. Taken together, these data show that application of the APS Process II to larger (90–100 gm) Altantic salmon produces post seawater mortalities and growth rates during the initial 37 days after seawater transfer that are comparable to those displayed when identical fish are treated with the APS Process I.

Example 15

Comparison of Seawater Transfer and Growth of Large Industry Standard Atlantic Salmon Smolts (100–75 gm) in Ocean Netpens After Treatment with the APS Process I or Subject to Present Day Farming Methods Fish treated with the APS Process I and paired controls treated with industry standard methods were studied for a total of 185 days after seawater placement of APS treated fish. it A total of 3 major conclusions were obtained each of which demonstrate the value and utility of the APS Process I:

1. Removal of the constraint of the conventional "smolt window": The mortalities observed after ocean net pen placement were low in APS smolt (6.1%) despite the fact that these fish were transferred to seawater 1.5 months after the smolt window and into a very high (15.1° C.) ocean water temperature. The mortality of APS smolt is similar to those of Industry Standard smolt (3.3%) transferred to cooler (10° C.) seawater during the smolt window that was 64 days earlier. This characteristic of APS treated smolts provides for a greater flexibility in freshwater hatchery operations since placement of APS smolt are not rigidly defined the conventional "smolt window" current used in industry practice.

2. Faster growth during interval after seawater transfer due to reduction or elimination of osmotic shock: The APS smolt were in peak condition during and immediately after seawater transfer. Unlike industry standard smolt that required at least 20 days to reach full feeding, the APS smolt fed vigorously within 48 hours. Moreover, the initial growth rates displayed by APS smolt is significantly larger than both published data for standard smolt during their initial 50 days after seawater placement as well as ANY SGR exhibited by their industry standard counterparts during the entire 185 day testing interval. As a result, APS smolts came close to achieving an identical average size to Industry Standard smolt despite the fact that the industry standard smolt were both 25% larger at the time of seawater placement as well as the fact that they had 64 days of additional time in seawater. These data provide evidence that the APS smolt were not subjected to significant osmoregulatory stress, which would prevent them from feeding immediately.

3. Reduction in time to achieve a market size salmon: The rapid growth of smolts treated with the APS Process I during the 96 day interval immediately after ocean net pen placement provides for compounding increases in the size of salmon as seawater growout proceeds. Thus, it is anticipated that these fish treated with the APS Process I if placed during the normal smolt window would reach market size as much as 7 months earlier as compared to industry standard fish grown at that same netpen site.

Description of Experimental Protocol: The experimental design including the characteristics of both APS Process I treated and Industry Standard Control groups is detailed in Example 2. The initial data for seawater transfer as well as specific growth rates (SGR) for APS Process I treated and Controls are provided on Tables 2–4.

Results: Table 4 provides data on the SGRs of both APS Process I treated and Control fish after 51 and 115 day of seawater growout. These identical studies have been extended as shown on Table 17 below.

TABLE 17

Summary Table of the Characteristics of St. John S1 Smolt Subjected to APS Process I Treatment vs Corresponding Industry Standard Smolts After Growth in Netpens.

|  | APS | Industry Standard Control |
|---|---|---|
| Total Fish | 10,600 | 150,577 |
| Mean Date of Seawater Transfer | 6/26/00 | 5/7/00 |
| Average Size at Transfer (gm) | 76.6 | 95.8 |
| Mortalities after 30 days (# and % total) | 648; 6.1% | 5,016; 3.3% |

TABLE 17-continued

Summary Table of the Characteristics of St. John S1 Smolt Subjected to APS Process I Treatment vs Corresponding Industry Standard Smolts After Growth in Netpens.

|  | APS | Industry Standard Control |
|---|---|---|
| Analysis #1 Data (8/17/00) | | |
| Interval between Netpen Placement and Analysis #1 | 51 days | 115 days |
| Average Weight (gm) | 175.48 ± 50 | 327.2 ± 97 |
| Specific Growth Rate (SGR) | 1.80 | 1.09 |
| Analysis #2 Data (10/1/00) | | |
| Interval between Analysis #1 And Analysis #2 | 45 days | 45 days |
| Average Weight (gm) | 335.3 ± 42 | 457.2 ± 62 |
| Specific Growth Rate (SGR) | 1.44 | 0.744 |
| Analysis #3 Data (1/2/01) | | |
| Interval between Analysis #2 And Analysis #3 | 90 days | 90 days |
| Average Weight (gm) | 618.9 ± 203.8 | 859.3 ± 231.7 |
| Specific Growth Rate (SGR) | 0.68 | 0.70 |

Despite the fact that smolts treated with the APS Process I were transferred to seawater 1.5 months after the optimal time i.e. the "smolt window" and into a very high (15.1° C.) ocean water temperature, their mortality was similar to those of Industry Standard smolt (3.3%) transferred to cooler (10° C.) seawater during the smolt window. This capability of APS Process I treated smolts provides for greater flexibility in salmon farming operations since seawater transfer of APS Process I treated smolt are no longer rigidly defined by the conventional "smolt window".

Figure 42:
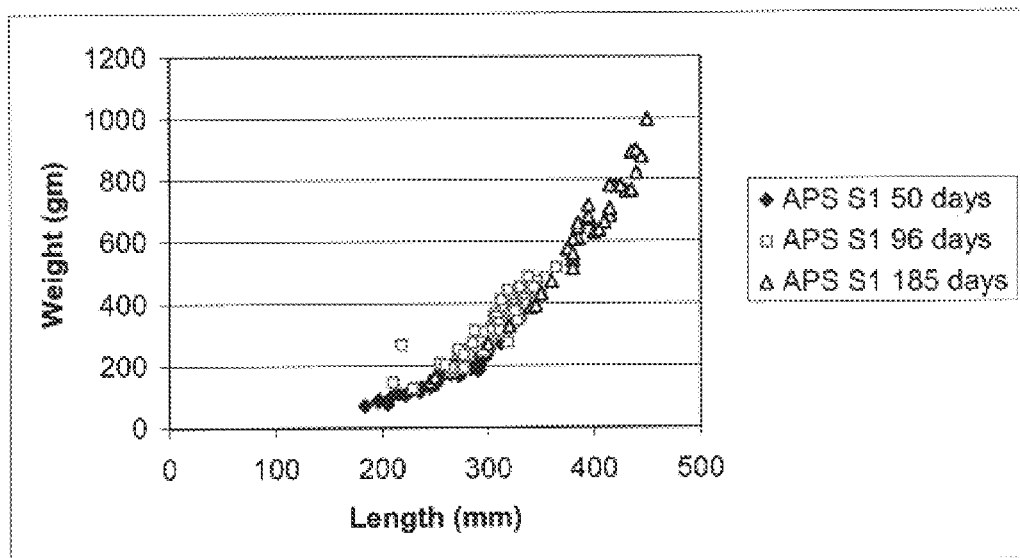
FIG. 42 is a graphical representation showing the body weights (gm) and length (mm) of salmon subjected to APS Process I and transferred to seawater.

Data provided on Table 17 and FIGS. 6A and 42 show that smolt treated with the APS Process I exhibited larger SGRs and increased food consumption as compared to industry standard controls especially during the initial 96 day interval after seawater transfer. The overall decreasing trend of SGR's for both APS Process I treated and Control fish is well described and due primarily to the seasonal decrease in photoperiod during intervals #2 and #3 as summer extends to fall. As shown in FIG. 6A, food consumed by APS Process I fish during the initial 7 day interval after seawater placement was approximately twice as large on a per fish basis as compared to industry standard smolts 30 days after their transfer to seawater.

Figure 41:
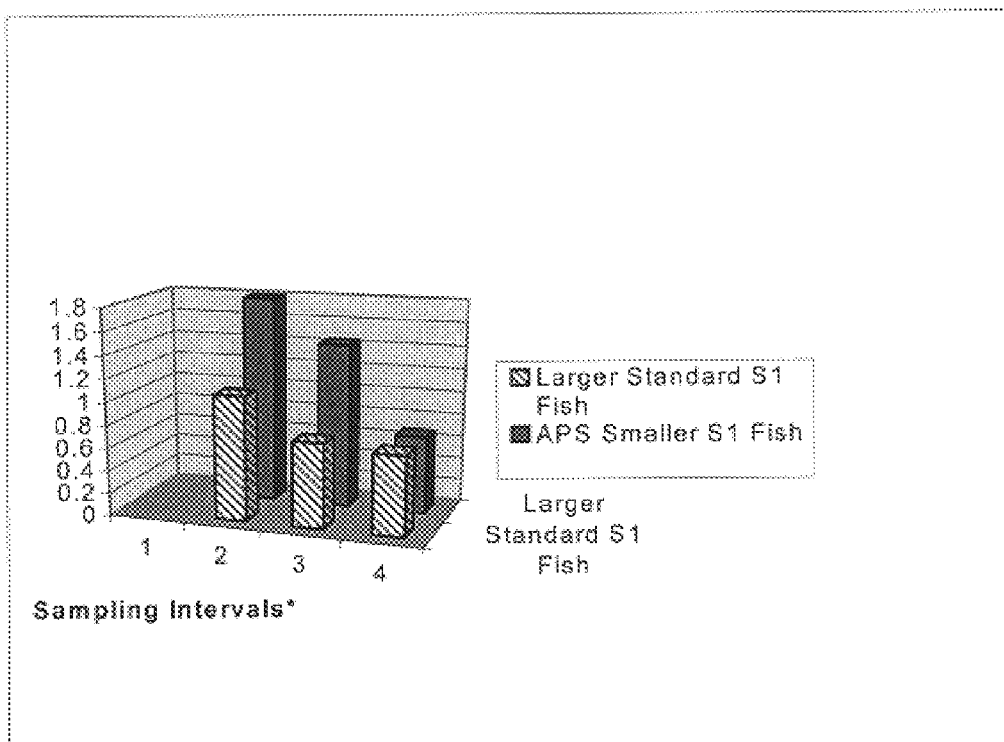
FIG. 41 is a graphical representation showing the SGR of smaller (average wt 76.6 gm) Atlantic salmon smolt treated with the APS Process I or larger industry standard smolt (average wt. 95.8 gm) after seawater transfer. Note larger SGR of APS Process I fish during the interval immediately after seawater transfer despite the fact that Control fish had been transferred to seawater 64 days earlier.

FIG. 41 provide a graphical comparison of SGRs of APS Process I treated fish vs. Control. The average SGR of APS Process I treated fish was 80–90% larger during the initial 64 day interval after their seawater transfer as compared to Industry Standard smolt. This larger SGR value is even more significant due to the fact that APS Process I treated fish were approximately 80% the size of larger Industry Standard smolt that had been transferred to seawater 64 days earlier. It is generally accepted that both of these factors (smaller body size at time the seawater transfer and less time to acclimate to seawater) tend to markedly depress SGR values. These data demonstrate that Atlantic salmon smolts that are treated with the APS Process I do exhibit larger growth rates as compared to Control fish after seawater transfer.

Figure 43:
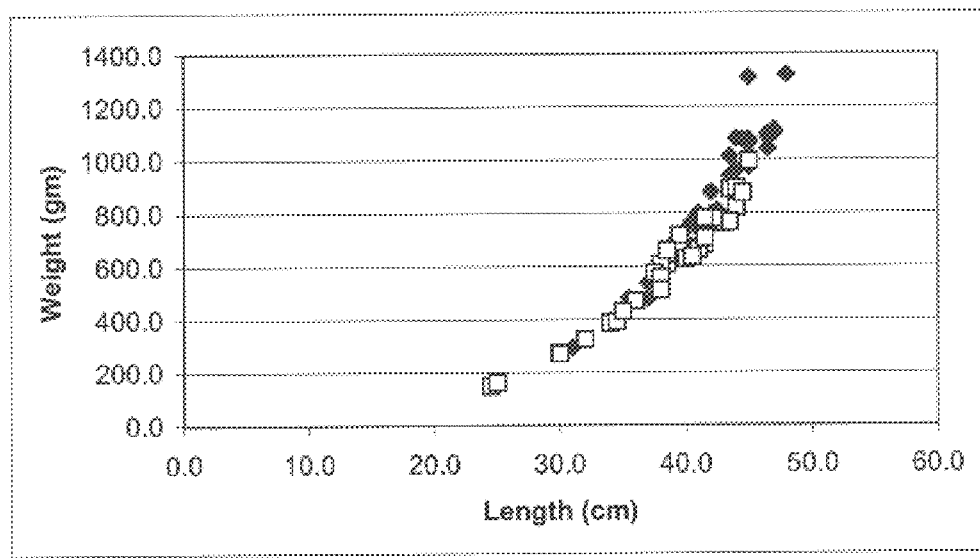
FIG. 43 is a graphical representation showing the body weights (gm) and length (cm) of industry standard smolt (shown in solid red diamonds) and smolt treated with the APS Process I (shown in blue open squares) after growth in ocean netpens. Note that APS smolt both began as smaller fish and were placed in seawater 64 days after the corresponding control smolt.

FIG. 42 shows increases in both body weight and length of smolt treated with the APS Process I after their transfer to seawater. Note that these fish treated with the APS Process I experienced an 8-fold increase in body weight during this 185 day interval. As a result, APS smolts (open squares in FIG. 43) came close to achieving an identical average size to Industry Standard smolt (solid diamonds) despite the fact that these industry standard smolt were both 25% larger at the time of seawater placement as well as the fact that they had 64 days of additional time in seawater (FIG. 43). These data provide evidence that the APS smolt were not subjected to significant osmoregulatory stress, which would prevent them from feeding immediately and growing rapidly.

As shown in FIG. 43, the rapid growth of smolts treated with the APS Process I during the 96 day interval immediately after ocean net pen placement provides for compounding increases in the size of salmon as seawater growout proceeds. For example, if these APS Process I fish were both the same average size (95.8 gm) as these Industry standard smolt and placed in seawater at the same time, they would weigh 1,620 gm instead of the 859 gm achieved by Industry standard fish in the current testing interval. Thus, these fish treated with the APS Process I would reach market size as much as 7 months earlier as compared to industry standard fish grown at that same netpen site.

Example 16

Growth of Juvenile Atlantic Salmon Possessing an Average Body Weight of 26.6 gm after Treatment with the APS Process I and Transfer to Seawater Laboratory Tanks for an Interval of 84 Days These data show that juvenile Atlantic salmon with an average body size of approximately 30% of industry standard S1 smolt can successfully accomplish a transfer from freshwater to seawater after a 6 week treatment with the APS Process I. However, like larger industry standard smolt, these APS Process I fish undergo a significant 61 day interval of little or no growth followed by significant increases in SGR accompanied by decreases in feed conversion ratios or FCRs.

Description of Experimental Protocol: As described in Example 2, Landcatch/St. John Atlantic salmon were treated with the APS Process I and then transferred to circular tanks containing seawater within the APS laboratory. Forty eight hours after sea water transfer, APS Process I fish were begun on standard moist (38% moisture) smolt feed (Connors Bros.) that had been re-pelletized due to the necessity to provide for smaller size feed for smaller APS Process I fish as compared to normal industry salmon. The mortality, feed consumption, growth and overall health of these 108 APS Process I weighing 26.6 gm were monitored closely, as described in Example 2.

Results: A total of 108 from the 140 APS Process I fish that are listed on Table 5 were closely monitored for a total of 84 day. The remaining 32 fish from this group were utilized in other experiments not reported here.

As shown on Table 18, the overall mortality of these APS Process I fish were 18/108 or 16.6%. The mortality rates amongst fish weighing less than 15 gm were somewhat larger (11/108) as compared to fish weighing greater than 15 gm (7/108). Growth rates for these APS Process I fish were poor (SGR 0.375) for initial 61 days after seawater when these fish were fed moist feed (38% moisture content). However, the average SGR for these fish improved during the last 23 day interval when APS Process I fish were fed standard dry feed (<10% moisture content). Similarly, the feed conversion ratio (FCR) of APS Process I fish were poor (FCR(av)=4.19) during this initial 61 day interval after seawater transfer but improved significantly during the last 23 day interval (FCR 0.89). These data are similar to those exhibited by larger (100 gm) smolt transferred to seawater using present day conventional techniques where a prolonged intervals of poor feeding and slow growth have been reported.

enhance the survival of juvenile Atlantic salmon during the initial 72 hr interval after seawater transfer were measured. The data disclosed here demonstrate that inclusion of Tryptophan in the diet of juvenile Atlantic salmon is significantly

TABLE 18

Summary of Data From APS Process I Landcatch/St John Smolts After Growth in APS Laboratory Tanks.

|  |  | % Mortality During Interval | | % Total |
| --- | --- | --- | --- | --- |
| Number of Fish | 108 | Less Than | Greater Than | Mortality |
| Weight at Placement into Seawater | 26.6 | 15 gms | 15 gms |  |
| Analysis #1 (10/3/00) | | | | |
| Days in Seawater | 22 | | | |
| Placement Weight Corrected for Mortalities | 26.75* | | | |
| Weight after Interval in Seawater | 30.31 | | | |
| Weight Gained in Seawater* | 3.56 | | | |
| SGR (% body weight/day) | 0.57 | | | |
| FCR corrected for 30% $H_2O$ content | 1.20 | | | |
| *Weight gain corrected for selective mortalities amongst smaller fish | | 1/108 or 0.9% | 1/108 or 0.9% | 1.8% |
| Analysis #2 (11/12/00) | | | | |
| Days in Seawater Since Analysis #1 | 39 | | | |
| Placement Weight Corrected For Mortalities | 31.37* | | | |
| Weight after Interval in Seawater | 33.90 | | | |
| Weight Gained in Seawater* | 2.53 | | | |
| SGR (interval Analysis #1 to Analysis #2) | 0.18 | | | |
| FCR corrected for 30% $H_2O$ content | 7.18 | | | |
| (interval Analysis #1 to Analysis #2) | | | | |
| *Weight gain corrected for selective mortalities amongst smaller fish | | 6/106 or 56% | 5/106 or 4.7% | 12.0% |

| Analysis #3 (12/06/00) | | | | |
| --- | --- | --- | --- | --- |
| Days in Seawater Since Analysis #1 | 23 | | | |
| Placement Weight Corrected For Mortalities | 35.04* | | | |
| Weight after Interval in Seawater | 49.07 | | | |
| Weight Gained in Seawater* | 14.03 | | | |
| SGR (interval Analysis #2 to Analysis #3) | 1.45 | | | |
| FCR Fish placed on dry feed (interval Analysis #2 to Analysis #3) | 0.89 | | | |
| *Weight gain corrected for selective mortalities amongst smaller fish | | 4/95 or 4.2% | 1/95 or 1% | 16.7% |

Figure 44:
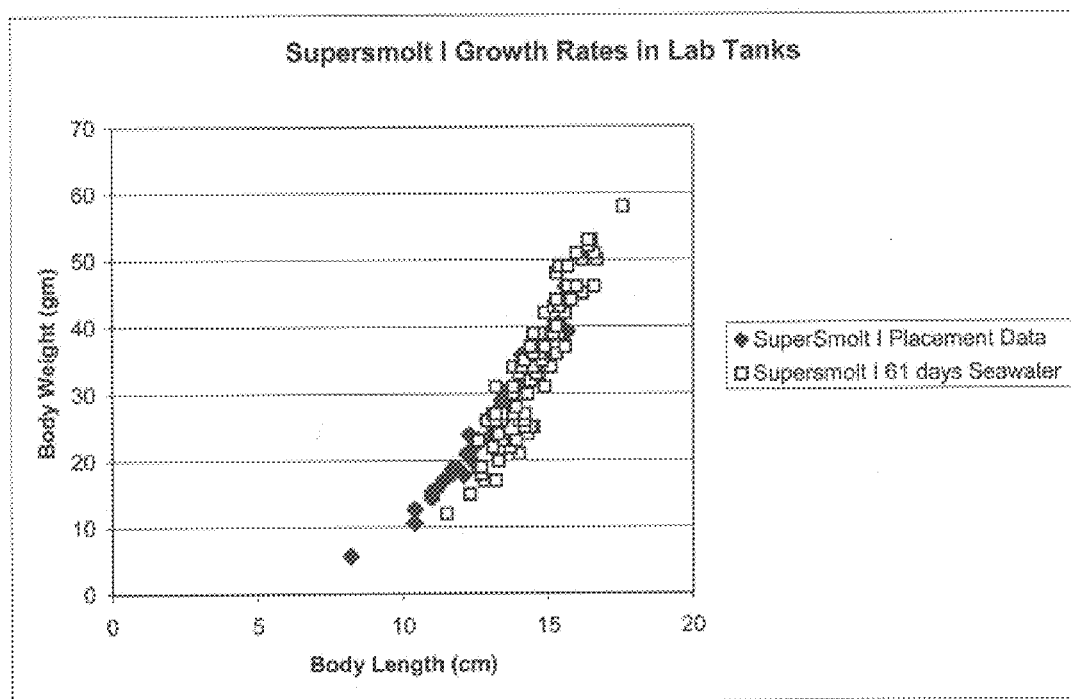
FIG. 44 is a graphical representation showing the body weights (gm) and length (cm) of APS Process I fish at the time of transfer to seawater as compared to 61 days after growth in seawater maintained on moist (38% moisture content) feed.

Data shown in FIG. 44 provide a comparison of the body characteristics of APS Process I fish after 61 days of growth in seawater vs. at the time of seawater placement. These data show that this group of APS Process I fish grew slowly while maintaining their appropriate body weight/length ratio despite the fact they were fed moist feed. Taken together, these data show that APS Process I fish can successfully undergo seawater transfer in a manner nearly identical to that reported for larger industry standard Atlantic salmon smolt (100 gm) but possess an average body weight that is approximately one third that of their larger counterparts.

Example 17

Differential Survival of Juvenile Atlantic Salmon During the Initial 72 hr After Seawater Transfer after Receiving Dietary Regimens Containing Different PVCR Agonists A total of 3 PVCR amino acid agonists (Tryptophan, Tyrosine and Histidine) were tested and their ability to more effective as compared to either Tyrosine or Histidine at increasing survival of fish after seawater transfer. Inclusion of another PVCR agonist (MgC12) together with Tryptophan does not improve seawater survival when compared to Tryptophan alone.

Description of Experimental Protocol: Juvenile Atlantic salmon (St. John/St. John strain) possessing an average weight of approximately 1 5 gm (range 5.50–30.5 gm) derived from a single hatching were divided into identical corresponding groups of 45 fish each and maintained in either freshwater (Control) or freshwater containing 3 mM Ca2+ and 1 mM Mg 2+. Fish food was formulated and prepared as described in Example 8 using 1 of 3 amino acids and fish were fed twice daily for an interval of 14 days. Fish were then transferred to circular tanks containing seawater within the APS laboratory. Mortalities were quantified every 24 hr and after 72 hr differential mortalities were compared. All fish were exposed to a continuous photoperiod for the duration of the experiment.

Figure 45:
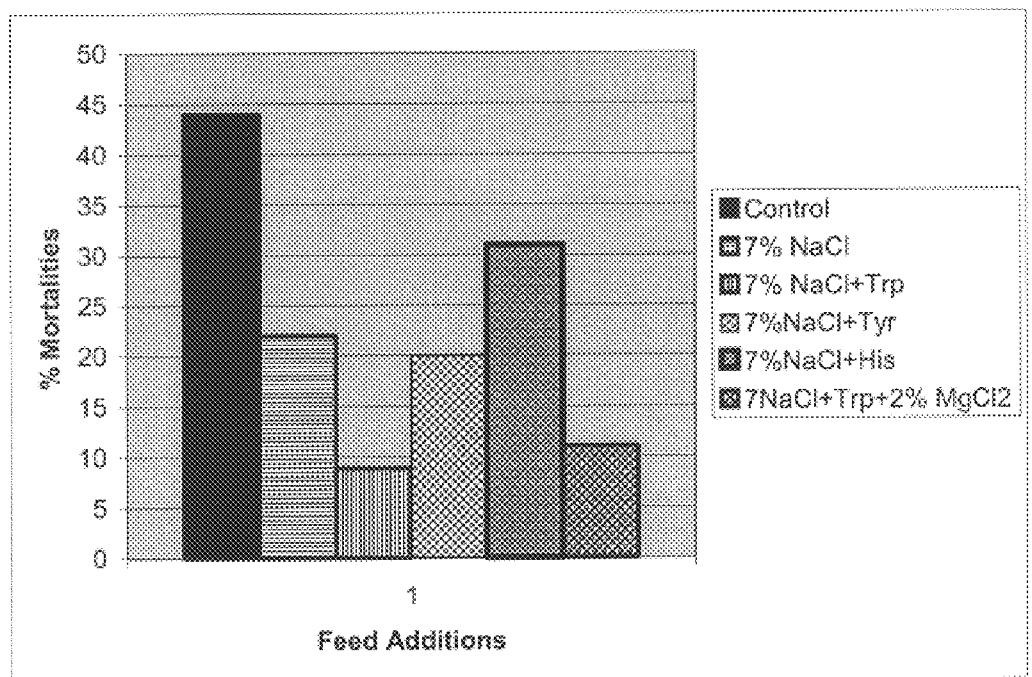
FIG. 45 is a graphical representation showing the percent (%) mortality observed in 6 groups of juvenile Atlantic salmon during 72 hr after transfer to seawater. Each group received different feed additives and were maintained in either freshwater (Control) or APS water mixture containing 3 mM Ca 2+ and 1 mM Mg2+ for 2 week interval prior to seawater transfer.

Results: Table 19 shows mortalities observed after the transfer of juvenile salmon to seawater. A comparison of total mortalities observed during the 72 hr experimental interval is shown in FIG. 45. In contrast to the initial seawater transfer mortality of control juvenile salmon that were maintained in freshwater and received only standard feed (44%), the addition of any of the 5 PVCR modulators significantly (p<0.05) reduced seawater transfer mortality. Dietary addition of 7% NaCl alone [#2] (APS Process I) produced a 50% reduction in mortality as compared to inclusion of both 7%NaCl+ Tryptophan [#3] (APS Process II) that reduced initial seawater transfer mortalities to less than 9%.

TABLE 19

Mortalities observed during the initial 72 hr after seawater transfer in individual groups (n = 45 Average Wt. 15 gm) of juvenile Atlantic salmon exposed to prior dietary regimens for 14 days

| | # of Mortalities | | | | |
|---|---|---|---|---|---|
| Feed Additives + Pretreatment | 24 hr | 48 hr | 72 hr | Total | % Total |
| 1. Control Diet + Freshwater | 4 | 7 | 9 | 20 | 44 |
| 2. 7% NaCl Addition | 2 | 4 | 4 | 10 | 22 |
| 3. 7% NaCl + 2 gm/Kg of Tryptophan | 0 | 0 | 4 | 4 | 8.9 |
| 4. 7% NaCl + 2 gm/Kg of Tyrosine | 2 | 3 | 4 | 9 | 20 |
| 5. 7% NaCl + 2 gm/Kg of Ristidine | 2 | 4 | 8 | 14 | 31 |
| 6. 7% NaCl + 2 gm/Kg Tryptophan + 2% $MgCl_2$ | 1 | 1 | 3 | 5 | 11.1 |

Note: All fish in groups #2–6 were maintained in water containing 3 mM $Ca^{2+}$ and 1 mM $Mg^{2+}$ for a 2-week interval prior to seawater transfer.

This low mortality is not altered (p>0.3) by inclusion of a third modulator of PVCR function in the diet (7%NaCl+2 gm/kg Tryptophan+2% MgCl2) [#6]. In contrast, addition of either Tyrosine or Histidine resulted in significantly lower reductions in post transfer seawater mortalities (20% and 31% respectively) as compared to Tryptophan (8.9%).

Example 18

Figure 46:
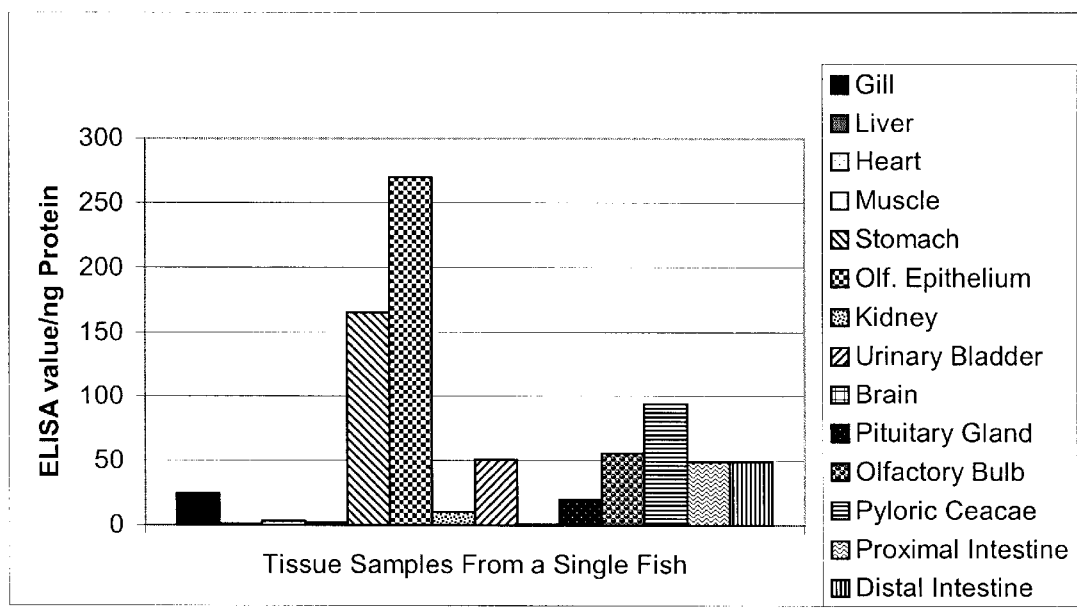
FIG. 46 is a graphical representation quantifying the Enzyme-Linked ImmunoSorbent Assay (ELISA) protein (ng) for various tissue samples (e.g., gill, liver, heart, muscle, stomach, olf. epithelium, kidney, urinary bladder, brain, pituitary gland, olfactory bulb, pyloric ceacae, proximal intestine, and distal intestine) from a single fish.

Demonstration of the Use of Solid Phase Enzyme-linked Assay for Detection of PVCRs in Various Tissues of Individual Atlantic Salmon Using Anti-PVCR Polyclonal Antiserum The PVCR content of various tissues of fish can be quantified using an ELISA 96 well plate assay system. The data, described herein, demonstrate the utility of a 96 well ELISA assay to quantify the tissue content of PVCR protein using a rabbit polyclonal anti-PVCR antibody utilized to perform immunocytochemistry and western blotting. These data form the basis for development of commercial assay kits that would monitor the expression levels of PVCR proteins in various tissues of juvenile anadromous fish undergoing the processes of the present invention, as described herein. The sensitivity of this ELISA is demonstrated by measurement of the relative PVCR content of 14 tissues from a single juvenile Atlantic salmon, as shown in FIG. 46.

Description of Experimental Protocol

Homogenates were prepared by placing various tissues of juvenile Atlantic salmon (St. John/St. John strain average weight 15–20 gm) into a buffer (10 mM HEPES, 1.5 mM MgCl2, 10 mM KCl, 1mM Phenylmethylsulfonyl fluoride (PMSF), 0.5 dithiothreitol (DTT) and 1mM benzamidine pH 8.8) and using a standard glass Potter-Elvenhiem homogenizer with a rotary pestle. After centrifugation at 2,550×g for 20 min. at 4° C. to remove larger debris, the supernatant was either used directly or frozen at −80° C. until further use. Homogenate protein concentrations were determined using the BCA assay kit (Pierce Chem. Co.). Aliquots of individual tissue homogenates were diluted into a constant aliquot size of 100 microliters and each was transferred to a 96 well plate (Costar Plastic Plates) and allowed to dry in room air for 15 hr. After blocking of nonspecific binding with a solution of 5% nonfat milk powder+0.5% Tween 20 in TBS (25 mM Tris 137 mM sodium chloride, 2.7 mM KCl pH 8.0), primary antiserum (either rabbit anti-PVCR immune or corresponding rabbit pre-immune antiserum) at a 1:1500 dilution. After a 1hr incubation, individual wells were rinsed 3 times with 500 microliters of TBS, an 1:3000 horseradish peroxidase conjugated goat anti-rabbit (Gibco-BRL ) were added and allowed to incubate for 1 hr. Individual wells were then rinsed and bound complex of primary-secondary antibody detected with Sigma A3219 2,2' Azino-bis(3-ethylbenzthiazidine-6-sulfonic acid) color reagent after 15 min of incubation using a Molecular Devices 96 well plate reader (Molecular Devices, VMAX) at 405 nm. Relative amounts of tissue PVCR content were determined after corrections for minimal background and nonspecific antibody binding as measured by binding of preimmune antiserum.

Results and Data Interpretation

FIG. 46 shows the data obtained from a representative single ELISA determination of PVCR protein content of 14 tissues of a single juvenile Atlantic salmon. Under the conditions specified in the Experimental Protocol as outlined above, nonspecific binding of both primary and secondary antibodies were minimized. While these quantitative values are measured relative to each other and not in absolute amounts, they provide data that parallels extensive immunocytochemistry examination of each of the tissues. Note that the PVCR content of various organs reflects their importance in osmoregulation of Atlantic salmon. Immunocytochemistry data described herein shows that tissues such as intestine (proximal and distal segments), gill, urinary bladder and kidney contained PVCR protein. In each case, epithelial cells that contact fluids that bathe the surfaces of these tissues express PVCR. In contrast, other organs including liver, heart and muscle contain minimal PVCR protein. Note that the highest PVCR content of any tissue tested is the olfactory lamellae where salmon possess the ability to "smell" alterations in calcium concentration in water. The olfactory bulb containing neurons that innervate the olfactory lamellae also possess abundant PVCR. Taken together, these data demonstrate the utility of ELISA kits to measure tissue content of PVCR proteins and form the basis for development of commercial assay kits that would monitor the expression levels of PVCR proteins in various tissues of juvenile anadromous fish undergoing the processes of the present invention. Alterations in PVCR tissue content measured in either relative changes in tissue PVCR content or absolute quantity of PVCR per tissue mass could, in turn, be utilized as correlative assays to determine the readiness of juvenile anadromous fish for sea water transfer or initiation of feeding. These data demonstrate the ability to perform such assays on individual juvenile Atlantic salmon in the range of body sizes that would be utilized to transfer fish from fresh to seawater after treatment with the methods of the present invention.

Example 19

Antibodies Made From the Carboxyl Terminal Portion of an Atlantic Salmon PVCR Protein are Effective in Immunocytochemistry and Immunoblotting Assays to Determine the Presence, Absence or Amount of the PVCR Protein Degenerate primers, SEQ ID NOs: 22 and/or 23, described herein were constructed specifically from the SKCaR DNA sequence. These primers have proved to be useful reagents for amplification of portions of PVCR sequences from both genomic DNA as well as cDNA (see Example 20).

To obtain more cDNA sequence from anadromous fish PVCRs, in particular the putative amino acid sequence of the carboxyl terminal domain of PVCRs that are targets for generation of specific peptides and, as a result, specific anti-Atlantic Salmon PVCR antisera, an unamplified cDNA library from Atlantic salmon intestine was constructed. Phage plaques originating from this cDNA library were screened under high stringency using $^{32}$P-labeled 653 bp genomic Atlantic Salmon PCR product (SEQ ID NO.: 1). From this cDNA library screening effort, a 2,021 bp cDNA clone was isolated and contained a single open reading frame for a putative amino acid sequence corresponding to approximately one half of a complete cDNA sequence from an intestinal PVCR protein. This putative amino acid sequence corresponds exactly to the sequence encoded by the corresponding genomic probe as well as the putative amino acid sequence corresponding to the carboxyl terminal domain of the PVCR.

On the basis of the knowledge of this putative amino acid sequence, a peptide, shown below, was synthesized and corresponded to a separate region of the putative carboxyl terminal PVCR amino acid sequence:

The peptide sequence for antibody production is as follows:

Peptide #1: Ac-CTNDNDSPSGQQRIHK-amide (SEQ ID NO.:24) producing rabbit antiserum SAL-1

The peptide was derivatized to carrier proteins and utilized to raise peptide specific antiserum in two rabbits using methods for making a polyclonal antibody.

The resulting peptide specific antiserum was then tested using both immunoblotting and immunocytochemistry techniques to determine whether the antibody bound to protein bands corresponding to PVCR proteins or yielded staining patterns similar to those produced using other anti-PVCR antiserum. A photograph of an immunoblot was taken showing protein bands that were recognized by antisera raised against peptides containing either SAL-1 (SEQ ID NO.: 24) or SKCaR (SEQ ID NO.: 18) (FIGS. 28A–E). As expected, antiserum raised to the peptide identified protein bands that co-electrophorese with PVCR proteins that are recognized by antisera raised to SKCaR (SEQ ID No.: 18). Immunostaining of juvenile Atlantic salmon kidney sections with 3 different anti-PVCR antisera (anti-Sall, anti-4641, and anti-SKCaR) produces similar localizations of PVCR protein within the tubules of salmon kidney. Staining produced by anti-SKCaR antiserum is identical to that produced by anti-4641 antiserum, an anti-peptide antisera corresponding to extracellular domain of mammalian PVCRs that is very similar to SKCaR (SEQ ID NO.: 18). These PVCR protein patterns stained identically to that produced by SAL-1 antiserum. Anti-Sal-1 antiserum also exhibits a similar staining pattern for the distribution of intestinal PVCR protein, as compared to anti-SKCaR. Thus, this new antiserum is specific for a PVCR in Atlantic Salmon tissues. This antiserum can be used to determine the presence, absence or amount of PVCR in various tissues of fish, using the methods described herein.

Example 20

Use of Reverse Transcriptase Polymerase Chain Reaction (RT-PCR) to Detect Expression of PVCRs in Various Tissues In Example 1, 2 degenerate primers, SEQ ID NOs.: 22 and 23 are disclosed. These two primers were used to amplify genomic DNA and obtain the sequence of a portion of the genomic DNA sequences of PVCRs from various anadromous fish. These same primers can also be used to amplify a portion of corresponding PVCR mRNA transcripts in various tissues. DNA sequence analyses amplified cDNAs from specific Atlantic salmon tissues (olfactory lamellae, kidney, urinary bladder) are all identical to certain genomic PVCR sequences described herein, e.g., SEQ ID NO 1-Atlantic salmon. These data show that:

1. PVCR mRNA transcripts are actually expressed in specific tissues of anadromous fish. These data reinforce the data regarding PVCR protein expression as detected by anti-PVCR antisera.
2. RT-PCR methods can be used to detect and quantify the degree of PVCR expression in various tissues, as a means to predict the readiness of anadromous fish for transfer to seawater.
3. cDNA probes can be generated from specific tissues of anadromous fish for use as specific DNA probes to either detect PVCR expression using solution or solid phase DNA-DNA or DNA-RNA nucleic acid hybridization or obtain putative PVCR protein sequences used for generation of specific anti-PVCR antisera.

RT-PCR Method

Total RNA was purified from selected tissues using Teltest B reagent (Friendswood, Tex.) and accompanying standard protocol. A total of 5 micrograms of total RNA was reverse transcribed with oligo dT primers using Invitrogen's cDNA Cycle Kit (Invitrogen Inc, Madison, Wis.). The resulting cDNA product was denatured and a second round of purification was performed. Two microliters of the resulting reaction mixture was amplified in a PCR reaction (30 cycles of 1 min. @ 94° C., 2 min. @ 57° C., min. @72° C.) using degenerate primers SEQ ID NO 22 and 23. The resulting products were electrophoresed on a 2% (w/v) agarose gel using TAE buffer containing ethidium bromide for detection of amplified cDNA products. Gels were photographed using standard laboratory methods.

DNA Sequencing of RT-PCR Products were Performed as Follows

A total of 15 microliters of Atlantic Salmon urinary bladder, kidney and nasal lamellae RT-PCR reactions were diluted in 40 microliters of water and purified by size exclusion on Amersham's MicroSpin S-400 HR spin columns (Amersham Inc, Piscataway, N.J.). Purified DNA was sequenced using degenerate PVCR primers (SEQ ID NO.: 22 and 23) as sequencing primers. Automated sequencing was performed using an Applied Biosystems Inc. Model 373A Automated DNA Sequencer (University of Maine, Orono, Me.). The resulting DNA sequences were aligned using MacVector (GCG) and LaserGene (DNA STAR) sequence analysis software.

Detection of Amplified RT-PCR cDNA products by Southern Blotting

Alternatively, the presence of amplified PVCR products was detected by Southern blotting analyses of gel fractionated RT-PCR products using a 32P-labeled 653 bp Atlantic salmon amplified genomic PCR product (SEQ ID NO.: 1). A total of 10 microliters of each PCR reaction was electrophoresed on a 2% agarose gel using TAE buffer then blotted onto Magnagraph membrane (Osmonics, Westboro, Ma.). After uv crosslinking of the DNA, blots were prehybridized and then probed overnight (68° C. in 6×SSC, 5×Denhardt's Reagent, 0.5% SDS, 100 ug/ml calf thymus DNA) with the 653 bp Atlantic salmon PCR product (labeled with RadPrime DNA Labeling System, Gibco Life Sciences). Blots were then washed with 0.1×SSC, 0.1% SDS @ 55° C. and subjected to autoradiography under standard conditions.

Figure 47:
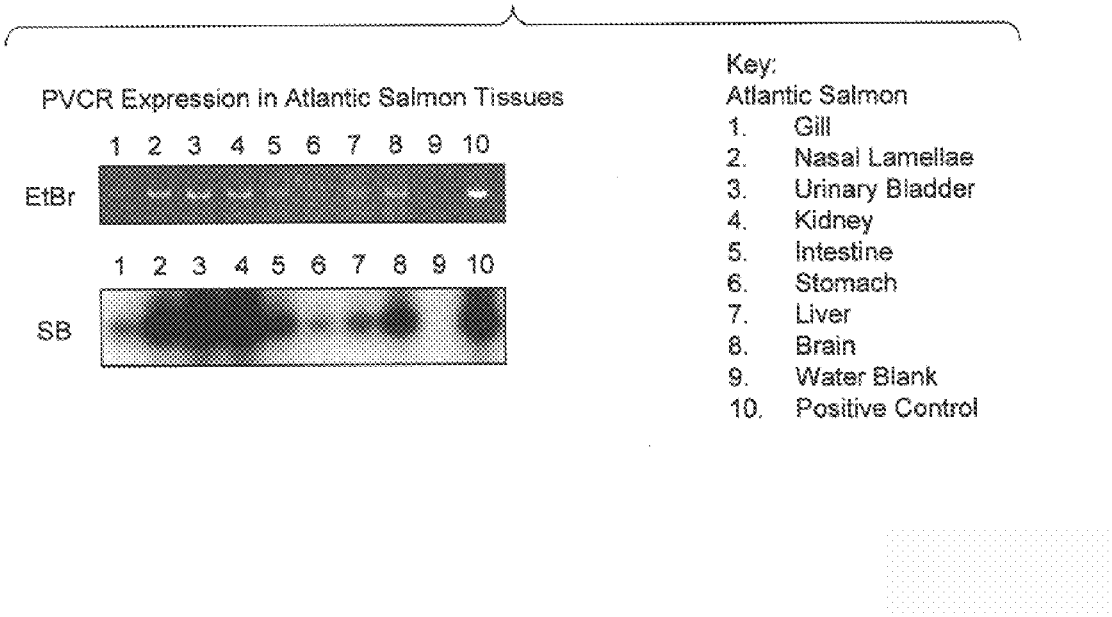
FIG. 47 is a photograph of a Reverse Transcriptase Polymerase Chain Reaction (RT-PCR) amplification of a partial PVCR mRNA transcript from various tissues (gill, nasal lamellae, urinary bladder, kidney, intestine, stomach, liver, and brain) of Atlantic Salmon. RT-PCR reactions were separated by gel electrophoresis and either stained in ethidium bromide(EtBr) or transferred to a membrane and Southern Blotted (SB) using a 32P-labeled 653 bp genomic DNA fragment from the Atlantic salmon PVCR gene.

FIG. 47 shows the results of RT-PCR amplification of a partial PVCR mRNA transcript from various tissues of juvenile Atlantic salmon. RT-PCR reactions were separated by gel electrophoresis and either stained in ethidium bromide(EtBr) or transferred to a membrane and Southern blotted using a 32P-labeled 653 bp genomic DNA fragment from the Atlantic salmon PVCR gene. FIG. 47 shows the detection of the PVCR in several tissue types of Atlantic Salmon using the RT-PCR method, as described herein. The types of tissue are gill, nasal lamellae, urinary bladder, kidney, intestine, stomach, liver, and brain.

Example 21

Treatment of Juvenile Atlantic Salmon with APS Process II Produces Changes in Both the Structure and Function of Gill Epithelial Cells That Prepare These Fish for More Effective Gill Functions Necessary For Survival After Transfer To Seawater The data described herein show that gill chloride cells of juvenile Atlantic salmon possess a PVCR protein, and that in response to treatment with APS Process II, juvenile Atlantic salmon remodel the distribution of gill chloride cells similar to that produced by transfer to seawater except that these fish remain in freshwater. Furthermore, the data described herein show that in response to treatment with APS Process II, the gills (but not pyloric caeca) of juvenile Atlantic salmon that remain in freshwater double their Na+K+ATPase activity in a manner similar to that of fish transferred to seawater. Taken together, these data provide strong evidence to indicate that the PVCR protein present on gill chloride cells responds to treatment of fish with APS Process II and remodels both the distribution and Na+K+ ATPase activity of chloride cells in a manner that closely resembles the process after fish are transferred to seawater. This treatment of anadromous fish with APS Process H provides for more rapid adaptation and better performance and growth after transfer of juvenile Atlantic salmon to seawater The following parameters have been established for gill chloride cells in anadromous fish adapted with APS Process I:

1. Anti-Na+K+ATPase antibody can be used to localize chloride cells in paraffin sections of gill lamellae. The distribution of chloride cells in both primary and secondary lamellae of salmonid gills can be used as an indicator to track how the gill is remodeled after the transfer of fish during the APS Process.
2. Na+K+ATPase activity present in homogenates of gill tissue can be quantified using methods described herein (e.g., an enzymatic assay). Since the vast majority of Na+K+ATPase enzyme is contained in chloride cells, changes in the quantity of Na+K+ATPase enzyme activity are used as indicator of changes in gill chloride cell activity. In general, Na+K+ATPase activity significantly increases as freshwater adapted salmonids are transferred to seawater and remodel their gills to this new hyperosmotic environment.

As detailed below, both techniques were utilized to demonstrate changes in the distribution and activity of gill chloride cells in juvenile Atlantic salmon. These changes that occur after treatment of the fish with the APS Process II are similar to those that occur in salmonids that are transferred to seawater.

Description of Experimental Protocol

Na+,K+-ATPase activity was measured in crude homogenates of gill and pyloric caeca (stripped of fat) by the method of McCormick (McCormick, S D 1993. Methods for nonlethal gill biopsy and measurement of Na+,K+-ATPase activity. Can. J. Fish Aquat. Sci. 50, 656–658). A 96 well plate reader was used (VERSAmax, Molecular Devices, Sunnyvale, Calif.). In brief, tissues were dissected and frozen in aliquots of ice-cold SEI buffer (300 mM sucrose, 20 mM EDTA, 50 mM imidazole, pH 7.3) and stored at −80° C. Samples were thawed immediately prior to assay and an aliquot of SEID (SEI buffer with 0.5% sodium deoxycholate) was added to achieve a final concentration of 0.1% sodium deoxycholate. Samples were homogenized in a Kontes Dual Tissue Grinder (Teflon/Glass) and centrifuged at 5000 g for 2 min to remove insoluble material. Activity was measured in 10 microliter I aliquots of homogenates in duplicates in assay mixtures with and without ouabain (0.5 mM). Assay mixtures were as follows: 2.1 mM PEP, 0.53 mM ATP, 0.29 mM NADH, 3 U/ml LDH, 3.75 U/ml PK, 47.25 mM NaCl, 2.63 mM MgCl2, 10.5 mM KC in 50 mM imidazole, pH 7.5. The linear rate of NADH disappearance was measured at 340 nm for 10 min. The Na+,K+-ATPase activity was calculated from the difference in ATP hydrolysis with or without ouabain and normalized for protein content in wells. Protein was analyzed in a plate reader with the Coomassie based Bio-Rad Protein Assay (Bio-Rad, Hercules, Calif.).

Results and Discussion

Chloride cells of juvenile Atlantic salmon in seawater are predominantly localized on the primary lamellae of the gill: Salmonid gills are composed of structures called lamellae that contain various epithelial cells and blood capillaries. As shown by paraffin sections of gill lamellae, each primary gill lamellus contain numerous secondary lamellae. Photographs of these sections were taken. In seawater-adapted salmonids (e.g., fish not subjected to the methods of the present invention), chloride cells, as identified by prominent staining with Na+K+ATPase antiserum, are almost exclusively localized to primary lamellae where they are located on either side of the base of the secondary lamellae.

Chloride cells of juvenile Atlantic salmon are located on both primary and secondary gill lamellae. Sections of gill lamellae were stained with either an anti-Na+K+ATPase or anti-PVCR antiserum, and photographs of these sections were taken. Chloride cells contain significant amounts of a PVCR protein. Gills from paired juvenile Atlantic salmon adapted to freshwater contain a different distribution of chloride cells, as compared to the distribution present in seawater adapted fish. However, in multiple experiments in which the fish were subjected to APS Process II the distribution of chloride cells in the gill shifted such that there was a significant reduction in the number of chloride cells in the secondary lamellae resembling the pattern exhibited by fish transferred to seawater, yet the treated fish remained in freshwater. In fish maintained in freshwater, chloride cells are localized in approximately equal numbers in both the primary and secondary lamellae of gill tissue. In contrast, when such fish are transferred to seawater, this distribution changes such that there are significantly fewer chloride cells observed in secondary lamellae. Mucous cells did not stain with Na+K+ATPase antiserum.

Immunostaining of adjacent sections with anti-PVCR antiserum shows that both chloride cells as well as mucous cells contain significant amounts of PVCR protein. See Example 3 in which the presence of PVCR protein in anadromous fish gill was shown by immunoblotting of SDS-PAGE separated gel protein bands. These data show that both chloride and mucous cells of the gill possess a PVCR protein and thus can sense the ionic composition of water that flows over gill tissue.

Figure 48:
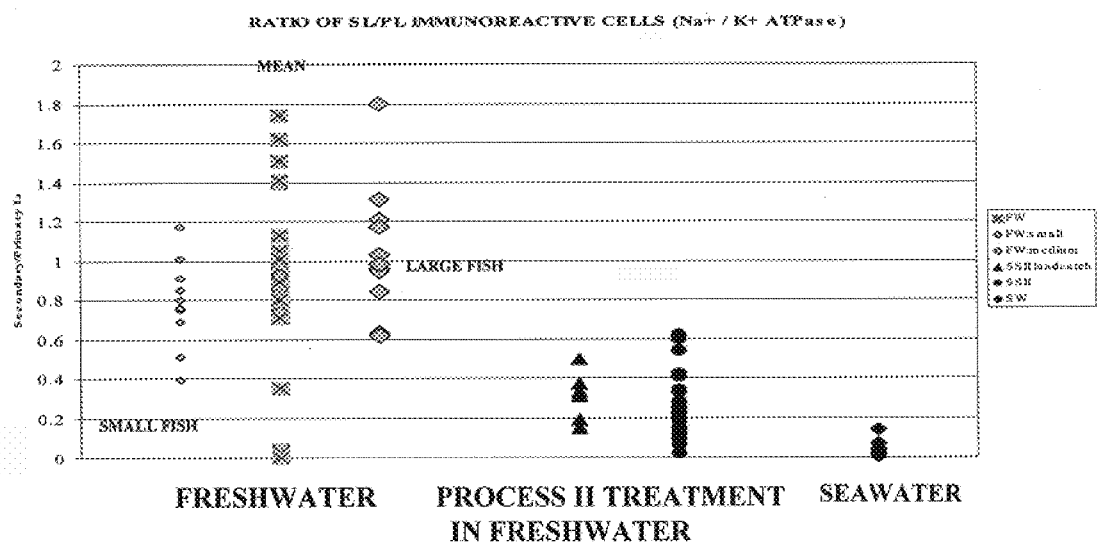
FIG. 48 is a graphical representation of the ratio of immunoreactive cells (Na+/K+ATPase) in Secondary Lamellae to Primary Lamellae for fish in freshwater, APS Process II treated fish in freshwater, and fish in seawater.

The distribution of chloride cells in juvenile Atlantic Salmon exposed to the APS Process II is similar to that displayed by seawater-adapted fish even though the APS Process II treated fish remain in freshwater. Sections of gill tissues shows the distribution of gill chloride cells in paired fish treated with APS Process II for a duration of 45 days. Distribution of chloride cells is similar to that exhibited by seawater adapted fish even though that these fish have remained in freshwater. The distribution of chloride cells present on secondary lamellae (SL) vs. primary lamellae (PL) can be expressed as a ratio as shown in FIG. 48. Note that SL/PL ratio is approximately 1 for freshwater-adapted salmon while that for seawater-adapted fish is approximately 0.1. By contrast, paired fish treated with APS Process II exhibit a SL/PL ratio of 0.3–0.4. This value is significantly different from fish maintained in freshwater and approaches the value exhibited by fish adapted to seawater. In summary, these data provide evidence for the remodeling of gill chloride cells to resemble that present in seawater adapted fish. The presence of PVCR protein in gill chloride cells permits chloride cells to sense changes in the ionic environment surrounding the chloride cell and permits it to remodel accordingly.

Figure 49:
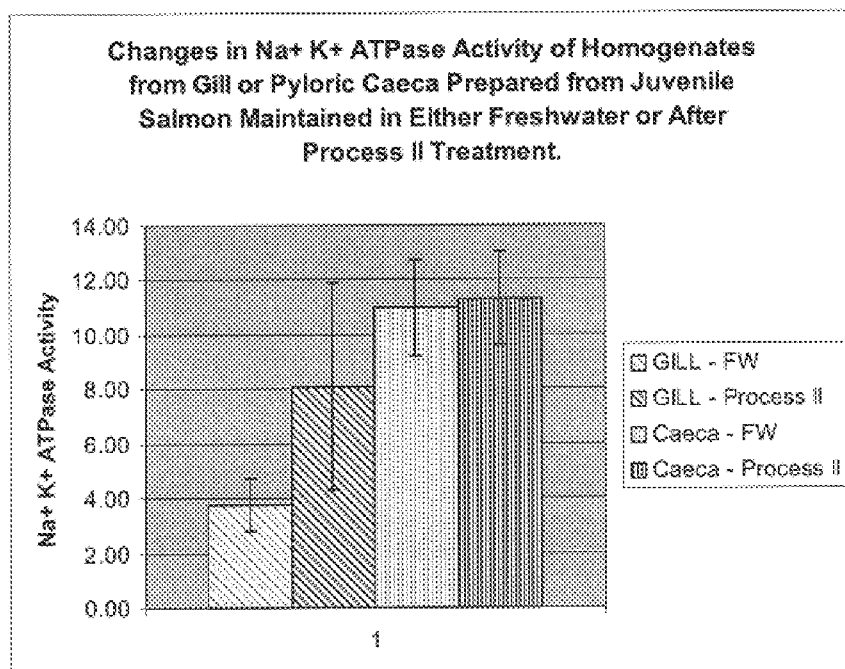
FIG. 49 is a graphical representation of Na+Ka+ATPase Activity of homogenates from gill, or pyloric caeca prepared from juvenile salmon maintained in either freshwater or after APS Process II treatment.

Treatment of juvenile Atlantic salmon to APS Process II increases Na+K+ATPase activity in homogenates of gill in a manner similar to that described after transfer of salmon to seawater. FIG. 49 shows comparisons of Na+K+ATPase activity present in homogenates prepared from either gills or pyloric caeca isolated from paired juvenile Atlantic salmon that were either maintained in freshwater or treated with APS Process HI for a total of 45 days. Na+K+ATPase activity from gills of fish treated with APS Process II is approximately double the activity present in gills from paired freshwater fish. This significant difference (8.10 +/−3.87 vs. 3.76+/−0.94 p<0.0008) is specific since Na+K+ATPase activities from the pyloric caeca of these same fish (11.0+/−1.76 vs. 11.1+/−1.71, p<0.35) are not significantly different.

Transfer of juvenile salmonid fish to seawater produces a significant increase in Na+K+ATPase activity that reflects remodeling of gill chloride cells to enable them to remove the NaCl ingested and absorbed by fish upon the commencement of drinking seawater. In summary, the data described herein demonstrates that APS Process II treatment of juvenile Atlantic salmon increases gill Na+K+ATPase activity while the fish remains in freshwater in advance of their transfer to seawater. This increase in Na+K+ATPase activity appears specific for gill since a similar increase does not occur in another organ rich in Na+K+ATPase activity in the same paired fish.

The data described herein show that treatment of juvenile Atlantic Salmon with APS Process II produces selective changes in the activity of Na+K+ATPase enzyme in osmoregulatory organs of the fish. These data show that the APS Process II causes specific increases in the Na+K+ATPase activities of specific tissues that occur prior to the transfer of juvenile Atlantic salmon to seawater. These data provide direct molecular evidence that APS Process II in freshwater mimics the increase in Na+K+ATPase activity that normally occurs in industry standard fish only after they are transferred to seawater.

Figure 50A:
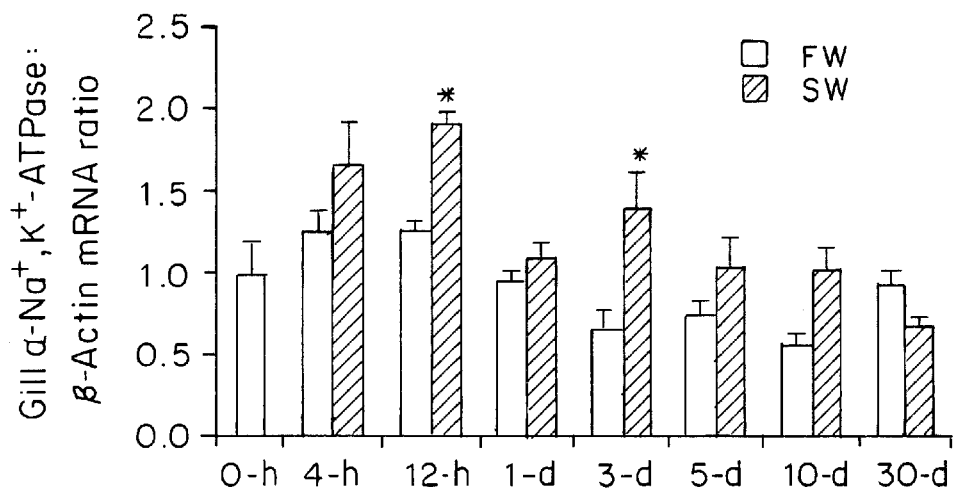
FIG. 50 is a graphical representation of Na+Ka+ATPase Activity ($\mu$mol ADP/mg protein/h or $\mu$-Actin mRNA ratio) of homogenates from gill for fish maintained in freshwater or seawater.
Figure 50B:
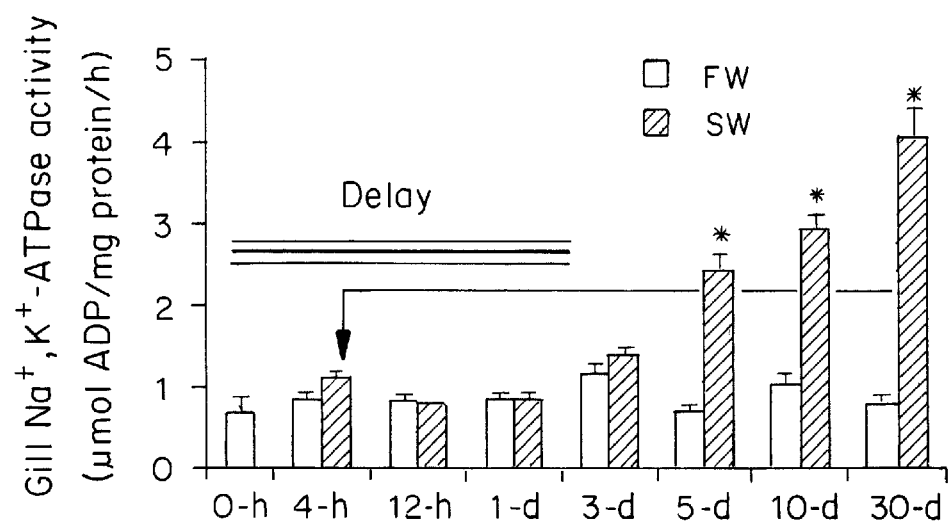

In response to treatment with APS Process II, the Na+K+ATPase activity of the gills but not pyloric caeca of juvenile Atlantic salmon that remain in freshwater significantly increase their Na+K+ATPase activity in a manner similar to that of fish transferred to seawater. These data provide direct evidence as to how treatment with APS Process II increases the survival of juvenile Atlantic salmon after their transfer to seawater. Instead of increases in gill Na+K+ATPase activity occurring in a delayed manner after transfer of juvenile fish to seawater, gill Na+K+ATPase activity increases during the APS Process II treatment in freshwater and are thus elevated prior to seawater transfer. This treatment of anadromous fish with Process II provides for more rapid adaptation and better performance and growth after transfer of juvenile Atlantic salmon to seawater The membrane bound Na+K+ATPase enzyme is a key part of the ability of fish to maintain their body composition when in both freshwater and seawater. As described above, chloride cells of the gills are rich sources of this enzyme. The changes in gill chloride cells and Na+K+ATPase enzyme activity for fish not subjected to the steps of the present invention are shown in FIG. 50. See Seidelin et al., *Physiol Biochem Zool.* 73(4):446–53 (2000). Data in FIG. 50 demonstrate a significant delay between initiation of cellular responses to salinity changes and activation of critical ion transport mechanisms in juvenile salmonids. FIG. 50 compares the changes in Na+K+ATPase enzyme activity in gill tissue homogenates from freshwater adapted juvenile trout (body weight 51 gm average) either maintained in freshwater [open bars] or after their transfer to 25 ppt (¾ seawater) [solid bars]. Within 12 hr after seawater transfer, there are significant increases in the mRNA for the Na+K+ATPase enzyme (FIG. 50, Panel A) as well as a 50% reduction in number of Na+K+ATPase immunoreactivity (NKIR) chloride cells in the secondary gill lamellae. However, significant increases in the activity of the Na+K+ATPase enzyme do not occur until 5 days after seawater transfer. This interval of delay (shown by the triple underline) represents the time interval where juvenile salmonids are highly stressed as they attempt to rapidly remodel their key osmoregulatory tissues like gill to cope with the new hyperosmotic seawater environment. If they fail to achieve the increases in gill Na+K+ATPase enzyme activity they will die of electrolyte imbalance. As described herein, the ability to survive this interval is dependent on size of the fish (critical size).

In contrast, juvenile Atlantic salmon treated with APS Process II in freshwater remodel both their distribution of NKIR (chloride) cells as well increase their gill Na+K+ATPase enzyme activity in freshwater prior to their transfer to seawater as detailed in text of Gill Disclosure. As shown in FIG. 49, comparison of Na+K+ATPase enzyme activities in gill and pyloric caeca from fish maintained in freshwater or immediately after treatment with APS Process II shows that significant increase in Na+K+ATPase enzyme in gill but not pyloric caeca. FIG. 49 shows a comparison of Na+K+ATPase activity in homogenates from gill and pyloric caeca of juvenile Atlantic salmon that were either maintained either in freshwater or treated for 45 days with Process II in freshwater. The star (★) denote significant (p<0.05) increases in enzyme activity in gill.

Thus, treatment with APS Process II does not simply alter Na+K+ATPase enzyme activities in all organs but these increases are limited to selective organs. The elimination of the 96 hr delay in the increase of Na+K+ATPase enzyme activities shown in FIG. 50 experienced by Industry Standard fish provides direct evidence that APS Process II produces physiological changes in Atlantic salmon that occur in freshwater during APS Process II instead of seawater. Upon transfer of APS Process II treated fish to seawater these changes are already manifest thus providing these fish with an ability to immediately adapt to the new seawater environment without an interval of osmoregulatory stress or death.

Example 22

PVCRs Can Sense Specific Amino Acids in the Presence of Extracellular Calcium

The shark kidney calcium receptor (SKCaR) possesses the ability to sense specific amino acids in the presence of extracellular calcium (1–10 mM). The data described herein show that SKCaR's sensing of amino acids occurs in a range of extracellular calcium that is present in various compartments of a fish's body including serum and body cavities including intestine, pyloric caeca and kidney, where transepithelial amino acid absorption occurs.

Description of Experimental Protocol

Full length recombinant dogfish (Squalus acanthias) shark kidney calcium receptor (SKCaR) (SEQ ID NO.: 17) was expressed in human embryonic kidney cells. SKCaR cDNA was ligated into the mammalian expression vector PCDNA II and transfected into HEK cells using standard techniques. The presence of SKCaR protein in transfected cells was verified by western blotting. Activation of SKCaR and its ability to respond to individual amino acids or mixtures thereof was quantified using a well characterized FURA-2 ratio imaging fluorescence assay where increases in intracellular $Ca^{2+}$ produced by SKCaR activation are detected and expressed as % normalized intracellular calcium response to receptor activation. Bai, M., S. et al., J. Biol. Chem., 32:19537–19545 (1996); Conigrave, A, et al., Proc. Nat. Acad. Sci. 97:4814–4819 (2000).

Results and Discussion

Figure 51:
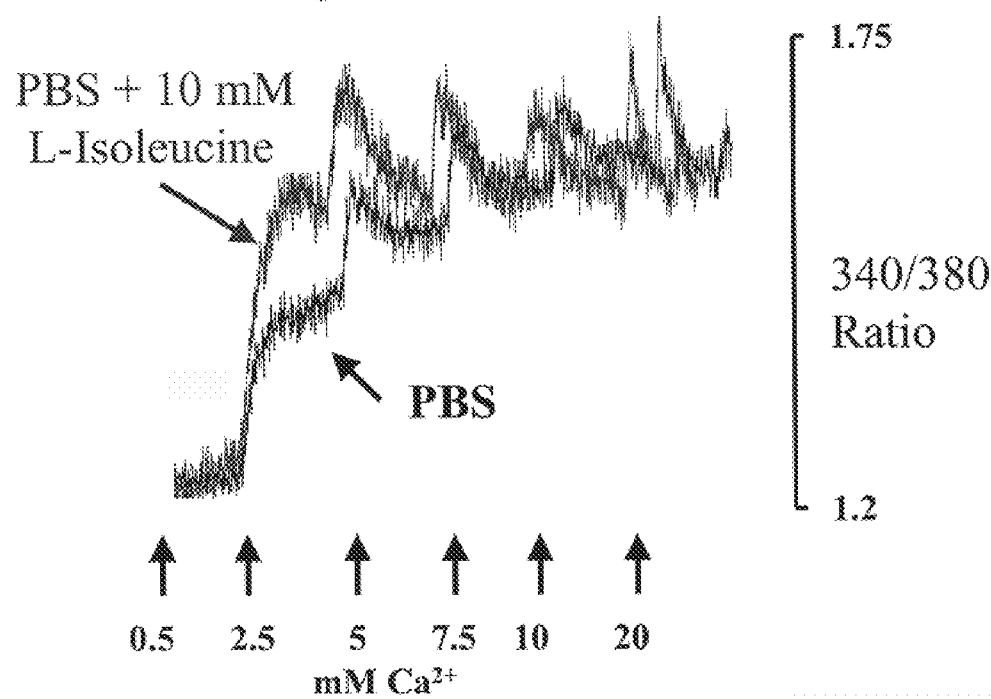
FIG. 51 is a graphical representation of the ratio from FURA-2 cells expressing a PVCR in the presence or absence of 10 mM L-Isoleucine in various concentrations (0.5, 2.5, 5.0, 7.5, 10.0 and 20.0 mM) of extracellular calcium ($Ca^{2+}$).

FIG. 51 shows a comparison of fluorescence tracings of FURA-2-loaded cells stably expressing SKCaR that were bathed in physiological saline (125 mM NaCl, 4 mM KCl, 0.5 mM CaCl2, 0.5 MgCl2, 20 mM HEPES (NaOH), 0.1% D-glucose pH 7.4) in the presence or absence of 10 mM L-Isoleucine (L-Ile) before being placed into the fluorimeter. Baseline extracellular $Ca^{2+}$ concentration was 0.5 mM. Aliquots of $Ca^{2+}$ were added to produce final extracellular concentrations of 2.5 mM, 5 mM, 7.5 mM, 10 mM and 20 mM $Ca^{2+}$ with changes in the fluorescence recorded. Note that increases in cell fluorescence was greater in the presence of 10 mM Phe for extracellular $Ca^{2+}$ concentrations less than 10 mM.

Figure 52:
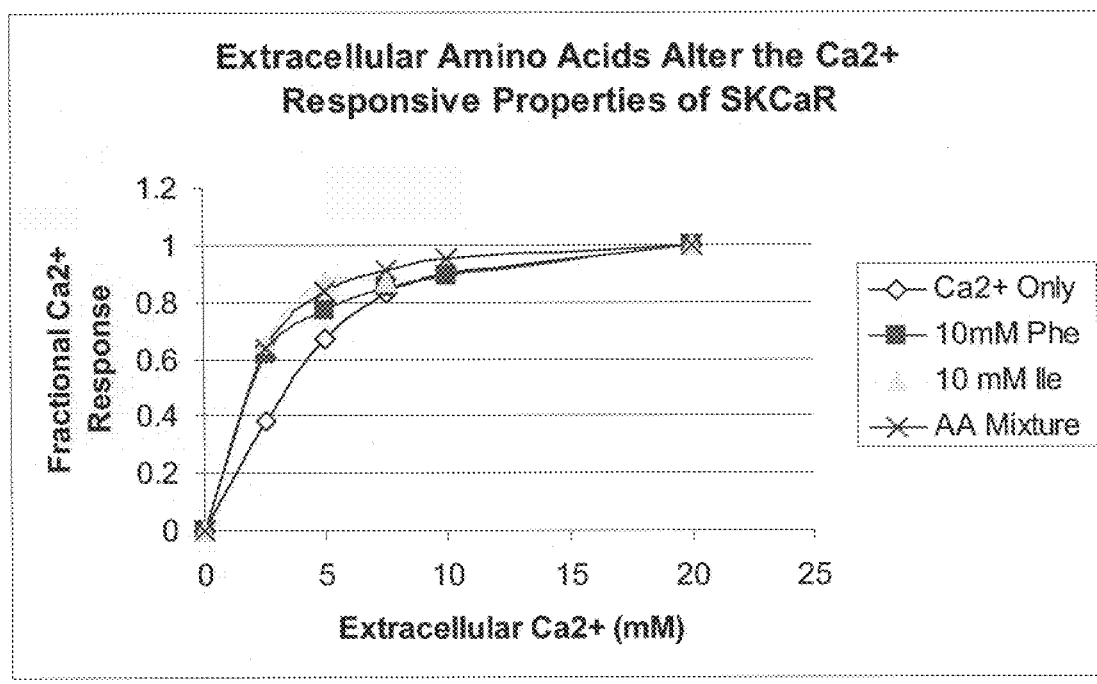
FIG. 52 is a graphical representation of the fractional $Ca^{2+}$ response, as compared to the extracelluar $Ca^{2+}$ (mM) for the PVCR in $Ca^{2+}$ only, Phenylalanine, Isoleucine, or AA Mixture (L-isomers in the following concentrations in micromoles/liter: 50 Phenylalanine (Phe), 50 Tryptophan (Trp), 80 Histidine (His), 60 Tyrosine (Tyr), 30 Cystine (Cys), 300 Alanine (Ala), 200 Threonin (Thr), 50 Asparagine (Asn), 600 Glutamine (Gln), 125 Serine (Ser), 30 Glutamic acid (Glu), 250 Glycine (Gly), 180 Proline (Pro), 250 Valine (Val), 30 Methionine (Met), 10 Aspartic acid (Asp), 200 Lysine (Lys), 100 Arginine (Arg), 75 Isoleucine (Ile), 150 Leucine (Leu)).

FIG. 52 shows data plotted from multiple experiments as described in FIG. 51 where the effects of 10 mM Phenylalanine (Phe), 10 mM Isoleucine (Ile) or an amino acid mixture (AA Mixture) containing all L-isomers in the following concentrations in micromoles/liter: 50 Phenylalanine (Phe), 50 Tryptophan (Trp), 80 Histidine (His), 60 Tyrosine (Tyr), 30 Cystine (Cys), 300 Alanine (Ala), 200 Threonin (Thr), 50 Asparagine (Asn), 600 Glutamine (Gln), 125 Serine (Ser), 30 Glutamic acid (Glu), 250 Glycine (Gly), 180 Proline (Pro), 250 Valine (Val), 30 Methionine (Met), 10 Aspartic acid (Asp), 200 Lysine (Lys), 100 Arginine (Arg), 75 Isoleucine (Ile), 150 Leucine (Leu). Note that both 11 mM Phe and 10 mM Ile as well as the mixture of amino acids increase SKCaR's response to a given $Ca^{2+}$ concentration. Thus, these data show that presence of amino acids either alone or in combination increase the apparent sensitivity to $Ca^{2+}$ permitting SKCaR to "sense" amino acids in the presence of physiological concentrations of $Ca^{2+}$.

The significance of these data for aquatic organisms stand in marked contrast to those mentioned in published reports on the roles of human CaRs amino acid sensing capabilities. FIG. 52 shows that SKCaR's maximal capability to sense amino acids is confined to a range of $Ca^{2+}$ that is present both in aquatic external environments as well as the body fluids of various fish. Based on previous localization data for PVCRs in fish, the following are important physiological processes and applications of the present invention:

1. Sensing of amino acids in the proximal intestine and pyloric caeca of fish: The PVCR present on the apical surface of intestinal epithelial cells is capable of responding to amino acids such as tryptophan as part of the APS Process II. Inclusion of tryptophan in the feed of fish interacts with the intestinal PVCR to improve the development of juvenile anadromous fish to tolerate seawater transfer.

2. In both adult, juvenile and larval fish, PVCR localized to the apical membrane of stomach and intestinal epithelial cells could "sense" the presence of amino acids produced by the proteolysis of proteins into amino acids. This mechanism could be used to inform both epithelial and neuroendocrine cells of the intestine of the presence of nutrients (proteins) and trigger a multitude of responses including growth and differentiation of intestinal epithelia as well as their accompanying transport proteins, secretion or reabsorption of ions such as gastric acid. It is believed that the apical PVCR can also regulate the secretion of intestinal hormones such as cholecystokin (CCK) and others.

3. The PVCR which present in cells of the nasal lamellae of fish can be used to "smell" both water salinity (via $Ca^{2+}$, $Mg^{2+}$ and NaCl) as well as amino acids. Amino acids, $Ca^{2+}$, $Mg^{2-}$ and/or NaCl can be used as both attractants and for homing.

All cited references, patents, and patent applications are incorporated herein by reference in their entirety. Also, companion patent application Ser. No. 09/687,373, entitled "Growing Marine Fish in Fresh Water," filed on Oct. 12, 2000; patent application Ser. No.: PCT/US01/31625, entitled "Growing Marine Fish in Fresh Water," filed Oct. 11, 2001; patent application Ser. No. 09/687,476, entitled "Methods for Raising Pre-adult Anadromous Fish," filed on Oct. 12, 2000; patent application Ser. No. 09/687,372, entitled "Methods for Raising Pre-adult Anadromous Fish," filed on Oct. 12, 2000; International PCT Application No. PCT/US01/31704,entitled "Polyvalent Cation Sensing Receptor Proteins in Aquatic Species," filed Oct. 11, 2001; Provisional Patent Application No. 60/240,392, entitled "Polyvalent Cation Sensing Receptor Proteins in Aquatic Species,"filed on Oct. 12, 2000; Provisional Patent Application No. 60/240,003, entitled "Polyvalent Cation Sensing Receptor Proteins in Aquatic Species," filed on Oct. 12, 2000; Provisional Patent Application No. 60/328,464 , entitled, "Methods for Growing and Imprinting Fish Using an Odorant," filed Oct. 11, 2001; are all hereby incorporated by reference in their entirety. Additionally, application Ser. No. 09/162,021, filed on Sep. 28, 1998, International PCT application No. PCT/US97/0503 1, filed on Mar. 27, 1997, and application Ser. No. 08/622,738 filed Mar. 27, 1996, all entitled, "Polycation Sensing Receptor in Aquatic Species and Methods of Use Thereof" are all hereby incorporated by reference in their entirety.

While this invention has been particularly shown and described with references to referred embodiments thereof, it will be understood by those skilled in the art that various changes can be made therein without departing from the scope of the invention encompassed by the appended claims.

What is claimed is:

1. A method of improving the raising of pre-adult anadromous fish, wherein the pre-adult anadromous fish are maintained in freshwater prior to transfer to seawater, comprising:
   a) adding at least one Polyvalent Cation Sensing Receptor (PVCR) modulator to the freshwater in an amount sufficient to modulate expression and/or sensitivity of at least one PVCR; and
   b) adding feed for fish consumption to the freshwater, wherein the feed contains an amount of NaCl sufficient to contribute to a significantly increased level of said PVCR modulator in serum of the pre-adult anadromous fish.

2. The method of claim 1, wherein increased expression of at least one PVCR is maintained until the pre-adult anadromous fish are transferred to seawater.

3. The method of claim 2, wherein the PVCR modulator is selected from the group consisting of a divalent cation, a trivalent cation, an aminoglycoside, a organic polycation, an amino acid, a Type I Calcimimetic, a Type II Calcimimetic, 1,25 dihydroxyvitamin D, a cytokine, and macrophage chemotatic peptide-1.

4. The method of claim 3, wherein the feed contains at least about 1% NaCl by weight.

5. The method of claim 4, further including exposing the pre-adult anadromous fish to a photoperiod.

6. The method of claim 5, wherein exposing the pre-adult anadromous fish to a photoperiod, occurs prior to and after transfer to seawater.

7. The method of claim 6, further including adding a PVCR modulator to the feed.

8. A method of preparing pre-adult anadromous fish for transfer from freshwater to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains an amount of NaCl sufficient to contribute to significantly increased level of said PVCR modulator in serum of the pre-adult anadromous fish.

9. The method of claim 8, wherein the pre-adult anadromous fish are maintained in the freshwater having at least one PVCR modulator until the pre-adult anadromous fish are transferred to seawater.

10. The method of claim 9, wherein the PVCR modulator is a PVCR agonist.

11. The method of claim 10, wherein the PVCR agonist is selected from the group consisting of a divalent cation, a trivalent cation, an aminoglycoside, an organic polycation and an amino acid.

12. A method for preparing pre-adult anadromous fish for transfer from freshwater to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains at least about 1% NaCl by weight.

13. The method of claim 12, wherein the feed contains between about 10,000 mg/kg and about 100,000 mg/kg of NaCl.

14. The method of claim 13, further including adding a PVCR agonist to the feed.

15. A method of improving the raising of pre-adult salmon, wherein the pre-adult salmon are maintained in freshwater prior to transfer to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains an amount of NaCl sufficient to contribute to a significantly increased level of said PVCR modulator in serum of the pre-adult salmon fish.

16. The method of claim 15, wherein increased expression of at least one PVCR is maintained until the pre-adult anadromous fish are transferred to seawater.

17. The method of claim 16, wherein the PVCR modulator is selected from the group consisting of a divalent cation, a trivalent cation, an aminoglycoside, an organic polycation, an amino acid, a Type I Calcimimetic, a Type II Calcimimetic, a 1,25 dihydroxyvitamin D, a cytokine, and a macrophage chemotatic peptide-1.

18. The method of claim 17, further comprising exposing the pre-adult salmon to a photoperiod.

19. The method of claim 18, wherein exposing the pre-adult anadromous fish to a photoperiod occurs prior to and after transfer to seawater.

20. The method of claim 19, wherein the feed contains at least about 1% NaCl by weight.

21. The method of claim 20, further including adding a PVCR modulator to the feed.

22. A method of preparing pre-adult salmon for transfer from freshwater to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains an amount of NaCl sufficient to contribute to a significantly increased level of said PVCR modulator in serum of the pre-adult salmon fish.

23. The method of claim 22, wherein the pre-adult salmon are maintained in the freshwater having at least one PVCR modulator until the pre-adult salmon are transferred to seawater.

24. The method of claim 23, wherein the PVCR modulator is a PVCR agonist.

25. A method for preparing pre-adult salmon for transfer from freshwater to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains at least about 1% NaCl by weight.

26. The method of claim 25, wherein the feed contains between about 10,000 mg/kg and about 100,000 mg/kg of NaCl.

27. The method of claim 26, further including detecting the level of expression of at least one PVCR to determine whether the pre-adult salmon are ready for transfer to seawater.

28. A method of increasing the growth rate of one or more pre-adult anadromous fish, wherein the pre-adult anadromous fish are maintained in freshwater prior to transfer to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains an amount of NaCl sufficient to contribute to a significantly increased level of said PVCR modulator in serum of the pre-adult anadromous fish.

29. A method of increasing food consumption of pre-adult anadromous fish, wherein the pre-adult anadromous fish are maintained in freshwater prior to transfer to seawater, comprising:
   a) subjecting the pre-adult anadromous fish to at least one PVCR modulator in an amount sufficient to modulate expression and/or sensitivity of at least one PVCR; and
   b) adding feed for fish consumption to the freshwater, wherein the feed contains an amount of NaCl sufficient to contribute to a significantly increased level of said PVCR modulator in serum of the pre-adult anadromous fish.

30. A method of increasing food consumption of pre-adult anadromous fish after transfer to seawater, wherein the pre-adult anadromous fish are maintained in freshwater prior to transfer to seawater, comprising:
   a) adding at least one PVCR modulator to the freshwater in an amount sufficient to modulate expression and/or sensitivity of at least one PVCR;
   b) adding feed for fish consumption to the freshwater, wherein the feed contains an amount of NaCl sufficient to contribute to a significantly increased level of said PVCR modulator in serum of the pre-adult anadromous fish; and
   c) transferring the pre-adult anadromous fish to seawater.

31. A method of increasing survival of pre-adult anadromous fish undergoing smoltification in freshwater, comprising:
   a) introducing the pre-adult anadromous fish to freshwater having at least one PVCR modulator in an amount sufficient to modulate expression and/or sensitivity of at least one PVCR; and
   b) adding feed for fish consumption to the freshwater, wherein the feed contains at least about 1% NaCl by weight;
      wherein the pre-adult anadromous fish are maintained in the freshwater sufficient to modulate expression and/or sensitivity said PVCR.

32. A method of preparing pre-adult anadromous parr for transfer from freshwater to seawater, comprising:
   a) adding at least one PVCR modulator to the freshwater in an amount sufficient to modulate expression and/or sensitivity of at least one PVCR;
   b) adding feed for fish consumption to the freshwater, wherein the feed contains an amount of NaCl sufficient to contribute to significantly increased level of said PVCR modulator in serum of the pre-adult anadromous parr; and
   c) transferring the pre-adult anadromous parr to seawater.

33. The method of claim 30, wherein the parr weighs between 15 grams and 30 grams upon transfer to seawater.

34. A method for reducing osmotic stress upon transfer of pre-adult anadromous fish from freshwater to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains at least about 1% NaCl by weight; and
   c) transferring the pre-adult anadromous fish to seawater; wherein, once transferred to seawater, the pre-adult anadromous fish have increased growth and decreased stress, as compared to pre-adult anadromous fish that are not subjected to steps a) and b).

35. A method of reducing mortality of pre-adult anadromous fish upon transfer from freshwater to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains at least about 1% NaCl by weight; and
   c) transferring the pre-adult anadromous fish to seawater.

36. A method of improving feeding in pre-adult anadromous fish immediately after transfer from freshwater to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains at least about 1% NaCl by weight; and
   c) transferring the pre-adult anadromous fish to seawater.

37. A method of transferring a pre-adult anadromous fish from freshwater to seawater having a temperature of about 14° C. to about 19° C., comprising:
   a) adding at least one PVCR modulator to the freshwater in an amount sufficient to modulate expression and/or sensitivity of at least one PVCR; and
   b) adding feed for fish consumption to the freshwater, wherein the feed contains at least about 1% NaCl by weight; and
   c) transferring the pre-adult anadromous fish to seawater.

38. A method of reducing an amount of time between generations of pre-adult anadromous fish, comprising:
   a) maintaining pre-adult anadromous fish in a freshwater environment having at least one PVCR modulator in an amount sufficient to modulate expression and/or sensitivity of at least one PVCR; and
   b) adding feed for fish consumption to the freshwater, wherein the feed contains at least about 1% NaCl by weight.

39. The method of claim 38, further including growing the pre-adult anadromous fish until the pre-adult anadromous fish are ready for breeding.

40. A method of preparing pre-adult anadromous fish for transfer from freshwater to seawater, comprising:
   a) adding at least one PVCR modulator to the freshwater in an amount sufficient to modulate expression and/or sensitivity of at least one PVCR in the brain of the pre-adult anadromous fish; and
   b) adding feed for fish consumption to the freshwater, wherein the feed contains an amount of NaCl sufficient to contribute to significantly increased level of said PVCR modulator in serum of the pre-adult anadromous fish.

41. A method of preparing pre-adult anadromous char for transfer from freshwater to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains an amount of NaCl sufficient to contribute to significantly increased level of said PVCR modulator in serum of the pre-adult anadromous char.

42. The method of claim 41, further including exposing the pre-adult anadromous char to a photoperiod.

43. The method of claim 42, wherein exposing the pre-adult anadromous char to a photoperiod occurs prior to and after transfer to seawater.

44. A method of preparing pre-adult anadromous trout for transfer from freshwater to seawater, comprising:
   a) adding at least one PVCR modulator to the freshwater in an amount sufficient to modulate expression and/or sensitivity of at least one PVCR; and
   b) adding feed for fish consumption to the freshwater, wherein the feed contains an amount of NaCl sufficient to contribute to significantly increased level of said PVCR modulator in serum of the pre-adult anadromous trout.

45. The method of claim 44, further including exposing the pre-adult anadromous trout to a photoperiod.

46. The method of claim 45, wherein exposing the pre-adult anadromous trout to a photoperiod occurs prior to and after transfer to seawater.

47. A method of determining whether a pre-adult anadromous fish is ready for transfer to seawater, wherein the pre-adult anadromous fish is subjected to a freshwater environment having at least one PVCR modulator, and feed having at least about 1% NaCl by weight; said method comprising assessing the amount of PVCR expression in the pre-adult anadromous fish, wherein an increased level of expression in at least one organ or tissue, as compared to a control, indicates that the pre-adult anadromous fish is ready for transfer to seawater.

48. The method of claim 47, further comprising:
   (a) contacting an anti-PVCR antibody to a sample comprising gill, liver, heart, stomach, urinary bladder, pituitary gland, olfactory bulb, pyloric ceacae, skin, olfactory lamellae, intestine, kidney, brain or muscle; under conditions sufficient for the formation of a complex between the antibody and the PVCR; and
   (b) detecting the formation of the complex.

49. The method of claim 47, wherein detecting the level of expression of the PVCR comprises:
   (a) hybridizing a nucleic acid sequence having a detectable label to the nucleic acid sequence of the PVCR of a sample taken from the pre-adult anadromous fish, under conditions sufficient for the hybridization thereof; and
   (b) detecting the hybridization.

50. The method of claim 47, wherein detecting the level of expression of the PVCR comprises:
   (a) reverse transcribing mRNA from the tissue having at least one PVCR;
   (b) performing a PCR reaction with PVCR-specific primers to obtain RT-PCR product; and
   (c) determining the presence or amount of the PVCR.

51. A method of improving the raising of pre-adult anadromous fish, wherein the pre-adult anadromous fish are maintained in freshwater prior to transfer to seawater, comprising:
   a) adding at least one Polyvalent Cation Sensing Receptor (PVCR) modulator to the freshwater in an amount sufficient to modulate expression and/or sensitivity of at least one PVCR; and
   b) adding feed for fish consumption to the freshwater, wherein the feed contains an agent that contributes to a significantly increased level of said PVCR modulator in serum of the pre-adult anadromous fish.

52. The method of claim 51, wherein the agent comprises NaCl.

53. A method of decreasing the number of chloride cells in secondary lamellae in gill tissue of pre-adult anadromous fish, wherein the pre-adult anadromous fish are maintained in freshwater prior to transfer to seawater; the method comprises:
   a) adding at least one Polyvalent Cation Sensing Receptor (PVCR) modulator to the freshwater in an amount sufficient to modulate expression and/or sensitivity of at least one PVCR; and
   b) adding feed for fish consumption to the freshwater, wherein the feed contains an amount of NaCl sufficient to contribute to a significantly increased level of said PVCR modulator in serum of the pre-adult anadromous fish;
      wherein a decrease in chloride cells in secondary lamellae in gill tissue occurs, as compared to fish not subjected to steps a) and b).

54. The method of claim 53, further including determining a ratio of the distribution of chloride cells between secondary lamellae (SL) and primary lamellae (PL).

55. The method of claim 54, wherein the SL/PL ratio decreases, as compared to fish maintained in freshwater and not subjected to steps a) and b).

56. The method of claim 55, wherein the SL/PL ratio-is between about 1.0 and about 0.1.

57. A method of improving the raising of pre-adult anadromous fish, wherein the pre-adult anadromous fish are maintained in freshwater prior to transfer to seawater, comprising:
   a) adding at least one Polyvalent Cation Sensing Receptor (PVCR) modulator to the freshwater in an amount sufficient to modulate expression and/or sensitivity of at least one PVCR;
   b) adding feed for fish consumption to the freshwater, wherein the feed contains an amount of NaCl sufficient to contribute to a significantly increased level of said PVCR modulator in serum of the pre-adult anadromous fish; and
   c) exposing the pre-adult anadromous fish to a photoperiod sufficient to increase growth and/or induce smoltification.

58. The method of claim 57, wherein the pre-adult anadromous fish are exposed to a continuous photoperiod for between about 4 days and about 50 days.

59. The method of claim 58, wherein expression and/or sensitivity of at least one PVCR is modulated in stalk of the pineal gland.

60. A method of transferring pre-adult anadromous fish to seawater, wherein the pre-adult anadromous fish are maintained in freshwater prior to transfer to seawater, comprising:
   a) adding at least one Polyvalent Cation Sensing Receptor (PVCR) modulator to the freshwater in an amount sufficient to modulate expression and/or sensitivity of at least one PVCR; and
   b) adding feed for fish consumption to the freshwater, wherein the feed contains an amount of NaCl sufficient to contribute to a significantly increased level of said PVCR modulator in serum of the pre-adult anadromous fish;
   c) transferring the pre-adult anadromous fish to seawater; and
   d) exposing the pre-adult anadromous fish to a photoperiod sufficient to increase growth and/or induce smoltification.

61. The method of claim 60, wherein the pre-adult anadromous fish are exposed to a continuous photoperiod for between about 7 days and about 45 days.

62. A method of improving the raising of pre-adult anadromous fish, wherein the pre-adult anadromous fish are maintained in freshwater prior to transfer to seawater, comprising:
   a) adding at least one Polyvalent Cation Sensing Receptor (PVCR) modulator to the freshwater in an amount sufficient to modulate expression and/or sensitivity of at least one PVCR;
   b) adding feed for fish consumption to the freshwater, wherein the feed contains an amount of NaCl sufficient to contribute to a significantly increased level of said PVCR modulator in serum of the pre-adult anadromous fish; and
   c) transferring the fish to seawater, wherein the fish weigh between about 15 grams and 120 grams.

63. A method for improving the feed conversion ratio (FCR) for pre-adult anadromous fish, , wherein the pre-adult anadromous fish are maintained in freshwater prior to transfer to seawater, comprising:
   a) adding at least one Polyvalent Cation Sensing Receptor (PVCR) modulator to the freshwater in an amount sufficient to modulate expression and/or sensitivity of at least one PVCR;
   b) adding feed for fish consumption to the freshwater, wherein the feed contains an amount of NaCl sufficient to contribute to a significantly increased level of said PVCR modulator in serum of the pre-adult anadromous fish; and
   c) transferring the fish to seawater,
      wherein the FCR is sufficient to maintain the growth and feed consumption of the fish.

64. The method of claim 63, wherein the FCR is between about 0.7 and about 7.0.

65. A method of improving the raising of pre-adult anadromous fish, wherein the pre-adult anadromous fish are maintained in freshwater prior to transfer to seawater, comprising:
   a) adding magnesium and calcium to the freshwater in an amount sufficient to modulate expression and/or sensitivity of at least one PVCR; and
   b) adding feed for fish consumption to the freshwater, wherein the feed contains an amount of NaCl and at least one amino acid sufficient to contribute to a significantly increased level of calcium and/or magnesium in serum of the pre-adult anadromous fish.

66. The method of claim 60, wherein the PVCR modulator in the feed contains an amino acid selected from the group consisting of Tryptophan, Tyrosine, Phenylalanine, Alanine, Serine, Arginine, Histidine, Leucine, Isoleucine, Aspartic acid, Glutamic acid, Glycine, Lysine, Methionine, Asparagine, Proline, Glutamine, Threonine, Valine, and Cysteine at concentrations of between about 1 and about 10 gm/kg feed.

67. The method of claim 66, wherein the feed contains at least about 1% NaCl by weight.

68. The method of claim 67, wherein the calcium is added to the freshwater sufficient to bring the calcium concentration up to an amount between about 2.0 mM and about 10.0 mM.

69. The method of claim 68, wherein the magnesium is added to the freshwater sufficient to bring the magnesium concentration up to an amount between about 0.5 mM and about 10.0 mM.

70. A method of increasing Sodium Potassium ATPase (Na+K+ATPase) activity in chloride cells in tissues of pre-adult anadromous fish, wherein the pre-adult anadromous fish are maintained in freshwater prior to transfer to seawater; the method comprises:
   a) adding at least one Polyvalent Cation Sensing Receptor (PVCR) modulator to the freshwater in an amount sufficient to modulate expression and/or sensitivity of at least one PVCR; and
   b) adding feed for fish consumption to the freshwater, wherein the feed contains an amount of NaCl sufficient to contribute to a significantly increased level of said PVCR modulator in serum of the pre-adult anadromous fish;
      wherein an increase in chloride cells in Na+K+ATPase activity occurs, as compared to fish not subjected to steps a) and b).

71. A method of improving the raising of pre-adult anadromous fish, wherein the pre-adult anadromous fish are maintained in freshwater prior to transfer to seawater, comprising:
   a) adding magnesium and calcium to the freshwater in an amount sufficient to modulate expression and/or sensitivity of at least one PVCR; and
   b) adding feed for fish consumption to the freshwater, wherein the feed contains an amount of NaCl sufficient to contribute to a significantly increased level of calcium and/or magnesium in serum of the pre-adult anadromous fish.

72. The method of claim 71, wherein the calcium is added to the freshwater sufficient to bring the calcium concentration up to an amount between about 2.0 mM and about 10.0 mM.

73. The method of claim 72, wherein the magnesium is added to the freshwater sufficient to bring the magnesium concentration up to an amount between about 0.5 mM and about 10.0 mM.

74. The method of claim 73, wherein the feed contains at least about 1% NaCl by weight.

75. The method of claim 74, further including exposing the pre-adult anadromous fish to a photoperiod.

76. A method for modulating gut motility in pre-adult anadromous fish, wherein the pre-adult anadromous fish are maintained in freshwater prior to transfer to seawater; the method comprises:
   a) adding at least one Polyvalent Cation Sensing Receptor (PVCR) modulator to the freshwater in an amount sufficient to modulate expression and/or sensitivity of at least one PVCR;
   b) adding feed for fish consumption to the freshwater, wherein the feed contains an amount of NaCl and at least one amino acid sufficient to contribute to a significantly increased level of said PVCR modulator in serum of the pre-adult anadromous fish; and
   c) transferring the pre-adult anadromous fish to seawater;
      wherein modulation in the activity of 5-hydrotryptamine (5-HT), serotonin or melatonin occurs; and an increase in growth in the pre-adult anadromous fish occurs, as compared to pre-adult anadromous fish that are not subjected to steps a) and b).

77. A method for improving the utilization of feed components by pre-adult anadromous fish, wherein the pre-adult anadromous fish are maintained in freshwater prior to transfer to seawater; the method comprises:
   a) adding at least one Polyvalent Cation Sensing Receptor (PVCR) modulator to the freshwater in an amount sufficient to modulate expression and/or sensitivity of at least one PVCR in epithelial and neuroendocrine cells of the gasterointestinal tract and the brain; and b) adding feed for fish consumption to the freshwater, wherein the feed contains an amount of NaCl and at least one amino acid sufficient to contribute to a significantly increased level of said PVCR modulator in serum of the pre-adult anadromous fish;
wherein an increase in growth in the pre-adult anadromous fish occurs, as compared to pre-adult anadromous fish that are not subjected to steps a) and b).

78. A method for reducing osmotic stress in pre-adult anadromous fish, wherein the pre-adult anadromous fish are maintained in freshwater prior to transfer to seawater; the method comprises:
a) adding at least one Polyvalent Cation Sensing Receptor (PVCR) modulator to the freshwater in an amount sufficient to modulate expression and/or sensitivity of at least one PVCR;
b) adding feed for fish consumption to the freshwater, wherein the feed contains an amount of NaCl and at least one amino acid sufficient to contribute to a significantly increased level of said PVCR modulator in serum of the pre-adult anadromous fish; and
c) transferring the pre-adult anadromous fish to seawater; wherein modulating the expression and/or sensitivity of at least one PVCR occurs in chloride cells in gill tissue, or epithelial cells in the gastrointestinal tract, tubules of the kidney, skin or urinary bladder.

79. The method of claim 78, wherein modulating the expression and/or sensitivity of at least one PVCR occurs in one or more epithelial cells of the stomach, pyloric caeca, proximal or distal intestine.

80. The method of improving the intake and sensing of food of pre-adult anadromous fish, wherein the pre-adult anadromous fish are maintained in freshwater prior to transfer to seawater; the method comprises:
a) adding at least one Polyvalent Cation Sensing Receptor (PVCR) modulator to the freshwater in an amount sufficient to modulate expression and/or sensitivity of at least one PVCR;
b) adding feed for fish consumption to the freshwater, wherein the feed contains an amount of NaCl and at least one amino acid sufficient to contribute to a significantly increased level of said PVCR modulator in serum of the pre-adult anadromous fish; and
c) transferring the pre-adult anadromous fish to seawater; wherein modulation of the expression and/or sensitivity of the PVCR occurs in cells of olfactory lamellae or olfactory bulb.

81. A method for modulating circulating hormone concentrations in pre-adult anadromous fish, wherein the pre-adult anadromous fish are maintained in freshwater prior to transfer to seawater; the method comprises:
a) adding at least one Polyvalent Cation Sensing Receptor (PVCR) modulator to the freshwater in an amount sufficient to modulate expression and/or sensitivity of at least one PVCR;
b) adding feed for fish consumption to the freshwater, wherein the feed contains an amount of NaCl and at least one amino acid sufficient to contribute to a significantly increased level of said PVCR modulator in serum of the pre-adult anadromous fish; and
c) transferring the pre-adult anadromous fish to seawater; wherein an increase in growth in the pre-adult anadromous fish occurs, as compared to pre-adult anadromous fish that are not subjected to steps a) and b).

82. A method of improving the raising of pre-adult anadromous fish, wherein the pre-adult anadromous fish are maintained in freshwater prior to transfer to seawater, comprising:

a) adding magnesium and calcium to the freshwater in an amount sufficient to modulate expression and/or sensitivity of at least one PVCR; and
b) adding feed for fish consumption to the freshwater, wherein the feed contains an amount of NaCl and at least one PVCR modulator sufficient to contribute to a significantly increased level of calcium and/or magnesium in serum of the pre-adult anadromous fish.

83. The method of claim 82, wherein the calcium is added to the freshwater sufficient to bring the calcium concentration up to an amount between about 2.0 mM and about 10.0 mM.

84. The method of claim 83, wherein the magnesium is added to the freshwater sufficient to bring the magnesium concentration up to an amount between about 0.5 mM and about 10.0 mM.

85. The method of claim 84, wherein the feed contains at least about 1% NaCl by weight.

86. The method of claim 85, wherein the feed contains tryptophan in an amount between about 1 gm/kg and about 10 gm/kg.

87. The method of claim 86, further including exposing the pre-adult anadromous fish to a photoperiod.

88. A method for modulating gut motility in pre-adult anadromous fish, wherein the pre-adult anadromous fish are maintained in freshwater prior to transfer to seawater; the method comprises:
a) adding at least one Polyvalent Cation Sensing Receptor (PVCR) modulator to the freshwater in an amount sufficient to modulate expression and/or sensitivity of at least one PVCR in epithelial and neuroendocrine cells of the gastrointestinal tract and the brain; and
b) adding feed for fish consumption to the freshwater, wherein the feed contains an amount of NaCl and at least one amino acid sufficient to contribute to a significantly increased level of said PVCR modulator in serum of the pre-adult anadromous fish;
wherein an increase in growth in the pre-adult anadoromous fish occurs, as compared to pre-adult anadromous fish that are not subjected to steps a) and b).

89. A method of improving the raising of pre-adult anadromous fish, wherein the pre-adult anadromous fish are maintained in freshwater prior to transfer to seawater, comprising:
a) adding magnesium to the freshwater in an amount between about 0.5 mM and about 10.0 mM;
b) adding calcium to the freshwater in an amount between about 2.0 mM and about 10.0 mM;
c) adding feed for fish consumption to the freshwater, wherein the feed contains about 7% NaCl by weight and tryptophan in a concentration between about 1 gm/kg and about 10 gm/kg; and
d) exposing the pre-adult anadromous fish to a photoperiod.

90. A method of improving the raising of pre-adult anadromous fish, wherein the pre-adult anadromous fish are maintained in freshwater prior to transfer to seawater, comprising:
a) adding magnesium to the freshwater in an amount between about 0.5 mM and about 10.0 mM;
b) adding calcium to the freshwater in an amount between about 2.0 mM and about 10.0 mM;
c) adding feed for fish consumption to the freshwater, wherein the feed contains about 7% NaCl by weight; and
d) exposing the pre-adult anadromous fish to a photoperiod.

* * * * *